United States Patent
Loeken et al.

(10) Patent No.: US 12,157,545 B2
(45) Date of Patent: Dec. 3, 2024

(54) WIND ENERGY POWER PLANT AND METHOD OF CONSTRUCTION

(71) Applicant: PRINCIPLE POWER INC., Emeryville, CA (US)

(72) Inventors: Rolf Loeken, Haslum (NO); Henrik Hannus, Hoevik (NO); Geir Olav Berg, Jar (NO); Lars Laukeland, Kolsas (NO); Svein Ersdal, Oslo (NO); Bjoern Paulshus, Kjeller (NO); Terje Nymoen, Oslo (NO); Inge Bertin Almeland, Oslo (NO); Odd Olav Vatne, Grimstad (NO); Simen Fodstad Stoelen, Nesoddtangen (NO); Cliff Zimsen, Harestua (NO); Christophe Bekhouche, Oslo (NO)

(73) Assignee: Principle Power Inc., Emeryville, CA (US)

(*) Notice: Subject to any disclaimer, the term of this patent is extended or adjusted under 35 U.S.C. 154(b) by 472 days.

(21) Appl. No.: 17/428,986

(22) PCT Filed: Feb. 11, 2020

(86) PCT No.: PCT/NO2020/050035
§ 371 (c)(1),
(2) Date: Aug. 6, 2021

(87) PCT Pub. No.: WO2020/167137
PCT Pub. Date: Aug. 20, 2020

(65) Prior Publication Data
US 2022/0119081 A1    Apr. 21, 2022

(30) Foreign Application Priority Data

Feb. 12, 2019  (NO) .................................. 20190193
Apr. 23, 2019  (NO) .................................. 20190529
(Continued)

(51) Int. Cl.
*B63B 75/00*        (2020.01)
*B63B 3/06*         (2006.01)
(Continued)

(52) U.S. Cl.
CPC ................ *B63B 75/00* (2020.01); *B63B 3/06* (2013.01); *B63B 35/44* (2013.01); *B63B 77/10* (2020.01);
(Continued)

(58) Field of Classification Search
CPC ......... B63B 75/00; B63B 77/00; B63B 77/10; B63B 3/00; B63B 3/06; B63B 35/00;
(Continued)

(56) References Cited

U.S. PATENT DOCUMENTS 10,174,744 B2    1/2019  Aubault et al.
10,215,161 B2*   2/2019  Viselli ..................... F03D 13/25
(Continued)

FOREIGN PATENT DOCUMENTS

CN    102758446 A    10/2012
CN    103010415 A    4/2013
(Continued)

OTHER PUBLICATIONS

Website "Offshore wind turbines installation platform", https://web.archive.org/web/20190311055634/http://www.seaplace.es/plataforma-para-instalacion-de (2019).
(Continued)

*Primary Examiner* — Lars A Olson
(74) *Attorney, Agent, or Firm* — Dergosits & Noah LLP; Michael E. Dergosits

(57) ABSTRACT

A method for constructing a floater for a floatable wind energy power plant includes providing a first pre-assembled part with at least one first connection arrangement, providing a second pre-assembled part with at least one second
(Continued)

connection arrangement, arranging the at least one first connection arrangement of the first pre-assembled part proximate to the at least one second connection arrangement of the second pre-assembled part so as to form a connection site which includes at least a part of the at least one first connection arrangement and at least a part of the at least one second connection arrangement, sealingly arranging an enclosure about the connection site so as to seal the enclosure against an ingress of water, and connecting the first pre-assembled part and the second pre-assembled part at the connection site. Each of the first pre-assembled part and the second pre-assembled part are floatable.

15 Claims, 59 Drawing Sheets

(30) Foreign Application Priority Data

Jun. 25, 2019 (NO) .................................. 20190790
Sep. 12, 2019 (NO) .................................. 20191096

(51) Int. Cl.
  *B63B 35/44* (2006.01)
  *B63B 77/10* (2020.01)
  *F03D 13/10* (2016.01)
  *F03D 13/25* (2016.01)
(52) U.S. Cl.
  CPC ............. *F03D 13/10* (2016.05); *F03D 13/25* (2016.05); *B63B 2035/446* (2013.01); *F05B 2240/93* (2013.01); *F05B 2240/95* (2013.01); *F05B 2240/97* (2013.01)
(58) Field of Classification Search
  CPC ... B63B 35/44; B63B 2035/446; F03D 13/00; F03D 13/10; F03D 13/25; F05B 2240/93; F05B 2240/95; F05B 2240/97
  USPC ........................................................ 114/65 R
  See application file for complete search history.

(56) References Cited

U.S. PATENT DOCUMENTS

| | | | |
|---|---|---|---|
| 10,336,404 B2 * | 7/2019 | Dagher | .............. F03D 13/10 |
| 2001/0002757 A1 | 6/2001 | Honda et al. | |
| 2009/0307998 A1 | 12/2009 | Zavitz et al. | |
| 2011/0037264 A1 | 2/2011 | Roddier et al. | |
| 2011/0056168 A1 | 3/2011 | Springett et al. | |
| 2011/0192333 A1 | 8/2011 | Lilas et al. | |
| 2012/0055389 A1 | 3/2012 | Quah et al. | |
| 2012/0082514 A1 | 4/2012 | Horton, III et al. | |
| 2012/0114484 A1 | 5/2012 | Tosello | |
| 2012/0328437 A1 | 12/2012 | Tunbjer et al. | |
| 2013/0180445 A1 | 7/2013 | Large et al. | |
| 2013/0287502 A1 | 10/2013 | Rijken et al. | |
| 2014/0345218 A1 | 11/2014 | Larsen et al. | |
| 2015/0023790 A1 | 1/2015 | Friis | |
| 2015/0027358 A1 | 1/2015 | Liu et al. | |
| 2015/0071711 A1 | 3/2015 | Wong et al. | |
| 2015/0147174 A1 | 5/2015 | Couchman et al. | |
| 2015/0197318 A1 | 7/2015 | Ahn et al. | |
| 2015/0204312 A1 | 7/2015 | Patterson et al. | |
| 2016/0245261 A1 | 8/2016 | Cruse | |
| 2016/0272284 A1 | 9/2016 | Grossmann et al. | |
| 2016/0340000 A1 | 11/2016 | Dagher et al. | |
| 2016/0369780 A1 | 12/2016 | Aubault et al. | |
| 2018/0030963 A1 | 2/2018 | Viselli et al. | |
| 2018/0051677 A1 | 2/2018 | Aubault et al. | |
| 2018/0134344 A1 | 5/2018 | Dagher et al. | |
| 2020/0307745 A1 | 10/2020 | Aguire Suso et al. | |

FOREIGN PATENT DOCUMENTS

| | | | |
|---|---|---|---|
| CN | 103373439 A | | 10/2013 |
| CN | 107539433 A | | 1/2018 |
| CN | 108240292 A | | 7/2018 |
| CN | 111075659 A | | 4/2020 |
| EP | 2 899 111 A1 | | 7/2015 |
| EP | 3 342 699 A1 | | 7/2018 |
| ES | 2 644 169 A1 | | 11/2017 |
| FR | 2 887 900 A1 | | 1/2007 |
| GB | 2 210 334 A | | 6/1989 |
| GB | 2507248 A | | 4/2014 |
| JP | H02-501561 A | | 5/1990 |
| JP | 2001-165032 A | | 6/2001 |
| JP | 2004-44117 A | | 2/2004 |
| JP | 2009-12620 A | | 1/2009 |
| JP | 2010216273 A | | 9/2010 |
| KR | 10-2015-0012422 A | | 2/2015 |
| KR | 10-2015-0120731 A | | 10/2015 |
| KR | 10-2015-0145978 A | | 12/2015 |
| KR | 10-2017-0140289 A | | 12/2017 |
| KR | 10-1933168 B1 | | 12/2018 |
| NO | 176353 B | | 12/1994 |
| NO | 19960359 A | | 7/1997 |
| NO | 20092912 A1 | | 3/2011 |
| TW | 202016429 A | | 5/2020 |
| WO | WO 2006/096723 A2 | | 9/2006 |
| WO | WO 2009/131826 A2 | | 10/2009 |
| WO | WO 2013/093614 A1 | | 6/2013 |
| WO | WO 2013/110276 A1 | | 8/2013 |
| WO | WO 2014/070024 A2 | | 5/2014 |
| WO | WO 2015/070282 A1 | | 5/2015 |
| WO | WO 2015/120227 A1 | | 8/2015 |
| WO | WO 2018/095304 A1 | | 5/2018 |
| WO | WO 2018/096650 A1 | | 5/2018 |

OTHER PUBLICATIONS

I.-B. Almeland et al.: "Snorre B. Hull: Design, Fabrication, Erection and Transportation.", OTC 2002 Paper 14224, pp. 1-11 (2002).
Y. Jiang et al.: "Hydrodynamic Performance of a Novel Floating Foundation for Offshore Wind Turbine", Proceedings of the Twenty-eighth (2018) International Ocean and Polar Engineering Conference, pp. 378-385 (2018).
Y. Okumoto: "4-8 Applications of Welding and Joining Technology (Shipbuilding)", Journal of the Japan Welding Society, pp. 51-56 (2010).
K. Ikegami et al.: "Development of Multi-Connected Floating System", The Japan Society of Naval Architects and Ocean Engineers, pp. 133-134 (2004), English Version.
Floating Offshore Wind Power Generation Technology Guidebook, New Energy and Industrial Technology Development Organization, pp. 1-6 (2018), English Version.

* cited by examiner

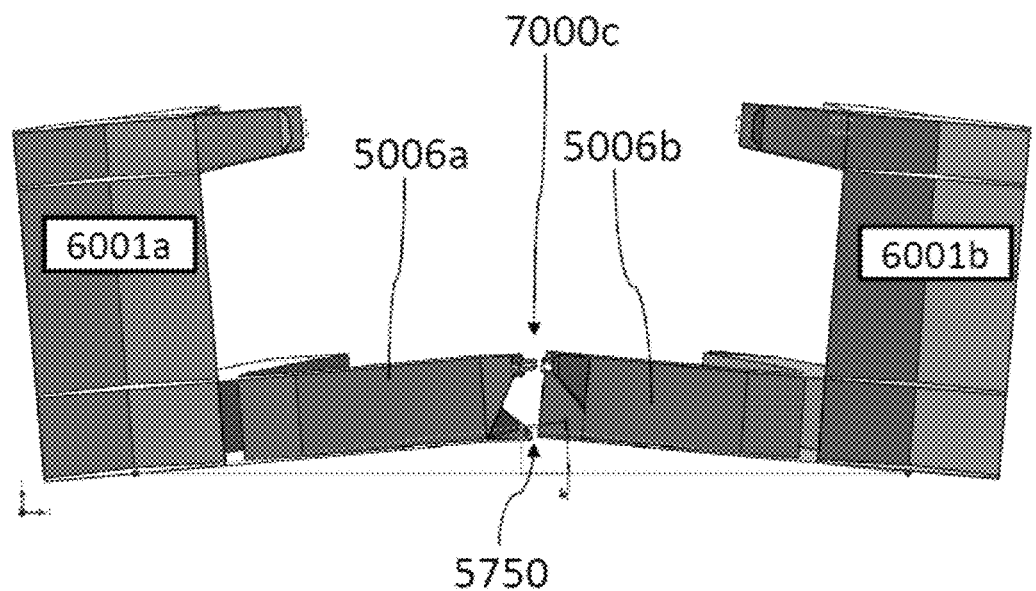
Fig. 14g
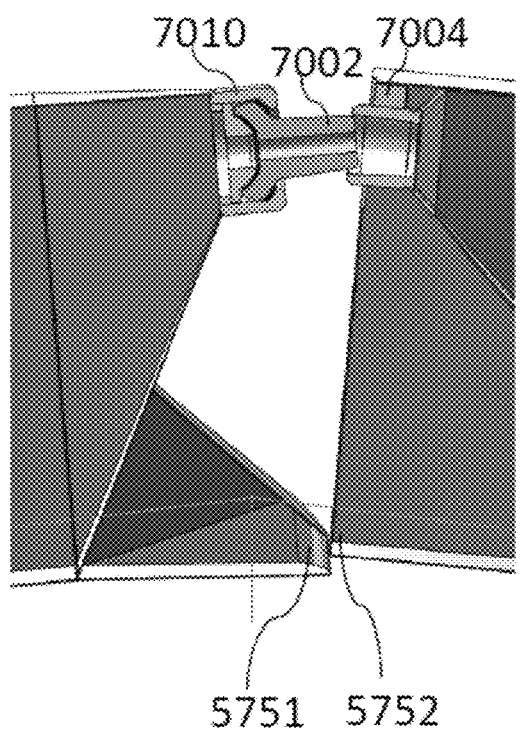
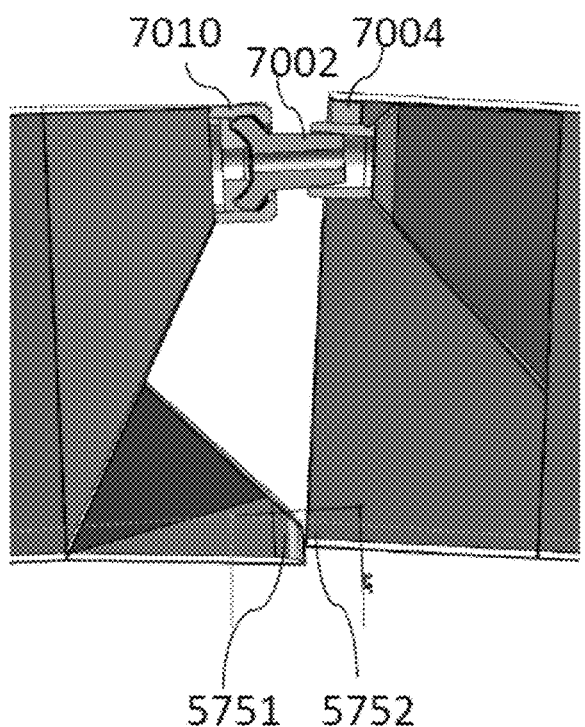
Fig. 14hFig. 14i

WIND ENERGY POWER PLANT AND METHOD OF CONSTRUCTION

CROSS REFERENCE TO PRIOR APPLICATIONS

This application is a U.S. National Phase application under 35 U.S.C. § 371 of International Application No. PCT/NO2020/050035, filed on Feb. 11, 2020 and which claims benefit to Norwegian patent application Ser. No. 20/190,193, filed on Feb. 12, 2019, to Norwegian patent application Ser. No. 20/190,529, filed on Apr. 23, 2019, to Norwegian patent application Ser. No. 20/190,790, filed on Jun. 25, 2019, and to Norwegian patent application Ser. No. 20/191,096, filed on Sep. 12, 2019. The International Application was published in English on Aug. 20, 2020 as WO 2020/167137 A1 under PCT Article 21(2).

FIELD

The present disclosure relates to offshore wind energy power plants, as well as methods for construction and assembly of wind energy power plants.

BACKGROUND

Floating, offshore wind energy converters are being studied and developed by various research and development (R&D) groups, both within academia and industry. While not yet in widespread commercial use, it is expected that further development of floating offshore wind technology will make such plants more competitive and a viable alternative for many locations in the near future.

Publications which may be useful to understand the background include WO 2009/131826 A2 and WO 2013/110276 A1.

SUMMARY

With a projected continued increase in the investments into wind power in the future, there is a need for further improved technology in this area. The present disclosure has the objective to provide such improvements, or at least alternatives, to the current state of the art.

The present invention provides a method for constructing a floater for a floatable wind energy power plant which includes providing a first pre-assembled part comprising at least one first connection arrangement, providing a second pre-assembled part comprising at least one second connection arrangement, arranging the at least one first connection arrangement of the first pre-assembled part proximate to the at least one second connection arrangement of the second pre-assembled part so as to form a first connection site which comprises at least a part of the at least one first connection arrangement and at least a part of the at least one second connection arrangement, sealingly arranging an enclosure about the first connection site so as to seal the enclosure against an ingress of water, and connecting the first pre-assembled part and the second pre-assembled part at the first connection site. Each of the first pre-assembled part and the second pre-assembled part are configured to be floatable.

The present disclosure will become apparent from the detailed description given below. The detailed description and specific examples disclose preferred examples of the disclosure by way of illustration only. Those skilled in the art understand from guidance in the detailed description that changes and modifications may be made within the scope of the disclosure.

Hence, it is to be understood that the disclosure herein is not limited to the particular component parts of the device described or steps of the methods described since such device and method may vary. It is also to be understood that the terminology used herein is for the purpose of describing particular embodiments only, and is not intended to be limiting. It should be noted that, as used in the specification and the appended claims, the articles "a", "an", "the", and "said" are intended to mean that there are one or more of such elements unless the context explicitly dictates otherwise. Thus, for example, reference to "a unit" or "the unit" may include several devices, and the like. Furthermore, the words "comprising", "including", "containing" and similar wordings do not exclude other elements or steps.

One example described herein relates to a method of constructing elongate sections for a floater of a floatable wind power plant, the method comprising:
  a. assembling a plurality of flat plate panels into polyhedral sections, and
  b. successively interconnecting the polyhedral sections to form the elongate sections (6001-6003,1501-1506).

A second example relates to a method comprising assembling a floater (3000) of a floatable wind power plant comprising one elongate section (6001-6003, 1501-1506).

A third example relates to a method comprising: constructing three pre-assembled parts (4501a-c) for the floater (3000), each pre-assembled part comprising at least one of the elongate sections; and assembling the floater (3000) by interconnecting the three pre-assembled parts (4501a-c) at at least two connection sites between each of the three pre-assembled parts.

A fourth example relates to a method comprising providing a connector at each of the at least two connection sites.

A fifth example relates to a method wherein the connector comprises a first connection element attached to a first of the three pre-assembled parts (4501a-c) and a second connection element attached to a second of the three pre-assembled parts (4501a-c).

A sixth example relates to a method wherein the first connection element comprises a protruding part (7001) and the second connection element (7004) comprises a receiver part (7003), with a fixing element (7006) therebetween to interlock the first and second elements.

A seventh example relates to a method wherein the step of assembling the floater comprises interconnecting the three pre-assembled parts by means of welding.

An eighth example relates to a method comprising assembling a floater (3000) of a floatable wind power plant comprising one elongate section (6001-6003, 1501-1506) as a vertical support column.

A ninth example relates to a method comprising assembling a floater (3000) of a floatable wind power plant having at least two vertical support columns (6001-6003), and comprising an elongate section (6001-6003,1501-1506) forming a connection member between the vertical support columns.

A tenth example relates to a method wherein the connection member is oriented perpendicular relative to at least one of the at least two vertical support columns (6001-6003).

A eleventh example relates to a method wherein the connection member is oriented obliquely relative to at least one of the at least two vertical support columns (6001-6003).

A twelfth example relates to a method comprising at least two connection members, at least one of the at least two connection members being oriented perpendicularly, and at least one of the at least one of the at least two connection members being oriented obliquely, relative to at least one of the vertical support columns (6001-6003).

A thirteenth example relates to a method comprising successively interconnecting the polyhedral sections (1510, 1511,1512) by welding.

A fourteenth example relates to a method wherein the elongate sections (6001-6003,1501-1506) define pontoon connection members (1504-1506).

A fifteenth example relates to a method wherein at least one of the flat plate panels (1530a-n) is reinforced with stiffening elements and/or joint plates (1522,1523) provided at an inward-facing surface of the polyhedral sections (1510, 1511,1512).

A sixteenth example relates to a method wherein at least two of the flat plate panels (1530a-n) are reinforced with stiffening elements and/or joint plates (1522,1523) provided at an inward-facing surface of the polyhedral sections (1510, 1511,1512), and the step of successively interconnecting the polyhedral sections (1510,1511,1512) comprises interconnecting the stiffening elements (1522,1523) of the at least two flat plate panels (1530a-n) by welding.

The detailed description, claims and appended drawings outline various further aspects and embodiments.

BRIEF DESCRIPTION OF THE DRAWINGS

The above and other characteristics will become clear from the following description of illustrative embodiments, given as non-restrictive examples, with reference to the attached drawings, in which:

FIGS. 14*g*-14*i* illustrate the connection of pontoon unit parts using a connector.

DETAILED DESCRIPTION

Figure 1A:
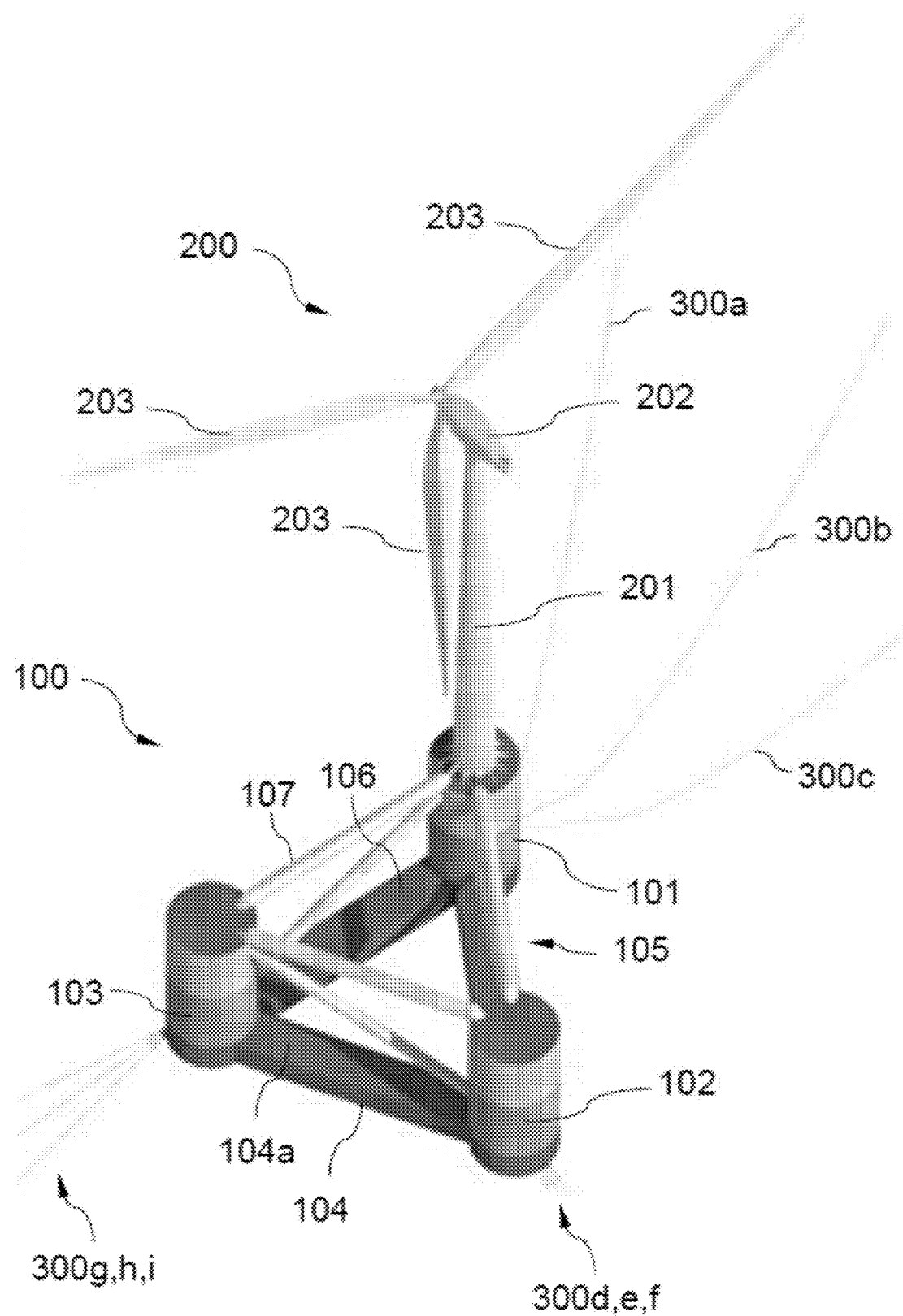
FIG. 1*a* is a perspective view of a floatable wind energy power plant according to an embodiment.

The following description may use terms such as "horizontal", "vertical", "lateral", "back and forth", "up and down", "upper", "lower", "inner", "outer", "forward", "rear", etc.

These terms generally refer to the views and orientations as shown in the drawings and that are associated with a normal use of the invention. The terms are used for the reader's convenience only and shall not be limiting.

FIG. 1a shows a floatable power plant comprising a floater 100 and a wind turbine 200. The wind turbine 200 can be of a conventional design (see, for example, publications WO 2009/131826 A2 and WO 2013/110276 A1 referenced above) with a tower 201, a nacelle 202 and blades 203.

The floater 100 comprises three columns 101,102,103. Each of the columns 101,102,103 is connected to at least two of the other columns 101,102,103. In some embodiments, there may be more than three columns in the floater 100, for example four, five or six columns.

Figure 1B:
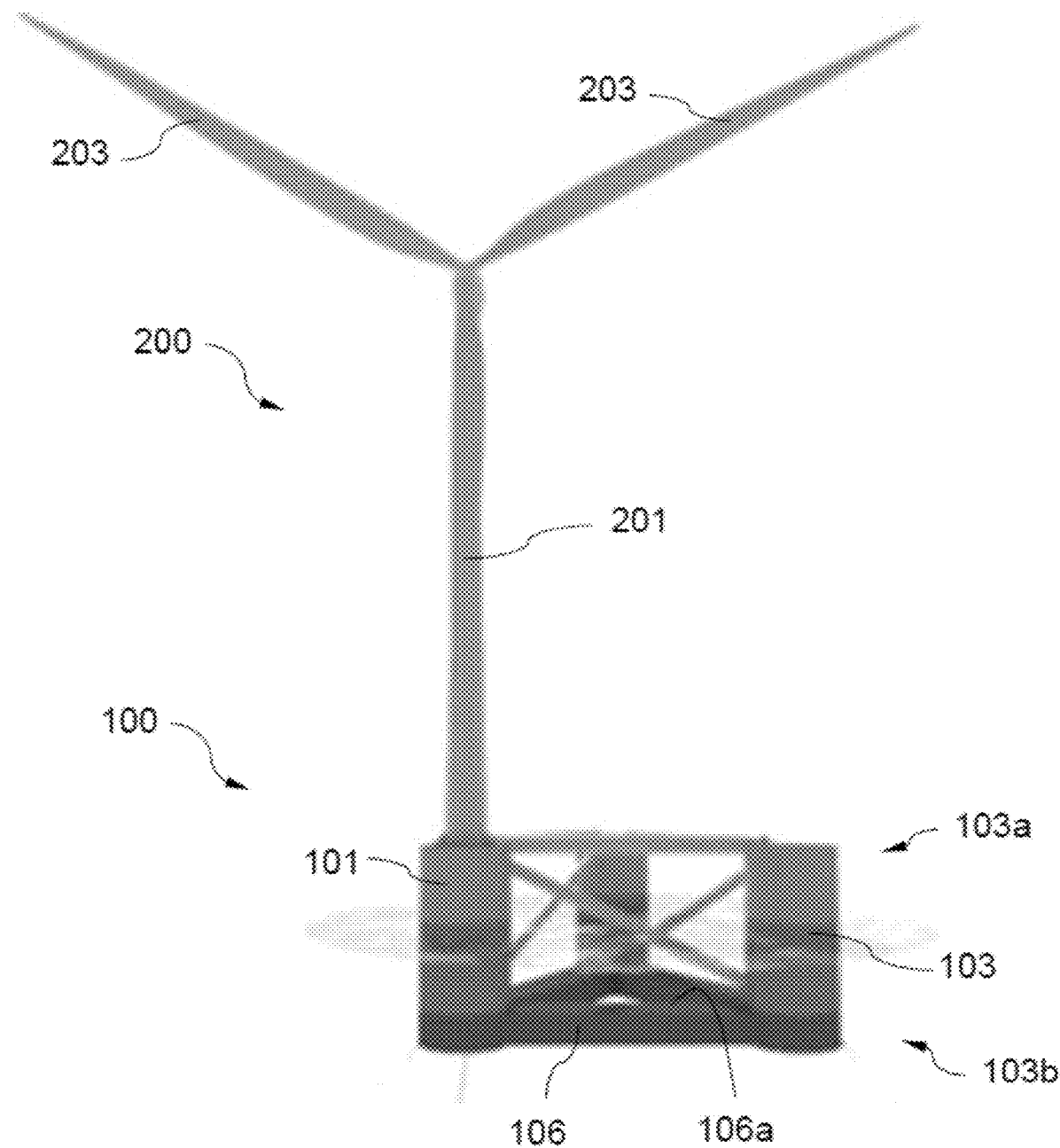
FIG. 1*b* is a side view of the floatable wind energy power plant of FIG. 1*a*.

Each column 101,102,103 has a lower part configured to be submerged in an operational position of the floater 100, indicated as 103b in FIG. 1b in relation to column 103. Further, each column 101,102,103 has an upper part 103a configured to be non-submerged in an operational position of the floater 100. The columns 102 and 103 have corresponding upper and lower parts.

Each column 101,102,103 is connected to at least two of the other columns at lower parts of the respective columns 101,102,103. This connection may be by means of substantially horizontal connection members.

Each column 101,102,103 may be provided with a ballasting system, for example ballast tanks or chambers adapter to be selectively filled with water. In this manner, the draught of the floater 100 can be regulated.

According to embodiments described herein, the floater 100 may be arranged without an active ballasting system, while still providing satisfactory operational characteristics for optimum wind energy exploitation. In some implementation of embodiments described herein, it may nevertheless be desirable to employ an active ballasting system in conjunction with other features as described herein.

In the embodiment illustrated in FIG. 1a, the connection members comprise pontoon units 104,105,106. The pontoon units 104,105,106 extend horizontally between the respective columns 101,102,103.

The pontoon units 104,105,106 may comprise ballast chambers which can selectively be ballasted or de-ballasted to a state where the pontoon units 104,105,106 has positive buoyancy in water, to provide buoyancy to the floater 100.

Alternatively, the pontoon units 104,105,106 may comprise permanent buoyancy (void) chambers such that the pontoon units 104,105,106 has permanent positive buoyancy in water, to provide buoyancy to the floater 100.

The floater 100 may optionally be provided without an active ballasting system, cf. WO 2009/131826 A2 and WO 2013/110276 A1 referenced above.

According to some aspects and embodiments described herein, easier manufacturing and installation can be realised. By providing pontoon units 104,105,106 with positive buoyancy (either permanent or selectively) between the lower parts of columns 101,102,103, it is, for example, possible to manufacture or carry out installation work on the floater 100 in shallower water, for example near a quay or shoreside without deepwater facilities. This can be achieved by de-ballasting the floater 100 (e.g. by de-ballasting ballast tanks/chambers in the columns 100,101,102 and/or ballast tanks/chambers in the pontoon units 104,105,106, if applicable), whereby the floater 100 will float high in the water due to the buoyancy of the pontoon units 104,105,106.

Each of the connection members may further, alternatively or additionally, be provided with a substantially horizontal plate arranged between the lower parts of the columns 101,102,103. One such horizontal plate 104a is indicated in FIG. 1a in relation to pontoon unit 104 and one plate 106a is indicated in FIG. 1b in relation to pontoon unit 106.

In the embodiment illustrated in FIGS. 1a and 1b, the plates 104a,106a form an upper section of the respective pontoon units 104,106 and are integral parts of the pontoon units 104,106. Alternatively, the plates 104a,106a may be independent of the pontoon units 104,106, or used without a pontoon unit 104,106. In some embodiments, the floater 100 may therefore comprise plates connecting the columns 101,102,103, and no pontoon units. Such plates may, for example, be steel plates designed for the purpose and may, for example, have strengthening members such as beams arranged thereon for appropriate structural integrity.

The plates 104a,106a provide damping of the floaters' 100 motion in the sea, notably so-called hydrodynamic added mass to reduce for example heave motion of the floater. It is known that damping plates, for example "water entrapment plates" (see the above referenced WO 2009/131826 A2) may be exposed to high fatigue loads, which require adaptions to ensure a sufficiently strong design of both the plate and the parts to which they are fixed (e.g. the columns 101,102,103). Reduced service life may still be experienced due to the high forces involved, particularly in weather-harsh areas. According to some embodiments of the present disclosure, improved sea behaviour can be realised with simpler design and easier manufacturing, which improves the cost efficiency of the unit.

In addition to the connection members, a truss structure 107 may be arranged between two or more of the pontoon units 104,105,106 for stabilisation. The truss structure 107 may extend between upper parts of two columns, between lower parts of two columns, or between and upper part of one column and a lower part of another column.

The tower 201 is arranged fixed to one of the columns 101,102,103. In the illustrated embodiment the tower 201 is fixed to column 101. In this embodiment, the tower 201 is positioned vertically above the column 101, extending upwardly from the column 101, however may alternatively be fixed to the side of the column 101, for example via a support structure fixed to the column 101. The tower 201 may be co-centrically arranged with the column 101, or a central axis of the tower 201 may be offset from a central axis of the column 101.

Mooring lines 300a-i may be provided from the floater 100, in this embodiment with three mooring lines extending from each of the three columns 101,102,103.

Figure 2A:
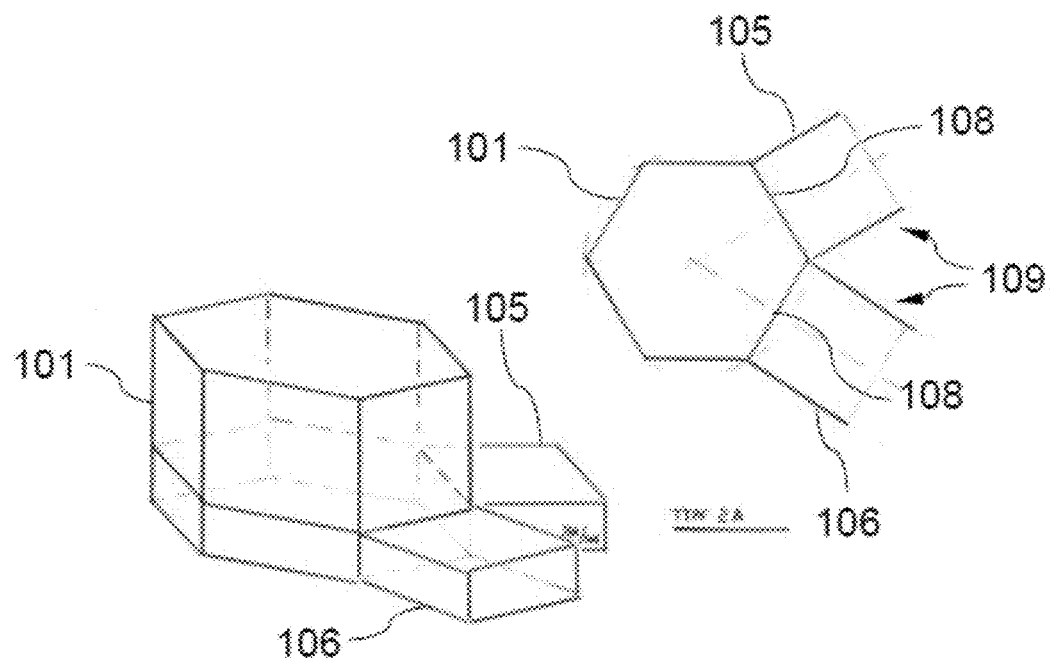
FIG. 2*a* illustrates parts of an embodiment of a wind energy power plant.

FIG. 2a illustrates an embodiment of the power plant. The embodiment may include one or more of the features described above in relation to FIGS. 1a and 1b. One or more of the columns 101,102,103 may have a planar surface 108 which forms the interface between the column and the respective connection members between the columns 101, 102,103, in this embodiment pontoon units 104,105,106. The pontoon units 104,105,106 may have corresponding planar surfaces at its end(s), or corresponding straight edges in the event that that the connection members are substantially flat plates, which interface with the planar surface of the columns 101,102,103.

The columns 101,102,103 may, for example, be polygonal. In the embodiment shown in FIG. 2a, the column 101 is hexagonal in its horizontal cross-section. The pontoon units 104,105,106 may be arranged at adjacent planes of the polygonal column 101, as illustrated in FIG. 2a. Two pontoon units 105,106 connected to a column 101, as shown in FIG. 2a, may themselves be connected, e.g. by means of welding (if positioned in direct contact) or by means of connection pieces, etc. The connection between the pontoon units 105,106 may be arranged between two adjacent surfaces 109.

Figure 2B:
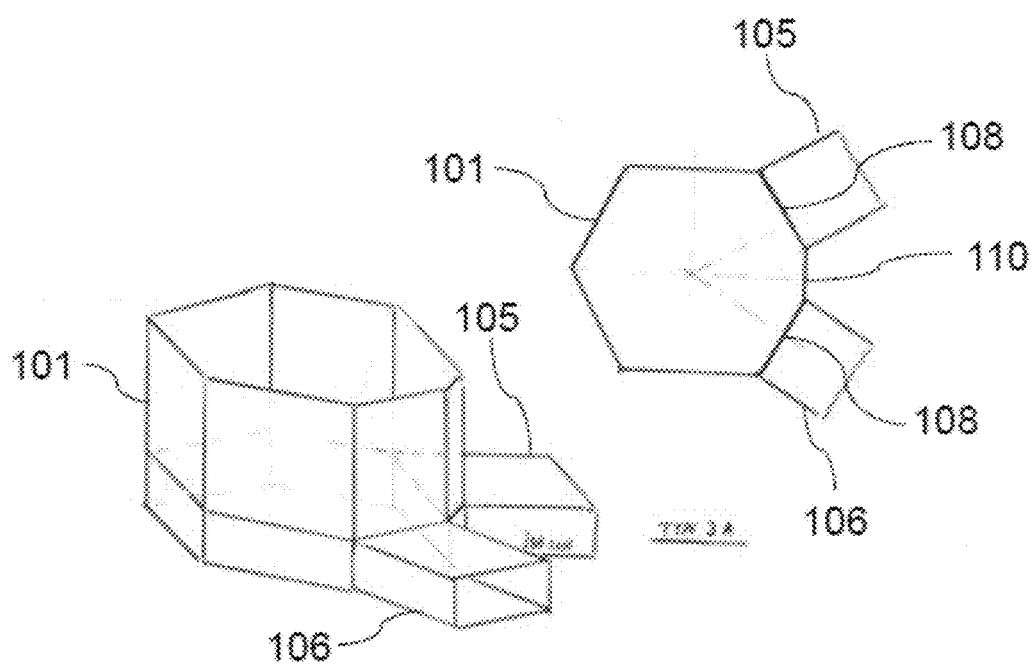
FIG. 2*b* illustrates parts of an embodiment of a wind energy power plant.

Alternatively, as illustrated in FIG. 2b, there may be a face 110 arranged between the faces 108 which interface the connection members, in this case the pontoon units 104,105, 106. The face 110 may be a planar surface, e.g. if the column 101 is polygonal, or it may be, for example, a rounded surface. The face 110 may be designed for best structural strength and easiest manufacturing, optionally in conjunction with strengthening elements between the connection members and/or within the column 101.

Arrangements as shown in FIGS. 2a and 2b may ease the structural design and manufacturing of the columns 101, 102,103 and/or the pontoon units 104,105,106. For example, planar faces may reduce the requirements for accuracy in the manufacturing of the floater 100, for example permitting this to be carried out at a not-for-purpose location such as a quay without yard facilities.

Figure 3A:
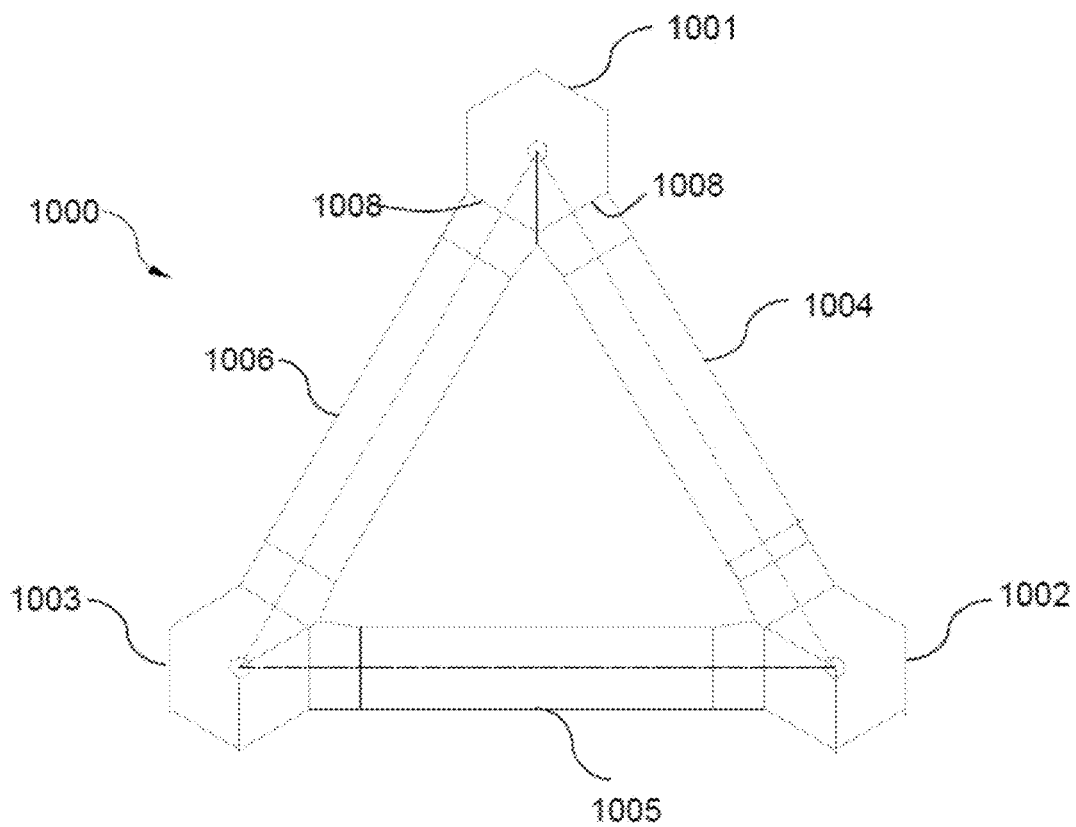
FIG. 3*a* illustrates a base of a floater.

According to further aspects, FIG. 3a illustrates a top view of a base 1000 of a floater. As depicted in FIG. 3a, the base 1000 comprises three corner members 1001-1003. Each corner member 1001-1003 is fixed to and interconnects two of connection members 1004-1006, in this case pontoon units. The connection between the corner members 1001-1003 and the respective connection members 1004-1006 may be a welded, bolted, or other type of connection. The corner members 1001-1003 may be provided with planar interfaces 1008 to facilitate connection with connection members 1004-1006.

In an embodiment, the base 1000 is made up of several interconnected polyhedron or flat panel structures, methods of the construction of which are described herein. The corner members 1001-1003 and the connection members 1004-1006 may be polyhedron structures. For example, each corner member 1001-1003 can have a hexagonal structure and each connection member 1004-1006 can have a flat panel structure as illustrated e.g. in FIG. 5a.

The connection members 1004,1005,1006 (in this embodiment, pontoon units) may have corresponding planar surfaces 1008 at their end(s), or corresponding straight edges in the event that the connection members are substantially flat plates, which interface with a planar surface or interface of columns of the floater.

The base 1000 according to this embodiment may thus be manufactured in parts (e.g., manufacturing the corner members 1001-1003 separately and the pontoon units 1004-1006 separately) and assembled together into the base 1000 as indicated in FIG. 3a. Optionally, the base 1000 may be pre-fabricated as a single unit, i.e. not as an assembly of parts. Such a single unit may be advantageous in some instances, for example where fabrication capability allows the base to be manufactured near an installation site.

In any of the embodiments described herein, the base 1000 may be submersible, and the base 1000 may have a positive buoyancy, or selectively positive buoyancy (the latter being the case if the base 1000, for example, comprises ballast chambers).

Figure 3B:
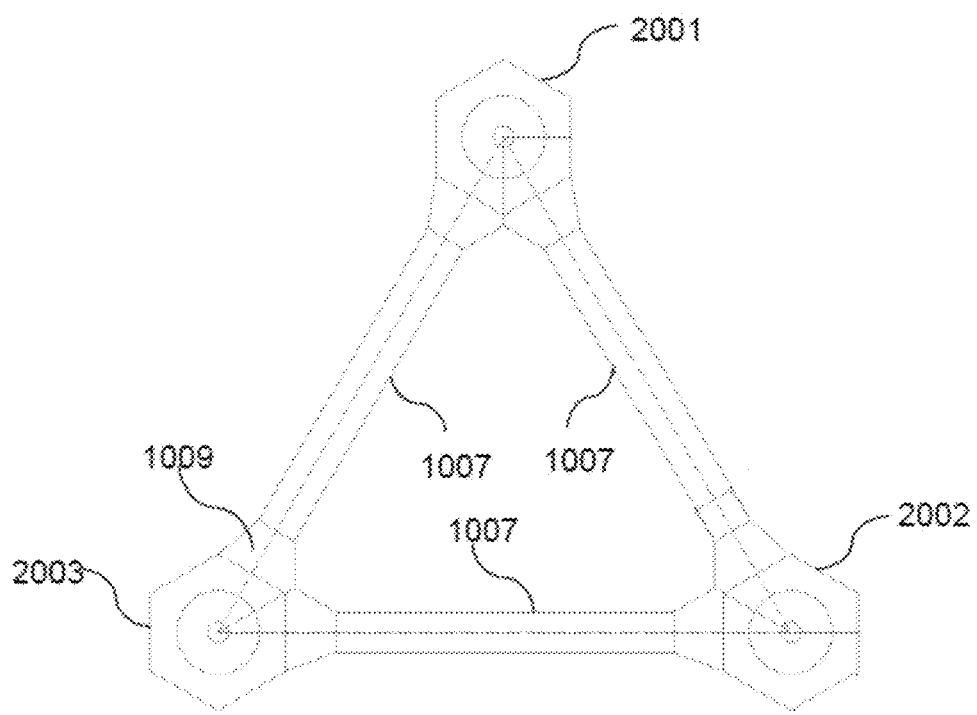
FIG. 3*b* illustrates a perspective view of columns of a floater.

FIG. 3b illustrates a top view of columns 2001-2003 of a floater with a truss structure 1007 arranged between the columns 2001-2003. In this embodiment, each column 2001-2003 is arranged on a respective corner member 1001-1003 (see FIG. 3a), whereby a lower end of each column 2001-2003 is fixed to the corner member 1001-1003, and thereby to the base 1000. The connection between the columns 2001-2003 and the respective corner member 1001-1003 may be, for example, a bolted connection, a welded connection, or any other type of mechanical connection.

In one embodiment, the columns 2001-2003 can be made up of plurality of flat panel or polyhedron structures. While the structure of columns 2001-2003 in FIG. 3b is illustrated as hexagonal, they can have a different cross-sectional shape.

Alternatively, the columns 2001-2003 can be manufactured by assembling several flat panel or polyhedron structures.

The truss structure 1007 extends between upper parts of the columns 2001-2003 and comprises connectors 1009, configured to engage and fixed to corresponding connector parts arranged on the upper part of each column 2001, 2002 and 2003.

In an embodiment, the truss structure 1007 can be made up of a plurality of polygonal flat panels. Alternatively, the plurality of polygonal flat panels can be assembled to form the truss structure 1007. In some embodiments, the truss structure 1007 may, however, be formed for example of beams having a different shape, for example beams having a circular cross-section.

Figure 4A:
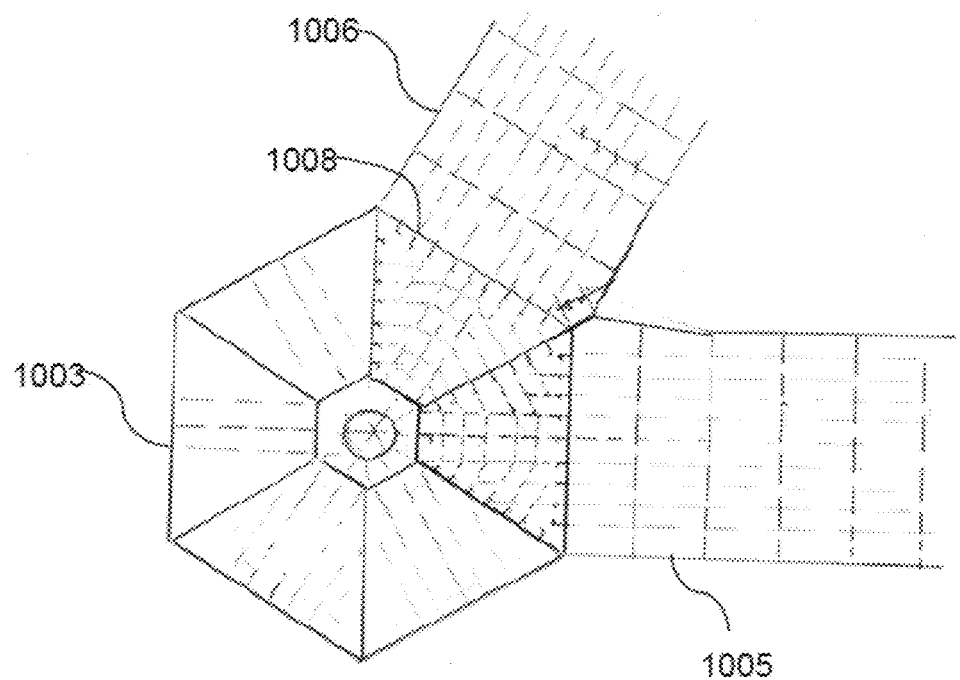
FIG. 4*a* illustrates a structure of the base of a floater.

FIG. 4a illustrates parts of a structure of the base 1000 of a floater. As described above, each corner member 1001-1003 of the base 1000 can be made up of polyhedron or flat panel structures with multiple straight edges and planar faces.

In an embodiment, each corner member 1001-1003 of the base 1000 can have a hexagonal shape as illustrated in FIG. 4a. The connection members 1005 and 1006 having planar end interfaces 1008 are fixed to outer surfaces of the corner member 1003 as illustrated in FIG. 4a.

Figure 4B:
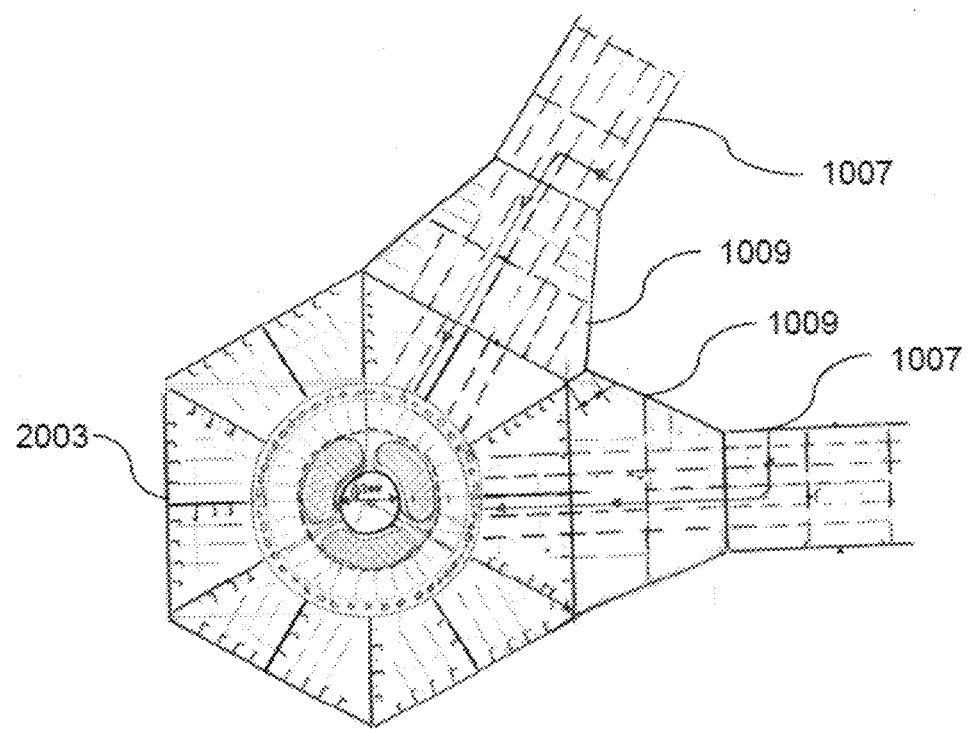
FIG. 4*b* illustrates a structure of a column of a floater.

FIG. 4b illustrates a structure of columns 2001-2003 of a floater. As depicted in FIG. 4b, each column 2001-2003 can have a hexagonal structure. The truss structure 1007, in this embodiment made up of polygonal flat panels, can be fixed to upper parts of the columns 2001-2003. Optionally, the truss structure 1007 can have a different configuration which may have planar ends for connection to the columns 2001-2003.

Figure 5A:
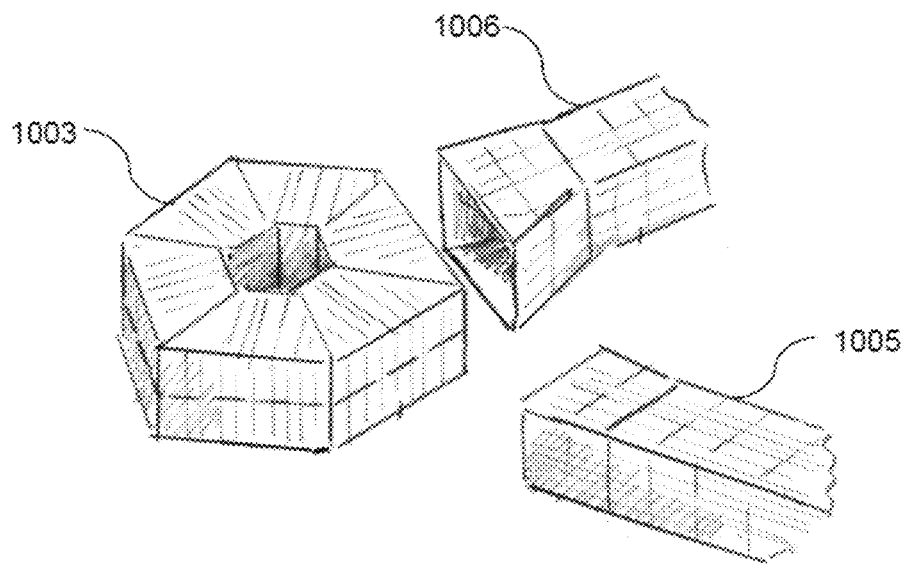
FIGS. 5*a*-5*c* illustrate a cross sectional view of the base of a floater.
Figure 5B:
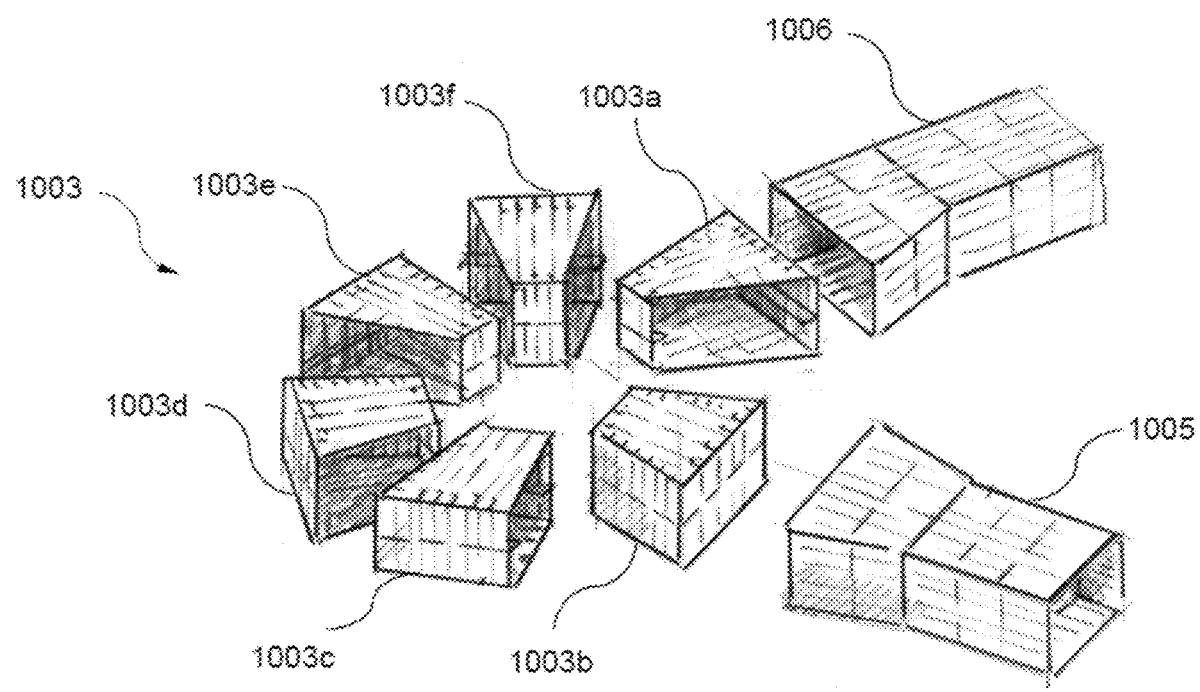
Figure 5C:
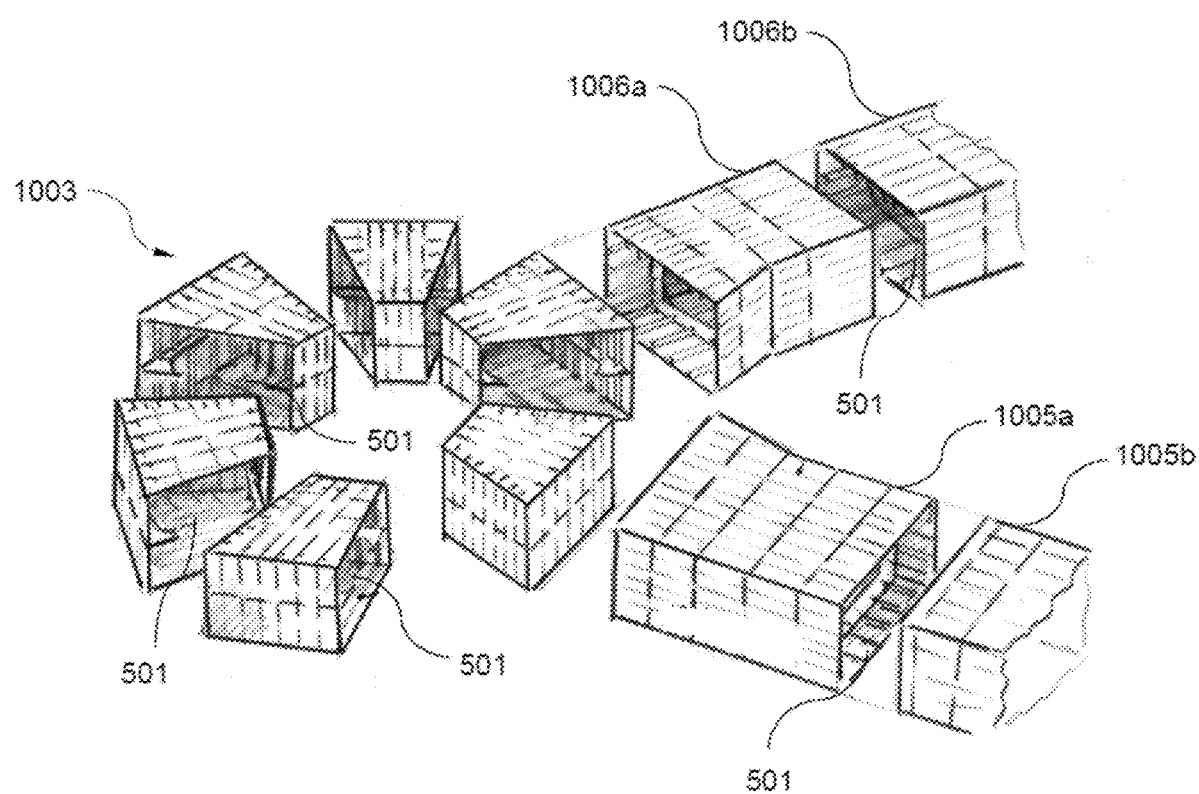

FIGS. 5a-5c illustrate a view of parts of the base 1000 of a floater. As depicted in FIG. 5a, the cross section of each corner member 1001-1003 can have a hexagonal structure and the connection members 1004-1006 can have a rectangular structure (e.g. a rectangular cross-section). The corner member 1003 having a hexagonal structure with connection members 1005 and 1006 designed to be fixed to the corner member 1003 is illustrated in FIG. 5a.

Each corner member 1001-1003 can be made up of a plurality of individual panel plate structures 1003a-1003f. For example, as illustrated in FIG. 5b, panel structures 1003a-1003f are assembled to form the connection member 1003 as shown in FIG. 5a.

Each corner member 1001-1003 according to this embodiment can be manufactured in parts (e.g. manufacturing each panel structure 1003a-1003f separately) which are then interconnected together into the each corner member 1001-1003. Alternatively, each corner member 1001-1003 may be pre-fabricated as a single unit, i.e. not as an assembly of parts.

Alternatively or additionally, each connection member 1004-1006 can be made up of plurality of rectangular flat panels. For example, the connection member 1005 can be made up of rectangular flat panel structures 1005a and 1005b and the connection member 1006 can be made up of rectangular flat panel structures 1006a and 1006b respectively, as illustrated in FIG. 5c.

The flat panel structures 1003a-1003f forming the corner member 1003 can include strengthening members 501, which can include horizontal and/or vertical beams. These horizontal or vertical beams provide support and strength (i.e., stiffness) when the structures 1003a-1003f are interconnected to form the corner member 1003.

Advantageously, the base 1000 may be made up of a plurality of structures 1003a-f, wherein at least some of the structures 1001a-f are an open polyhedron which are combined to form a closed polyhedron. By open polyhedron it is meant a structure comprising flat panels but having at least one open side. The open side of one polyhedron structure is then fixed, e.g. by welding, to an open or a closed side of another polyhedron. Referring to FIG. 5b, structure 1003a, for example, is an open polyhedron with the front side open. The back side (that interfacing structure 1003f) is closed. Structure 1003b is a closed polyhedron, whereby open sides of structures 1003a and 1003c interfaces closed sides of structure 1003b. Structure 1003f is an open polyhedron which is open on two opposing sides. This may further ease manufacturing of the floater, for example in that pre-manufactured structures can be provided, whereby when these are assembled a base 1000 and floater with the desired structural strength can be obtained.

The term 'polyhedron' as used herein, as well as similar terms (e.g. polyhedral), in this and in subsequent embodiments and aspects, should thus be taken to mean an open polyhedron or a closed polyhedron, i.e. a three-dimensional structure with flat polygonal side faces, straight edges and sharp corners or vertices, whether or not the structure is closed or has one or more open sides.

Figure 6A:
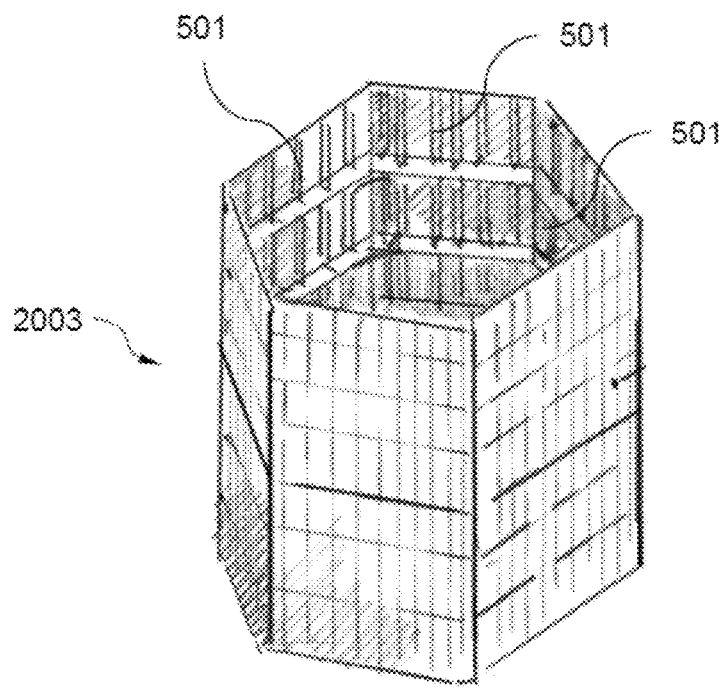
FIGS. 6*a* and 6*b* illustrate a cross sectional view of the columns of a floater.
Figure 6B:
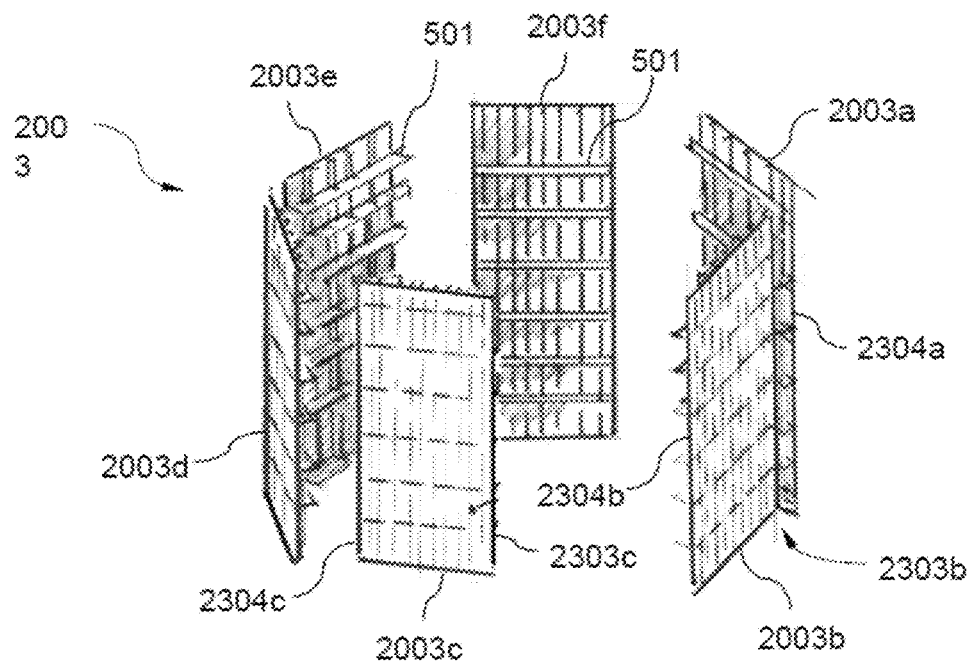

FIGS. 6a-6b illustrate the columns 2001-2003 of the floater of this embodiment. As depicted in FIG. 6a, the cross section of each of the columns 2001-2003 can have a hexagonal structure. The columns 2001-2003 can include strengthening members 501 i.e., horizontal and/or vertical beams at inner walls of the columns 2001-2003 which provide support and strength (i.e., stiffness) to the columns 2001-2003.

Each column 2001-2003 may be made up of a plurality of flat panel structures. For example, as illustrated in FIG. 6b, flat panel structures 2003a-2003f are interconnected to form the column 2003.

Therefore, according to this embodiment, each column 2001-2003 can be manufactured in parts (e.g. manufacturing each panel 2003a-2003f separately) and assembled together into the each column 2001-2003. Alternatively, each column 2001-2003 may be pre-fabricated as a single unit, before, for example, being assembled on the base 1000.

Figure 7:
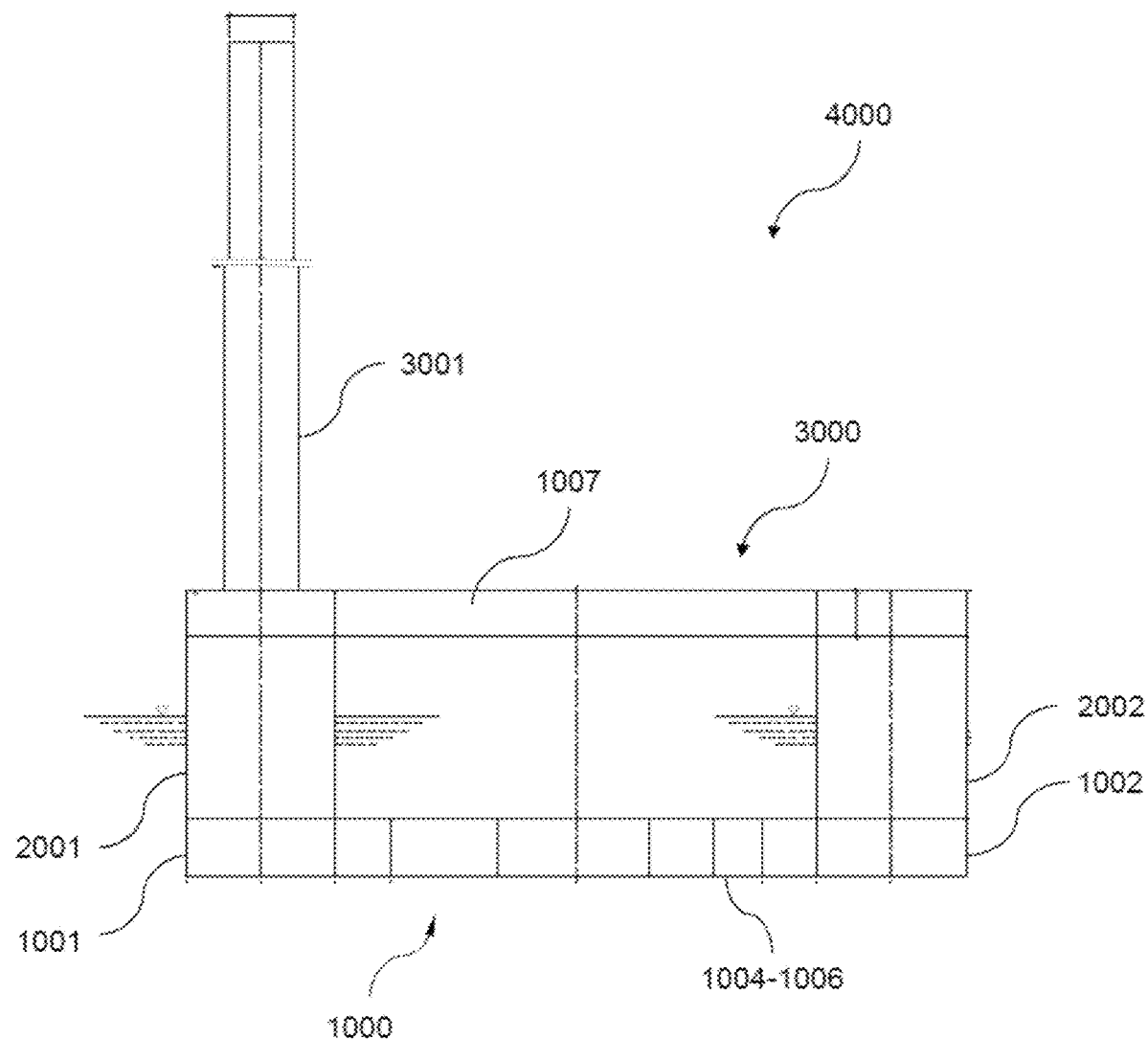
FIG. 7 illustrates a side view of a floatable wind energy power plant.

FIG. 7 illustrates a side view of a floatable wind energy power plant 4000. The floatable wind energy power plant 4000 is assembled after construction of a base 1000 and columns 2001-2003 of a floater 3000. The columns 2001-2003 are mounted on the corner members 1001-1003 of the base 1000, respectively. The columns 2001-2003 may form a portion of the base 1000 as depicted in the FIG. 7.

The truss structure 1007 may optionally be omitted, if the base 1000 and columns 2001-2003 provide sufficient strength and stability without the need for the truss structure 1007.

A wind turbine tower 3001 is arranged fixed to one of the columns 2001,2002,2003. In the illustrated embodiment the tower 3001 is fixed to the column 2001. In this embodiment, the tower 3001 is positioned vertically above the column 2001, extending upwardly from the column 2001, however may alternatively be fixed to the side of the column 2001, for example via a support structure fixed to the column 2001.

The tower 3001 may be co-centrically arranged with the column 2001, or a central axis of the tower 3001 may be offset from a central axis of the column 2001.

Figure 8:
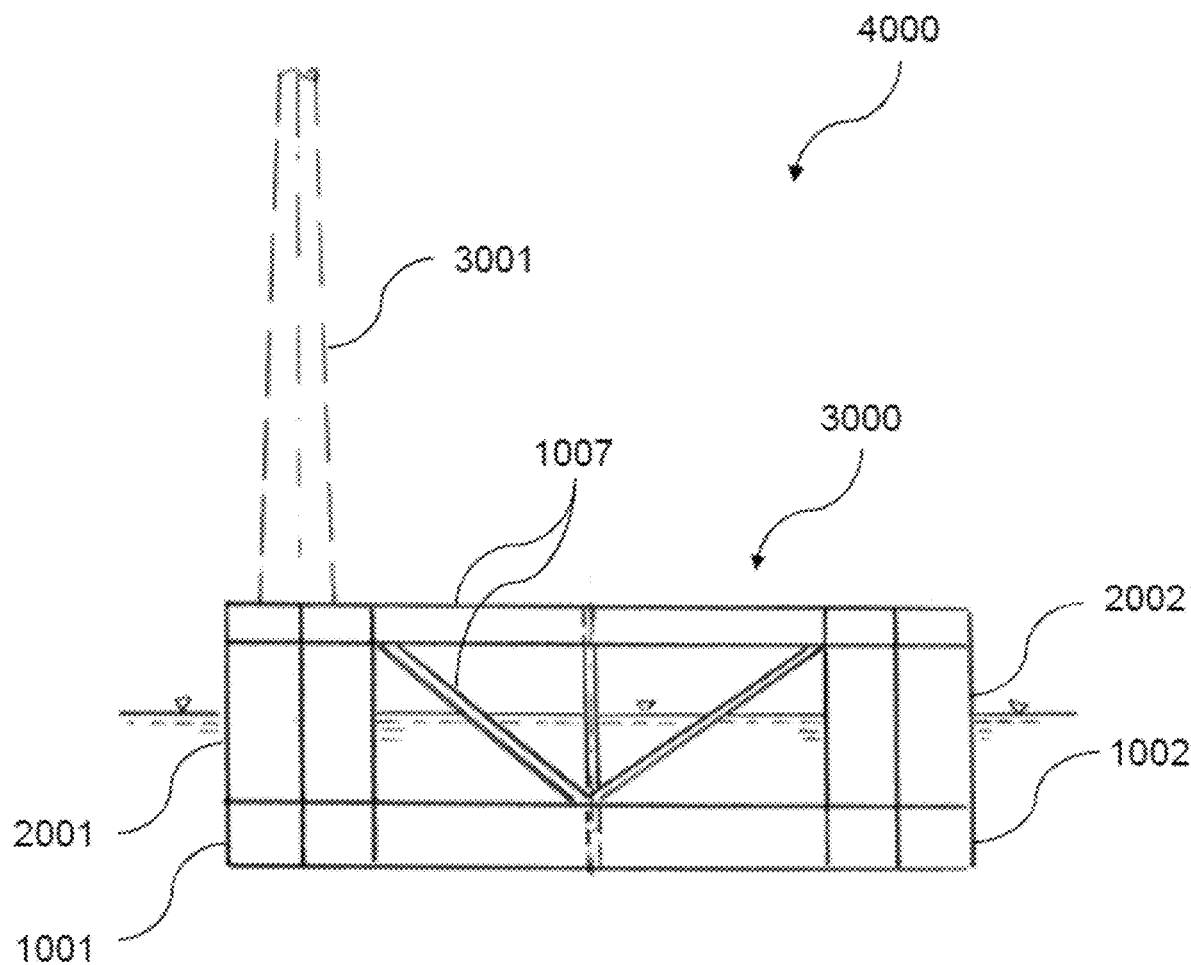
FIG. 8 illustrates a truss structure inserted between parts of a floater.

FIG. 8 illustrates another embodiment of a truss structure 1007 inserted between parts of the floater 3000. As depicted in FIG. 8, the truss structure 1007 may extend between upper parts of two columns 2001-2003, optionally between lower parts of two columns, and between a column and the base 1000. It will be understood that similar truss structures 1007 are arranged between columns 2001 and 2003, and between the columns 2002 and 2003. The truss structure 1007 may comprise connectors (not shown), configured to engage and be fixed to corresponding connectors arranged on the upper part of each column 2001-2003.

In the preceding embodiments, the corner members 1001-1003 and the columns 2001-2003 are shown as separate structures, which are interconnected to form parts of the floater. Optionally, the corner members 1001-1003 and the columns 2001-2003 may form a single unit and be manufactured as such. For example, the corner member 1001 and column 2001 may be manufactured as a single unit as may be the case in the illustration of FIGS. 6a and 6b, and the floater may be assembled by interconnecting the connection members 1004-1006 and truss structures 1007 (if any) to the combined corner member 1001 and column 2001. (Cf. FIGS. 4a and 5a.) The same may be done for the other corner members 1002-1003 and columns 2002-2003.

In yet further embodiments, we provide methods of assembling a floater and a floater assembled from parts. The methods and floater may have a "flat plate"/polyhedron geometry such as the examples described above, or it may have a different design, such as substantially cylindrical columns or other parts.

Figure 9A:
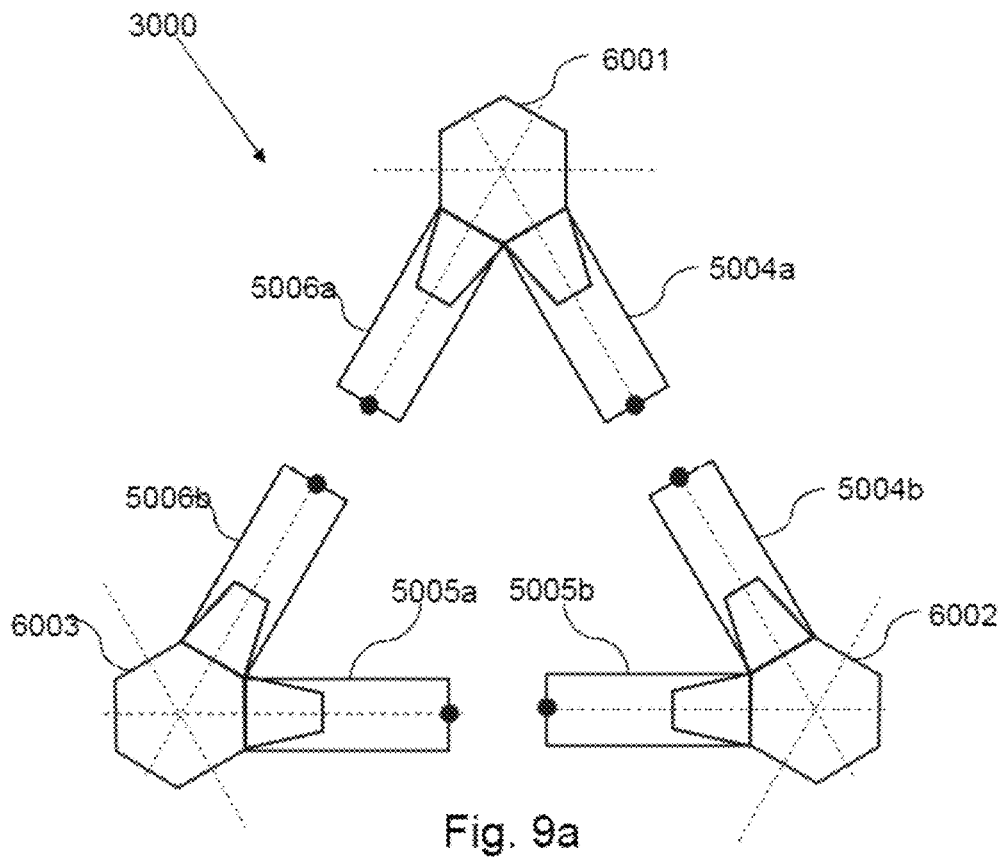
FIGS. 9*a*-9*f* illustrate connection of pontoon units of each column of a floater.

FIGS. 9a-9f illustrate various steps in a method for assembling a floater for a wind turbine power plant. The wind turbine power plant may be of the design described above, or of a different design. In FIGS. 9a-9f, the connection of pre-fabricated units of a floater 3000 is shown in a top view. As depicted in FIG. 9a, in this embodiment each of the combined corner members/columns 6001-6003 (hereinafter only denoted "columns") is connected to a pontoon unit part. For example, the column 6001 is connected to pontoon unit parts 5004a and 5006a. The column 6002 is connected to pontoon unit parts 5004b and 5005b.

Although the columns 6001-6003 are illustrated with a hexagonal cross-section here, the design of the columns 6001-6003 may be a different one, for example having a circular cross-section.

Each of the columns 6001-6003, connected to its pontoon unit part, may initially be positioned as illustrated in FIG. 9a, i.e. separate from one another.

Figure 9B:
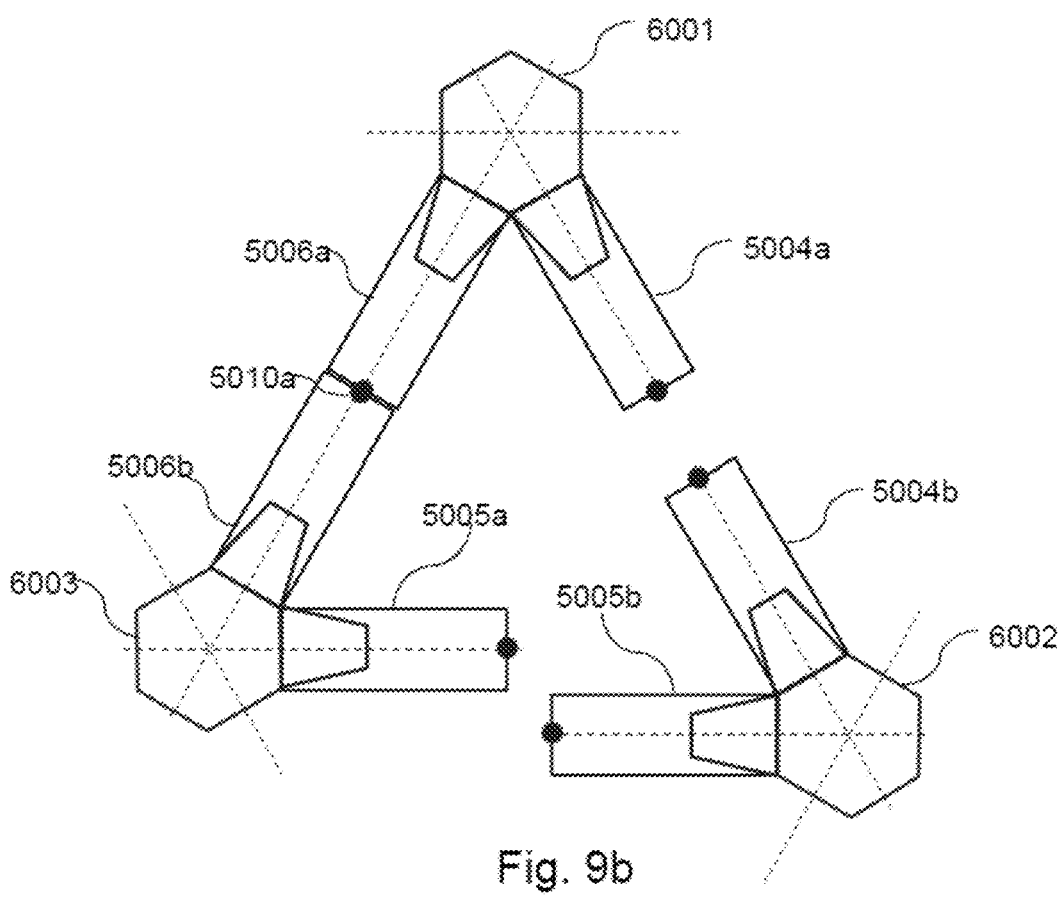

The column 6003 connected to the pontoon unit part 5005a and 5006b can be moved towards the column 6001 which is connected to the pontoon unit parts 5004a and 5006a as illustrated in FIG. 9b. Further, the pontoon unit parts 5006a and 5006b can be brought into engagement with each other via a connector 5010a.

Figure 9C:
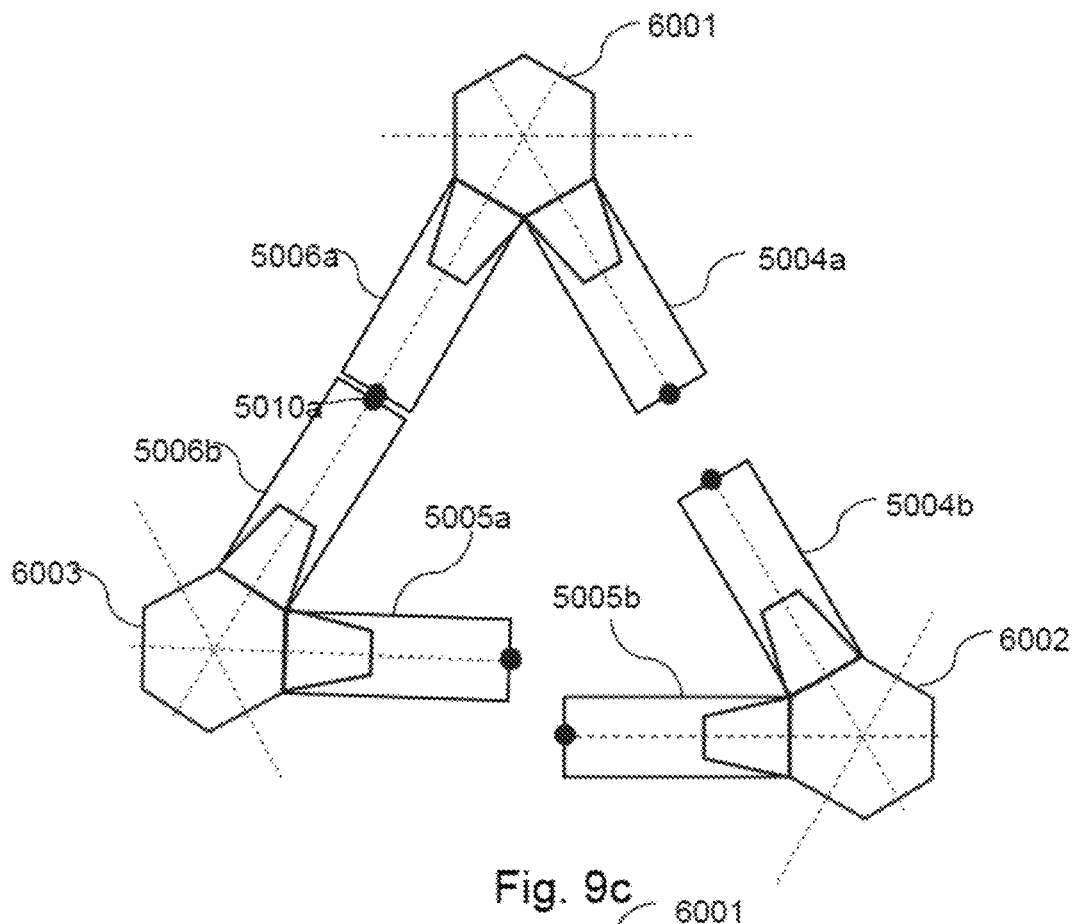

Further, the column 6003 which is connected to the pontoon unit parts 5005a and 5006b can be moved or tilted away from the column 6002 which is connected to the pontoon unit parts 5004b and 5005b as illustrated in FIG. 9c. Moving or tilting the column 6003 as shown in FIG. 9c creates a small angle between the longitudinal axes of the pontoon unit part 5006a and the pontoon unit part 5006b. The angle may be in the order of 5 degrees, however other angles are possible, according to the size and design of the different units and respective connectors.

Figure 9D:
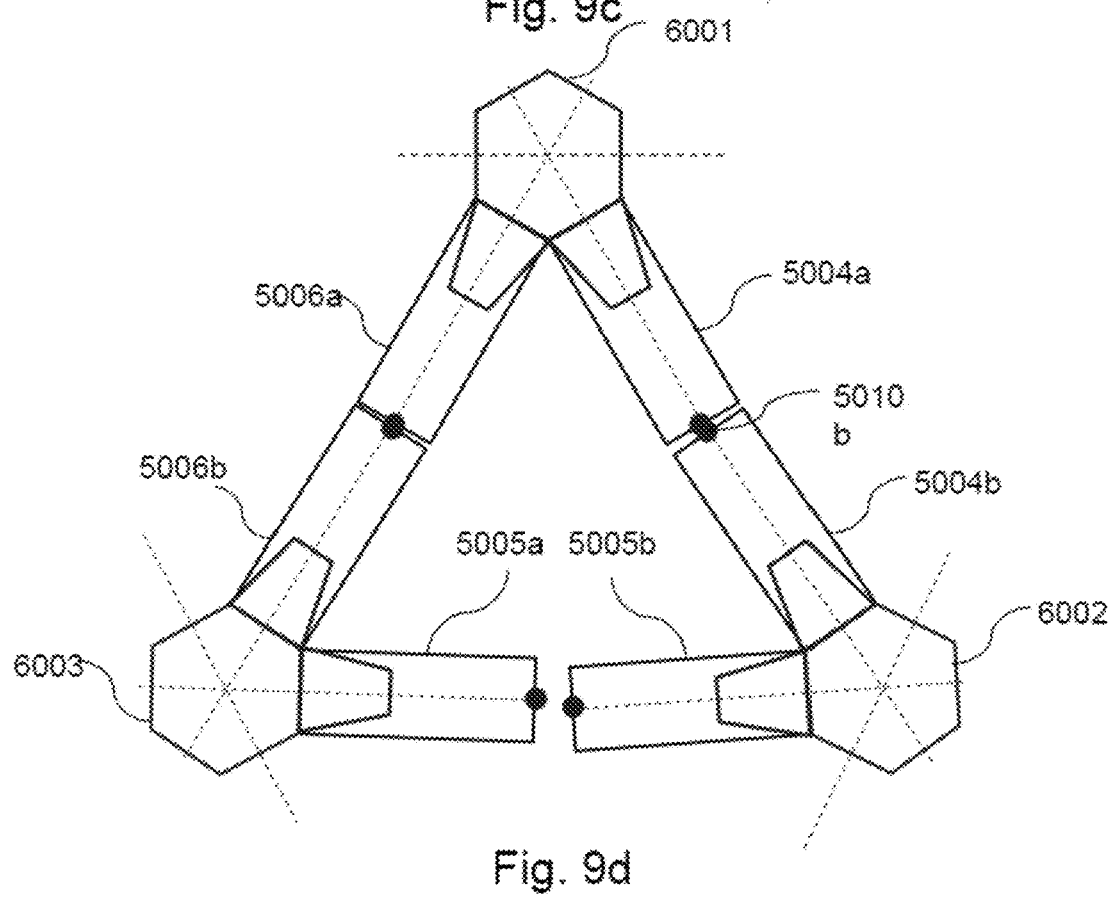

When the column 6003 is moved or tilted away from the column 6002, the column 6002 can be further moved towards column 6001 as illustrated in FIG. 9d. The column 6002 may be positioned such that the pontoon unit parts 5004a and 5004b have a small angle in relation to each other, and/or such that pontoon unit parts 5005a and 5005b have a small angle in relation to each other. When the column 6002 is moved towards the column 6001, the pontoon unit parts 5004a and 5004b can be brought into engagement with each other using a connector 5010b as illustrated in FIG. 9d.

Figure 9E:
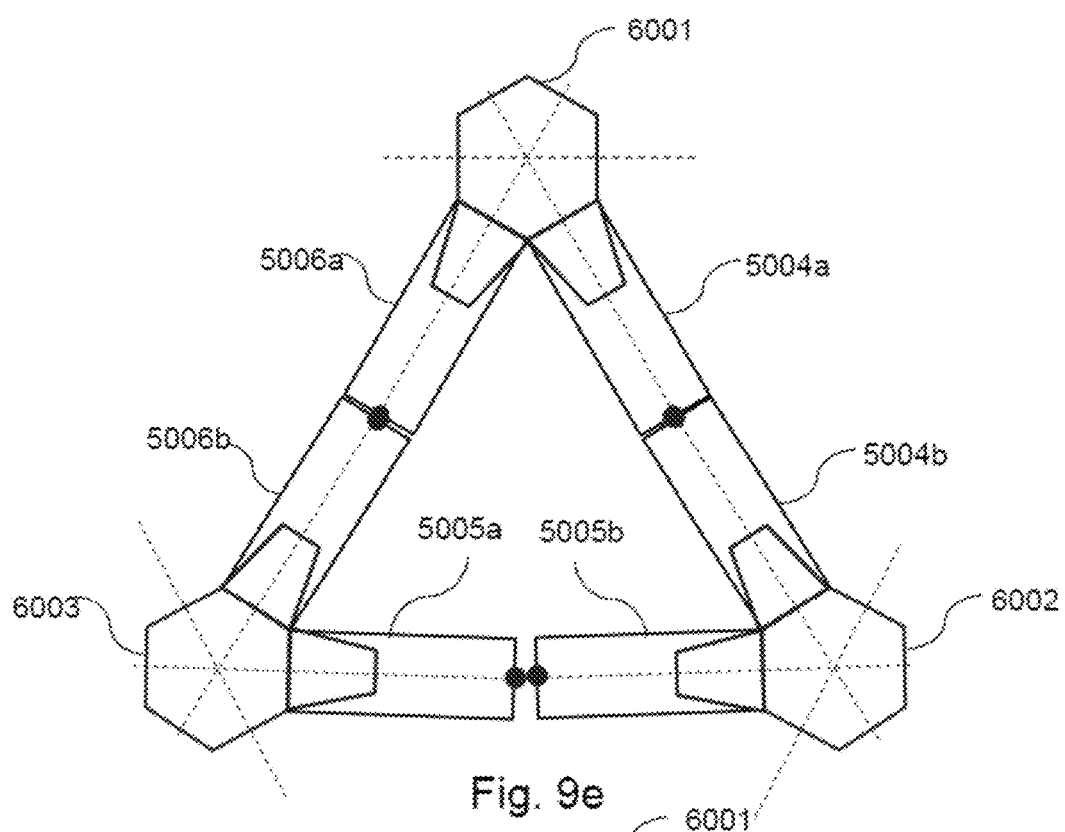

After connecting the pontoon unit parts 5004a and 5004b, the column 6002 can be moved towards the pontoon unit 5005a to connect the pontoon unit part 5005a with the pontoon unit part 5005b as illustrated in FIG. 9e.

Figure 9F:
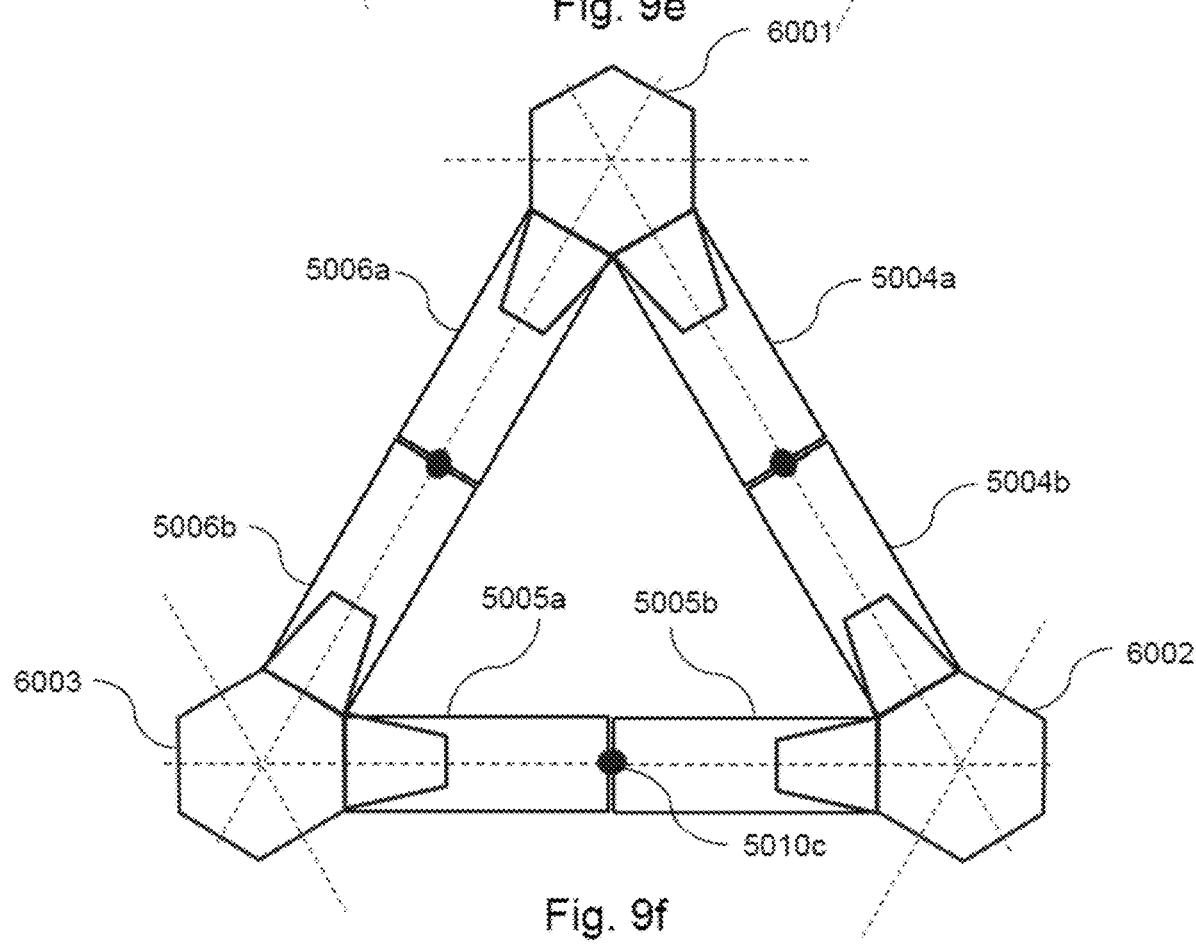

Thus, the pontoon unit parts 5004a and 5004b, 5005a and 5005b, and 5006a and 5006b are connected between the columns 6001-6003 as illustrated in FIG. 9f.

Figure 10:
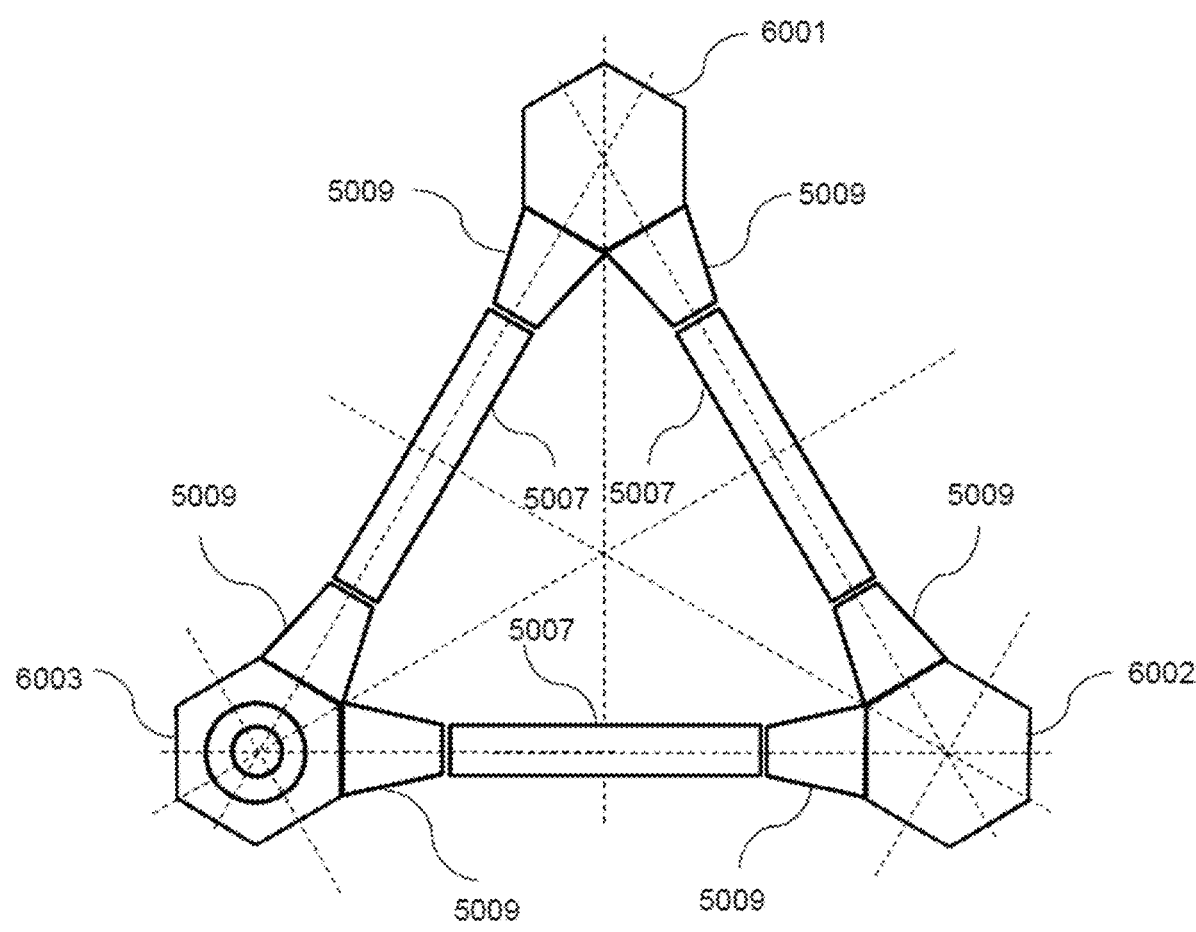
FIG. 10 illustrates a truss connected between upper parts of columns of a floater.

FIG. 10 illustrates a truss 5007 connected between upper parts of columns of the floater. The truss 5007 extends between upper parts of the columns 6001-6003 and comprises connectors (not shown) configured to engage and be fixed to corresponding connection structures 5009 arranged on the upper part of each column 6001, 6002 and 6003 as illustrated in FIG. 10. The truss 5007 can be made up of a plurality of polygonal flat panels, single flat panel, a beam (e.g., a cylindrical or partly cylindrical beam), or the like. Thus, the upper part of each column 6001, 6002 and 6003 is connected with truss 5007 as illustrated in FIG. 10, corresponding also to that shown in FIG. 14a, which is described later.

Figure 11A:
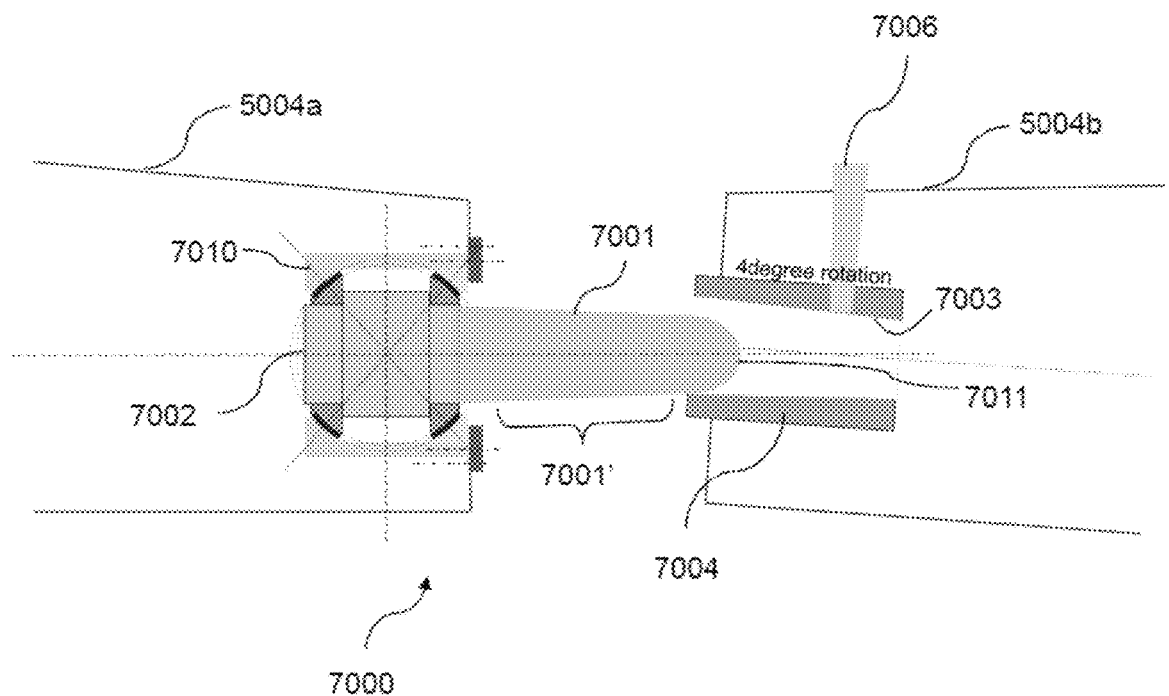
FIGS. 11*a*-11*e* illustrate connection of pontoon units of each column with a connector.

FIG. 11a-11e illustrates a top view of the connection of pontoon unit parts of each column 6001-6003 with a connector 7000 (see also FIGS. 9a-f). The pontoon unit parts 5004a and 5004b are brought in proximity to each other to connect them with the connector 7000 as described above. The connector 7000 comprises a first connection element 7002 which is attached (e.g. fixed) at one end of the pontoon unit part 5004a and a second connection element 7004 at pontoon part 5004b as illustrated in FIG. 11a.

The first connection element 7002 comprises a protruding part 7001 extending in a direction outwardly from the pontoon unit part 5004a, and the second connection element 7004 comprises a receiver part 7003 operable to receive the protruding part 7001.

Figure 11B:
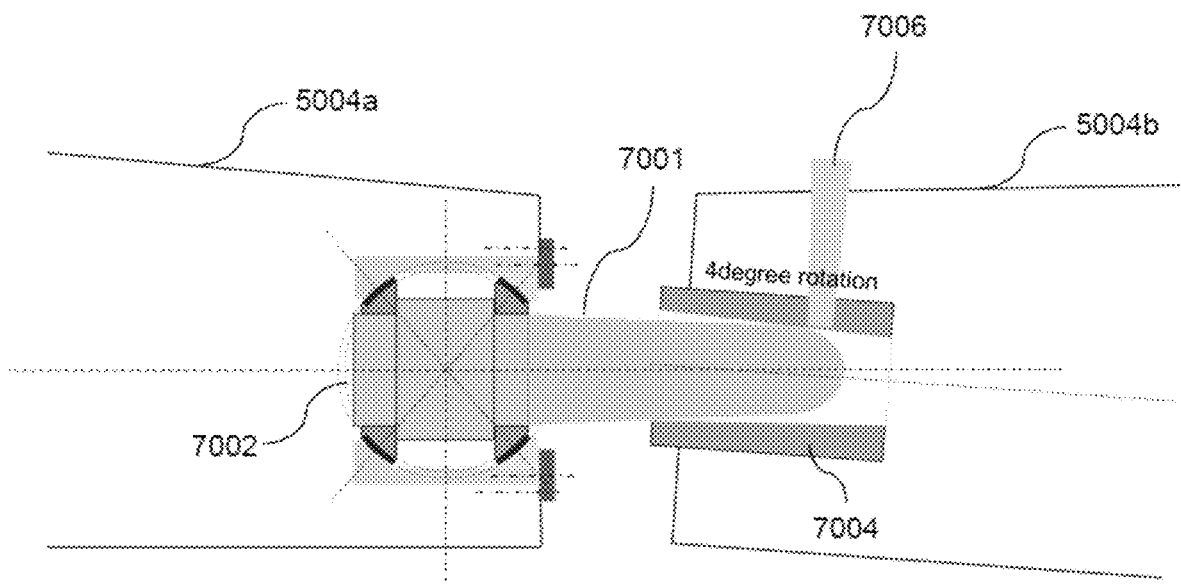
Figure 11C:
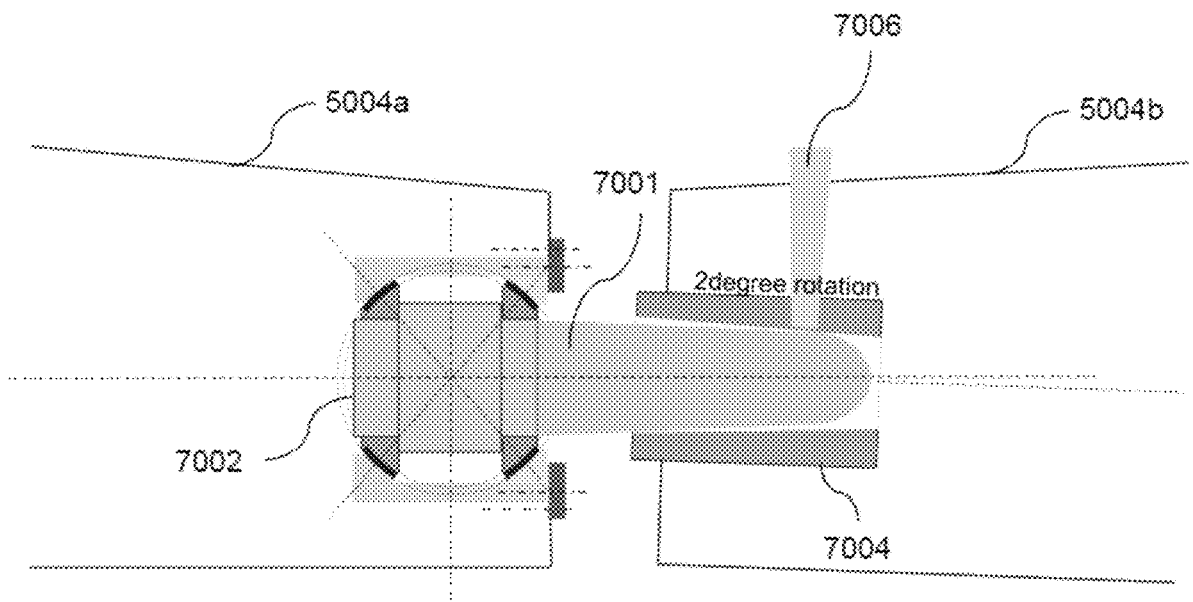
Figure 11D:
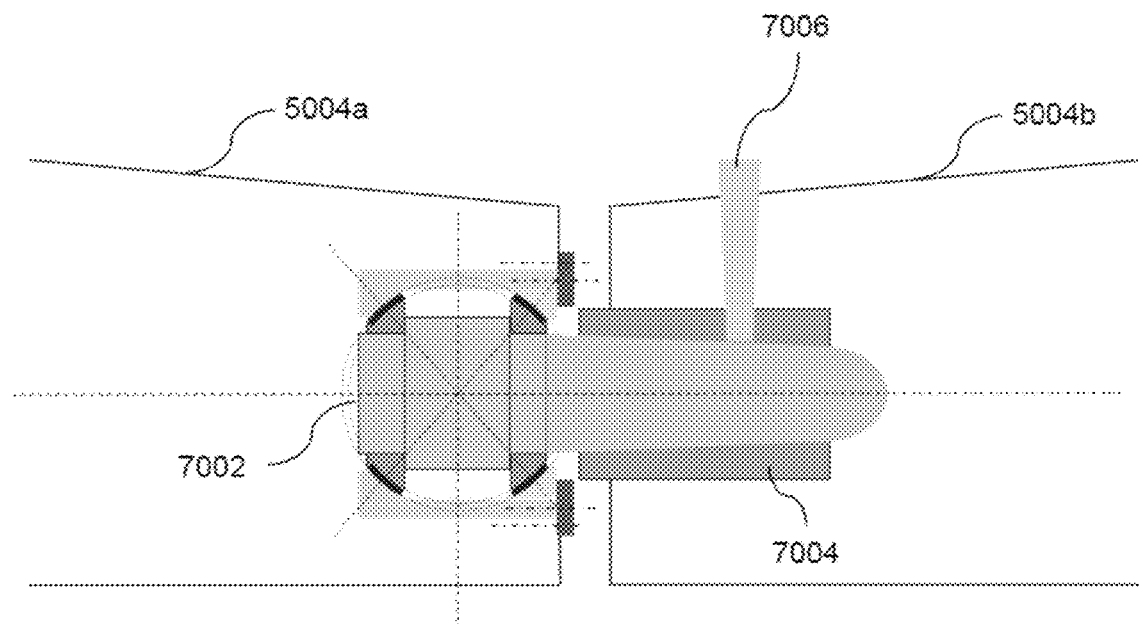

During connection, the first connection element 7002 at the pontoon unit 5004a is moved towards the open end of the second pontoon unit 5004b to connect the pontoon unit parts 5004a and 5004b. FIGS. 11b-11d illustrate the connection of the pontoon unit parts 5004a and 5004b with gradual insertion of the protruding part 7001 into the receiver part 7003 of the second connection element 7004 as the pontoon unit 5004a is moved towards the second pontoon unit 5004b.

Figure 11E:
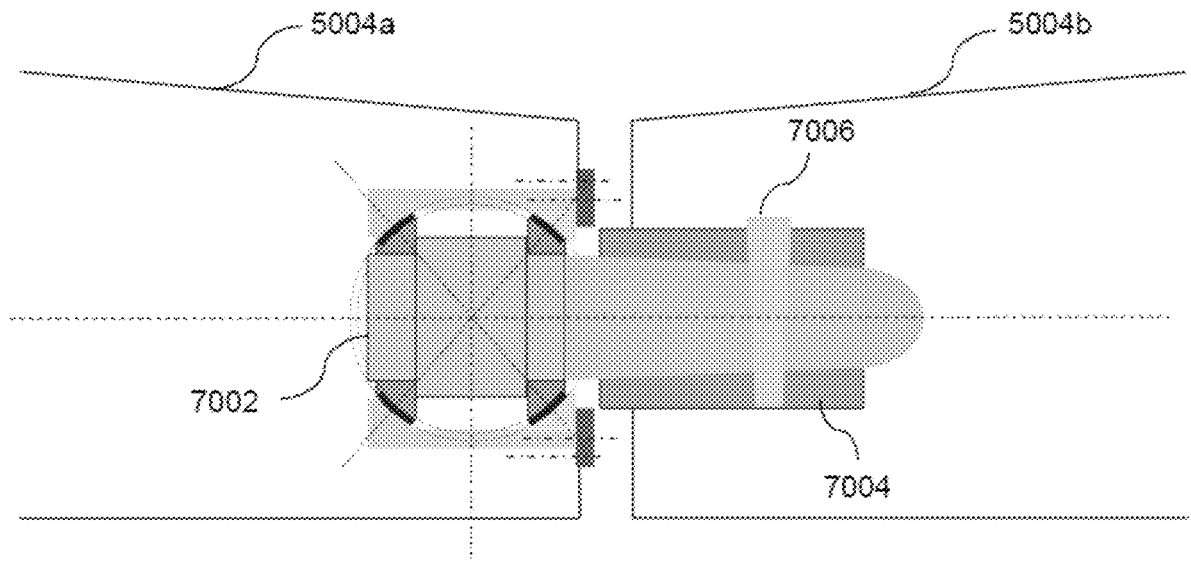

Upon completion of the connection of the pontoon unit parts 5004a and 5004b, the connection between the pontoon unit parts 5004a and 5004b is made rigid with a fixing element 7006. The fixing element 7006 is activated upon completion of connection of the pontoon unit parts 5004a and 5004b with the connector 7000 as illustrated in FIG. 11e. The fixing element 7006 locks the first connector part 7002 to the second connector part 7004 so as to provide a fixed connection, thereby facilitating a connection between the pontoon unit parts 5004a and 5004b.

Although the above mentioned description of FIGS. 11a-11e discloses the connection of pontoon unit parts 5004a and 5004b with the connector 7000, it should be noted that the connector 7000 can be used to connect various parts of the floater other than the pontoon unit parts 5004a and 5004b. For example, a similar connector 7000 may be used to connect the truss 5007 or a beam between the upper portion of the columns 6001-6003.

The connector 7000 may be designed to allow mating between the first connector part 7002 and the second connector part 7004 also when there is an angle between the longitudinal axes of the two components to be connected, such as the pontoon unit parts 5004a,b. For example, in the embodiment shown in FIGS. 11a-e, the protruding part 7001 has a frustoconical section 7001' and the receiver part 7003 has a corresponding frustoconical section to receive the protruding part 7001. This allows the components (e.g., the pontoon unit parts 5004a,b) to be connected also when these are brought together with an angle between their respective longitudinal axes, as illustrated in FIGS. 11a-e. For example, the frustoconical sections may be designed such as to allow the components to be brought into engagement with an angle of 2°, 4°, 5° or more. With reference to FIGS. 9a-f, the frustoconical portions may allow the components of a floater to be interconnected with less sensitivity to manufacturing tolerances and/or accurate placement of the parts, as the initial lead-in of the connector can be assisted. For example, as shown in FIG. 11a, an initial angular misalignment between the parts may be 4° during the start of the connection, whereas when the components are brought together this is reduced (FIG. 11c) and finally they are substantially fully aligned (FIG. 11d), whereby the final fixation can be done (FIG. 11e).

Alternatively, or additionally, the connector 7000 may be angularly displaceable. For example, the first or second connection element 7002,7004 may be angularly flexible ("rotatable") when mounted to the respective component, such as the pontoon unit parts 5004*a,b*. In the embodiment shown in FIGS. 11*a-e*, the protruding part 7001 is arranged on a rotatable member which is arranged in a holder part 7010 (see FIG. 11*a*). The protruding part 7001 may be connected with the holder part 7010 via a flexible coupling, for example, a flex element (e.g. a metal disc arrangement with elastomeric inserts), a spherical bearing, or a different type. For example, flex elements such as those used to support tension legs in offshore tension leg platforms may be suitable for adaption to this purpose.

The first connector part 7002 (or, optionally, the second connector part 7004, or both) may be angularly displaceable with, for example, ±1-2°. In some embodiments, the angular play may be designed to be higher; this will depend on the size and specific design of the floater. By angularly displaceable, it is meant that the connector is capable of providing a load-bearing connection with a given angular displacement, e.g. that the connector is capable of handling for example ±1-2° changes in alignment of the respective parts to be connected.

Albeit not illustrated in FIGS. 11*a-e*, an angularly displaceable first connector part 7002 further aids the interconnection process, in that the protruding part 7001 may yield to some degree when inserted into the receiver part 7003.

The protruding part 7001 may have a rounded lead face 7011 for insertion into the receiver part 7003, as shown in FIG. 11*a*.

If the first connector part 7002 is angularly displaceable and/or the protruding part 7001 has a rounded lead face 7011, the requirements for the conical angle of the frustoconical part 7001' of the protruding part 7001 and the frustoconical part of the receiver part 7003 may be reduced. For example, a smaller conical angle may be used, while still ensuring reliable mating and connection of the connector 7000. Optionally, it may be possible to design the connector 7000 without frustoconical protruding and receiving parts.

The size of the connectors 7000 required for connecting the truss 5007 and the pontoon unit parts 5004*a* and 5004*b* between the columns may vary depending on dimensions of the truss 5007 and the pontoon unit parts 5004*a* and 5004*b*.

Figure 12A:
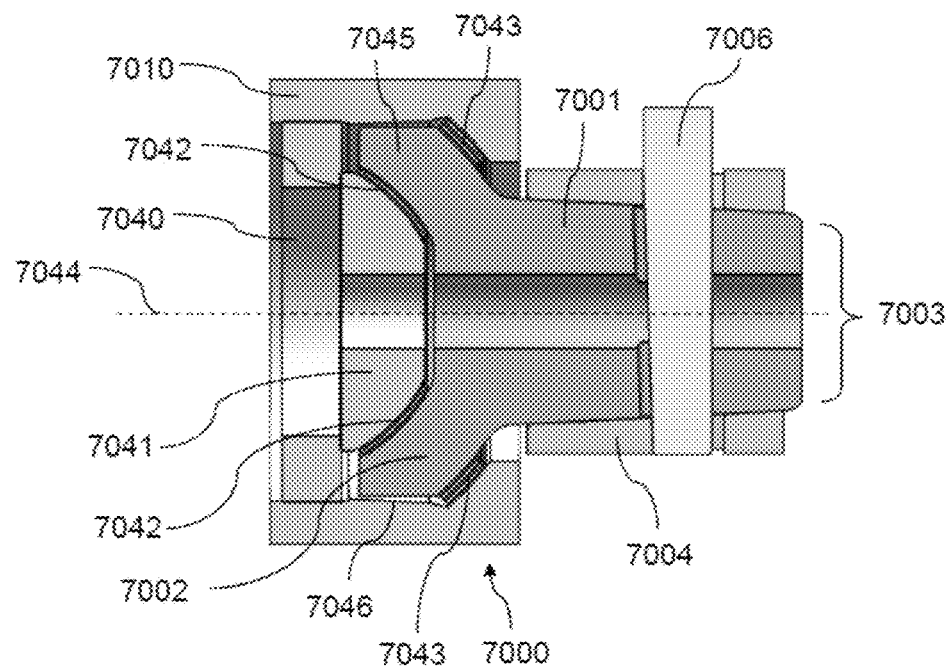
FIG. 12*a* illustrates an embodiment of a connector from a side view.

FIG. 12*a* shows an embodiment of the previously described connector 7000. The connector 7000 comprises a first connection element 7002 inside a holder part 7010. In this embodiment the holder part 7010 comprises a joint bearing 7040 and a joint retainer ring 7041. The first connection element 7002 is connected with the holder part 7010 via a flexible coupling, herein with flex element packs 7042, 7043 of a spherical shape (e.g. a metal disc arrangement with elastomeric inserts). Alternatively, there may be only one flex element pack and/or a flex element pack of another shape, e.g. quadratic, may be used.

Advantageously, the holder part 7010 has the same outer shape as the cross section of the part to which it will be applied e.g. fastened or affixed. In the depicted embodiments the holder part 7010 may have a rectangular/quadratic lateral cross-section to be mounted to a similarly shaped second connection element 7004 (e.g. with a rectangular/quadratic lateral cross section), such as on a pontoon section 5004*a* as shown in FIG. 11*a*. The shape of the lateral cross-section of the holder part 7010 and the second connection element 7004 may, for example, facilitate welding of said holder part 7010 and connection element 7004 to an external structure (which may be a pontoon section as is shown in FIG. 11*a*). For example, a rectangular or square shaped holder part 7010 or connection element 7004 may be more easily welded to an external structure than an element comprising a round cross-section.

The first connection element 7002 comprises a protruding part 7001, which is designed to fit into a receiver part 7003 of a second connection element 7004. Upon completion of the connection of the connection elements 7002 and 7004, the connection is made rigid with a fixing element 7006. The fixing element 7006 locks the first connection element 7002 to the second connection element 7004 (e.g. by inserting the fixing element 7006 through provided apertures in both the first and second connection elements 7002,7004) so as to provide a fixed connection between the elements to which the connector is affixed or fastened.

Figure 12B:
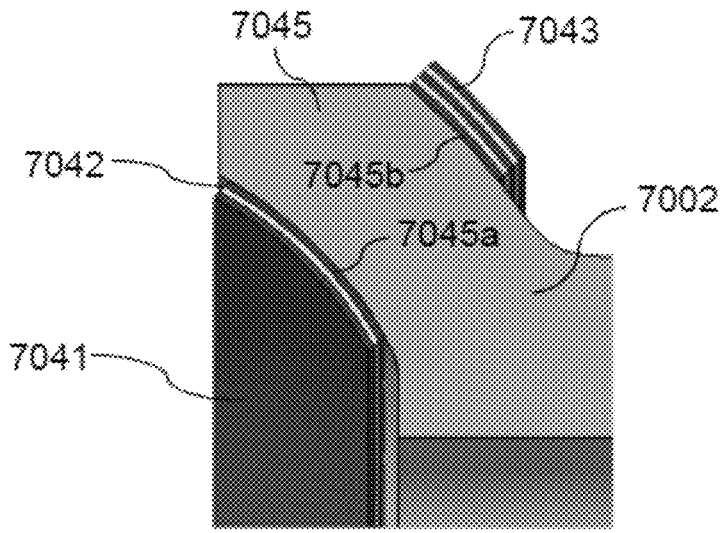
FIG. 12*b* illustrates a close-up of FIG. 12*a* on the flexible elements of the connector.

FIG. 12*b* shows a close-up of the flex element packs 7042, 7043 connecting the holder part 7010 and the first connection element 7002. The joint retainer ring 7041 is omitted in this view for clarity. The flex element packs 7042, 7043 are formed by a metal disc arrangement with elastomeric inserts. The metal disc arrangement may, for example, comprise steel plates and the elastomeric inserts may be formed from rubber. Other flexible connection members may, however, be applicable as well. The flex element packs 7042, 7043 in this embodiment have a cylindrical symmetry about the first connection element 7002 and its longitudinal axis 7044. In another embodiment, however, another shape may prove advantageous.

In any of the embodiments shown herein, the protruding part 7001 may be fixed to the holder part 7010 via a flexible element, as exemplified in FIGS. 12*a* and 12*b*. In this illustrative embodiment, the flexible element is made up of the flex element packs 7042,7043.

The flexible element may comprise alternating sheets of metallic discs and elastomeric inserts, for example steel plates and rubber inserts. This may provide for a very strong element which tolerates some degree of displacement of the first connection element 7002.

The first connection element 7002 may advantageously be arranged with a back part 7045 having opposing support faces 7045*a,b*, against which the flex element packs 7042, 7043 act to support the first connection element 7002 in the holder part 7010. The support faces 7045*a,b* have a non-zero angle with respect to the longitudinal axis 7044, i.e. the support faces are not parallel with the axis 7044. The angle may be 90 degrees, i.e. the support faces 7045*a,b* may be perpendicularly arranged in relation to the longitudinal axis 7044. Advantageously, however, the support faces 7045*a,b* have an angle in relation to the longitudinal axis 7044 which is between zero and 90 degrees, for example about 45 degrees or about 60 degrees. Such an angle allows good transfer of forces acting on the protruding part 7001, via the flex element, to the holder part 7010, which may include forces acting in the direction of the longitudinal axis 7044 and forces and/or bending moments acting in different directions.

The holder part 7010 may advantageously comprise a stop face 7046 (FIGS. 12*a* and 12*c*) configured to limit the angular displacement of the first connection element 7002 in relation to the holder part 7010. The stop face 7046 can be configured such that an angular displacement is mechanically restricted by the geometry of the holder part 7010 and the first connection element 7002. The maximum allowable angular displacement can thereby be defined by design.

Figure 12C:
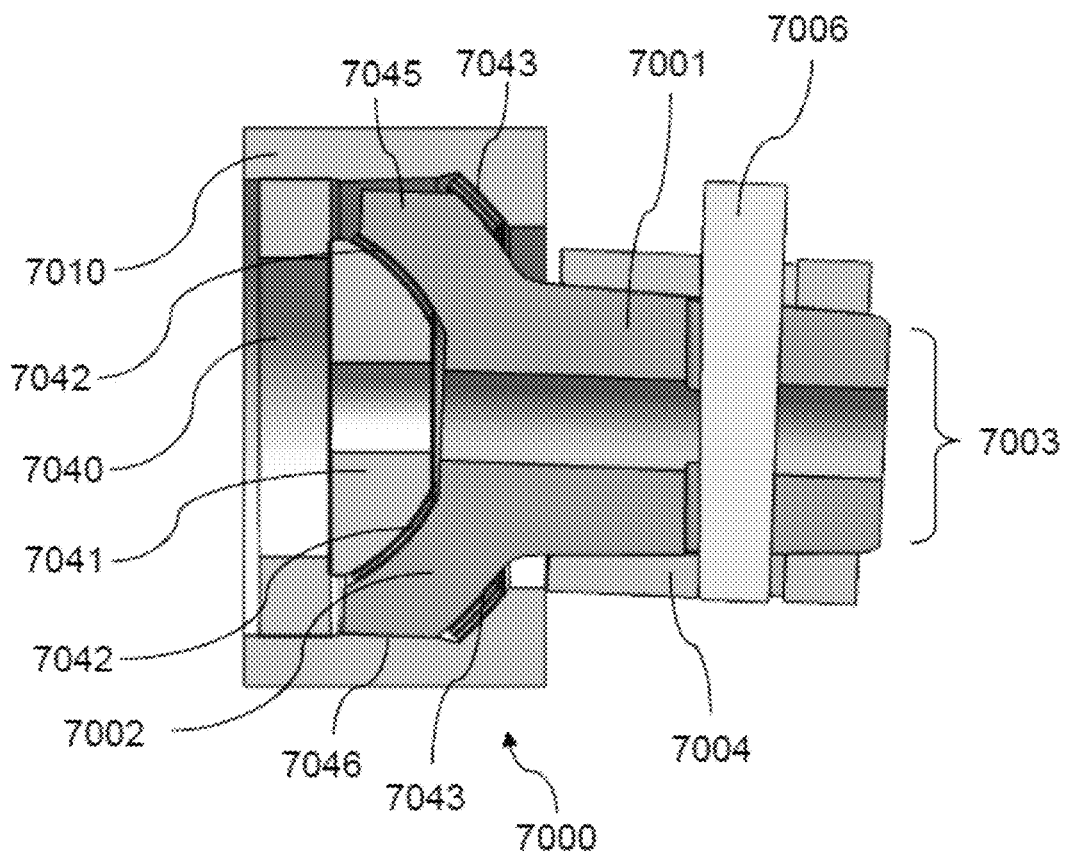
FIG. 12*c* illustrates the connector from FIG. 12*a* in a tilted state.

The stop face 7046 can, as illustrated, be configured to engage a corresponding surface on the back part 7045. FIG. 12*c* illustrates the first connection element 7002 in the maximum permitted angular displacement for this illustrative embodiment, in which, as can be seen, the back part 7045 engages the stop face 7046 and the first connection element 7002 is mechanically prevented from further angular displacement in relation to the holder part 7010.

The maximum allowable angular displacement can be set based on the required angle needed during connection of column element parts, and/or during operation of the assembled floater. The angle may, for example, be in the order 2 to 8 degrees. By mechanically restricting the maximum angular displacement, one may, for example, ensure the integrity of and avoid damage to the flex element.

The flex element (here: flex element packs 7042, 7043) thus enables an angular displacement of the first connection element 7002 with respect to its holder part 7010 as shown in FIG. 12c. Therefore an angular displacement of the holder part 7010 with respect to the first connection element 7002 and, if necessary, the second connection element 7004 is facilitated, enabling the angular displacement of parts connected by the connector if and when this is necessary during connection of the parts or during operation of the fully assembled floater.

Figure 13:
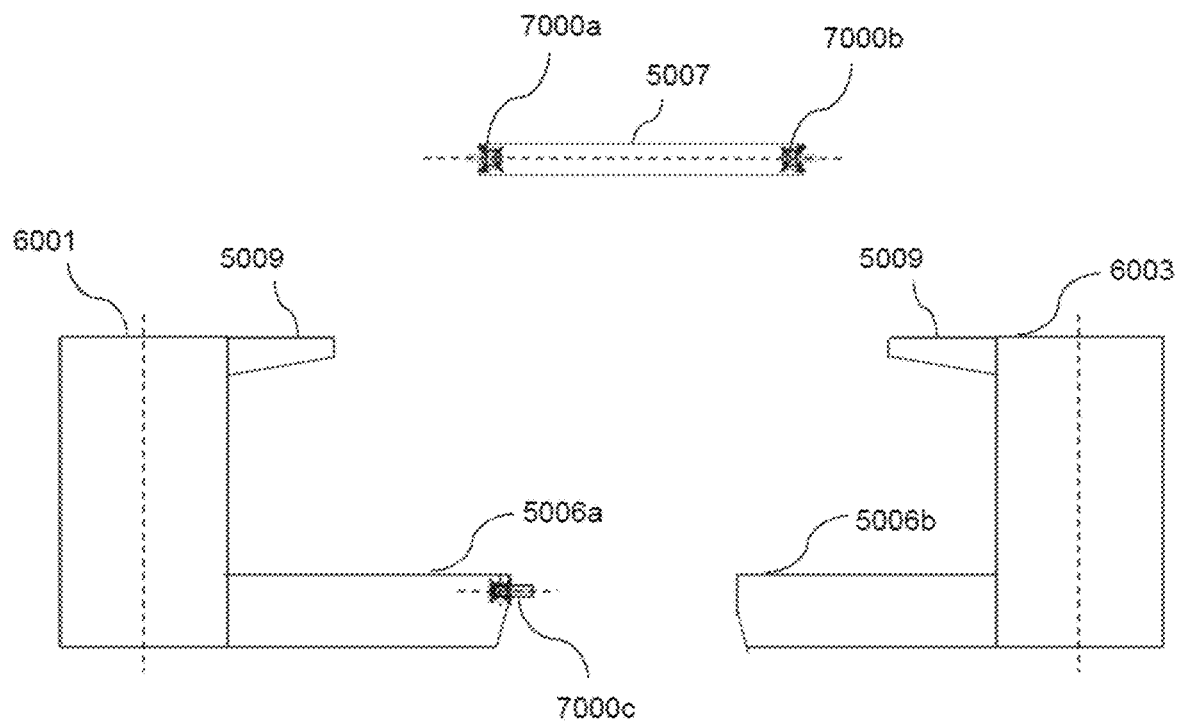
FIG. 13 illustrates columns prior to connection of pontoon unit parts and a truss between upper parts of the columns.

FIG. 13 illustrates columns 6001 and 6003 prior to connection of pontoon unit parts 5004a and 5004b and the truss 5007 between upper parts of the columns. (See also FIG. 9a.) As depicted in the FIG. 13, the columns 6001 and 6003 with pontoon unit parts 5006a and 5006b can be positioned initially as illustrated in FIG. 13. The truss 5007 is provided with connectors 7000a and 7000b for connecting the truss 5007 between the upper parts of the columns 6001 and 6003. The pontoon unit part 5006a is provided with a connector 7000c for connecting the pontoon unit part 5006a with the pontoon unit part 5006b.

Figure 14A:
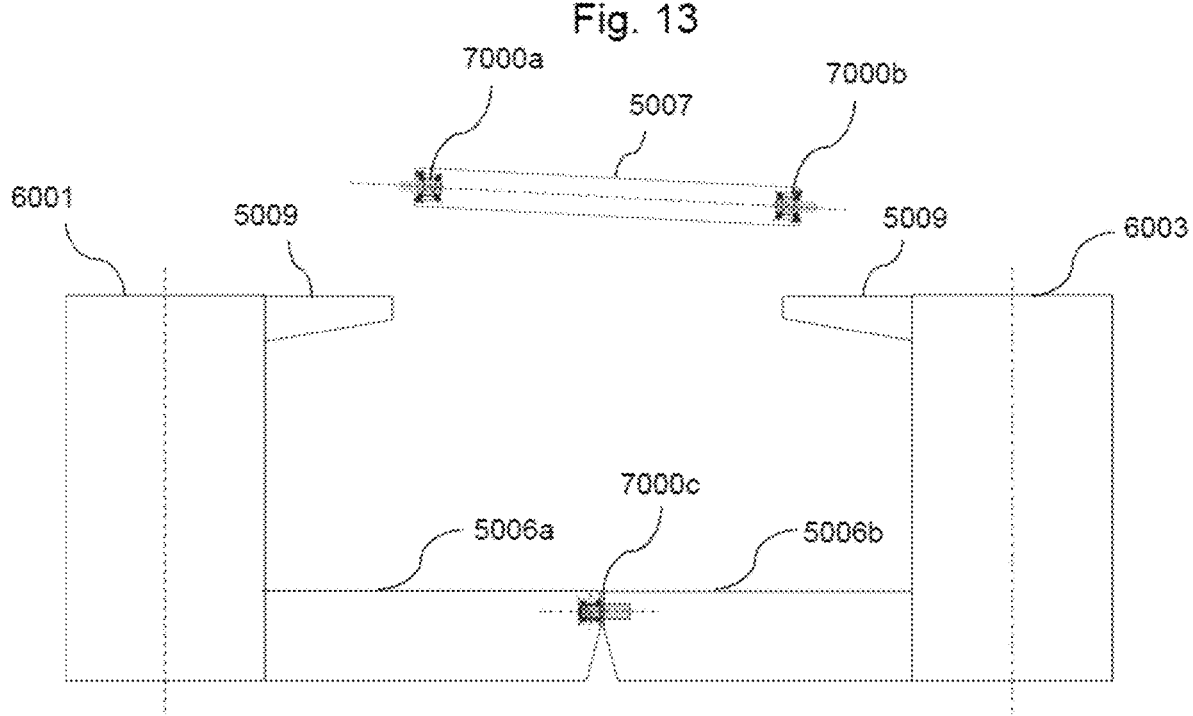
FIGS. 14*a*-14*f* illustrate connection of pontoon unit parts and a truss between upper parts of the columns.

FIGS. 14a-14i illustrate various steps for connection of pontoon unit parts 5006a-5006b and the truss 5007 between the upper parts of the columns 6001 and 6003. As depicted in FIG. 14a, the pontoon unit parts 5006a and 5006b are moved towards each other for connecting them with the connector 7000c. In this embodiment, the floater is assembled with the three column/pontoon floater parts floating in water. This may be beneficial if the different floater parts can be pre-assembled at a remote site, and assembled locally closer to the installation site. The columns 6001 and 6003 may be translated or rotated through an actuator or by ballasting the floater parts. The floater parts may, for example, comprise ballast chambers for this purpose.

Optionally, the floater may be assembled at a yard or shore side, or on a working deck of an installation vessel. The floater parts may in that case be moved or lifted by means of jacks, cranes, hoists, or the like.

For the purpose of assembling the floater on water, each floater part may have a positive buoyancy. Preferably, the upper end of the pontoon unit parts 5006a-b are above the sea level when assembling the floater on water as shown in FIG. 14b-e with the water line. Also preferably, the connector 7000c is positioned so as to also be above the sea level, which may facilitate the connection procedure.

Figure 14B:
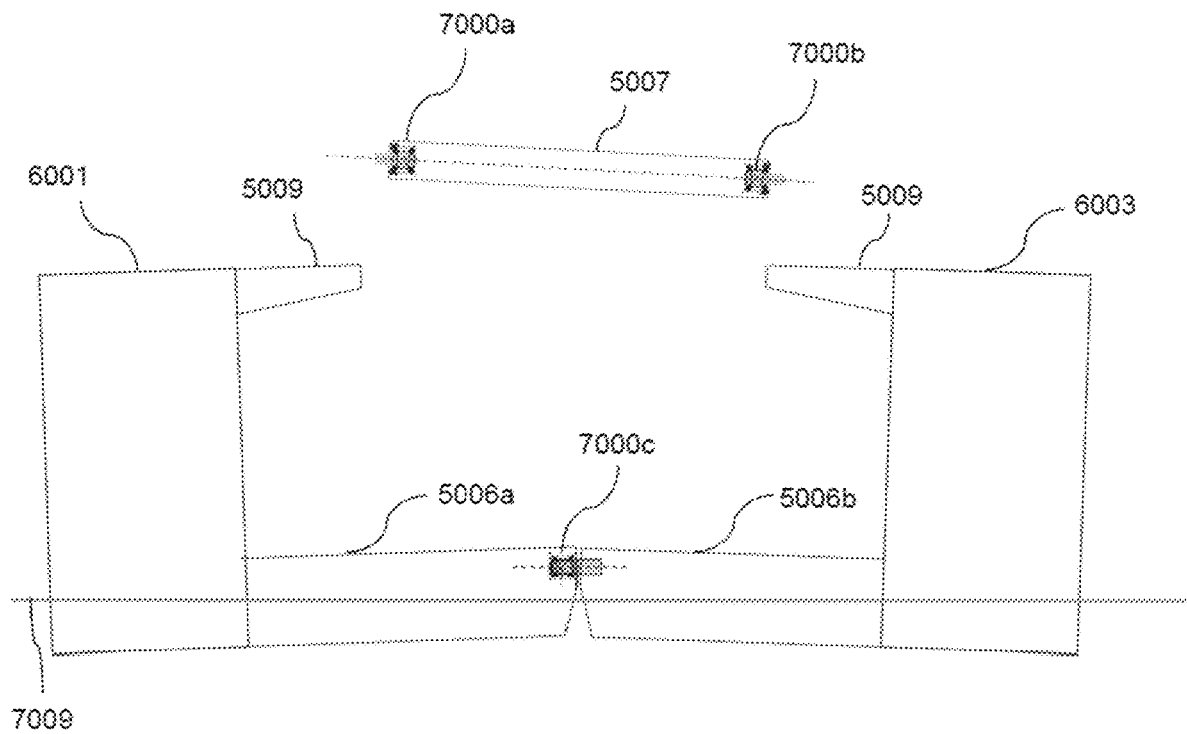
Figure 14C:
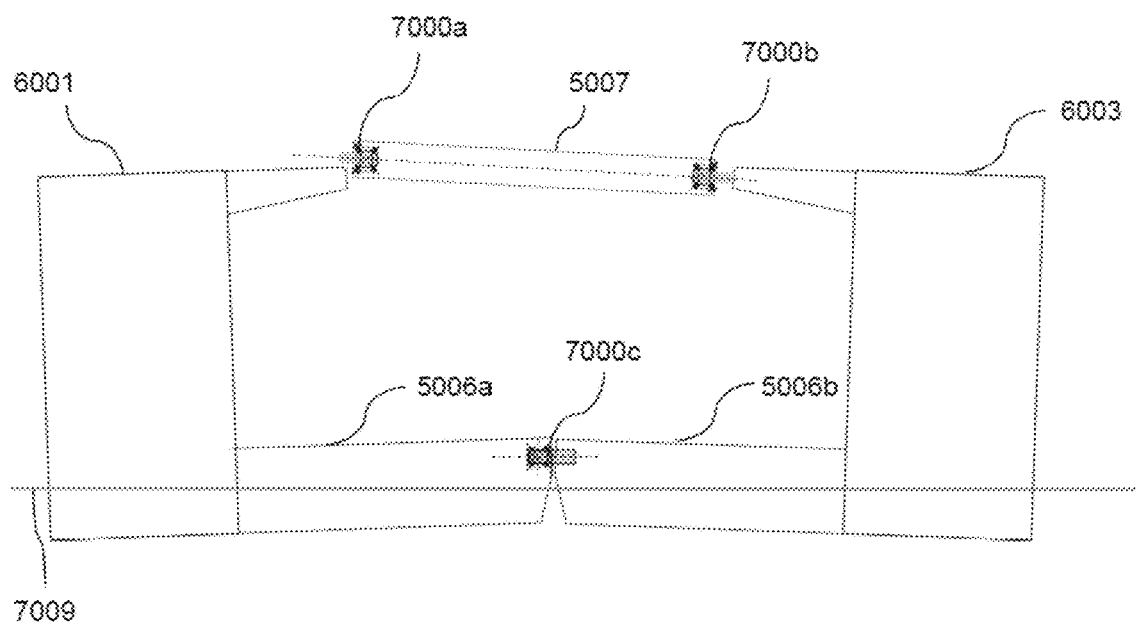
Figure 14D:
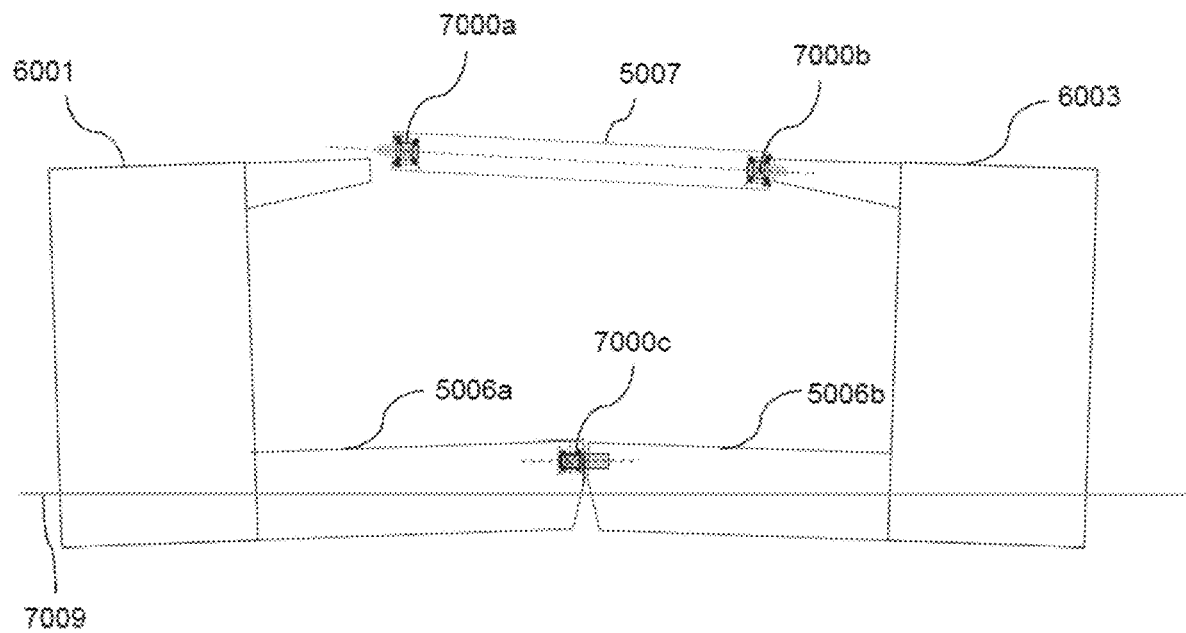

After connecting the pontoon unit parts 5006a and 5006b, the position of the columns 6001 and 6003 may be adjusted as illustrated in FIG. 14b for connecting the truss 5007 between the upper parts of the columns 6001 and 6003. The columns 6001 and 6003 may for this purpose be tilted about a horizontal axis such as to space the connection structures 5009 farther from each other to allow the truss 5007 to be installed. This can be done, for example, by ballasting or jacking the column parts, if installed when floating, or by jacking or otherwise lifting the parts if installed on shore or on a deck. When the position of the columns 6001 and 6003 are suitably adjusted for connecting the truss 5007, the connector 7000b fixed to the truss 5007 is positioned in contact with the upper part of the column 6001 as illustrated in FIG. 14c. Further, the connector 7000b is connected to the upper part of the column 6003 by angularly displacing the connector 7000b by a required angle, e.g. 2°, 4°, 5° or the like, with the upper part of the column 6003 as illustrated in FIGS. 14d and 14e.

Figure 14E:
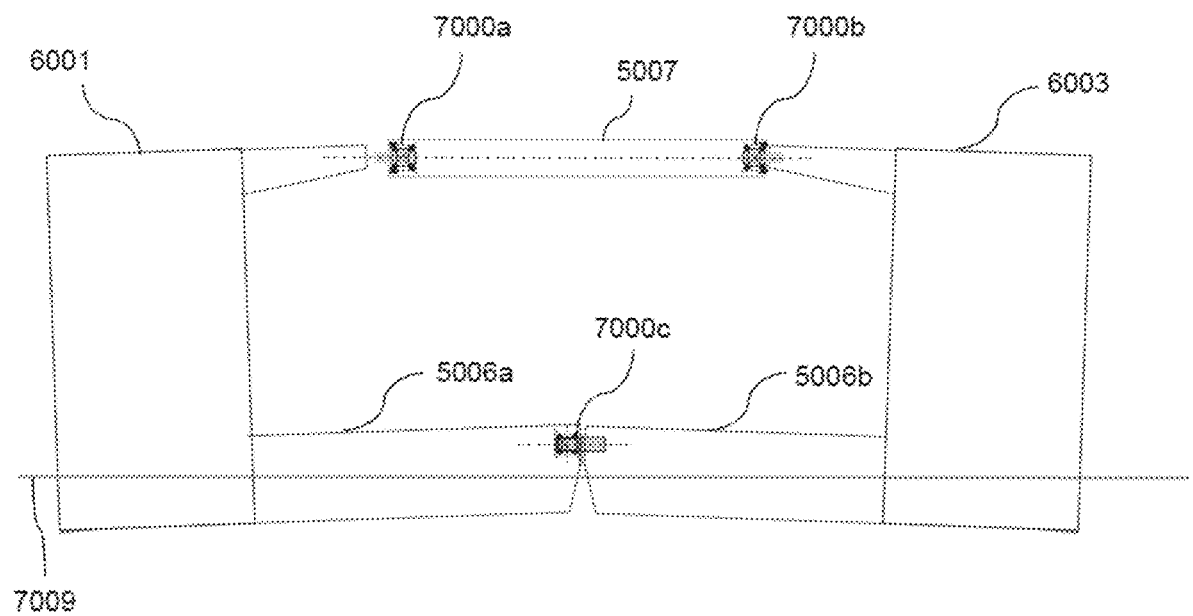
Figure 14F:
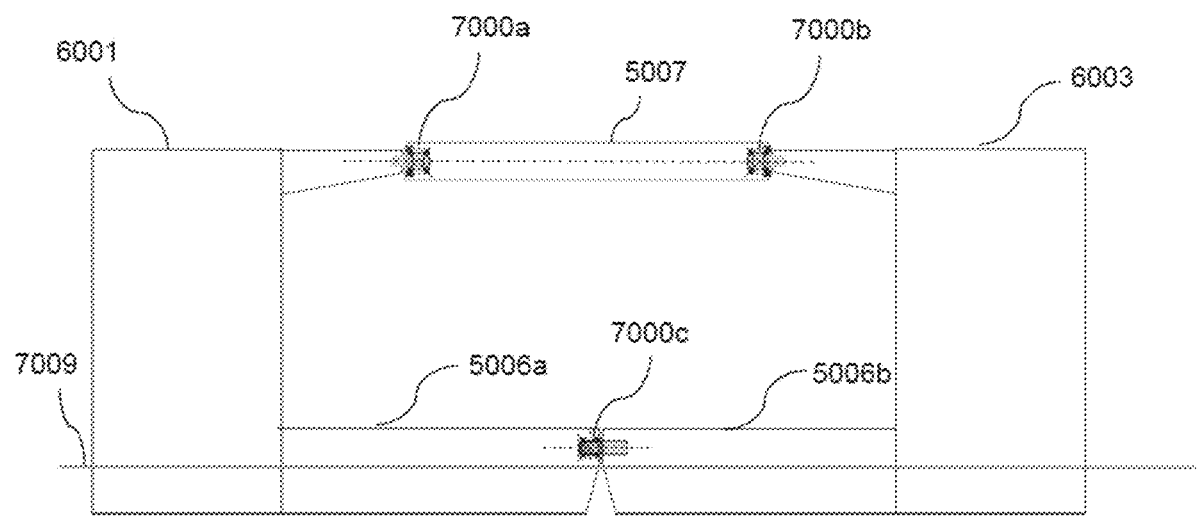

The position of the column 6003 may be suitably adjusted for connecting the other end of the truss 5007 to the upper part of the column 6001 with the connector 7000a as illustrated in FIGS. 14e and 14f. The connector 7000a can be connected to the upper part of the column 6001 by angularly displacing the connector 7000b with the upper part of the column 6003 and the position of columns 6001 and 6003 may be suitably aligned as illustrated in FIG. 14f. Thus, the truss 5007 is connected at the upper parts of the columns with the connectors 7000a and 7000b and the pontoon unit parts 5006a and 5006b are connected to each other with the connector 7000c as illustrated in FIGS. 14a-14i.

The connector between the pontoon unit parts and the truss between the other columns may be installed in a similar manner.

If installed on shore or on a deck, the columns can for example be pushed, dragged or rotated either upwards, downwards while connecting the truss between the upper parts of the columns. For example, the columns can be positioned on a base (not shown), which can be a movable trolley, work floor, an actuator or the like which can push or drag any of the columns. The base may have actuators, for example hydraulic cylinders, to effect this movement. Such a movable base may be arranged with one, two, or all three of the column positions. Thus, the position of the columns may be adjusted for connecting the truss between the upper parts of the columns with the respective connectors. In a similar manner, the lower portion of the columns and pontoon unit parts may be adjusted (e.g. pushed or dragged) using a movable trolley, the work floor, or the actuator for connecting the pontoon unit parts with the respective connector.

FIGS. 14g-i show various steps for the connection of pontoon unit parts 5006a-b of another embodiment with a connector 7000c. In this embodiment the pontoon unit parts 5006a-b extend from the lower end of the columns 6001a-b. Preferably, pontoon unit parts 5006a-b have an upper surface and upper section that are above the sea level when the floater is positioned on water (e.g. the upper half of the pontoon unit parts 5006a-b are located above the sea level/water surface level when the floater is being assembled on water, where upper is in the sense shown in FIG. 14f, for example). As is best shown in FIGS. 14b-f, when the pontoon unit parts 5006a-b are positioned on water, the buoyancy of the pontoon parts 5006a-b may enable such parts to float on water, such that a water surface level 7009 may be defined on the pontoon unit parts 5006a-b. The water surface level 7009 may change depending on the density of the liquid in which the pontoon unit parts 5006a-b are placed, and also the buoyancy of the pontoon unit parts 5006a-b.

Also preferably, the connector 7000c is located above the water surface level 7009 when the pontoon unit parts 5006a-b are being assembled on water (e.g. seawater or freshwater), which may facilitate the connection procedure of the pontoon parts 5006a,b. The connector 7000c, or a part thereof, may be located in line with, or proximate to, the upper surface of the pontoon parts 5006a-b, as may the protruding part 7001.

Further preferably, the lower end of the columns 6001a-b comprise means 5750 to aid in the connection procedure. In this embodiment the end of one pontoon unit part 5006*a* comprises a bumper 5751, which extends from the pontoon unit part 5006*a* and which may be affixed thereto or which may be integrally formed therewith. The second pontoon unit 5006*b* comprises a counterpart bumper surface 5752 extending therefrom at the other pontoon unit part 5006*b*. This bumper 5751 enables contact of the pontoon unit parts 5006*a-b* prior to inserting the protruding element 7001 into the second connection element 7004, when the pontoon unit parts 5006*a-b* are in their pivoted position as shown in FIGS. 14*g-i*. This may assist to stabilize the pontoon unit parts 5006*a-b* by, for example, reducing the degrees of freedom of motion of the pontoon unit parts 5006*a-b* with respect to each other. In turn, this may facilitate the insertion of the protruding element 7001 into the second connection element 7004. In another embodiment further mechanical means may be used, e.g. clamps or hooks to provide contact between the pontoon unit parts 5006*a-b* in their pivoted position. As illustrated in FIGS. 14*g-i*, the bumper 5751 extends from the pontoon unit part 5006*a* and may be in the form of a triangular prism, while the counterpart bumper surface 5752 may have a polygonal prism shape. Each of the bumper surfaces 5751, 5752 comprise a leading edge, at or proximate to which first contact between the bumper surface and counterpart 5751, 5752 may be made. Such a configuration may assist to provide a simple first step in a connection process, as well as providing stability to the pontoon units 5006*a,b* during the connection process.

During connection of the pontoon parts 5006*a,b*, when initially inserting the protruding part 7001 (shown, for example in FIGS. 12*a-c*) into the second connection element 7004, the bumpers 5751-5752 preferably remain in contact as the pontoon parts 5006*a,b* are pivoted with respect to one another. As the pontoon parts 5006*a,b* are pivoted, the protruding part 7001 moves with respect to the holder part 7010 so as to become inserted therein. The movement of the protruding part 7001 relative to the holder part 7010 is shown in FIG. 14*i*.

These aspects may facilitate the assembly of multiple parts on water and may find application in similar embodiments, e.g. featuring a contact for easier alignment for subsequent welding.

FIGS. 15*a*-15*j* illustrates various other aspects or embodiments relevant for one or more of the embodiments described herein.

Figure 15A:
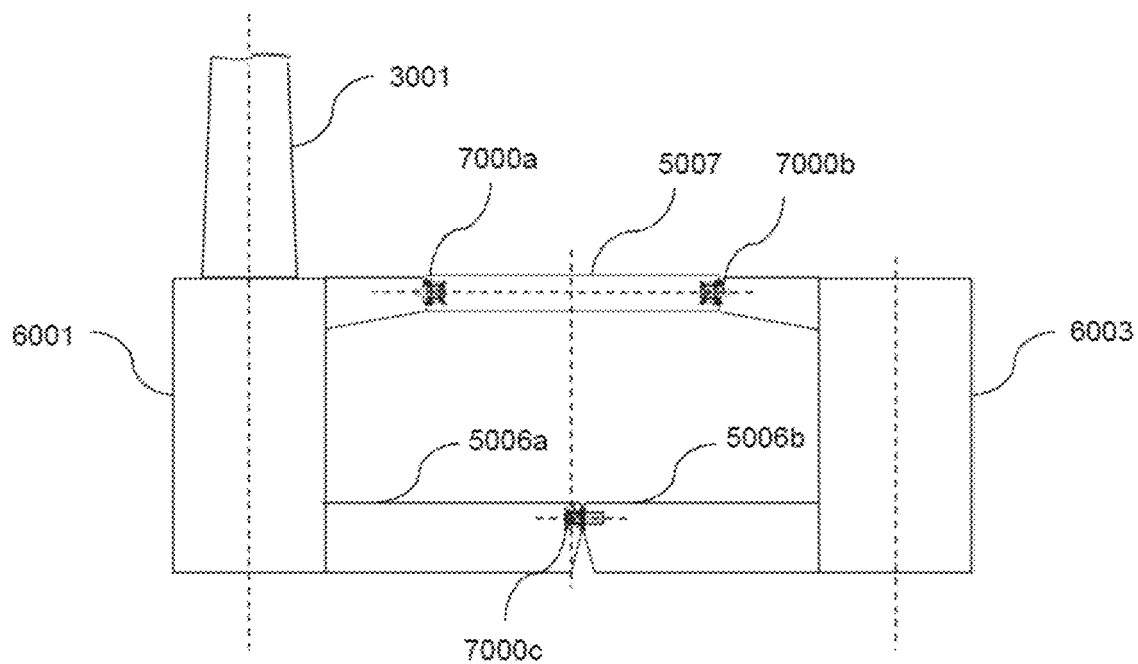
FIGS. 15*a*-15*j* illustrate various embodiments involving the connection of pontoon unit parts and a truss of the columns with connectors.

In FIG. 15*a*, the connection of pontoon unit parts 5006*a* and 5006*b* and truss 5007 (or a beam) between the columns 6001 and 6003 with the connectors 7000 is as described above in relation to FIGS. 14*a-i*. The upper parts of the columns 6001 and 6003 are connected with the truss 5007 (or a beam) using the connectors 7000*a* and 7000*b*. Further, the pontoon unit parts 5006*a* and 5006*b* are connected with the connector 7000*c* as illustrated in FIG. 15*a*. A wind turbine tower 3001 is arranged on column 6001.

Figure 15B:
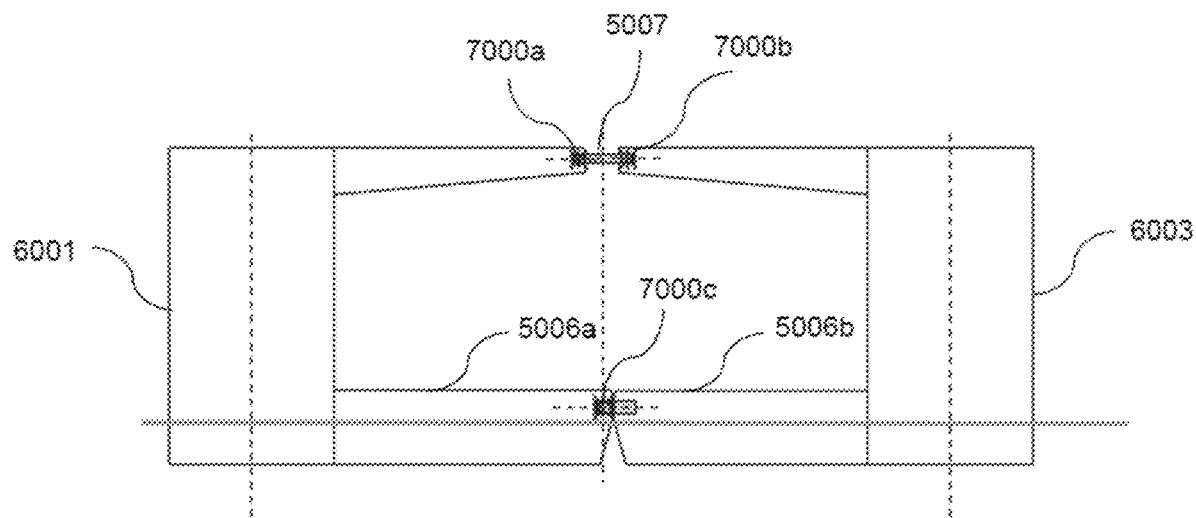

The upper part of the columns may optionally be connected directly with a shorter beam or truss 5007 using the connectors 7000*a* and 7000*b* as illustrated in FIG. 15*b*. The pontoon unit parts 5006*a* and 5006*b* may be connected with the connector 7000*c*, as above.

Figure 15C:
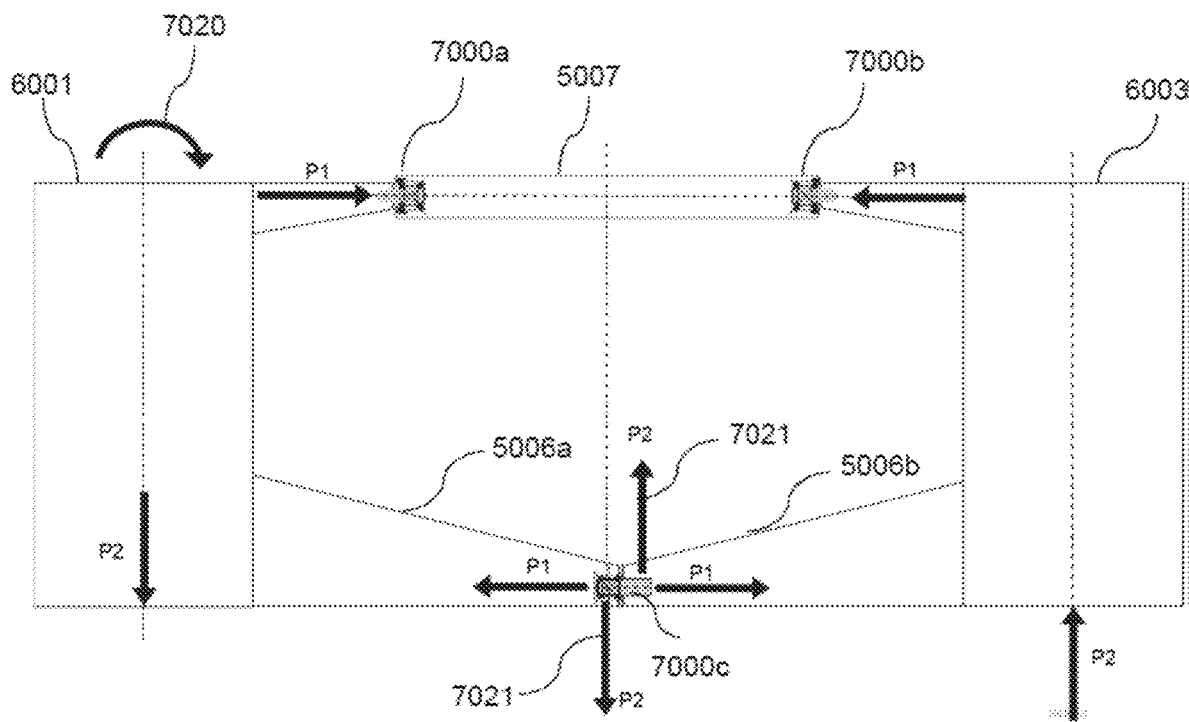

FIG. 15*c* illustrates, in a simplified manner, some of the main load forces acting on the floater during operation. A turning force 7020 from the wind turbine 3001 (see FIG. 15*a*) acts on column 6001. Shear forces 7021 between the two floater parts are induced in the connector 7000*c* between the pontoon unit parts. Consequently, even if one or more of the connectors 7000*a-c* is rotationally flexible, the construction is stiff in the plane intersecting the truss 5007 and the pontoon unit parts 5006*a,b*.

Figure 15D:
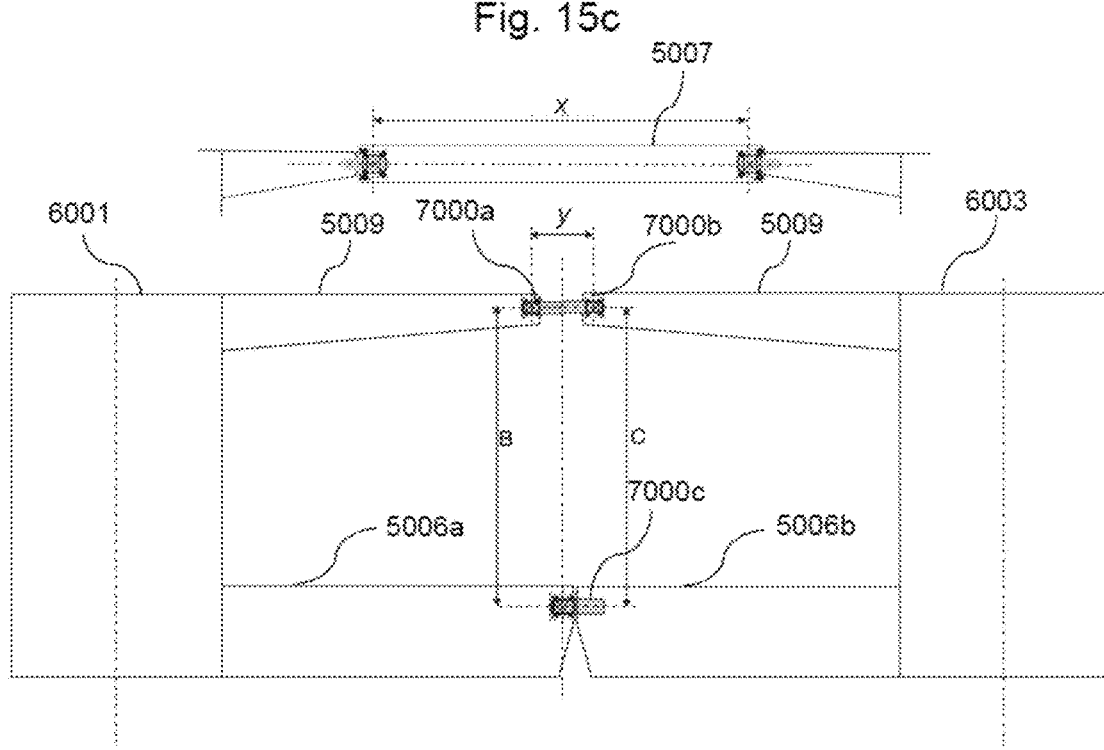

The truss 5007 may have different lengths as illustrated in FIG. 15*d*. A truss 5007 having a longer length x may be connected to the upper parts of the columns 6001 and 6003 with the connectors 7000*a* and 7000*b*. Optionally, a truss having a shorter length y may be connected between upper parts of the columns 6001 and 6003 with the connectors 7000*a* and 7000*b* as illustrated in FIG. 15*d*. Using a truss of longer length may increase the allowable manufacturing tolerance for the floater parts, and the design truss length can therefore be selected based on the expected manufacturing accuracy and the type of connector used. Alternatively, increasing the truss length may wider distribute stresses in said truss, reducing the severity of stress concentration points, for example. A misalignment between the connection structures 5009 (a difference between lengths B and C as illustrated) can be tolerated by having an angularly displaceable connector 7000*a,b* between the truss and the respective structure 5009. A connector with a high allowable angular displacement may allow a shorter truss 5007 to be used.

Figure 15E:
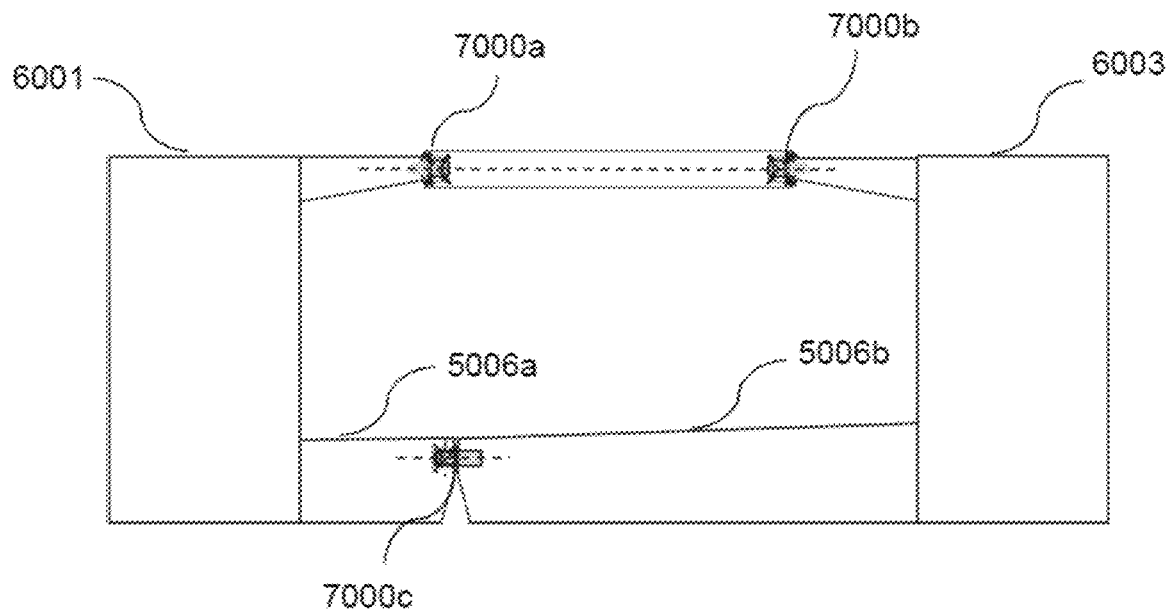
Figure 15F:
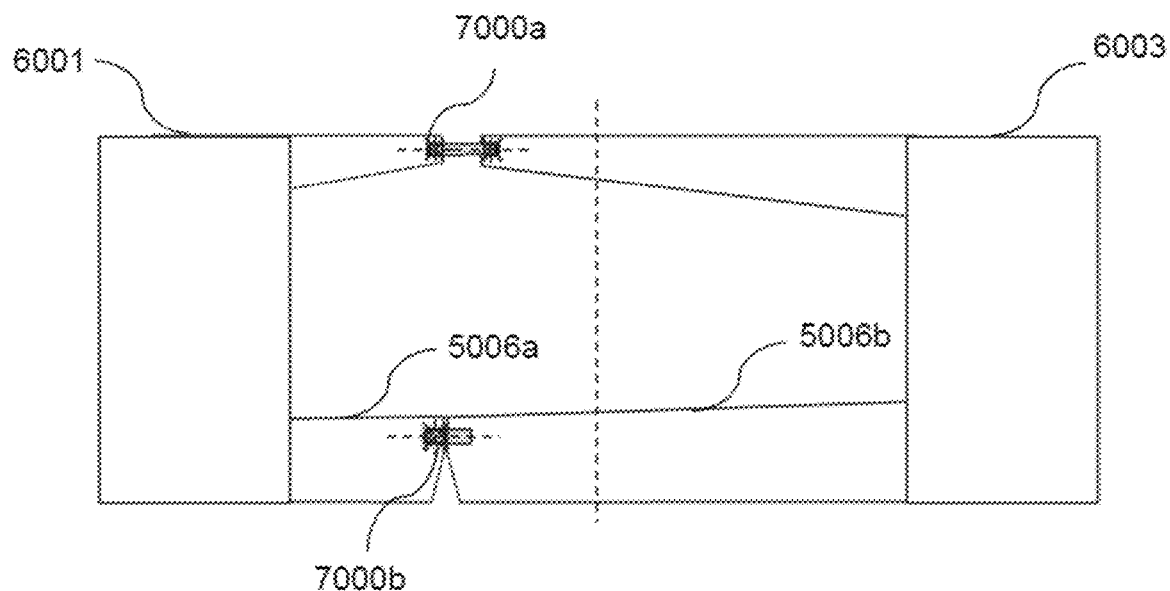

Illustrated in FIG. 15*e*, the lengths of the pontoon unit parts 5006*a* and 5006*b* may be different (unequal) between the columns, i.e. the connector is not necessarily positioned with equal distance to each column. The same may be the case for the truss, as illustrated in FIG. 15*f*.

Figure 15G:
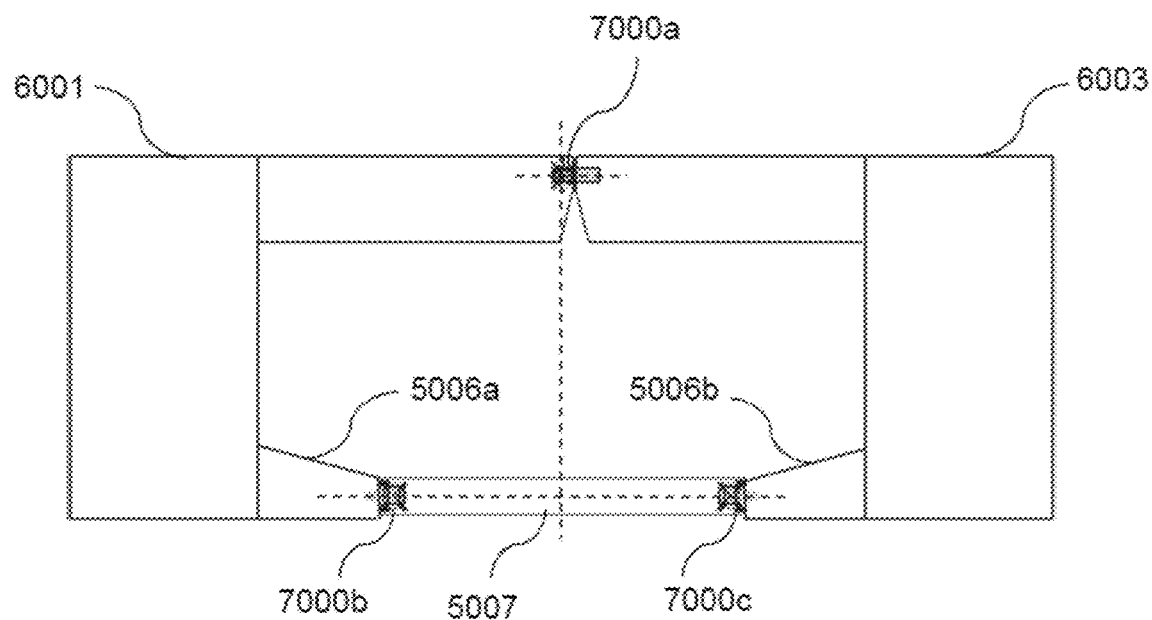

In an embodiment, a beam or truss 5007 may be connected between the lower pontoon unit parts 5006*a* and 5006*b* with two connectors 7000*b* and 7000*c* respectively as illustrated in FIG. 15*g*. Further, the upper part of the columns is connected with a single connector 7000*a*.

Figure 15H:
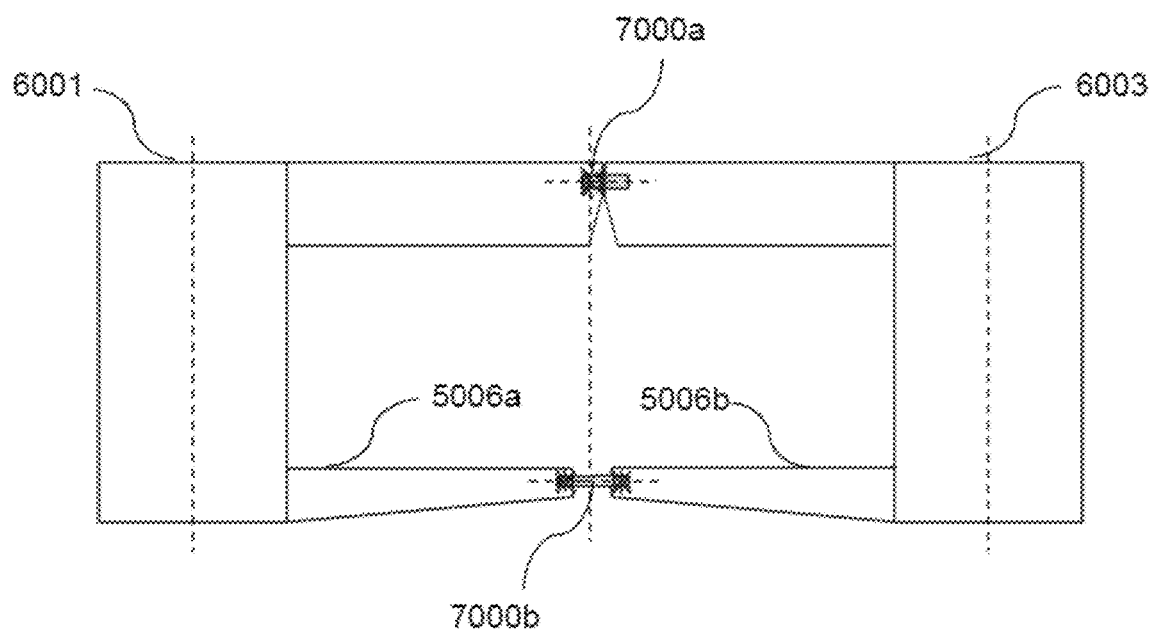

Alternatively, a shorter beam 5007 may be connected between the pontoon unit parts 5006*a* and 5006*b* with the connectors 7000*b* and 7000*c* respectively as illustrated in FIG. 15*h*.

Figure 15I:
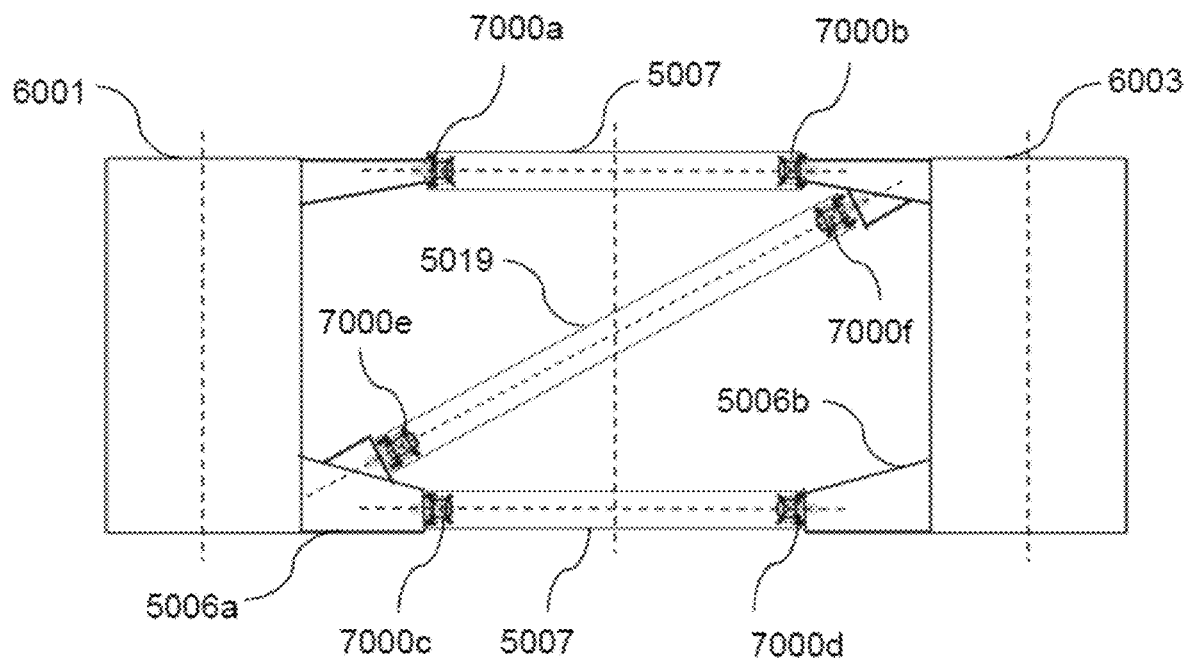

In another embodiment, illustrated in FIG. 15*i*, the beam 5007 may be connected between the pontoon unit parts 5006*a* and 5006*b* with the connectors 7000*c* and 7000*d*. A second beam 5007 may also be connected between the upper parts of the columns with the connectors 7000*a* and 7000*b*. Further, a third beam 5019 may be connected diagonally between the pontoon unit part 5006*a*, which can extend to the upper part of the column 6002, with the connectors 7000*e* and 7000*f*. Thus, by connecting the third beam 5019 diagonally between the pontoon unit part 5006*a* and the upper part of the column 6002, stiffness can be achieved between the columns 6002 and 6003 even if one has four connection points 7000*a-d* with the first and second beams.

Figure 15J:
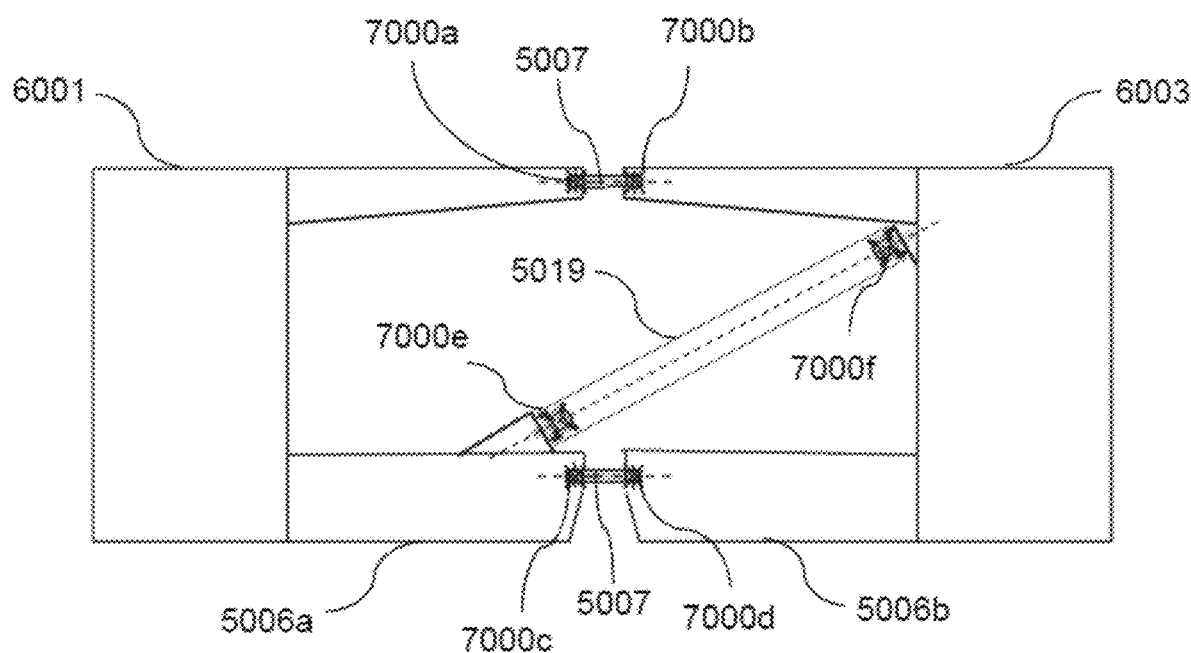

In yet another embodiment, illustrated in FIG. 15*j*, a shorter beam 5007 may be connected between the pontoon unit parts 5006*a* and 5006*b* (having equal lengths) with the connectors 7000*c* and 7000*d*. The upper parts of the columns 6002 and 6003 may be connected with the shorter beam 5007, with the connectors 7000*a* and 7000*b*. Further, a beam 5019 extending diagonally from the pontoon unit part 5006*a* to the upper part of the column 6003 may be connected with the connectors 7000*e* and 7000*f*.

Although the embodiments described above utilize pontoon units 5004*a,b*, 5005*a,b* and 5006*a,b*, any of the embodiments above may be realized using only beam structures to interconnect the columns. In other words, the connection structure between the columns may or may not provide buoyancy for the floater. For example, in some embodiments the pontoon units may be replaced by a truss or beam structure with the design and manufacturing methods otherwise being the same as described above. Further, it should be noted that, while a diagonally extending beam 5019 is illustrated in FIGS. 15*i* and 15*j*, such a beam may be considered an optional feature and embodiments may be realized with or without said beam 5019.

Figure 16A:
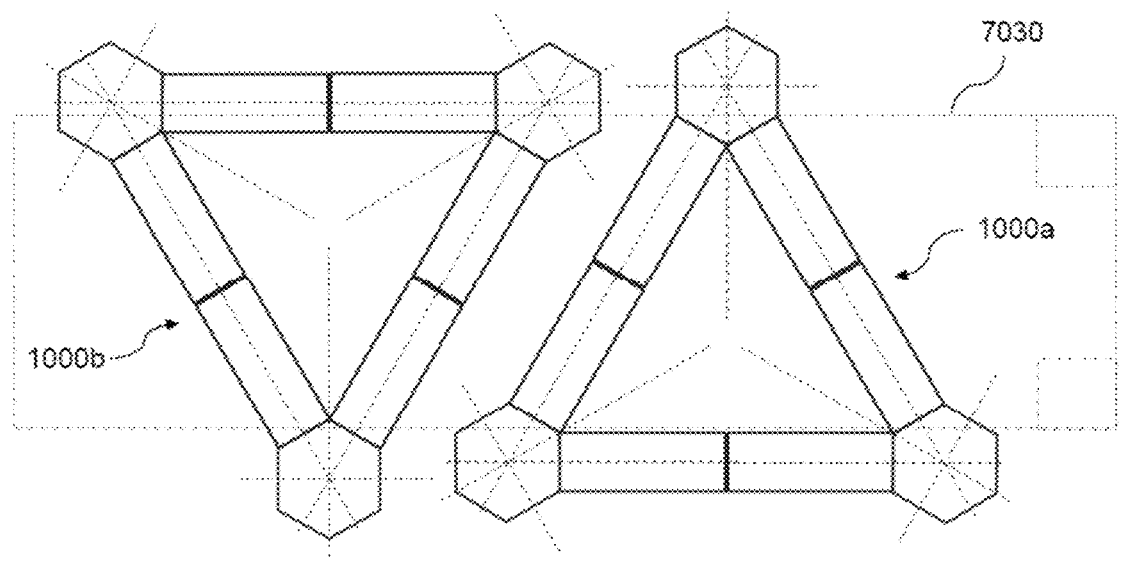
FIGS. 16*a*-16*b* illustrate a comparison of a conventional system of stacking various parts of a floater with an exemplary system.
Figure 16B:
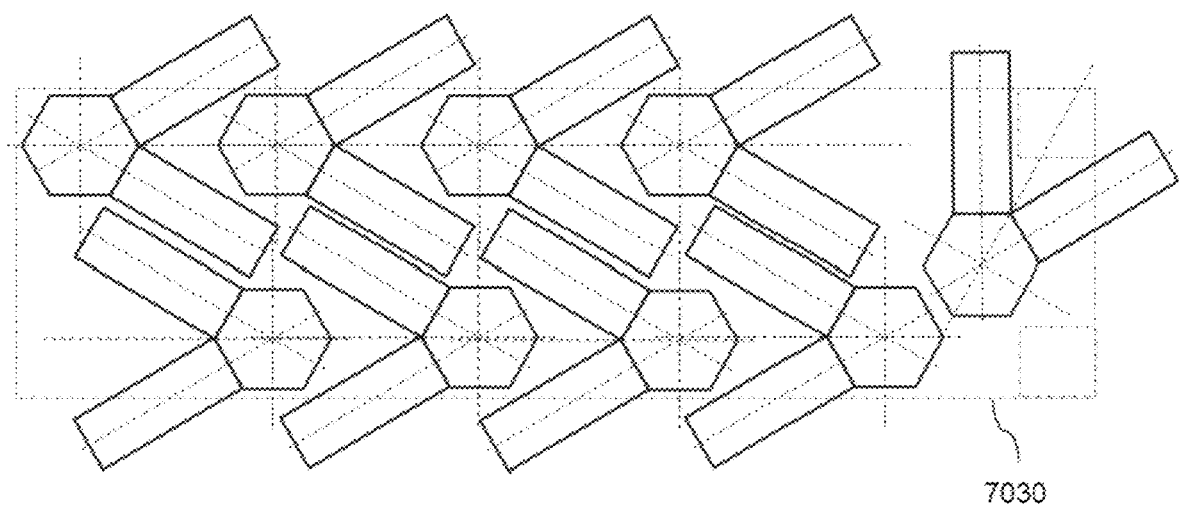

FIGS. 16*a*-16*b* illustrate a comparison of a conventional system of stacking various parts of a floater. As depicted in FIG. 16*a*, bases 1000*a* and 1000*b* of the floater 3000 are stacked on a deck 7030 of a vessel (shown in broken outline for clarity) for transporting the bases 1000*a* and 1000*b* to an offshore location for assembling and/or installation of the floatable power plant. With the proposed system, the various parts of the base 1000 such as the corner members 1001-1003 with connected member parts 1004-1006 can be transported individually as illustrated in FIG. 16*b* (see also FIG. 3*a* and FIGS. 9*a*-*f*).

For example, as illustrated in FIG. 16*a*, two pre-assembled units (i.e., the base 1000*a* and 1000*b*) can be stacked on the deck of the vessel for transporting to the offshore location. However, with the proposed system, three or more base units can be transported on the same deck space as illustrated in FIG. 16*b*. This provides greater efficiency during transport and installation of the floating power plant.

According to embodiments disclosed herein, the manufacturing and assembly of a floatable wind power plant 4000 may be made more efficient and flexible, for example in relation to the facilities required at the manufacturing site. This may allow, for example, assembly of a floatable wind power plant 4000 at a quayside or shore side without deep-water facilities. In some embodiments, the assembly of the power plant may be carried out offshore, for example on an installation vessel or with individual floater parts floating in water prior to assembly.

In some embodiments, manufacturing costs and efforts can be reduced in that manufacturing tolerances can be relaxed. This may allow more efficient manufacturing and/or a more efficient manufacturing chain, for example by allowing sourcing of components from different manufacturing entities. In embodiments using connectors, assembly without welding can be provided, thereby reducing the requirements at the assembly site and/or permitting assembly closer to the installation site.

Various further inventive aspects and embodiments according to the present disclosure will now be outlined in the following numbered clauses, each of which making up inventive aspects provided by the present disclosure:

Clause 1. A floater (3000) for a floatable wind energy power plant (4000), the floater (3000) comprising:
a base (1000) having connection members (1004,1005, 1006); and
a plurality of columns (2001,2002,2003) fixed to the base (1000), at least one of the columns configured for supporting a wind turbine tower (3001);
wherein at least one of the base (1000) and the plurality of columns (2001,2002,2003) is made up of polyhedron structures.

Clause 2. The floater of clause 1, wherein at least one of the base (1000) and the plurality of columns (2001,2002, 2003) is made up of at least two interconnected polyhedron structures.

Clause 3. The floater of clauses 1 or 2, wherein at least one of the base (1000) and the plurality of columns (2001,2002, 2003) have a polyhedron shape.

Clause 4. The floater according to any of the clauses 1-3, wherein the polyhedron structures are made up of a plurality of interconnected polygonal panels.

Clause 5. The floater according to clause 4, wherein the plurality of interconnected polygonal panels include strengthening members (501) at an inner wall.

Clause 6. A method of constructing a floater (3000) for a floatable wind energy power plant (4000), comprising:
assembling a plurality of substantially flat polygonal panels to form a plurality of components (1003*a*-*f*, 1005, 1006, 2003);
assembling the components to form a polyhedron structure, wherein the polyhedron structure forms a part of the floater (3000);
assembling a wind turbine tower (3001) on the floater (3000).

Clause 7. A method according to clause 6, wherein the floater comprises a base (1000) and a plurality of columns (2001,2002,2003), and wherein at least one of the base (1000) and the plurality of columns (2001,2002,2003) is made up of the polyhedron structure.

Clause 8. The method of clause 7, wherein at least one of the base (1000) and the plurality of columns (2001,2002, 2003) is made up of at least two interconnected polyhedron structures.

Clause 9. The method of clause 7 or 8, wherein at least one of the base (1000) and the plurality of columns (2001, 2002,2003) have a polyhedron shape.

Clause 10. The method according to any of clauses 6-9, wherein the plurality of polygonal panels include strengthening members (501) at an inner wall.

Clause 11. A method for constructing a floater (3000) for a floatable wind energy power plant (4000), the method comprising the steps:
constructing three columns (1001,1003,2001,2003,1002, 2002) from a plurality of substantially flat polygonal panels, each column having a polygonal cross section and at least one of the columns configured for supporting a wind turbine tower (3001);
interconnecting the columns by means of connection members (1004-1006), where the step of interconnecting the columns comprises connecting each column to two other columns to form a substantially triangular floater structure by fixing the connection members (1004-1006) at planar interfaces (1008) on the columns.

Clause 12. A floater (3000) for a wind energy power plant, the floater comprising:
three floater parts, each floater part comprising a column (2001-2003, 6001-6003), at least one of the columns configured for supporting a wind turbine tower (3001), the floater parts interconnected to form a substantially triangular floater structure by means of a plurality of connectors (7000*a*-7000*f*),
wherein the connectors (7000*a*-7000*f*) provide non-welded connections between the floater parts.

Clause 13. The floater (3000) of clause 12, wherein between each pair of columns (6001-6003) there is provided a connection structure.

Clause 14. The floater (3000) of clause 13, wherein the connection structure comprises exactly two or exactly three non-welded connectors (7000*a*-7000*f*).

Clause 15. The floater (3000) of clause 13 or 14, wherein the connection structure comprises
a first connection structure part (5004*a*,*b*, 5005*a*,*b*, 5006*a*, *b*), the first connection structure part arranged substantially horizontally between two columns (6001-6003) and comprising one connector (7000*c*), and
a second connection structure part (5007) the second connection structure part arranged substantially horizontally between the two columns (6001-6003) and comprising one or two connectors (7000*a,b*).

Clause 16. The floater (3000) of clause 15, wherein the second connection structure part (5007) comprises a beam having a connector at each end thereof.

Clause 17. The floater (3000) of any of clauses 12-16, wherein each floater part has a positive buoyancy.

Clause 18. A floater (3000) for a floatable wind energy power plant (4000), the floater (3000) comprising:
- a plurality of columns (6001-6003), at least one of the columns configured for supporting a wind turbine tower (3001);
- each column having a pontoon unit part (5004*a*-5004*b*), the pontoon unit part (5004*a*) of each column (6001-6003) is connected to a pontoon unit (5004*b*) part of another column (6001-6003) with at least one connector (7000*a*-7000*f*); and
- a beam (5007) connecting an upper part of the columns (6001-6003), the beam (5007) is connected to the upper part of the columns (6001-6003) with at least one connector (7000*a*-7000*f*).

Clause 19. The floater of clause 18, wherein the beam (5007) is connected to the upper part of the columns (6001-6003) with two connectors (7000*a*-7000*f*).

Clause 20. The floater of clause 18 or 19, wherein the pontoon unit part (5004*a*) of each column (6001-6003) is connected to the pontoon unit part (5004*b*) of another column (6001-6003) with one connector (7000*a*-7000*f*).

Clause 21. The floater of any of clauses 18-20, wherein between each pair of columns (6001-6003) there are exactly two or exactly three connectors (7000*a*-7000*f*).

Clause 22. The floater of any of clauses 18-21, wherein the one connector (7000*a*-7000*f*) connecting any pair of pontoon unit parts (5004*a-b*) is located in the upper half of said pontoon unit parts (5004*a-b*).

Clause 23. The floater of any of clause 18-22, wherein the one connector (7000*a*-7000*f*) connecting any pair of pontoon unit parts (5004*a-b*) is located above the waterline when the pontoon units are positioned in water, particularly wherein the connector (7000*a*-7000*f*) is located above the waterline when the pontoon units are positioned in a de-ballasted state in water and located below the waterline when the pontoon units are in an operational/service draft.

Clause 24. The floater of any of the clauses 18-23, wherein at least one of the pontoon unit parts (5004*a-b*) comprises a bumper (5751-5752).

Clause 25. The floater of any of the clauses 18-24, wherein one of the pontoon unit parts (5004*a-b*) comprises a first bumper (5751) and a second of the pontoon unit parts (5004*a-b*) comprises a second counterpart bumper (5752).

Clause 26. A method of assembling a floater (3000) of a floatable wind energy power plant (4000), the method comprising:
- providing three floater parts, each floater part comprising a column (6001-6003), at least one of the columns configured for supporting a wind turbine tower (3001);
- connecting each pair of floater parts with at least one connector (7000*a*-7000*f*), the at least one connector providing a non-welded connection between the floater parts.

Clause 27. A method according to clause 26, further comprising
- connecting a lower part of each floater part with at least one connector (7000*c,d*), and
- connecting an upper part of each floater part with at least one connector (7000*a,b*).

Clause 28. A method according to clause 27, wherein the step of connecting an upper part of each floater part comprises connecting an upper part of each floater part with a beam (5007), the beam comprising a connector at each end thereof.

Clause 29. A method according to any of clauses 26-28, wherein the step of connecting each pair of floater parts comprises forming a connection structure (5006*a,b*,5007, 5009,7000*a-c*) between each pair of columns (6001-6003).

Clause 30. A method according to clause 29, wherein the step of connecting each pair of floater parts comprises forming a connection using exactly two or exactly three non-welded connectors (7000*a*-7000*f*) between each pair of columns (6001-6003).

Clause 31. A method according to clause 30, wherein the exactly two or exactly three non-welded connectors (7000*a*-7000*f*) between each pair of columns (6001-6003) are arranged in a substantially vertical plane.

Clause 32. A method according to any of clauses 26-31, wherein the step of connecting each pair of floater parts is carried out:
- with the floater parts arranged floating in water,
- with the floater parts arranged onshore, or
- with the floater parts arranged on a vessel deck.

Clause 33. A method according to any of clauses 26-32; wherein the three floater parts comprises a first (6001, 5006*a*,5004*a*), a second (6003,5006*b*,5005*a*) and a third (6002,5004*b*,5005*b*) floater part, the method comprising
- bringing the first and second floater parts into engagement and connecting the first and second floater parts with a first connector (5010*a*),
- bringing the first and third floater parts and connecting the first and third floater parts with a second connector (5010*b*),
- angularly displacing the second floater part in relation to the third floater part to bring the second and third floater parts into engagement, and connecting the second and third floater parts with a third connector.

Clause 34. A method according to any of clauses 26-33, wherein the step of connecting each pair of floater parts with at least one connector comprises, in at least one horizontal plane, providing an interconnection structure between the columns (6001-6003) having exactly three connectors, one connector between each pair of columns.

Clause 35. A method according to any of clauses 26-34, wherein the at least one connector is located in the upper half of the floater part.

Clause 36. A method according to any of clauses 26-35, wherein the at least one connector is located above the waterline during the connection of each pair of floater parts.

Clause 37. A floater or a method according to any clause 12-36, wherein each connector (5010, 7000) comprises a first connection element (7002) and a second connection element (7004).

Clause 38. A floater or a method according to clause 37, wherein at least one of the first and second connection elements (7002,7004) are angularly displaceable.

Clause 39. A floater or a method according to any of clauses 37-38, wherein the first connection element (7002) comprises a protruding part (7001) and the second connection element (7004) comprises a receiver part (7003) operable to receive the protruding part (7001).

Clause 40. A floater or a method according to clause 39, wherein the protruding part (7001) is arranged on a rotatable member which is arranged in a holder part (7010).

Clause 41. A floater or a method according to clause 40, wherein the protruding part (7001) is connected with the holder part (7010) via a flexible coupling (7042,7043).

Clause 42. A floater or a method according to clause 41, wherein the flexible coupling (7042, 7043) comprises alternating sheets of at least one metallic disc and at least one elastomeric insert.

Clause 43. A floater or a method according to clause 41 or 42, wherein the first connection element (7002) comprises a back part (7045) having opposing support faces (7045*a,b*) against which the flexible coupling (7042, 7043) acts to support the first connection element (7002) in the holder part (7010).

Clause 44. A floater or a method according to clause 43, wherein the support faces (7045*a,b*) have a non-zero angle relative to a longitudinal axis (7044) of the first connection element (7002).

Clause 45. A floater or a method according to clause 44, wherein the angle is about 45 degrees, about 60 degrees or 90 degrees.

Clause 46. A floater or a method according to any of clauses 40 to 45, wherein the holder part (7010) comprises a stop face (7046) configured to limit an angular displacement of the first connection element (7002) in relation to the holder part (7010).

Clause 47. A floater or a method according to clause 46, wherein the stop face (7046) is configured to engage a corresponding surface on the back part (7045).

Clause 48. A floater or a method according to clause 46 or 47, wherein the angular displacement is limited to less than 10 degrees, less than 8 degrees, less than 6 degrees, or less than 4 degrees.

Clause 49. A floater or a method according to any of clauses 39-48, wherein the protruding part (7001) has a frustoconical section (7001') and the receiver part (7003) has a corresponding frustoconical profile to receive the protruding part (7001).

Clause 50. A floater or a method according to any of clauses 37-49, wherein the connector comprises a fixing element (7006) operable to interlock the first and second connection elements (7002,7004).

Clause 51. A floater or a method according to any of clauses 40 to 50, wherein the holder part (7010) has at least one flat outer surface.

Clause 52. A floater or a method according to any of clauses 40 to 51, wherein the outer section of the holder part (7010) has a cubic or rectangular prism shape.

Clause 53. A floater or a method according to any of clauses 40 to 52, wherein the second connection element (7004) has at least one flat outer surface.

Clause 54. A floater or a method according to any of clauses 40 to 53, wherein the outer section second connection element (7004) has a cubic or rectangular prism shape.

Figure 17:
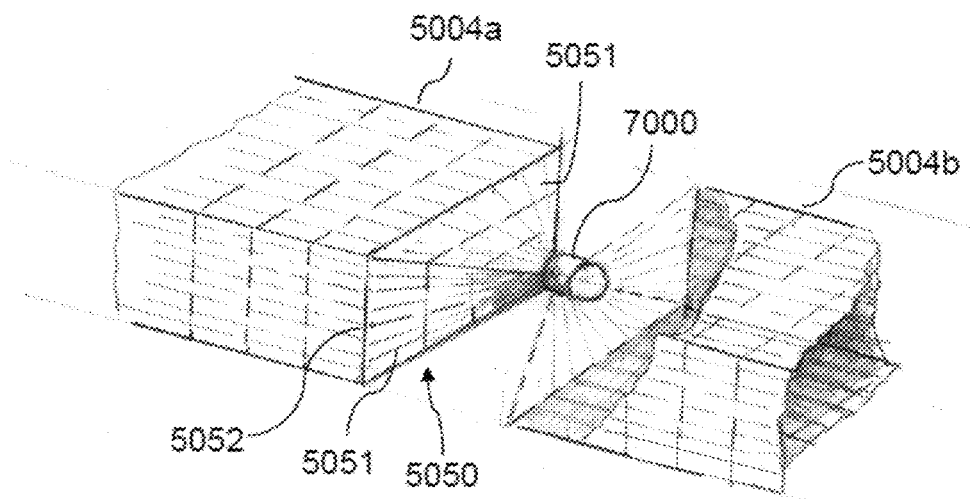
FIG. 17 illustrates a connection between parts of a floater.

Illustrated in FIG. 17, and as may be the case in any of the described embodiments, the connector 7000 may be arranged on a transition section of a column 6001-6003 and/or beam 5007. In FIG. 17, the connector 7000, which may be a connector according to any of the designs described herein is arranged on a narrowing transition section 5050 at a front end part of the pontoon unit parts 5004*a,b*.

The transition section 5050 may be made up of a plurality of angled plates 5051 and the pontoon unit 5004*a,b* may be made up of several connected substantially flat plates. The angled plates 5051 may then continue from the respective flat plate to which it is connected and which makes up an outer surface structure of the pontoon unit 5004*a,b* in an angle which is between zero and ninety degrees. The angled plates 5051 are advantageously provided welded to an end 5052 of the pontoon unit part 5004*a,b* and continue in the extension of the longitudinal axis of the pontoon unit part 5004*a,b* between the end 5052 and the connector 7000. Each angled plate 5051 may, for example, continue from the flat plate of the pontoon unit 5004*a,b* to which it is fixed in a direction away from the end 5052 with about forty-five degree angle between the respective angled plate 5051 and the flat plate of the pontoon unit 5004*a,b* to which it is fixed.

The transition section 5050 may be welded to the end 5052 and welded to the connector 7000.

The narrowing part 5050 may provide a gradually reducing cross-section area (in a plane perpendicular to the longitudinal axis of the pontoon unit part 5004*a,b*) from the pontoon unit part 5004*a,b* to the connector 7000. Advantageously, the narrowing part 5050 is strengthened with internal strengthening members 501 (such as those shown in FIGS. 6*a* and 6*b*) and more advantageously, the plate thickness increases towards the connector 7000 to increase the stability of the narrowing section 5050.

While FIG. 17 illustrates the transition section being arranged between two pontoon unit parts 5004*a,b*, an equivalent design with a transition section 5050 may be used, alternatively or additionally, between the beam 5007 and the connection structures 5009 (see e.g. FIG. 13).

According to these aspects, there are provided the following numbered clauses, each of which making up inventive aspects provided by the present disclosure:

Clause A1. A connector (7000) for a floater (3000) for a floatable wind energy power plant (4000) as described in any of the clauses 1 to 54 of the previous aspects, the connector (7000) being or comprising a non-welding connector.

Clause A2. A connector (7000) according to clause A1, arranged on a column (6001-6003) or beam (5007) at or adjacent a transition section (5050) of narrowing width or diameter.

Clause A3. A connector (7000) according to clause A2, wherein the width or diameter of the column (6001-6003) or beam (5007) narrows towards the connector (7000).

Clause A4. A connector (7000) according to clause A2 or A3, wherein the transition section (5050) is strengthened with at least one internal strengthening member (501).

Clause A5. A connector (7000) according to clause A2 to A4, wherein the transition section (5050) is made up of a plurality of interconnected plates (5051), at least one plate (5051) being angled relative to a plate connected thereto.

Clause A6. A connector (7000) according to any preceding clause A1-A5, wherein the plate thickness in the transition section (5050) increases towards the connector (7000).

Clause A7. A floater (3000) for a floatable wind energy power plant (4000) having a connector as specified in any preceding clause A1-A6.

Clause A8. A floatable wind energy power plant (4000) having a connector as specified in any preceding clause A1-A6.

Figure 21:
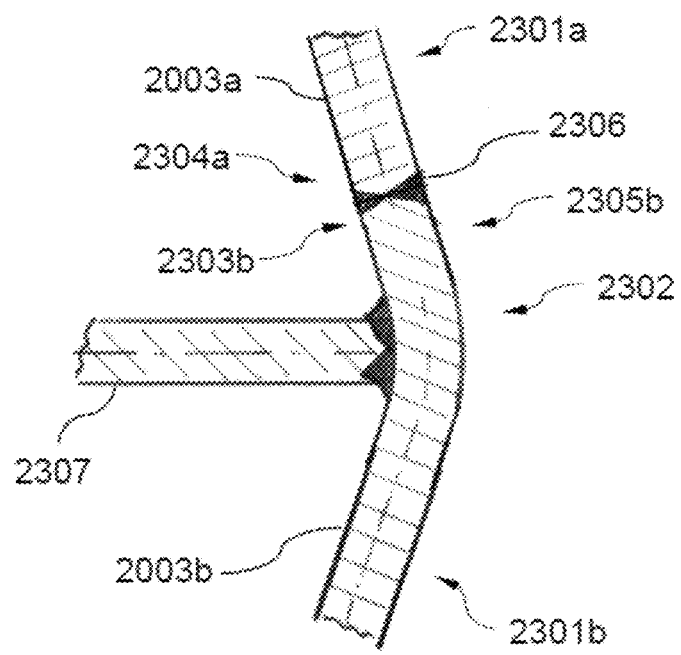
FIG. 21 shows parts of a column for a floatable wind energy power plant according to an embodiment.
Figure 22:
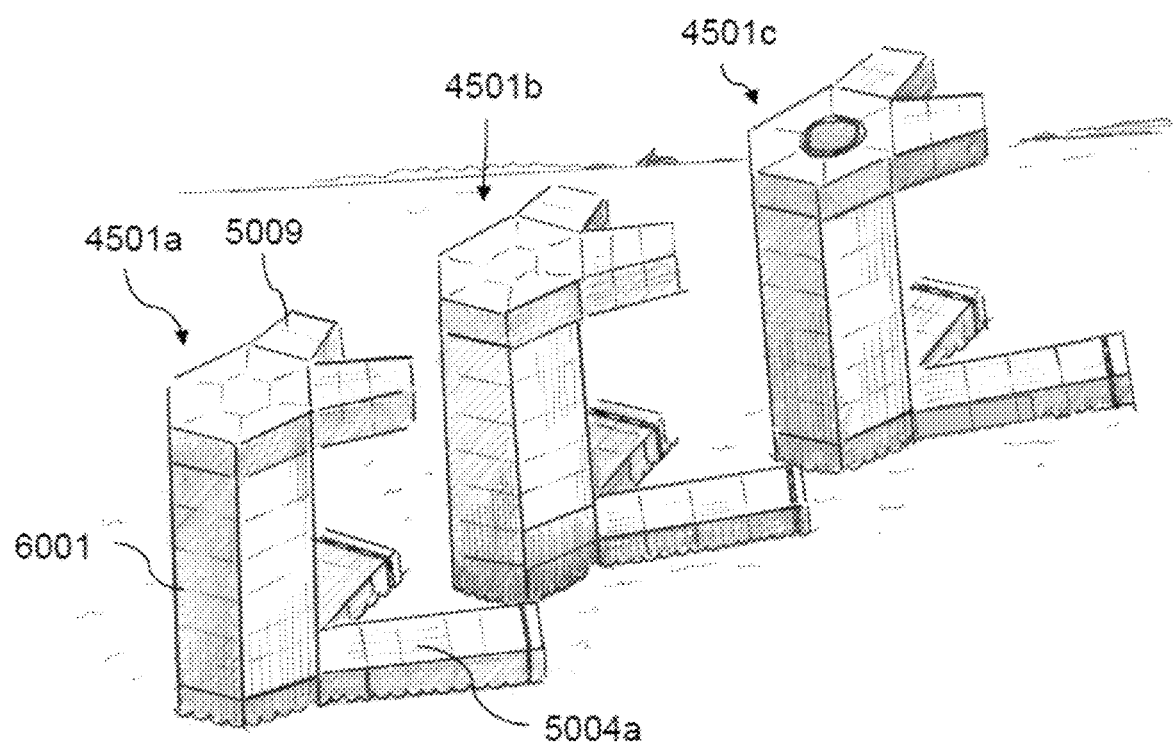
FIGS. 22-26 illustrate a method of assembling a floating wind power plant.
Figure 23:
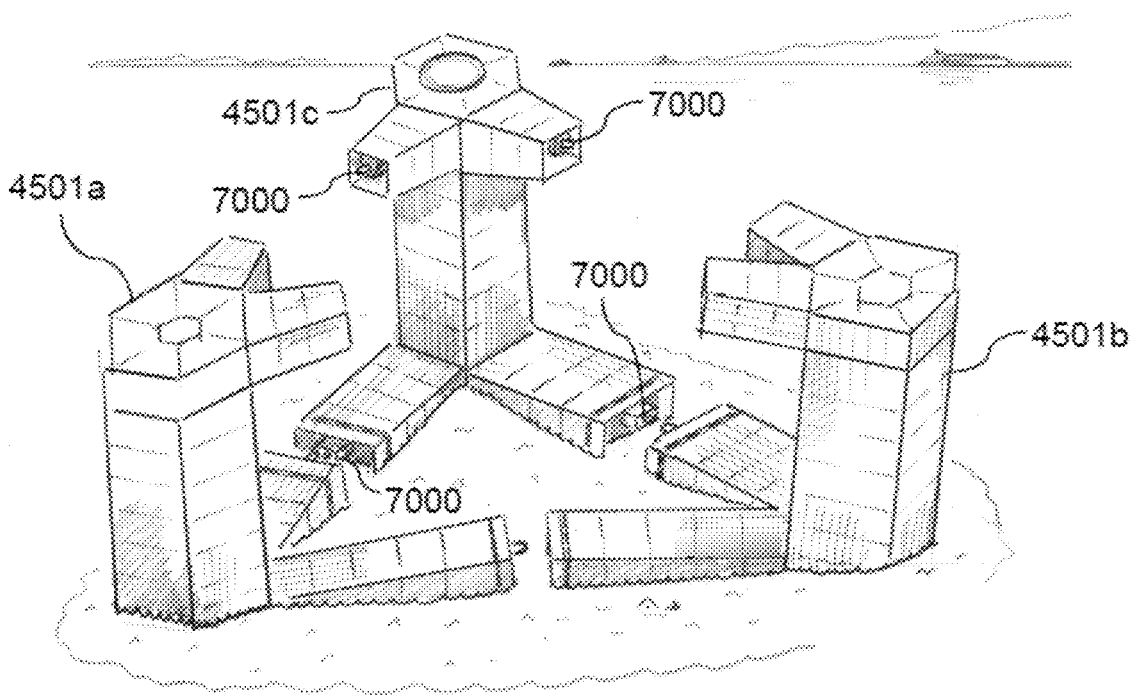

Now with reference to FIG. 21, as well as to FIGS. 6*a-b*, an advantageous construction of one or more of the columns 2001-2003 of a floatable wind energy power plant 4000 according to the above or other embodiments is presented.

As shown in FIGS. 6*a* and 6*b*, and described above, the column 2003 can be made up of a plurality of panels 2003*a-f*. Each panel 2003*a-f* can be welded to neighboring panels 2003*a-f* along side edges 2303*b,c*, 2304*b,c* thereof. (Side edges 2303*b,c* and 2304*a,b,c* are indicated in FIG. 6*b* in relation to panels 2003*a,b,c* but corresponding side edges on the other panels 2003*a* and 2003*d-f* can be seen.)

FIG. 21 illustrates a top view of the interface between panels 2003*a* and 2003*b*. The edges 2304*a* and 2303*b* are welded together by weld 2306. The other panels 2003*c-f* are welded together equivalently, to produce a substantially polygonal structure as illustrated in FIG. 6*a*. Each panel 2003*a-f* is thus welded to neighboring panels 2003*a-f* with longitudinal welds 2306.

Each panel 2003*a-f* is predominantly planar, i.e. non-curved, or flat. A substantially planar section 2301*a,b* on each panel 2003*a,b* can make up most of the panel 2003*a,b*, e.g. formed by a flat plate structure. Strengthening members 501 can be provided on each panel 2003*a-f*, as described above. (These are not shown in FIG. 21.)

Each panel 2003*a-f* further comprises a bent section 2302 where the panel is bent about an axis parallel to a longitudinal axis of the column. The panel 2003*a-f* may follow a curved or substantially curved path in the bent section 2302, as indicated in FIG. 21.

The panels 2003*a-f* may be bent towards the edge interfacing the neighboring panel on one side edge or on both side edges. Preferably, to reduce manufacturing effort, each panel is bent only on one side. Consequently, in FIG. 21, the planar section 2301*b* of the panel 2003*b* extends from the bent section 2302 all the way towards the other side edge 2304*b* (see FIG. 6*b*) and the panel 2003*b* is flat across this whole section. The bent, curved section 2302 is thus arranged near the side edge 2303*b* to interface neighboring panel 2003*a*.

The bent section 2302 may be bent, for example, by an angle which equals 360 degrees divided by the number of panels 2003*a-f* in the column 2003. This may allow the edges 2304*a*,2303*b* (and the corresponding other edge pairs) to interface each other with no angle between the panels, such that the weld 2306 can be provided between two substantially co-planar plate sections.

The bent section 2302 can extend all the way to the edge 2303*b*, or can be provided at a position between the side edges such that a second planar (flat) section 2305*b* is provided on the panel 2003*b*. (And correspondingly on the other panels 2003*a-f*.) Each panel 2003*a-f* may thus have first and second flat sections 2301*a,b*, 2305*b* provided at opposite sides of the bent section 2302. The angle of the bent section 2302 may, as above, provide that the second flat section 2305*b* on panel 2003*b* and the first flat section on panel 2003*a* are substantially coplanar. (And correspondingly for the other panel-to-panel interfaces.)

By providing a first side edge 2304*b,c* of the respective panel on a first flat section 2301*a,b* and a second side edge 2303*b,c* on the second flat section 2305*b*, the weld 2306 can be spaced from the bent section 2302.

An inner support structure 2307 (FIG. 21) may be fixed to each panel 2003*a-f*. The inner support structure may be a rigid structure which connects to each panel 2003*a-f* to provide structural stability. It may be separate from the strengthening members 501, which may be provided on the panels only, or the inner support structure 2307 may, alternatively or additionally, connect to one or more of the support members 501.

The inner support structure 2307 can be fixed to each panel 2003*a-f* in a location which is spaced from any weld between the respective panel and the neighbouring panels 2003*a-f*, i.e. spaced from the weld 2306 in FIG. 21.

The inner support structure 2307 can be fixed to each panel 2003*a-f* on the bent section 2302, or it can, alternatively or additionally, be fixed to each panel 2003*a-f* on the planar section 2301*a,b*. The inner support structure 2307 can for this purpose be welded to each panel 2003*a-f*.

The inner support structure 2307 can extend radially inwardly from the panel 2003*a-f*, for example as shown in FIG. 21 wherein the inner support structure 2307 comprises plates or beams extending inwardly from each panel 2003*a-f* and is connected together in an inner substructure of the column 2003.

The first planar section 2301*b* or the first and second planar sections 2301*b*,2305*b* may make up the majority of the surface of the panel. For example, the first planar section 2301*b* or the first and second planar sections 2301*b*,2305*b* may make up more than 50% of panel surface, more than 75% of the panel surface, more than 90% of the panel surface or more than 95% of the panel surface. The bent section 2302 may correspondingly form only a minor part of the panel surface.

Advantageously, the embodiments described in relation to FIGS. 6*a*, 6*b* and 21 can provide enhanced load distribution and thereby structural properties in a floating wind energy power plant, while allowing easy manufacture of the floater parts and assembly of the columns and floater.

According to these aspects, there are provided the following numbered clauses, each of which making up inventive aspects provided by the present disclosure:

Clause B1. A column (2001-2003) for a floatable wind energy power plant (4000),
  the column made up of a plurality of panels (2003*a-f*),
    each panel (2003*a-f*) welded to neighboring panels (2003*a-f*) along side edges (2303*b,c*, 2304*b,c*) thereof,
    wherein each panel (2003*a-f*) comprises a substantially planar section (2301*a,b*) and a bent section (2302) where the panel is bent about an axis perpendicular to a longitudinal axis of the column.

Clause B2. A column (2001-2003) according to the preceding clause, wherein, for each panel (2003*a-f*), the panel (2003*a-f*) follows a curved path about the axis in the bent section (2302).

Clause B3. A column (2001-2003) according to any of the two preceding clauses, wherein the substantially planar section (2301*a,b*) comprises more than half of the surface area of the panel.

Clause B4. A column (2001-2003) according to any of clauses B1 to B3, wherein the flat section (2301*a,b*) is a first flat section (2301*a,b*) and the panel (2003*a-f*) comprises a second flat section (2305*b*), the first and second flat sections (2301*a,b*, 2305*b*) provided at opposite sides of the bent section (2302).

Clause B5. A column (2001-2003) according to clause B4, wherein, for each panel (2003*a-f*), a first side edge (2304*b,c*) of the respective panel is provided on the first flat section (2301*a,b*) and a second side edge (2303*b,c*) is provided on the second flat section (2305*b*).

Clause B6. A column (2001-2003) according to clause B5, wherein, for each panel (2003*a-f*), the first flat section (2301*a,b*) is substantially co-planar with the second flat section (2305*b*) of the neighboring panel (2003*a-f*) to which the first flat section (2301*a,b*) is connected (e.g. welded, bonded, or the like).

Clause B7. A column (2001-2003) according to any of clauses B1 to B6, wherein each panel (2003*a-f*) welded to neighboring panels (2003*a-f*) with longitudinal welds (2306).

Clause B8. A column (2001-2003) according to any of clauses B1 to B7, wherein the flat sections (2301*a,b*, 2305*b*)

form a substantially polygonal cross-section shape in a plane perpendicular to a longitudinal axis of the column (2001-2003).

Clause B9. A column (2001-2003) according to any of clauses B1 to B8, the column (2001-2003) comprising an inner support structure (2307) fixed to each panel (2003a-f).

Clause B10. A column (2001-2003) according to clause B9, wherein the inner support structure (2307) is fixed to each panel (2003a-f) in a location which is spaced from any weld between the respective panel and the neighboring panels (2003a-f).

Clause B11. A column (2001-2003) according to clause B9 or B10, wherein the inner support structure (2307) is fixed to each panel (2003a-f) on the bent section (2302).

Clause B12. A column (2001-2003) according to any of clauses B9 to B11, wherein the inner support structure (2307) is fixed to each panel (2003a-f) on the planar section (2301a,b).

Clause B13. A column (2001-2003) according to any of clauses B9 to B12, wherein the inner support structure (2307) is welded to each panel (2003a-f).

Clause B14. A column (2001-2003) according to any of Clauses B9 to B13, wherein the inner support structure (2307) extends radially inwardly from the panel (2003a-f).

Clause B15. A column (2001-2003) according to any of clauses B1 to B14, wherein the bent section (2302) is bent by an angle equal to 360 degrees divided by the number of panels (2003a-f) in the column (2001-2003).

Clause B16. A column (2001-2003) according to any of clauses B1 to B15, wherein the first planar section (2301b) or the first and second planar sections (2301b,2305b) combined make up more than 50% of the surface of the respective panel (2003a-f), more than 75% of the surface of the respective panel (2003a-f), more than 90% of the surface of the respective panel (2003a-f) or more than 95% of the surface of the respective panel (2003a-f).

Figure 24:
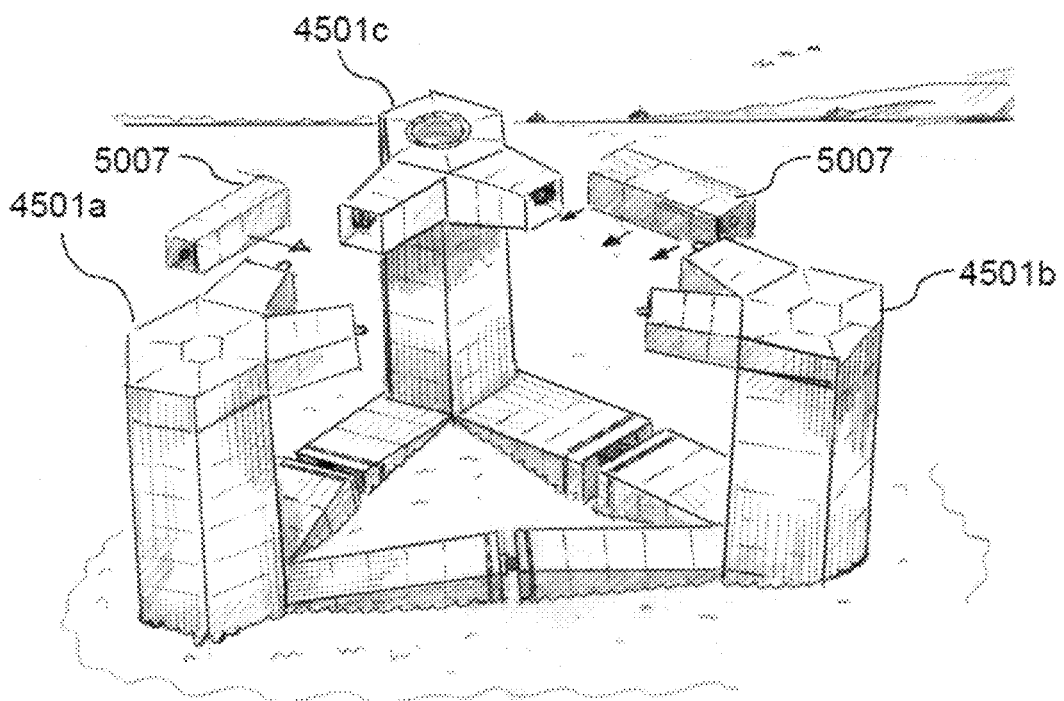
Figure 25:
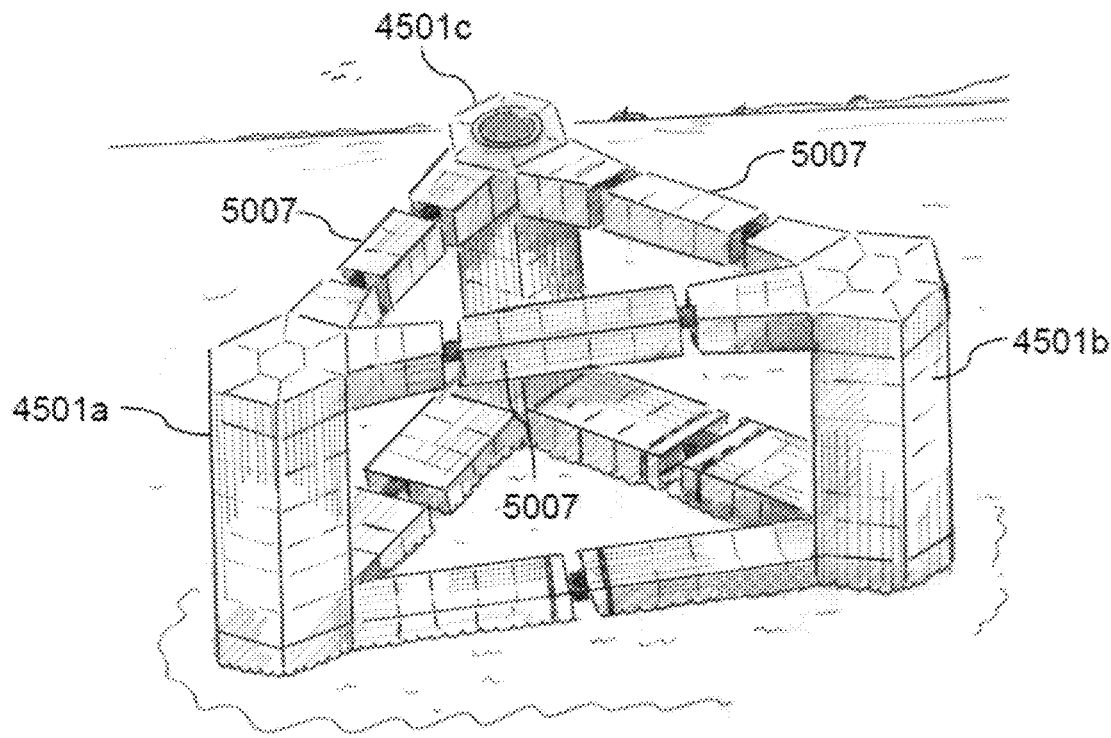
Figure 26:
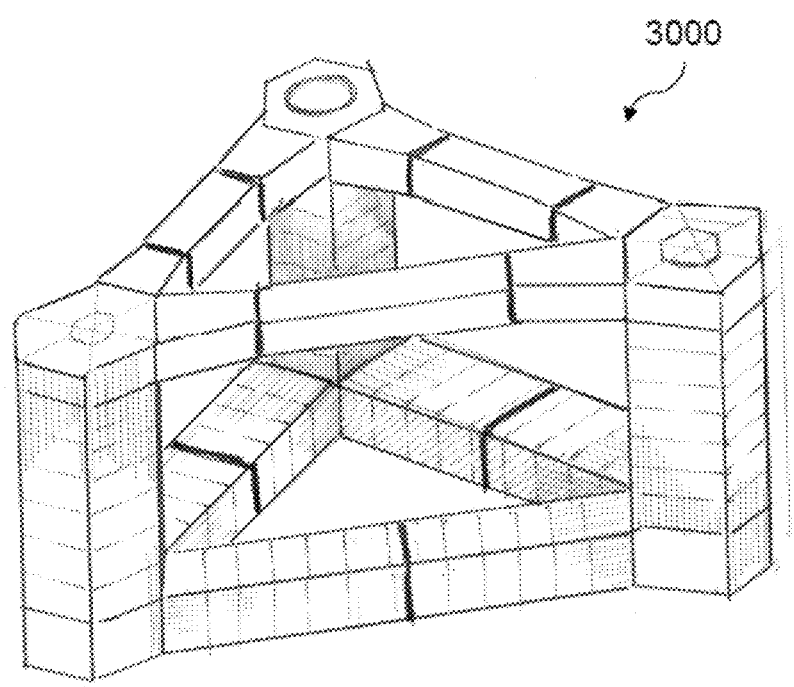

FIGS. 22-26 illustrate steps of one method of assembling a floating wind energy power plant. The floating power plant may correspond to that described above in relation to FIGS. 9a-f. Three pre-assembled floater parts 4501a-c can be provided floating independently and provided at an assembly site, for example at a quayside or at the installation location. Referring to the embodiment shown in FIG. 22 these pre-assembled floater parts 4501a-c may comprise columns 6001-6003, pontoon unit parts 5004a-5006b and/or connection structures 5009, preferably any or all of them being constructed utilizing a flat plate geometry. Shown in FIG. 23 the pre-assembled floater parts 4501a-c are positioned in relation to each other for interconnection. As seen in FIG. 24, upper structural truss connections 5007 may then be provided between upper parts of the pre-assembled floater parts 4501a-c. The pre-assembled floater parts 4501a-c can then be pushed or pulled together for example by means of a dedicated tool, winches, or equivalent. The different pre-assembled parts 4501a-c may be interconnected by means of connectors. The connectors may be any of the connectors described herein for example connector 7000 as described in FIGS. 12a-c. Optionally, one or more of the structural interconnections may be welded connections. FIG. 26 illustrates the assembled floater 3000 for the wind energy power plant comprising welded connections. The method shown in FIGS. 22-26 illustrates an assembly of the pre-assembled parts 4501a-c while floating. Optionally, the pre-assembled parts 4501a-c, 5007 may be assembled onshore or on a vessel deck, for example utilizing a method such as that described in relation to FIGS. 46-49, as will be described also in relation to a further aspect.

Advantageously, the floater parts 4501a-c connector 7000 can be provided such that the parts have a de-ballasted state in which the connector 7000 is located above the waterline. The connection of the three floater parts can then be carried out by engaging the connectors 7000 and interconnecting them while above the waterline, and thereafter ballasting the floater. In the subsequent operational/service draft, the connectors 7000 may then be located under water, i.e. submerged.

Advantageously, in any of these connection methods, the lower connectors 7000 may be connected first, then the interconnected floater parts 4501a-c may be ballasted, and thereafter the upper structural truss connections 5007 can be fixed in place. This may, for example, reduce the need for lifting capacity and the complexity associated with fixing the upper structural truss connections 5007 in place.

When assembling multiple parts of a floater for a floatable wind power plant in water such as a floater already described in previous aspects and embodiments, a connection between these parts may be formed. This can be a by means of a connector, by welding or by any other mechanical means. A method for providing a connector is shown, for example with reference to FIGS. 11a-12c. There may be times when the location of the desired connection is below the surface level of the water. While connecting parts of the floater underwater (e.g. subsea) may be possible, it may be more desirable to be able to connect such parts located below the water surface level without those parts being underwater. For example, if the desired connection is a welded connection, then avoiding having to weld underwater may reduce the cost associated with the weld, while also improving the quality of the weld and facilitate handing of parts and equipment.

As such, when connecting multiple parts together (e.g. by welding), it may be beneficial to provide an enclosure for preventing ingress of water towards a connection site (e.g. by means of a cofferdam), by placing said means adjacent the connection site (which may be a welding site). The enclosure may permit any water to be removed from the connection site, and/or may prevent water ingress towards the connection site. As previously explained this may remove the requirement for underwater welding and facilitate the handling of parts and equipment at the connection site.

Figure 27:
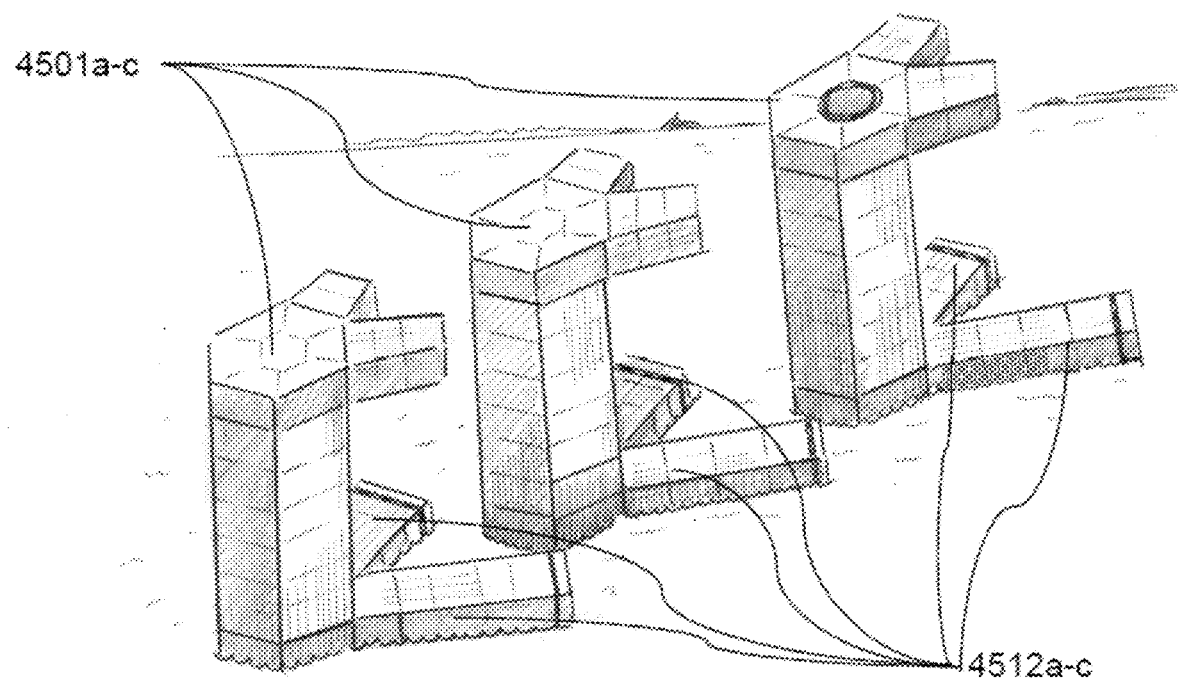
FIG. 27 illustrates multiple pre-assembled parts of a floater.

FIG. 27 shows multiple pre-assembled parts 4501a-c being provided offshore. Each of the pre-assembled parts 4501a-c is substantially identical and each comprises a pair of elongate members 4512a-c. These pre-assembled floater parts 4501a-c may comprise columns 6001-6003, pontoon unit parts 5004a-5006b and/or connection structures 5009 similar to embodiment shown in the previous aspect, preferably any or all of them being constructed utilizing a flat plate geometry. In the shown embodiment the elongate members 4512a-c consist of the pontoon unit parts 5004a-5006b, however in another embodiment the elongate members 4512a-c may comprise other parts of the floater 3000. In this example, each elongate member 4512a-c may be connected to an elongate member of another preassembled part 4501a-c such that the elongate members 4512a-c are arranged in a triangular configuration. To do so a connection may be established between the elongate members, for example, by welding pairs of the elongated members 4512a-c, for example such that each of the pre-assembled parts 4501a-c is connected to each other of the pre-assembled parts 4501a-c.

In some examples, there may be more than three pre-assembled parts 4501a-c and/or the pre-assembled parts

4501*a-c* may have a different shape to that illustrated. In other examples the pre-assembled parts 4501*a-c* may also all have a different shape. For example, in place of the elongate members 4512*a-c* as in the depicted embodiment, there may be a truss member (such as that shown in FIG. 15*g*) which comprises a further connection to the column member of each of the pre-assembled parts. In a further example, the pre-assembled parts 4501*a-c* may be missing any form of elongate member 4512*a-c*, which may instead be connected to the pre-assembled parts 4501*a-c* at a later time (e.g. once the pre-assembled part is at a desired location, for storage or for construction). Further, there may be more than three pre-assembled parts 4501*a-c*. In such examples, not all the pre-assembled parts may be connected to each other, and/or the pre-assembled parts 4501*a-c* may be connected in a different shape, such as a square or rhombus shape, or a pentagonal shape. The aspect describes the method with respect to the depicted embodiment, but any other embodiment with at least one welding connection below sea level may also profit from this method.

Figure 28:
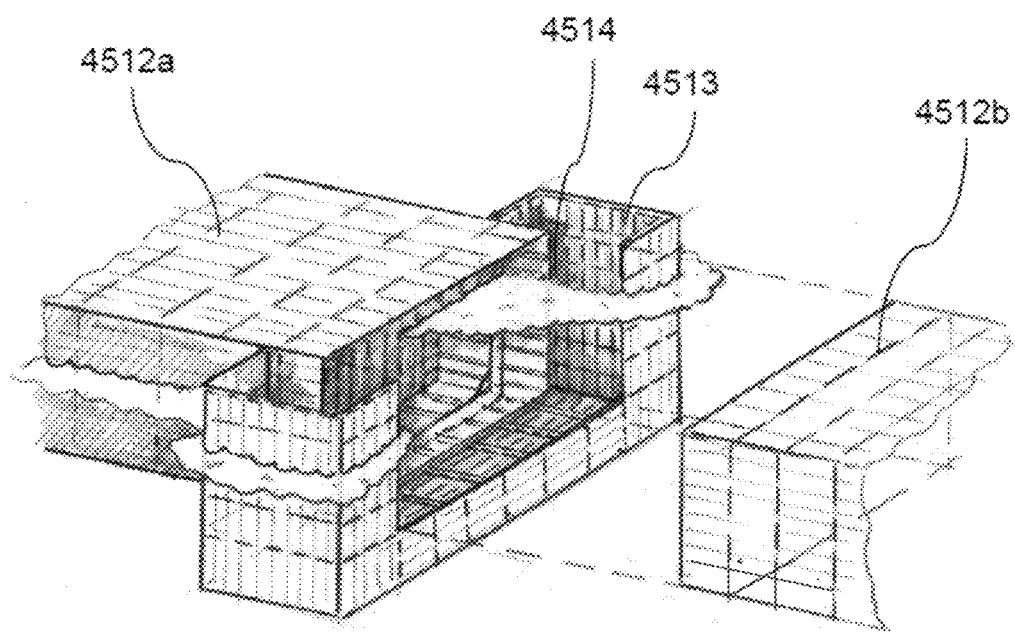
FIG. 28 illustrates a method to weld two parts of a floater on water.

When bringing two elongate members 4512*a-b* of the pre-assembled parts 4501*a-b* side by side for connection (e.g. welding), an enclosure 4513 may be introduced adjacent the connection site 4514, as depicted in FIG. 28. The enclosure 4513 may prevent water from reaching the connection site 4514 (for example by permitting water to be removed, e.g. pumped, from the connection site 4514), and therefore facilitate connection of the elongate members 4512*a-b* by permitting connection without the relevant parts being underwater (e.g. in a dry environment). While preventing water from reaching the connection site 4514, the enclosure 4513 may additionally provide a space (e.g. an air gap) between the connection site 4514 and the enclosure 4513, so as to facilitate connection e.g. by welding, clamping, chemical bonding, or the like. Having the relevant parts not being underwater may facilitate welding of the elongate members 4512*a-b*. While the connection site 4514 may not be submerged in water, it may still be located below the surrounding water level (e.g. the sea level).

The enclosure 4513 may also prove beneficial as it may assist in the handling of the elongate members 4512*a-b*, e.g. by holding them in place for connection (e.g. welding). The enclosure 4513 surrounds the base of the elongate members 4512*a-b* and may extend at least to sea level and be sealed with respect to the elongated members 4512*a-b* to prevent water leakage towards the connection site 4514. This may be achieved by providing seals (e.g. static seals) between the enclosure 4513 and elongate members 4512*a-b* on either side of the connection site 4514. The static seals may be in the form of rubber seals. Alternatively the static seals may be formed by other means, such as by forming a weld between the enclosure 4513 and at least one elongate member 4512*a-b*, or by any other appropriate means.

If water is present in the enclosure 4513 after having positioned the elongate members together, this can be pumped out prior to connection work starting.

After connecting the first two elongate members 4512*a-b*, the third pre-assembled part 4501*c* may then be connected. These connections may be welded connections.

Figure 29:
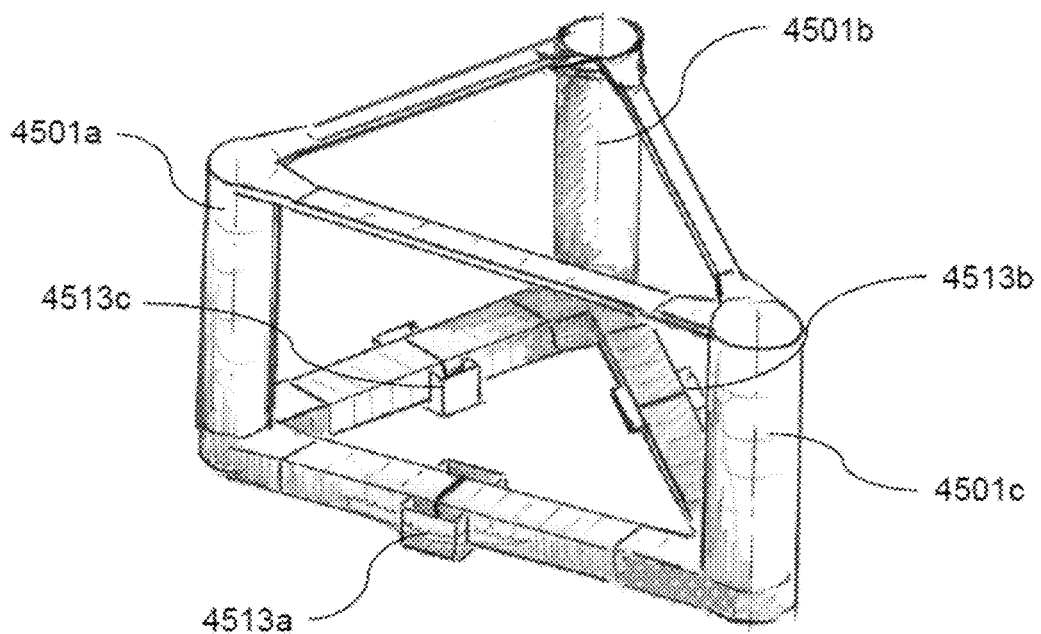
FIG. 29 illustrates assembly of a floater using the method illustrated in FIG. 28.

FIG. 29 depicts the constructed floater 3000 comprising the pre-assembled parts 4501*a-c*. The upper connections between the pre-assembled parts 4501*a-c* are above sea level and may be welded without the requirement of an enclosure 4513 (e.g. they may be dry welded). The lower connections may be welded with support of the enclosures 4513*a-c*, wherein the enclosures 4513*a-c* may be detachable. In some embodiments, including the depicted embodiment, the enclosures 4513*a-c* are mounted and stay with the floater 3000. While, in FIG. 29, the enclosures 4513*a-c* are shown located equidistant from each of the columns of the pre-assembled parts 4501*a-c*, the skilled reader will appreciate that other locations of the enclosures 4513*a-c* may be possible, and may be dependent on the location of the connection sites 4514.

According to these aspects, there are provided the following numbered clauses, each of which making up inventive aspects provided by the present disclosure:

Clause C1. A method for the connection of two pre-assembled parts (4501*a-b*) of a floater (3000) for a floatable wind energy power plant (4000), the method comprising:
providing a first and a second pre-assembled part (4501*a-b*) in an offshore location, the first and second pre-assembled parts (4501*a-b*) comprising a first and second connection arrangement, respectively, for connection thereof;
arranging the first and second connection arrangements of the first pre-assembled part (4501*a*) proximate to the connection arrangement of the second pre-assembled part (4501*b*) to form a connection site (4514) comprising at least a part of the first and second connection arrangements;
sealingly arranging an enclosure (4513) about the connecting site (4514), the enclosure (4513) being sealed against ingress of water therein;
connecting the first and second pre-assembled parts (4501*a-b*) at the connection site (4514).

Clause C2. A method according to clause C1, wherein connecting the first and second pre-assembled parts (4501*a-b*) comprises welding.

Clause C3. A method according to clause C2 or C3, wherein the enclosure (4513) is a cofferdam.

Clause C4. A method according to any of clauses C1 to C3, wherein the enclosure (4513) is detachable from the first and second pre-assembled parts (4501*a-b*).

Clause C5. A method according to any of clauses C1 to C4, comprising removing a liquid from the enclosure (4513) prior to connection of the first and second pre-assembled parts (4501*a-b*).

Clause C6. A method according to any of clauses C1 to C5, comprising providing an air gap between the enclosure (4513) and the connection site (4514).

Clause C7. A method according to clause C6, wherein there is no contact between the enclosure (4513) and the connection site (4514).

Clause C8. A method according to any of clauses C1 to C7, comprising connecting a third pre-assembled part (4501*c*) to at least one of the first and second pre-assembled parts (4501*a-b*).

Clause C9. A method according to any of clauses C1 to C8, comprising connecting a third pre-assembled part (4501*c*) to both the first and second pre-assembled parts (4501*a-b*).

Clause C10. A method according to clause C8 or C9, comprising connecting each of the first, second and third pre-assembled parts (4501*a-c*) to each other of the first, second and third pre-assembled parts (4501*a-c*).

Offshore wind power installations provide an opportunity to deploy wind power plants, although the construction of such plants may be complex. It is further desirable for the construction of these offshore wind power plants to be as cost efficient as possible. In further aspects, advantageous methods for the construction of a floater for a floating wind power plant are provided. According to these methods, more efficient production of floaters and/or complete wind turbine power plants can be enabled/realised.

Figure 30:
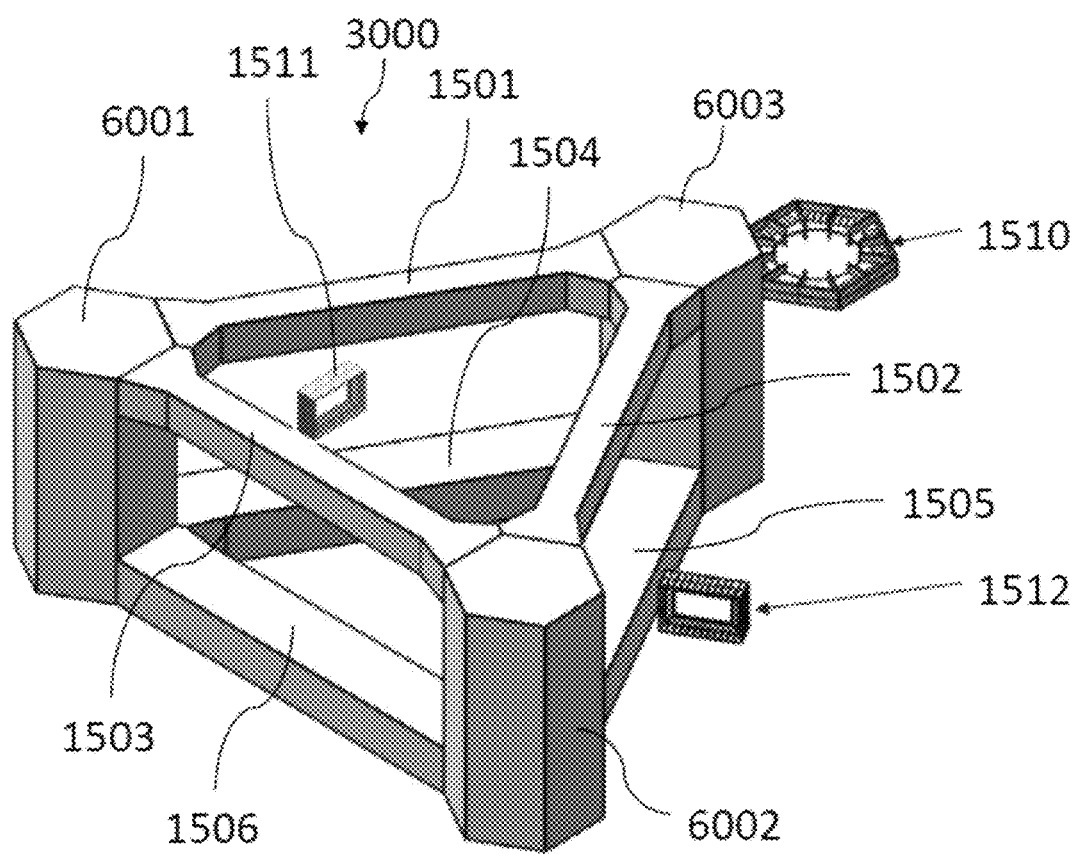
FIG. 30 illustrates a floater showing various structural sections.

FIG. 30 illustrates a floater 3000 for a floating wind power plant 4000, which may be similar to those described in relation to another aspect or aspects. For clarity, sections 1510, 1511 and 1512 have been shown, which illustrate a section of the internal structure of the adjacent part. The floater comprises three columns 6001-6003 (e.g. vertical support columns) and connection members 1501-1506, wherein every column 6001-6003 is connected to each other column 6001-6003 by one or more connection members 1501-1506. The embodiment shown in FIG. 30 has three connection members 1501-1503 on the upper parts of the columns 6001-6003 and three connection members 1504-1506 on the lower parts of the columns 6001-6003, wherein the lower connection members 1504-1506 in this case are buoyant pontoons, while the upper connection members 1501-1503 may be, for example, struts or beams, and may experience forces such as tensional, compressive, torsional, or the like. In the shown embodiment the connection members 1501-1506 are similar to those shown in FIGS. 3-5c, namely the connection members 1004-1006 for the lower and truss structures 1007 for the upper connection members. The connectors 1009 between truss structures 1007 and columns 2001-2003 are included in the upper connection members 1504-1506 as the person skilled in the art will be able to apply the provided aspect for manufacturing of the connectors 1009 as well. In this case shown in FIG. 30, no diagonal beams or struts are provided as are shown, for example, in FIGS. 15i-j. However, the skilled person would understand, based on the prior description, that such diagonal beams or struts could be incorporated into the embodiment of FIG. 30.

The columns 6001-6003 may be constructed out of one or more column sections 1510 and the connection members 1501-1506 may be constructed out of one or more connection member sections 1511, 1512. As shown, each column 6001-6003 is constructed from a plurality of connected column sections 1510, at least two or all of the column sections 1510 may be identical. Similarly, each connection member is constructed from a plurality of connected connection member sections 1511, 1512, at least two or all of which may be identical. By having identical, or substantially identical, sections 1510, 1511, 1512 the manufacturing process may be quicker and/or cheaper.

Figure 31:
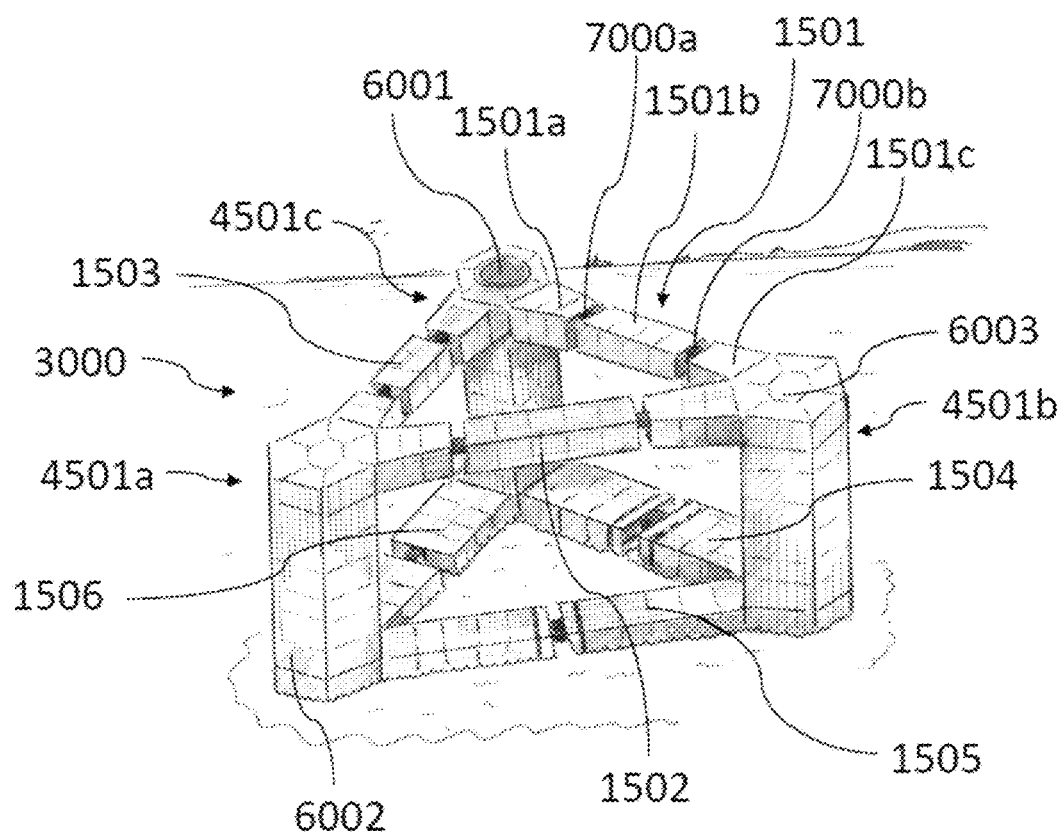
FIG. 31 illustrates a further embodiment of a floater.

FIG. 31 illustrates an embodiment of a floater 3000 constructed in the aforementioned manner. In accordance with the numbering of FIG. 31 and with respect to FIG. 25, the floater 3000 is built with a "flat plate geometry" and comprises three columns 6001-6003 and connection members 1501-1506. In this embodiment the connection member 1501 is constructed with several parts 1501a, 1501b,1501c connected by connectors 7000a-b, wherein the connection may be maintained by any mechanical means, such as those described herein. The connection members 1502-1506 consist of several respective parts. Wherein this aspect rather aims at the construction of the single parts, the previously mentioned assembly of said pre-assembled parts 4501a-c as in FIG. 25 also is applicable. According to the numbering in FIG. 25 the pre-assembled part 4501c comprises column 6001, upper connection members 1501a, 1503a as well as lower connection members 1504a and 1506a. The skilled person will see the possibility of applying both methods to a variety of embodiments, which may facilitate the construction of the floater 3000.

Each section 1510-1512 in the described embodiments has a flat plate geometry and these sections may preferably be constructed with a similar method. For example, each of the lower/upper connection members may be constructed using the same method, and according to the same design, while each column 6001-6003 may be constructed using the same method and according to the same design. This may facilitate efficient construction of the different parts.

The elongate structural parts and their method of construction may be used to construct at least part of, or all of, the floater 3000. For example, the columns 6001-6003, lower connection members 1504-1506 and the upper connection members 1501-1503, may be constructed according to the methods described here. For example, only the columns 6001-6003 may be constructed with these methods, and the connection members 1501-1506 be provided as beams or other ready-made units. As another example, only the columns 6001-6003 and the lower connection members 1504-1506 can be constructed with these methods, while the upper connection members 1501-1503 are provided as beams or other ready-made units which are fixed between the upper part of the columns 6001-6003.

The shapes of the columns 6001-6003 and the connection members 1501-1506 are not limited by this method, as any polyhedral shape (e.g. triangular, rectangular or hexagonal) may be created by connecting flat plate structures. Also, any or all of connection members 1501-1506 or columns 6001-6003 of the floater 3000 may be constructed with this method. In one example, the upper connection members 1501-1503 may be constructed by a different method and/or have a different shape, for example a beam that may have a circular cross-section. The various connection members 1501-1506 may also have a different shape, as other polyhedral structures may also be suitable, for example a pentagonal cross-section. The same holds true for the various columns 6001-6003, which are not necessarily limited to a structure with a six-sided polygonal cross-section.

The methods may be used to construct the entire floater 3000 or individual parts thereof. FIG. 31 illustrates the floater 3000 being made up of several parts, including three pre-assembled parts 4501a-c, comprising columns 6001-6003, which are connected by connectors 7000a,b (illustrated only in relation to some of the connections but as can be seen from the figure there are connectors arranged between several further structural parts). Optionally, the floater 3000 may be constructed with welded connections between all parts, i.e. not using connectors 7000a,b. This may for example be done by providing the structural parts, e.g. pre-assembled parts 4501a-c and connection member parts 1501b,1502b,1503c with respect to the depicted embodiment, manufactured according to the methods described here and connecting (e.g. welding, bonding, clamping, etc.) these together, or by manufacturing the entire floater 3000 according to the methods described here without intermediate structural parts manufactured separately.

Figure 32:
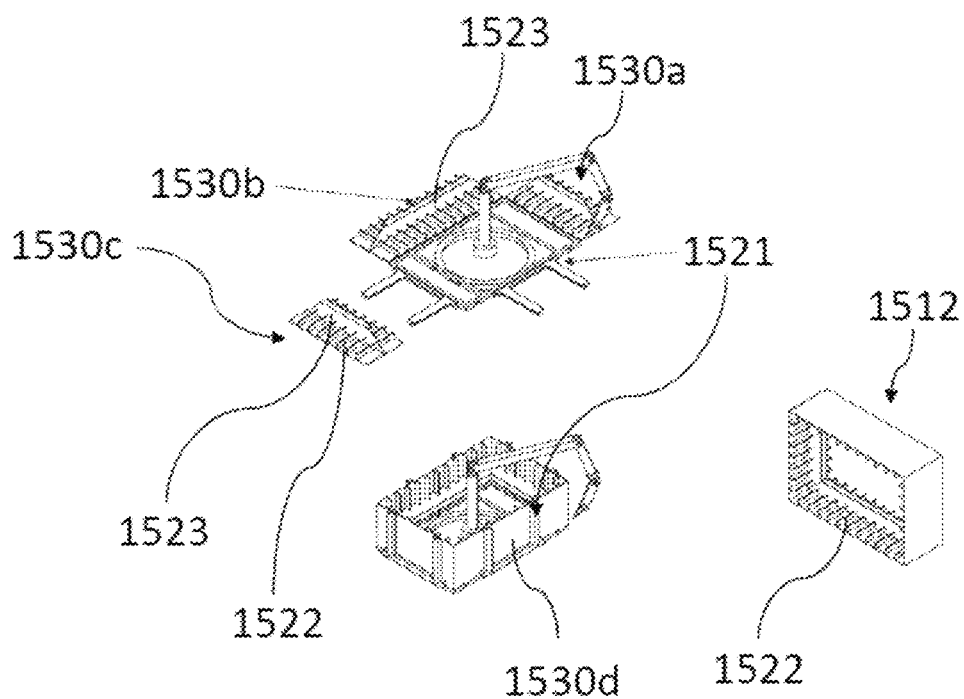
FIG. 32 illustrates the construction of a structural section for a floater.

In FIG. 32 the assembly of a lower connection member section 1512 is illustrated. Multiple flat plate panels 1530a-d, e.g. steel plates, are connected to form a lower connection member section 1512. In one example the panels 1530a-d are welded together, advantageously this may be achieved by placing them on a jig 1521 which may be arranged in the desired shape of the completed lower connection member section 1512. The panels 1530a-d may then be connected, e.g. welded, bonded, or the like, together. Optionally, the connection may be established with bolts, screws or by any other mechanical means. Although not shown, the method may comprise forming all or part of a connection member or connection arrangement on at least one, or all, panels 1530*a-d*, which may assist, for example, in connecting one panel (or one pontoon section 1512) to another. The connection arrangement may be in the form of a hole or bore in a panel, or a profiled section configured to fit into a corresponding profiled section on an adjacent connection arrangement.

The flat plate panels 1530*a-d* may have stiffness/reinforcement elements 1522 and joint plates 1523 arranged thereon for mechanical and structural purposes. These may advantageously improve the stiffness of the flat plate panels 1530*a-d* and/or may increase the welding cross section of the connections and therefore may improve the stability of the floater 3000. In some cases, however, the stiffness elements 1522 or joint plates 1523 may not be necessary if the structural properties are such as not to require them. As will be clear to the skilled person, the described methods may also be applied to the construction of an upper connection member section 1511 or a column section 1510.

Figure 33A:
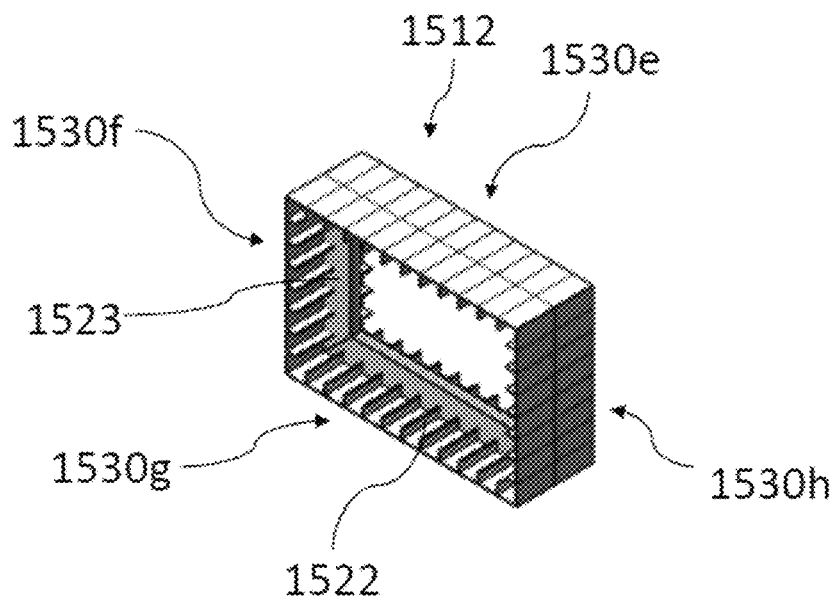
FIGS. 33*a* and 33*b* are cross-sectional views of structural sections for a floater.
Figure 33B:
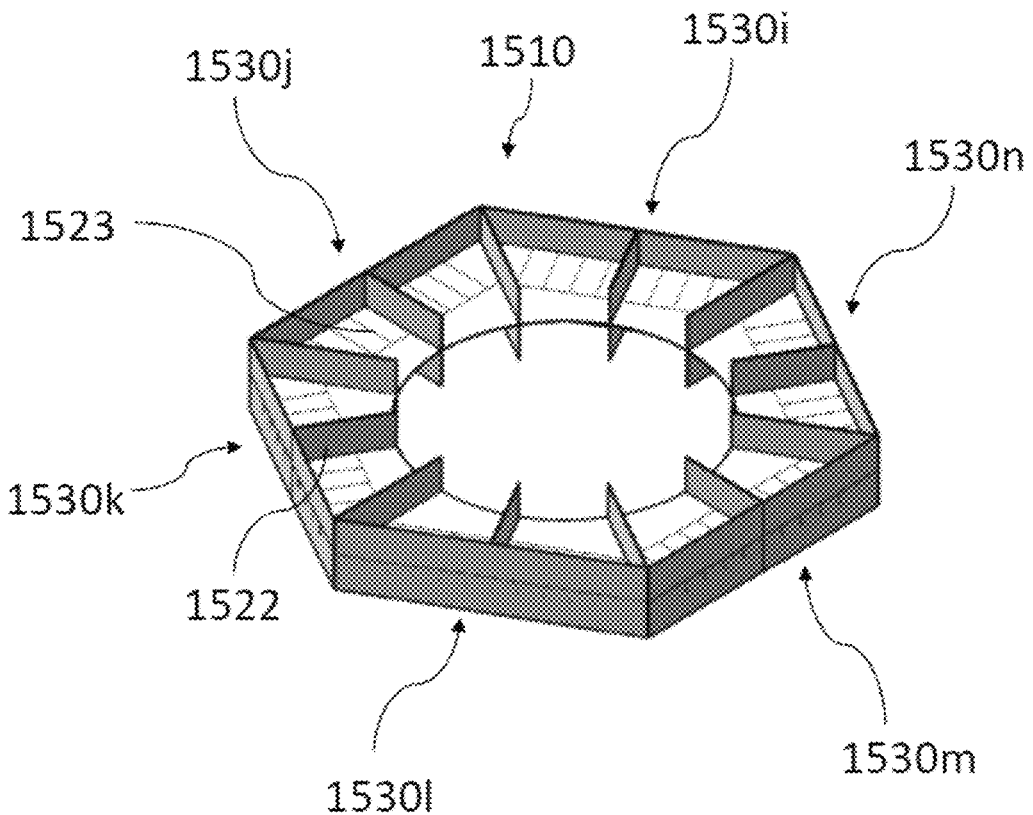

In FIG. 33*a* an upper connection member section 1512 as previously shown in FIG. 32 is shown in more detail. In FIG. 33*b*, a column section 1510 is illustrated, as also shown in FIG. 32.

Illustrated in FIG. 33*a*, an upper connection member section 1511 is created from multiple flat plate panels 1530*e-h*. The cross-sectional shape of the upper connection member section 1511 may vary and the number and/or shape of the flat plate panels 1530*a-f* may differ. In this embodiment the upper connection member section 1511 has a rectangular cross-section and therefore consists of four flat plate panels 1530*e-h*, and each flat plate panel 1530*e-h* is a rectangular plate. Similarly as for the lower connection member section shown in FIG. 32, the upper connection section 1511 may comprise stiffening elements 1522 and joint plates 1523 and may be constructed using a jig 1521.

Illustrated in FIG. 33*b*, the column section 1510 is created from multiple flat plate panels 1530*i-n*. The cross-sectional shape of the column section 1510 may vary and the number and/or shape of the flat plate panels 1530*i-n* may differ. In this embodiment the column section 1510 has a hexagonal shape and therefore consists of six flat plate panels 1530*i-n*, and each flat plate panel 1530*i-n* is a rectangular plate. Similarly as for the lower connection member section shown in FIG. 32, the column section 1510 may comprise stiffening elements 1522 and joint plates 1523 and may be constructed using a jig 1521.

As will be clear from the figures, in any of the embodiments described here, e.g. in the embodiments described in relation to previous figures such as FIGS. 3*a*-6*b* and those described in relation to FIGS. 30-35, the flat plate panels may have stiffening elements 1522, stiffening joint plates 1523, or both of these. The stiffening elements 1522 may be arranged on an inside surface of the section 1510, 1511, 1512, and may be arranged perpendicularly on the plates 1530*a-f*. The stiffening joint plates 1523 may be arranged on an inside surface of the section 1510, 1511, 1512, and may be arranged perpendicularly on the plates 1530*a-f*. If both stiffening elements 1522 and stiffening joint plates 1523 are used, the stiffening elements 1522 may advantageously be arranged perpendicularly to the stiffening joint plates 1523.

The connection member sections 1511-1512 may be created according to the same specifications and principles as the column sections 1510. As illustrated in FIGS. 32-33*a*, they may consist of multiple flat plate panels 1530*a-d* and may comprise stiffness elements 1522 and/or joint plates 1523. The shape and arrangement of stiffness elements 1522 and joint plates 1523 of any section 1510-1512 are not limited to the depicted embodiments of a rectangular cross-section and/or a hexagonal cross-section, and other shapes or arrangement of stiffening elements 1522 and joint plates 1523 may be applied, such as patterned, sector-wise, or angled placement of the stiffness elements 1522 or joint plates 1523, or application of stiffness elements 1522 or joint plates 1523 only on parts of the inner surface of the sections 1510-1512. Furthermore, the sections 1510-1512 may have any polyhedral cross section.

Figure 34:
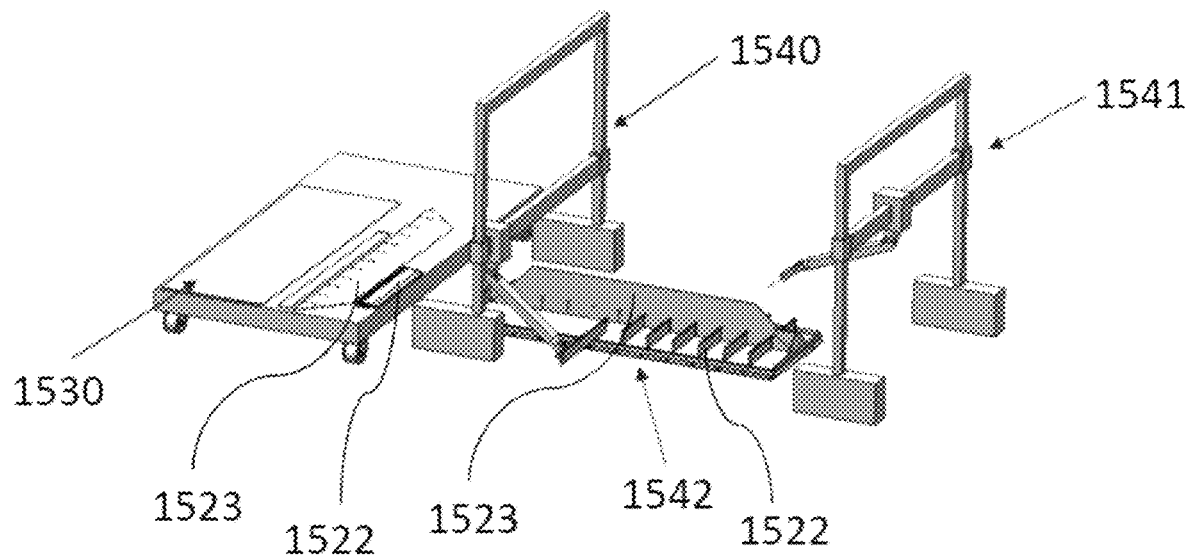
FIGS. 34 and 35 illustrate steps in the construction of a floater.

FIG. 34 shows an apparatus for construction of flat plate panels 1530 used for construction of the sections 1510-1512. A flat plate panel 1530 is supplied or cut from sheet metal and preferably the stiffness elements 1522 and joint plates 1523 (if applied) are connected by welding or chemical bonding to the flat plate panels 1530. This may be done by means of a handling robot 1540 to align the different parts for welding, which can be done by a welding robot 1541, as well as an assembly jig 1542. Optionally, one or more of these steps may be carried out manually, e.g. manually positioning the parts and/or manually welding one or more of the welds.

Figure 35:
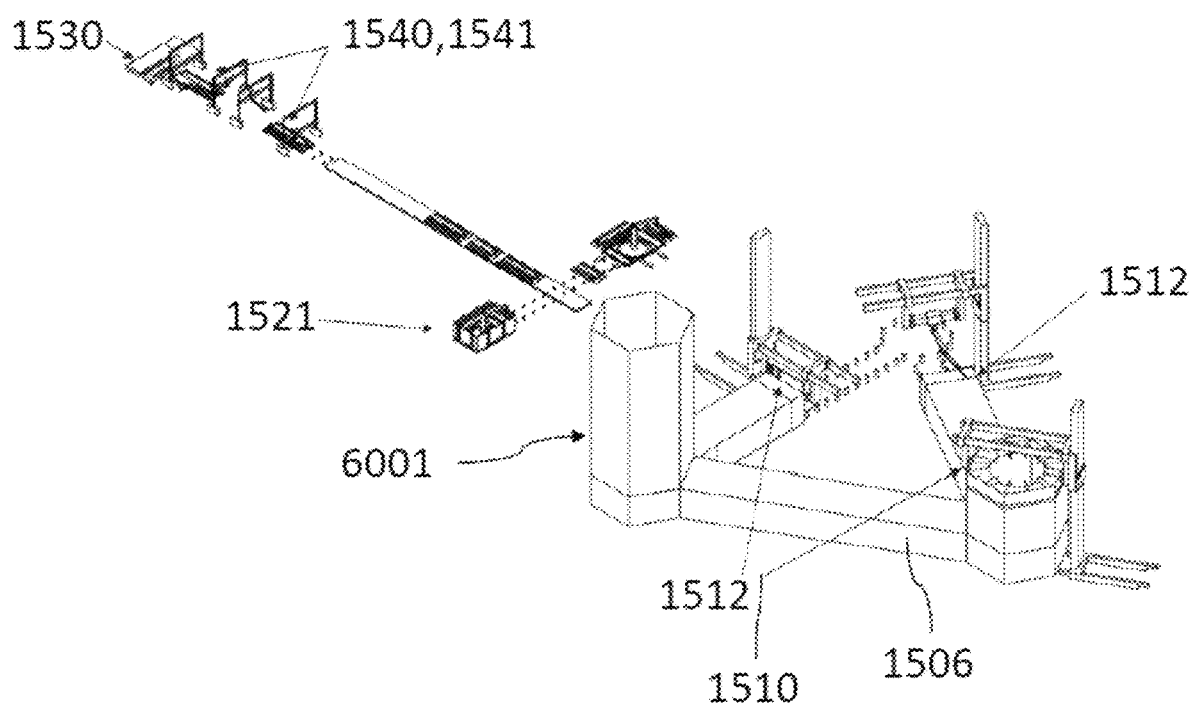

FIG. 35 illustrates a method from parts cut from bed to the assembly of the floater. On the top left the flat plate panels 1530 are constructed, as shown in FIG. 34, consecutively the flat plate panels 1530 are assembled to sections 1510-1512 as shown in FIG. 32, here shown in the middle of FIG. 35.

Finally, shown on the bottom right of FIG. 35, the sections 1510-1512 are assembled and welded to form the floater. Advantageously, the floater is made up of a plurality of sections 1510-1512 having the same shape and form, however, some of the sections 1510-1512 may have different shapes or vary in number to form a floater 3000. In this embodiment the floater is constructed in its entirety from the sections, i.e. without constructing pre-assembled parts 4501*a-c* individually, which may be assembled with connectors (see FIG. 31, for example), however alternatively the method may be used to construct column parts 6001-6003 (see FIG. 31) and/or connection members 1501-1506 individually, and thereafter these may be connected or welded together. As will be appreciated, there may also be other, further structural parts required to form the floater 3000, e.g. an interface for connecting the wind turbine tower, mooring line connectors, or other elements. These may be provided on the floater during the construction method illustrated, or afterwards.

As can be seen from FIG. 35, the construction of the floater can therefore be carried out by adding sections sequentially and adding new sections to the construction. This may be done for the columns 6001-6003, by adding sections 1510, and/or for the lower connection members 1504-1506, by adding sections 1512. The method may also be used for the upper connection members 1501-1503 if desirable.

Advantageously, the step of adding a new section 1510-1512 to the structure may include welding panels 1530 of the section to be added to corresponding panels 1530 of a section previously added. This may also include a step of welding stiffness elements 1522 and/or joint plates 1523 of a section to be added to stiffness elements 1522 and/or joint plates 1523 of a section previously added.

Using a "flat plate geometry" and methods as disclosed here may provide more efficient production of floaters for offshore wind power plants, and/or a structurally more beneficial design.

Accordingly, there are provided the following numbered clauses, each of which making up inventive aspects provided by the present disclosure:

Clause D1. A method of constructing elongate sections (6001-6003,1501-1506) for a floater (3000) of a floatable wind power plant (4000), the method comprising:

a. assembling a plurality of flat plate panels (1530*a-n*) into polyhedral sections (1510,1511,1512), and b. successively interconnecting the polyhedral sections (1510,1511,1512) to form the elongate sections (6001-6003,1501-1506).

Clause D2. The method according to clause D1, comprising assembling a floater (3000) of a floatable wind power plant comprising one elongate section (6001-6003, 1501-1506).

Clause D3. The method according to clauses D1 or D2, comprising:

constructing three pre-assembled parts (4501*a-c*) for the floater (3000), each pre-assembled part comprising at least one of the elongate sections; and assembling the floater (3000) by interconnecting the three pre-assembled parts (4501*a-c*) at at least two connection sites between each of the three pre-assembled parts.

Clause D4. The method according to clause D3, comprising providing a connector at each of the at least two connection sites.

Clause D5. The method according to clause D4, wherein the connector comprises a first connection element attached to a first of the three pre-assembled parts (4501*a-c*) and a second connection element attached to a second of the three pre-assembled parts (4501*a-c*).

Clause D6. The method according to clause D5, wherein the first connection element comprises a protruding part (7001) and the second connection element (7004) comprises a receiver part (7003), with a fixing element (7006) therebetween to interlock the first and second elements.

Clause D7. The method according to clause D3, wherein the step of assembling the floater comprises interconnecting the three pre-assembled parts by means of welding.

Clause D8. The method according to any of clauses D1 to D7, comprising assembling a floater (3000) of a floatable wind power plant comprising one elongate section (6001-6003, 1501-1506) as a vertical support column.

Clause D9. The method according to any of clauses D1 to D8, comprising assembling a floater (3000) of a floatable wind power plant having at least two vertical support columns (6001-6003), and comprising an elongate section (6001-6003,1501-1506) forming a connection member between the vertical support columns.

Clause D10. The method according to clause D9, wherein the connection member is oriented perpendicular relative to at least one of the at least two vertical support columns (6001-6003).

Clause D11. The method according to clause D9, wherein the connection member is oriented obliquely relative to at least one of the at least two vertical support columns (6001-6003).

Clause D12. The method according to any of clauses D9-D11, comprising at least two connection members, at least one of the at least two connection members being oriented perpendicularly, and at least one of the at least one of the at least two connection members being oriented obliquely, relative to at least one of the vertical support columns (6001-6003).

Clause D13. The method according to any of clauses D1-D12, comprising successively interconnecting the polyhedral sections (1510,1511,1512) by welding.

Clause D14. The method according to any of clauses D1-D13, wherein the elongate sections (6001-6003,1501-1506) define pontoon connection members (1504-1506).

Clause D15. The method according to any of D1-D14, wherein at least one of the flat plate panels (1530*a-n*) is reinforced with stiffening elements and/or joint plates (1522, 1523) provided at an inward-facing surface of the polyhedral sections (1510,1511,1512).

Clause D16. The method according to D15, wherein at least two of the flat plate panels (1530*a-n*) are reinforced with stiffening elements and/or joint plates (1522,1523) provided at an inward-facing surface of the polyhedral sections (1510,1511,1512), and the step of successively interconnecting the polyhedral sections (1510,1511,1512) comprises interconnecting the stiffening elements (1522, 1523) of the at least two flat plate panels (1530*a-n*) by welding.

When connecting multiple polyhedral structures, for example polyhedral structures as described in embodiments herein, there may arise problems connecting the ends of those structures. For example, slight differences in the dimensions of each structure may result in misalignment of a welding surface or surfaces. This may make welding of misaligned sections of a welding surface difficult, or in some cases may prevent welding completely. One way to mitigate against these problems is to provide such polyhedral structures with stiffness/reinforcement elements. Stiffness/reinforcement elements, or a part or parts thereof, may be located at a weld surface and may provide a larger welding surface which, in turn, may reduce the significance of misaligned sections of the welding surface. This may therefore positively increase the overall stability of the welding connection between the structures. This aspect provides a solution to the problem of the misalignment of welding surfaces when connecting multiple polyhedral structures, for example by providing a larger welding surface. In turn, this may increase the stability of the floater, and may additionally or alternatively increase the production tolerances required of such polyhedral structures, for example of pre-assembled polyhedral structures.

Figure 36:
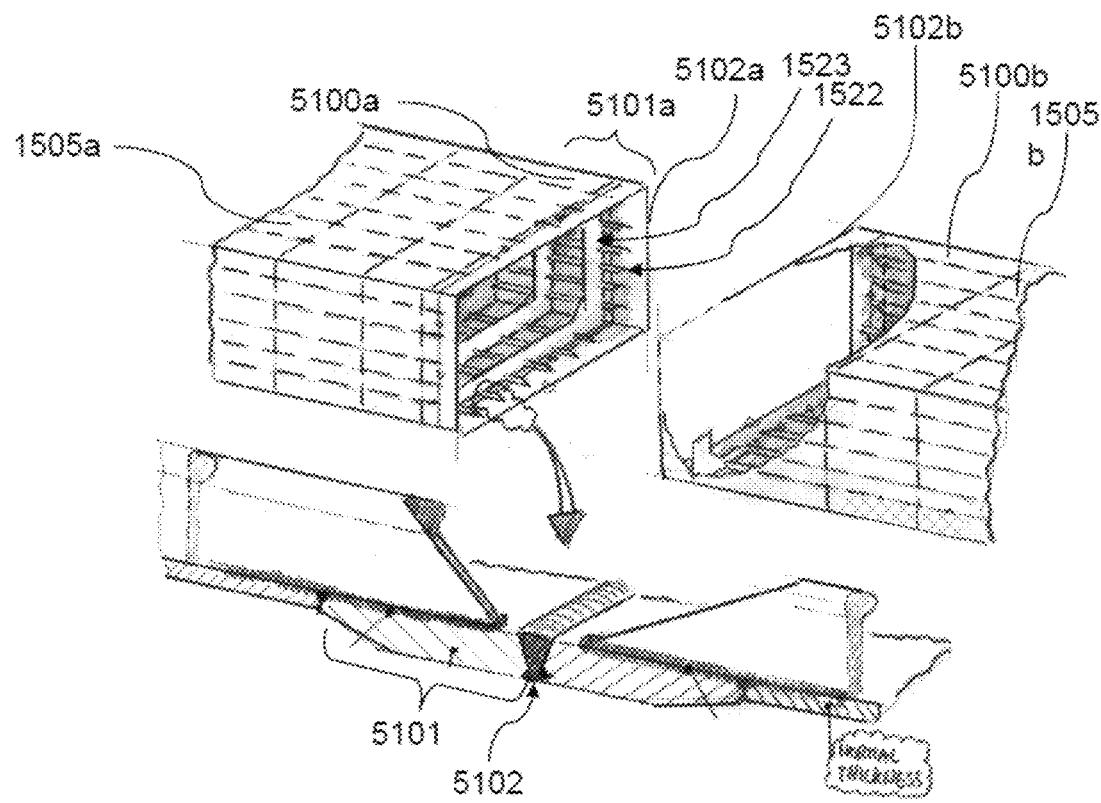
FIG. 36 illustrates connection of two parts of a floater.

The upper image in FIG. 36 shows multiple polyhedral structures 5100*a-b*, which may for example be two lower connection members 1505*a* and 1505*b* with respect to FIG. 31, wherein these shall be welded together rather than using a connector 7000. The skilled person will find the provided aspect to be applicable to various embodiments of two polyhedral structures, which shall be welded together, e.g. upper connection members or multiple column sections and also possibly in combination with other aspects, e.g. welding with a cofferdam. The polyhedral structure 5100*a* has an end section 5101*a* and an end surface 5102*a*. The polyhedral structure 5100*b* has a corresponding end section 5101*b* (not indicated) and a corresponding end surface 5102*b*. Advantageously the polyhedral structures 5100*a-b* are reinforced with stiffness/reinforcement elements 1522 as already shown in various figures and aspects. Also advantageously the polyhedral structures 5100*a-b* comprise joint plates 1523.

When welding these polyhedral structures 5100*a-b*, there may arise problems, for example as a result of the production tolerances of the dimensions of the end sections 5101 being insufficiently tight, or the stiffness/reinforcement elements 1522,1523 being elongated towards the end surface 5102*a-b*, which thus may hinder placing the end surfaces 5102 in direct contact as is required for welding.

The lower picture shows a close up of welding the end surfaces of both polyhedral structures 5100*a-b* together. As depicted, the stiffness/reinforcement elements 1522 are elongated in the end section 5101, but are not extended towards the end surface 5102. This may prevent the stiffness/reinforcement elements 1522 from hindering the welding process. However, this particular configuration may also reduce the welding cross section, as the stiffness/reinforcement elements 1522 of the various polyhedral structures 5100*a-b* therefore no longer form part of the welding surface.

To overcome the loss of welding surface area and plate stiffness characteristics, the welding cross section may be enlarged by other means. As is shown in the lower picture of FIG. 36, the thickness of the flat plate geometry of the polyhedral structures 5100*a-b* increases towards the end section 5101. In this example, the thicker end section 5101 is provided by attaching (e.g. by welding) a plate of increased thickness onto the flat plate forming the flat plate geometry of the end section 1501, which may be referred to as a connection member, as this connection member enables connection of one plate to another. However, multiple such thickness increasing plates may be added to multiple sections 1510,1511,1512 that are forming the polyhedral structures 5100*a-b*. The skilled reader will appreciate that other means of affixing such a thickened plate are possible (e.g. by chemical bonding) or that a construction of a section 1510, 1511,1512 with thickened plates, preferably similar to the construction by flat plate geometry, may also be possible. The thickened walls of the end section 5101 may yield a larger surface area for the end surface 5102 and therefore a larger welding area, which may improve the stability of the connection.

Advantageously, according to the methods described in the aspect, the floaters for a floatable wind power plant may be produced faster and in a more cost efficient manner. The flat plate geometry may therefore enable both fast and cost efficient production, while the stiffening/reinforcement elements and joint plates may improve the overall stability and the presented aspect E may facilitate the welding of multiple flat plate sections as well as increase the stability of the constructed floater. Individually, any of the described aspects may benefit the construction of the floater as described in this aspect. Further, when combined, the combination of described features may interact to produce synergistic effects.

According to these aspects, there are provided the following numbered clauses, each of which making up inventive aspects provided by the present disclosure:

Clause E1. A method for connecting a first structure (5100*a*) and a second structure (5100*b*), comprising:
  providing a first connection surface (5102*a*) of the first connection structure (5100*a*), and a second connection surface (5102*b*) on the second connection structure (5100*b*);
  attaching a connection member to the first connection structure (5100*a*), and a corresponding connection member to the second connection structure (5100*b*), so as to increase the area of the first connection surface (5102*a*) and the second connection surface (5102*b*);
  connecting at least a part of the first connection surface (5102*a*) to the second connection surface (5102*b*).

Clause E2. A method according to clause E1, wherein connecting the first structure (5100*a*) and the second structure (5100*b*) comprises welding.

Clause E3. A method according to clause E1 or E2, wherein the first and second connection structures (5100*a,b*) comprise a plate attached to the first and second structures (5100*a,b*), the plate having a greater thickness than the respective connected first or second structure.

Clause E4. A method according to clauses E1 or E2, wherein the first and second connection structures (5100*a,b*) each comprise at least one stiffening element (1522,1523).

Clause E5. A method according to clause E4 wherein one of the at least one stiffening element (1522,1523) is in the form of an elongate rod, and is arranged perpendicular to a plane of the first and/or second connection structure, such that one extremity of the stiffening member (1522,1523) forms part of the first and/or second connection surface.

Clause E6. A method according to clauses E4 or E5, wherein one of the at least one stiffening elements (1522, 1523) is in the form of an elongate rod, and is arranged parallel to a plane of the welding surface, such that one lateral side of the one of the at least one stiffening elements (1522,1523) forms part of the welding surface.

Clause E7. A method according to any of clauses E1-E6, wherein the first structure (5100*a*) and the second structure (5100*b*) are part of lower connection members 1505*a* and 1505*b* arranged between two columns of a floater 3000 for a wind turbine power plant 4000.

It may be necessary to transport a floater, or parts thereof (e.g. partially constructed parts thereof) to a desired location for assembly. In one described aspect, a method to transport and construct a floater 3000 for a wind turbine power plant 4000 is disclosed. The handling and transport of large structures can in many cases be difficult, as these structures can be unwieldy. Towing of large, floating structures such as semi-submersible platforms, are usually very time-consuming and expensive if transport over large distances is required. One approach is to move or transport these on the deck of a transport vessel, however this in many cases requires large volume capacity or specialised vessels for large scale structures.

Figure 37:
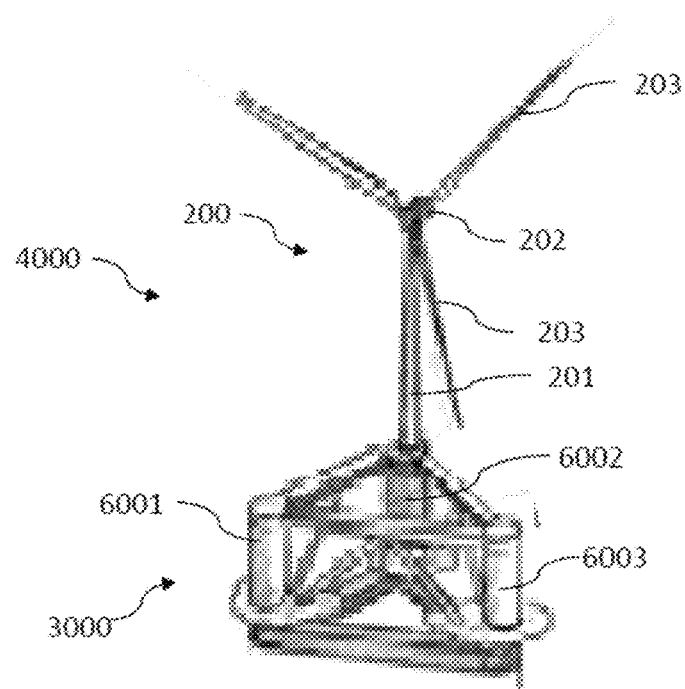
FIG. 37 illustrates an assembled floating wind power plant.

FIG. 37 shows a fully constructed floatable wind power plant 4000 comprising a floater 100 and a wind turbine 200. (See also FIGS. 1*a,b*.) The wind turbine 200 can be of a conventional design (see, for example, publications WO 2009/131826 A2 and WO 2013/110276 A1 referenced above) with a tower 201, a nacelle 202 and blades 203.

The floater 3000 comprises three columns 6001,6002, 6003. Each of the columns 6001,6002,6003 is connected to both other columns 6001,6002,6003 with one or multiple connection members. The connection members may be, for example, beam structures, pontoon members, or a combination of these.

Manufacturing and construction of the wind turbine power plant 4000 may be carried out by construction of the floater 3000 first, and then positioning and mounting the wind turbine 200 onto the floater 3000. The floater 3000 may, however, be a very large structure, for which construction facilities (such as a yard) is not available near the installation site for the power plant 4000. The floater 3000 may have to be constructed and manufactured at a site farther away from the installation site, and then transported to the installation site. Such transport can be time-consuming and expensive.

For this purpose, improvements relating to the manufacturing, construction and/or installation of the wind turbine power plant 4000 are provided.

Figure 38:
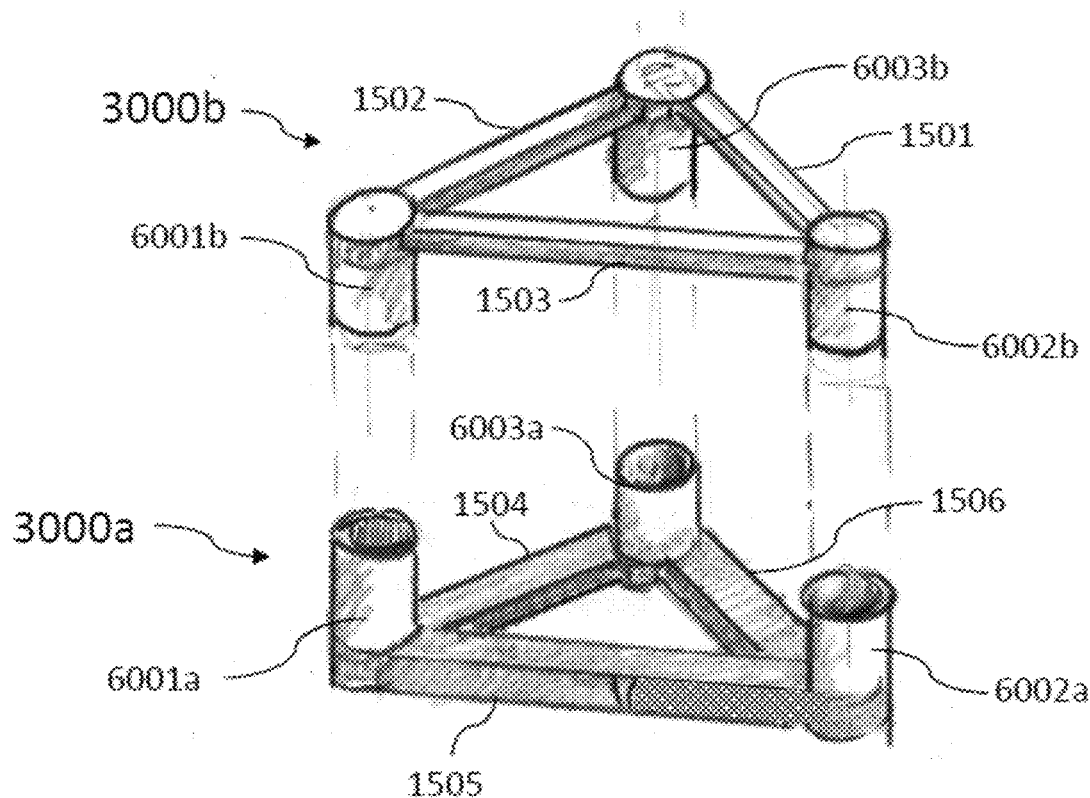
FIG. 38 illustrates an embodiment of two pre-assembled parts of a floater of a floating wind power plant.

Illustrated in FIG. 38, the floater 3000 is constructed from a lower part 3000*a* and an upper part 3000*b*. Each column 6001,6002,6003 comprises an upper column part 6001*b*, 6002*b*,6003*b* which are manufactured as part of the upper part 3000*b*, and a lower column part 6001*a*,6002*a*,6003*a* which are manufactured as part of the lower part 3000*a*. The illustrated embodiment resembles the embodiment of a floater 3000 shown in FIG. 30.

The upper column parts 6001*b*,6002*b*,6003*b* are interconnected by upper connection members 1501-1503 and the lower column parts 6001*a*,6002*a*,6003*a* are interconnected by lower connection members 1504-1506. Each upper column part 6001*b*,6002*b*,6003*b* is thus connected to both the other upper column parts 6001*b*,6002*b*,6003*b* and each lower column part 6001*a*,6002*a*,6003*a* is connected to both the other lower column parts 6001*a*,6002*a*,6003*a*.

In the embodiment illustrated in FIG. 38, the lower connection members 1504-1506 comprise pontoon members, and the upper connection members 1501-1503 comprise beams.

In FIG. 38, two parts 3000*a* and 3000*b* of the floater 3000 are shown prior to assembly. The floater 3000 can be assembled by connecting the upper column parts 6001*b*, 6002*b*,6003*b* with their respective lower counterparts 6001*a*,6002*a*,6003*a*. The connection between the upper and lower column parts may advantageously be done by welding, however other methods, such as bolted connections, may be desirable in some cases.

Figure 39:
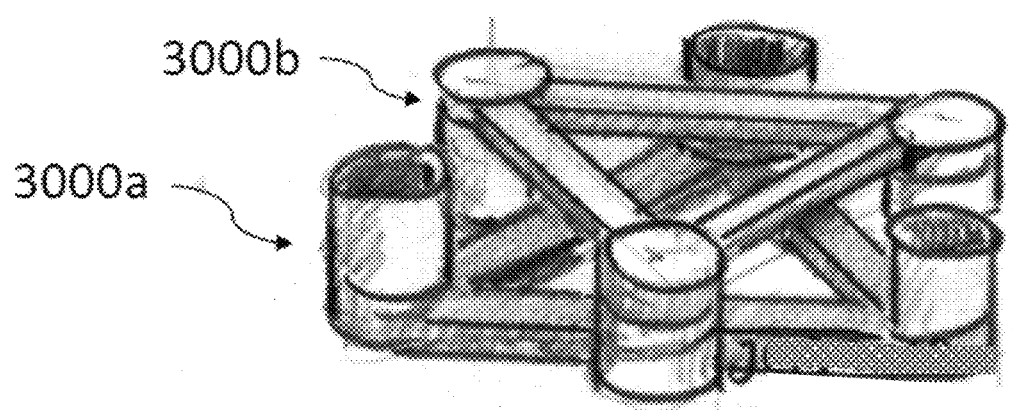
FIG. 39 illustrates an embodiment of stacking of two pre-assembled parts.

In FIG. 39, a method for stacking the two parts 3000*a*, 3000*b* of the floater 3000 for transportation or storage is illustrated. The two floater parts 3000*a*,3000*b* are arranged concentrically but angularly displaced (about their vertical axis central axis) with the upper and lower column parts arranged side-by-side and the lower connection members 1504-1506 vertically adjacent the upper connection members 1501-1503. (Depending on the height of the columns 6001,6002,6003, the upper connection members 1501-1503 may rest on the lower connection members 1504-1506 or may be spaced vertically from the lower connection members 1504-1506.) This may therefore reduce the space needed to store or transport these two floater parts 3000*a*, 3000*b*. This method may also be applied for further floater parts 3000*a*,3000*b*, which may be stacked on top of the upper floater part 3000*b* in FIG. 39 or on the side of the two floater parts 3000*a*,3000*b* in FIG. 39.

Each upper column part 6001*b*,6002*b*,6003*b* may advantageously make up between 40 and 60 percent of the total height of the respective column 6001,6002,6003. This may effectively halve the storage height required for the two parts 3000*a*,3000*b* compared to the space requirement of the assembled floater 3000. In one advantageous embodiment, more than two floater parts 3000*a*,3000*b* may be arranged concentrically and angularly displaced, e.g. by displacing each by 30°. The skilled person may find embodiments, wherein even more floater parts 3000*a*,3000*b* may be stacked according to the provided method.

A "horizontally split" assembly and method according to this aspect may reduce the storage space requirements, and when transporting the parts of floaters to an assembly facility, one might increase the number of transportable floaters per vessel or vehicle by stacking them with the mentioned method. The described method also enables transportation of multiple floaters at once and might be useful for temporarily storing floaters near the installation site. At or nearer the installation site, the two parts 3000*a,b* may be assembled, e.g. welded together, a wind turbine tower 200 may be arranged on the floater 3000 and the power plant 4000 may be installed.

According to these aspects, there are provided the following clauses, each of which making up inventive aspects provided by the present disclosure:

Clause F1. An assembly of parts (3000*a,b*) for a floater (3000) of a floatable wind power plant (4000), the assembly comprising:
a top part (3000*b*) and a bottom part (3000*a*), wherein the top part (3000*b*) comprises first, second and third upper column parts (6001*b*,6002*b*,6003*b*) interconnected by upper connection members (1501-1503) and the bottom part (3000*a*) comprises first, second and third lower column parts (6001*a*,6002*a*,6003*a*) interconnected by lower connection members (1504-1506),
wherein each first, second and third upper column parts (6001*b*,6002*b*,6003*b*) is configured for connection to the respective first, second and third lower column parts (6001*a*,6002*a*,6003*a*) to form first, second and third columns (6001,6002,6003) in an assembled state of the floater (3000).

Clause F2. An assembly of parts according to clause F1, wherein the floater parts (3000*a,b*) are configured to be stacked concentrically and angularly displaced about a vertical axis.

Clause F3. A floater according to any of clauses F1 or F2, wherein the respective upper and lower column parts (6001*a,b*,6002*a,b*,6003*a,b*) in the assembled columns (6001,6002,6003) have parallelly aligned cylinder axes.

Clause F4. A floater according to any of clauses F1 to F3, wherein the lower connection members (1504-1506) are buoyant pontoons.

Clause F5. A floater according to any of clauses F1 to F4, wherein each of the first, second and third upper column parts (6001*b*,6002*b*,6003*b*) make up between 40 and 60 percent of a total height of the respective column 101,102, 103 in the assembled state.

Clause F6. A method of providing a floater (3000) for a floatable wind power plant (4000), the method comprising:
providing a top part (3000*b*) and a bottom part (3000*a*), the top part (3000*b*) comprising first, second and third upper column parts (6001*b*,6002*b*,6003*b*) interconnected by upper connection members (1501-1503) and the bottom part (3000*a*) comprising first, second and third lower column parts (6001*a*,6002*a*,6003*a*) interconnected by lower connection members (1504-1506);
connecting each of the first, second and third upper column parts (6001*b*,6002*b*,6003*b*) to the respective first, second and third lower column parts (6001*a*, 6002*a*,6003*a*) to form first, second and third columns (6001,6002,6003);
arranging a wind turbine (200) on the floater (3000).

Clause F7. A method according to clause F6, comprising stacking the upper and lower parts (3000*a,b*) concentrically and angularly displaced about a vertical axis.

Clause F8. A method according to clause F7, wherein the step of stacking the upper and lower parts (3000*a,b*) comprises stacking the upper and lower parts (3000*a,b*) while transporting the upper and lower parts (3000*a,b*).

Clause F9. A method according to any of clauses F6 to F8, wherein the connection members (1504-1506) of the lower part are buoyant pontoons.

When transporting the floaters to the installation site, it may be beneficial to transport them in pre-assembled parts, rather than as a fully assembled structure. This may provide the benefit of reducing the cargo space needed to transport said parts, while at the same time keeping the work required to be completed offshore to a minimum. This aspect relates to methods for transporting a partially assembled floater to reduce any or both the required cargo space and the number of connections that may be established at the installation site to form the fully assembled floater.

Figure 40:
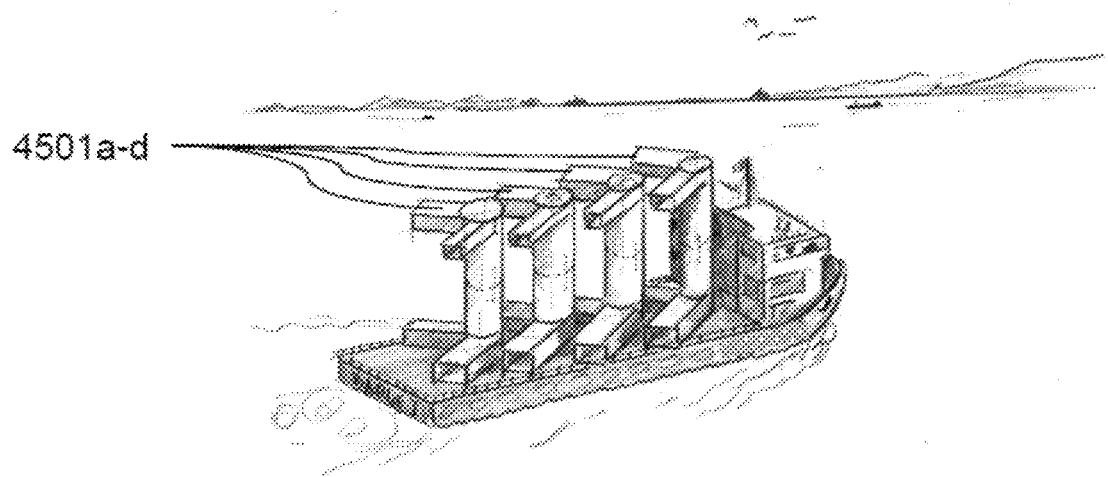
FIG. 40 illustrates the transport of multiple pre-assembled parts on a vessel.

FIG. 40 shows the transport of multiple pre-assembled parts 4501a-d on a vessel, in this embodiment of the prior mentioned columns with elongated sections. Means to weld (e.g. dry weld) these elongated sections to form a fully assembled floater have been presented previously. As shown, each of the pre-assembled parts 4501a-d have the same, or a similar, shape. When viewed from above in the configuration shown in FIG. 40, the pre-assembled parts 4501a-d may be generally V-shaped. Where the pre-assembled parts have a similar shape as shown in FIG. 40, the pre-assembled parts may be fitted together, for example stacked together. Fitting the pre-assembled parts together in this way (e.g. during transport of the pre-assembled parts) may permit more of the pre-assembled parts 4501a-d to be fitted onto a transport vessel such as that illustrated. As such, transporting a floater as a number of pre-assembled parts 4510a-d may provide cost and time saving advantages.

Figure 41:
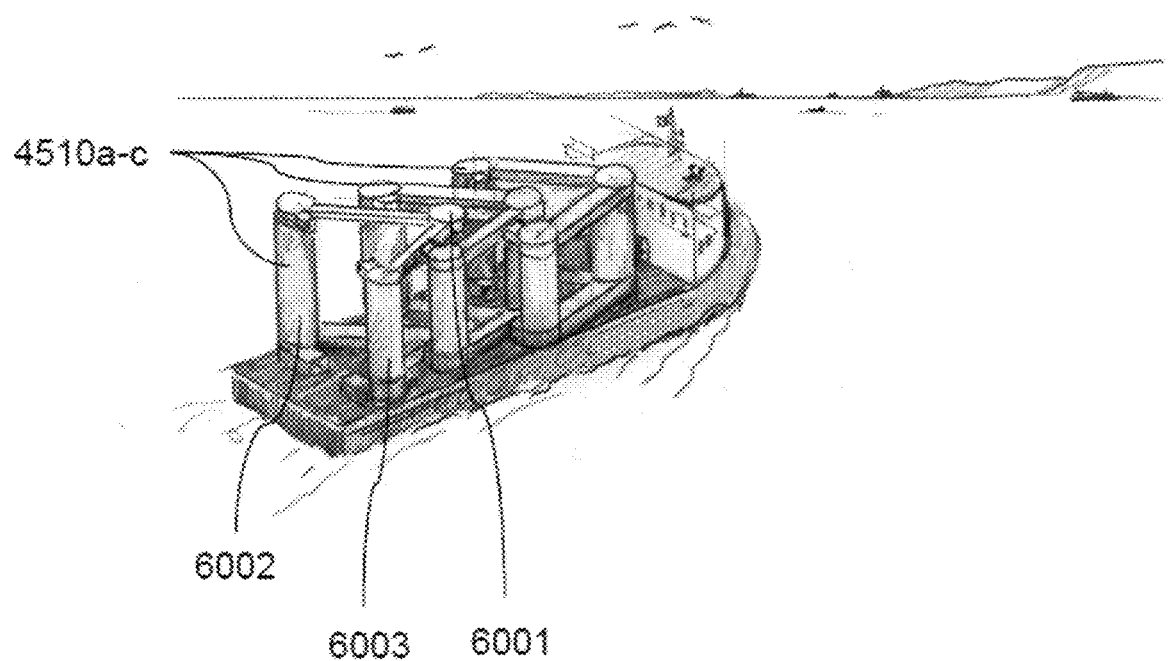
FIG. 41 illustrates the transport of another embodiment of pre-assembled parts on a vessel.

FIG. 41 shows the transport of multiple pre-assembled parts 4510a-c of another type, also on a vessel which may be the same or different to the vessel of FIG. 40. These pre-assembled parts 4510a-c comprise a first, second and third connected column elements 6001,6002,6003, with the first column element being connected via two connection elements to both the second column and the third column (totaling four connection elements). As shown, the second and third column elements 6002,6003 may not yet be connected by any connection members. As such, the illustrated pre-assembled parts 4510a-c resemble a V-shape, but larger in comparison to the previously shown embodiments of pre-assembled parts 4501a-d. These missing connection members 4511a-b as shown in FIG. 41 may enable stacking of the pre-assembled parts 4510a-c on a vessel for transport, which is depicted in FIG. 41.

Figure 42:
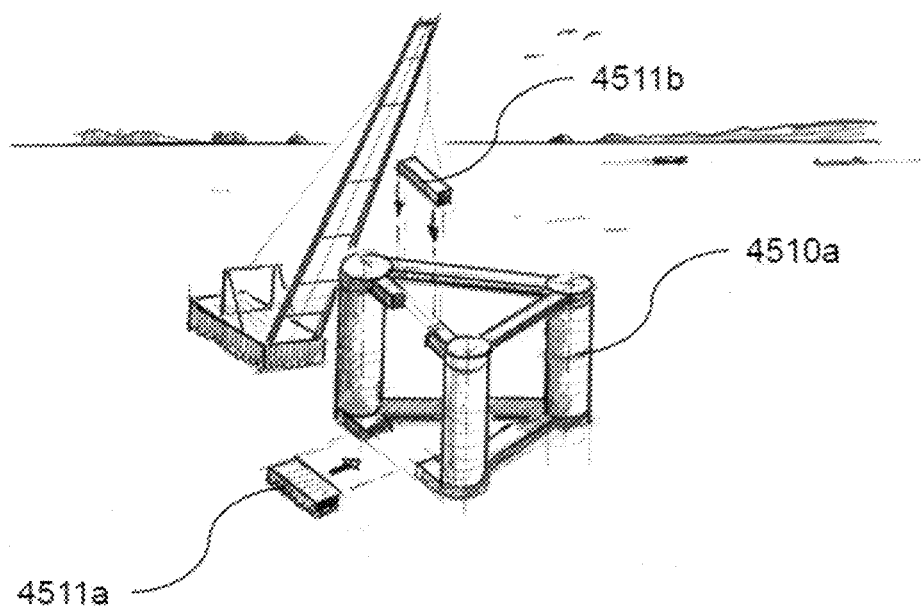
FIG. 42 illustrates the construction of a floater using the pre-assembled parts shown in FIG. 41.

FIG. 42 shows the assembly of the floater 3000 from the provided pre-assembled parts 4510a and 4511a-b. The required connection members 4511a-b are inserted and connected to the pre-assembled part 4510a in FIG. 42 to complete the fully assembled floaters 3000. The connections may be formed e.g. by welding or using connectors or other mechanical means.

By stacking the partially constructed pre-assembled parts as shown in FIG. 41, this provides the benefit of permitting more parts to be positioned on said vessel. Had the floaters 3000 been fully assembled when positioned on the vessel, stacking may not have been possible, resulting in fewer floaters 3000 able to be fitted on a vessel such as the vessel shown in FIG. 41.

As was the case with FIG. 40, by stacking the pre-assembled parts 4510a-c as shown in FIG. 41, it may be possible to fit a greater number of floaters onto a transport vessel. For example, as shown in FIG. 41, three floaters may be shipped to the installation site on one vessel, therefore greatly reducing the needed cargo space that may be required were the floaters to be transported fully assembled. Depending on the facilities available to a user, either configuration as shown in FIG. 40 or 41 may be more suitable. For example, depending on the ability of a user to assemble a floater at an offshore location, the user may transport pre-assembled parts of a floater or floaters as shown in either FIG. 40 or 41. For example, in FIG. 41, the number of connections needed to form a complete floater 3000 is reduced as compared to the assembly of the floater 3000 from the pre-assembled parts 4501a-c of FIG. 40. Therefore, the transport configuration of FIG. 41 may be preferable in cases where a user has a greater ability to construct pre-assembled parts of a floater in an onshore location, for example.

According to these aspects, there are provided the following numbered clauses, each of which making up inventive aspects provided by the present disclosure:

Clause G1. A method for constructing a floater (3000) comprising:
providing a pre-assembled floater part (4510a) comprising a first, second and third column element (6001, 6002,6003), the first column element (6001) being connected via at least one connection element to the second column element (6002), and the first column element (6001) being connected via at least one connection element to the third column element (6003) such that the pre-assembled floater part (4510a) is V-shaped;
transporting the pre-assembled floater part (4510a) stacked on a vessel deck together with other similarly shaped pre-assembled floater parts (4510a); connecting the second column element (6002) to the third column element (6003) via at least one connection element such that the floater (3000) comprises a triangular shape.

Clause G2. A method according to G1, wherein the pre-assembled floater part (4510a) is provided having the first column element (6001) connected to the second column element (6002) via two connection elements, and the first column element (6001) is connected to the third column element (6003) via two connection elements.

Clause G3. A method according to G1 or G2, comprising securing the pre-assembled floater part (4510a) at a desired location prior to connecting the second column element (6002) to the third column element (6003).

In another aspect, a method to temporarily moor floaters 3000, such as those as described herein, or fully assembled floatable wind power plants 4000 is disclosed. When manufacturing or assembling a floatable wind power plant 4000, it may not be possible to install the power plant 4000 immediately after manufacturing or assembly.

This may be the case, for example, due to weather windows available for offshore installation, equipment capacity (e.g. the availability of installation vessels), or other factors. It may for this reason be necessary to temporarily store the floatable wind power plant 4000 for a period of time after completion of the manufacturing or assembly.

Such temporary storage may traditionally be done with onshore (dry) storage of power plant units or by individually mooring the units to the sea floor in a quay/yard area or farther offshore. In some locations, the available space for such traditional storage may be limited, which can pose a challenge if having to store a large number of units. For example, if the weather window for installing wind turbine power plants is relatively short (e.g., some weeks over a summer period) while the power plant units should be manufactured or assembled over a longer period of time prior to that (e.g. manufacturing during the winter to have a large number of units ready for installation in the weather window), there may be challenges arranging for temporary storage of the completed or semi-completed units.

Figure 43:
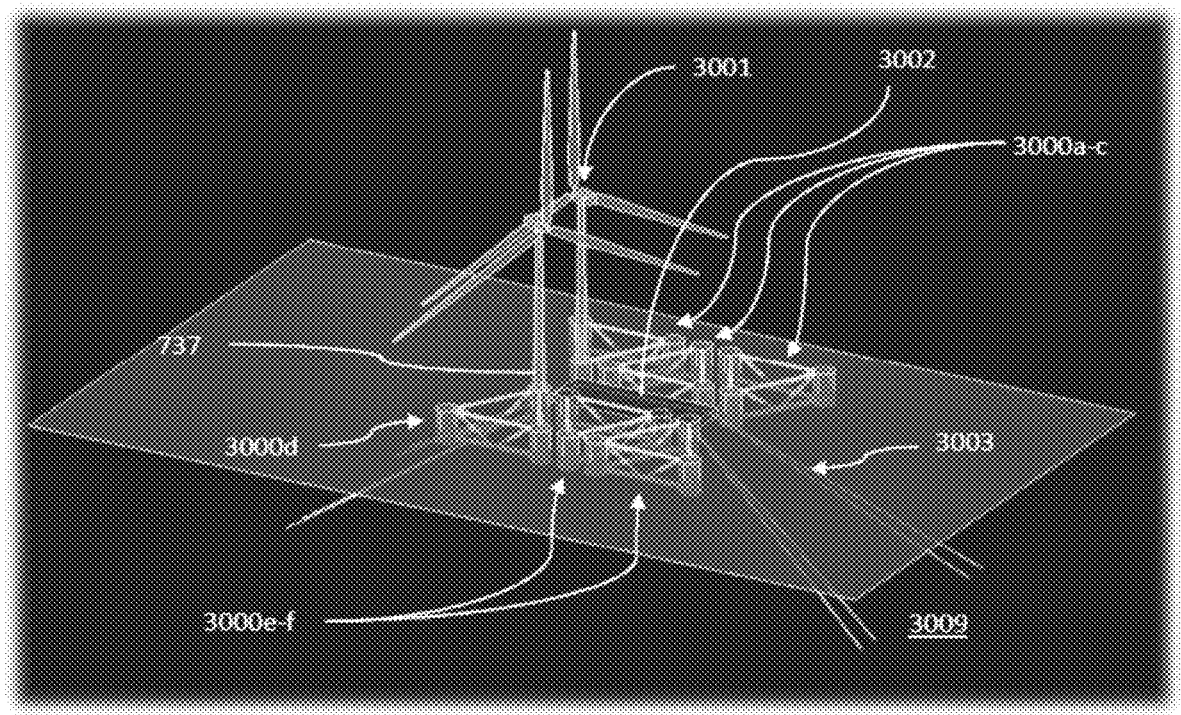
FIG. 43 illustrates multiple moored floaters.

The mooring of multiple floaters 3000a-f of a floating wind power plant is shown in FIG. 43. In FIG. 43, multiple floaters 3000a-c are fastened in an array, which is temporarily fixed to a barge 3002. Further floaters 3000d-f are also arranged in a second array, which is temporarily fixed to the barge 3002.

In the embodiment shown in FIG. 43 two of the floaters 3000a-f have a mounted wind turbine tower 3001 (such as that shown in FIG. 37), in alternative embodiments any number of floaters 3000a-f may have a mounted wind turbine tower 3001 or none at all. Nevertheless, each floater 3000*a-f* has a defined column 737 which is configured for supporting the wind turbine tower 3001.

Referring to FIG. 43, the barge 3002 is moored with eight mooring lines 3003 to the sea floor 3009, though in alternative embodiments the number of mooring lines 3003 may be different. For example, there may be any suitable number and any arrangement of mooring lines.

Figure 44:
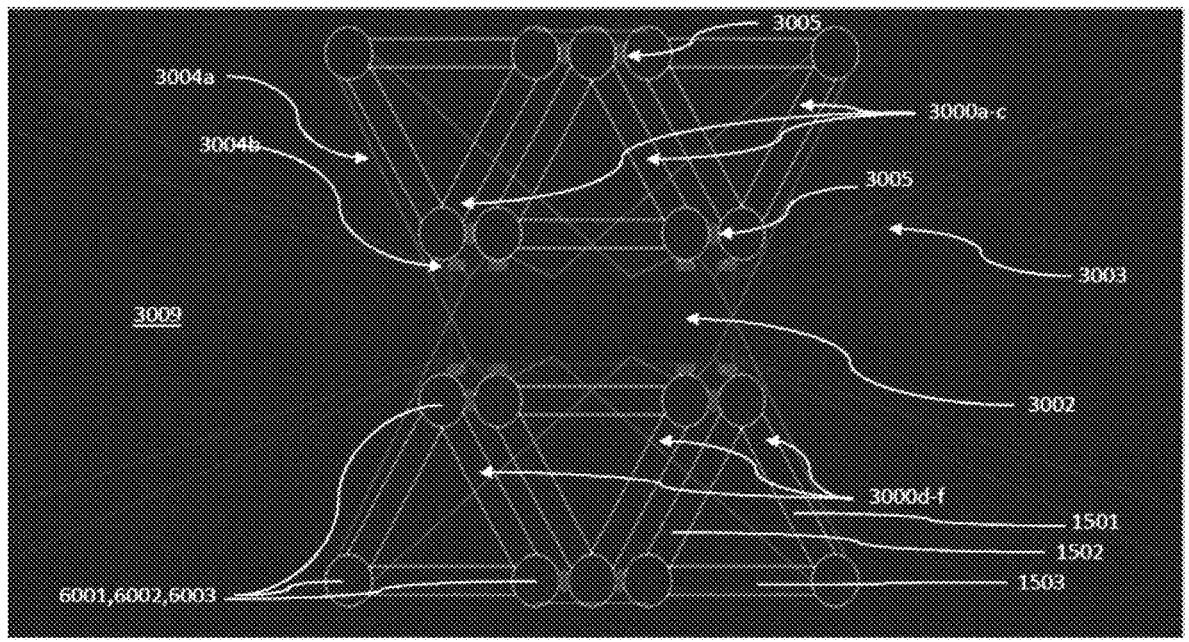
FIG. 44 illustrates a top view of multiple moored floaters.
Figure 45:
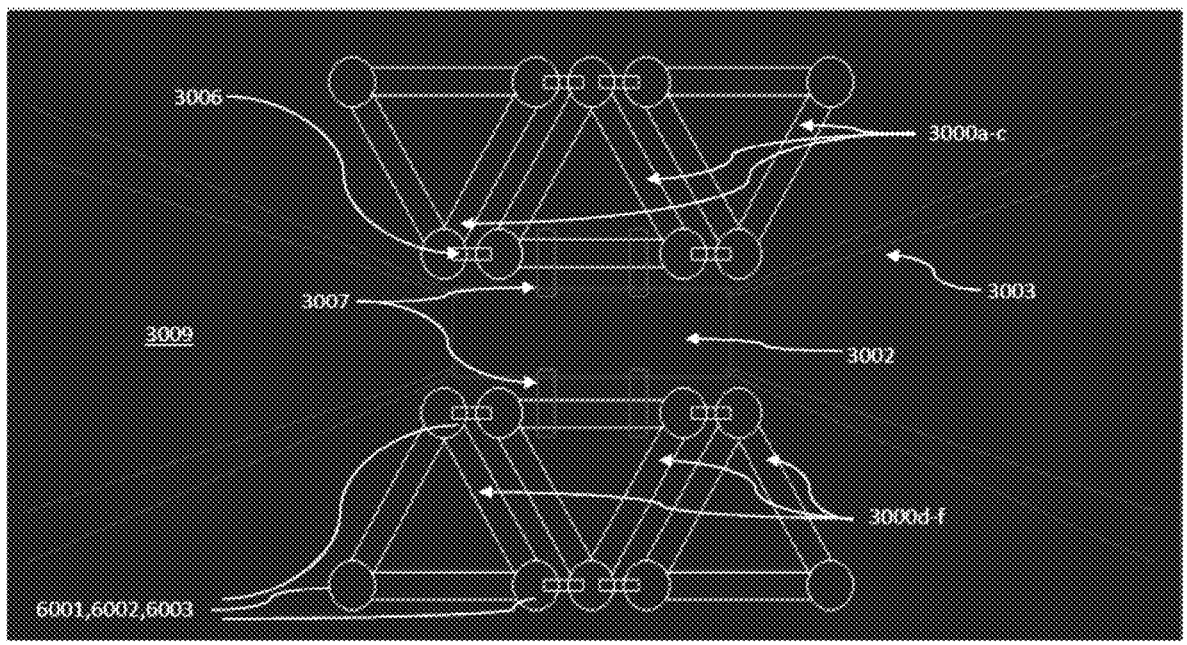
FIG. 45 illustrates an alternative example of multiple moored floaters.

The mooring of the floaters 3000*a-f* is further shown in FIG. 44 and FIG. 45; the embodiments shown in FIG. 44 and FIG. 45 show in principle the same embodiment as FIG. 43 but the embodiments are shown from a top view. The floaters 3000*a-f* each comprise three column elements 6001,6002, 6003 arranged in a triangular configuration and connected by connection members 1501, 1502, 1503, giving the floater a triangular-shaped base (e.g. from a top view). As shown, the connection members 1501, 1502, 1503 are equal in length, which results in an equilateral triangle shaped, base which may provide a floater with optimal stability in all directions (e.g. stability about horizontal X and Z axes). Floaters having an equilateral triangle base may additionally be simpler to manufacture than differently shaped floaters. Alternatively, other lengths of connection members may be used, which may provide the floaters with a different triangular base, such as an isosceles triangular base, or a scalene triangular base. Such differently shaped triangular bases may be useful to provide increased stability of floaters about a particular axis. An array of floaters 3000*a-c* is moored by connecting adjacent floaters with connectors 3005 and also connecting the array of floaters 3000*a-f* to the barge 3002 with connectors 3004*a,b*. The connectors 3004*a,b* may be any type of connector suitable for the purpose, such as mooring lines of rope, chains, wires, etc., or may be rigid connection members such as rods or the like. A combination of different connectors 3004*a,b* may be used.

As shown in FIGS. 44 and 45, the floaters may each have an identical shape, or at least a substantially similar shape which may assist when connecting the floaters together with the connectors 3004*a-b*. However, it will be understood that at least one of the floaters may be differently shaped. For example, at least one of the floaters may have the form of an isosceles triangle, while the remaining floaters have the form of an equilateral triangle.

The array of floaters 3000*a-c* is advantageously arranged in the form of a triangular tiling but may be arranged in any other configuration. For example, arranging the floaters of an array of floaters 3000*a-c* with larger spacing, forming multiple arrays of floaters 3000*a-c* or arranging the floaters 3000*a-f* in one single array. The same conditions may apply for any other array of floaters 3000*d-f*.

In the embodiment depicted in FIG. 45, the floaters 3000*a-f* each consist of three column elements 6001,6002, 6003 giving the floater a triangular base. An array of floaters 3000*a-c* is moored by connecting adjacent floaters with connectors 3006 and also connecting the array of floaters 3000*a-f* to the barge 3002 with connectors 3007. The array of floaters 3000*a-c* is advantageously arranged in triangular tiling, as above, but may be arranged in any other configuration. For example, arranging the floaters of an array of floaters 3000*a-c* with larger spacing, forming multiple arrays of floaters 3000*a-c* or arranging the floaters 3000*a-f* in one single array, may be desirable in some cases. The same conditions apply for any other array of floaters 3000*d-f*.

The connectors between the floaters 3005,3006 may be any suitable connector for this purpose, such as a rope, chain or wire, or a rigid connector such as a rod or similar. Advantageously, the connectors between the floaters may comprise a dampening member, such as one or more fenders, arranged between the floaters and a tension member, such as a tensioned rope, to hold the floaters together.

Alternative embodiments of mooring the floaters may include any arrangement of connectors 3005,3006,3007 or mooring lines 3004 to fasten the floaters 3000*a-f* to each other or to fasten any floater 3000*a-f* to the barge 3002. The usage of multiple barges 3002 may be implemented in an alternative embodiment or mooring multiple floaters 3000*a-f* without using any barge 3002.

Advantageously, according to methods described herein, a more efficient storage of floaters of wind turbine power plants at sea or a more efficient transport of said floaters can be obtained. This may apply to the described embodiment, or any other embodiment as described herein. For example, at various yard facilities used for the production for wind turbine power plants quay space may be limited. According to methods described herein, the storage of the floaters may be done offshore, preferably close to the yard facility, when further work has to be done at the floaters thus reducing the need for storage space at the facility. The described method also enables transportation of multiple floaters at once and might be useful for storing floaters near the installation site. In said case this method may also provide a platform for commissioning works. This method can increase the flexibility of mooring the floaters as not each separate floater needs to be moored to a sea floor, a quay or anything moored and possibly increase the handling speed for mooring floaters.

According to these aspects, there are provided the following numbered clauses, each of which making up inventive aspects provided by the present disclosure:

Clause H1. A method of temporarily storing a plurality of floaters (3000*a-f*), the method comprising:
  temporarily fastening the plurality of floaters (3000*a-f*) to a barge (3002), the barge (3002) being moored to a sea floor (3009),
  wherein the plurality of floaters (3000*a-f*) are arranged in an array in which each floater (3000*a-f*) is fixed to at least one other floater (3000*a-f*) by means of floater-to-floater connectors (3005,3006),
  and the array is fixed to the barge (3002) by means of at least one barge connector (3004*a,b*, 3007) arranged between the barge and at least one of the floaters (3000*a-f*).

Clause H2. The method of clause H1, wherein the floaters (3000) have a triangular base and consist of three column elements (6001,6002,6003) connected together by at least three connection members (1501, 1502, 1503).

Clause H3. The method of clause H2, wherein a first and a second floater are arranged such that a connection member of the first floater is arranged parallel to a connection member of the second floater.

Clause H4. A method according to clause H2, wherein each of the floaters (3000) have an identical shape.

Clause H5. A method according to clause H4, wherein each floater (3000) of the array of floaters (3000*a-c*) is connected to at least one adjacent floater (3000) and each floater (3000) is connected to the barge (3002) at an at least one point.

Clause H6. A method according to clause H5, wherein each floater (3000) is connected to each adjacent floater (3000) and at least one floater (3000) is connected to the barge (3002).

Clause H7. A method according to clause H5 or H6, wherein at least one floater (3000) comprises a wind turbine tower (3001) mounted thereon.

Clause H8. A method according to any of clauses H1 to H7, wherein each of the plurality of floaters (3000) has a triangular base, and the plurality of floaters are arranged together in at least one triangular tiling formation.

Clause H9. A method according to claim H8, wherein the at least one triangular tiling formation comprises a first triangular floater arranged adjacent a second triangular floater in the same configuration as the first floater, and a third floater arranged between the first and second floaters in an inverted orientation such that the first, second and third floaters together form a trapezium shape.

Figure 46:
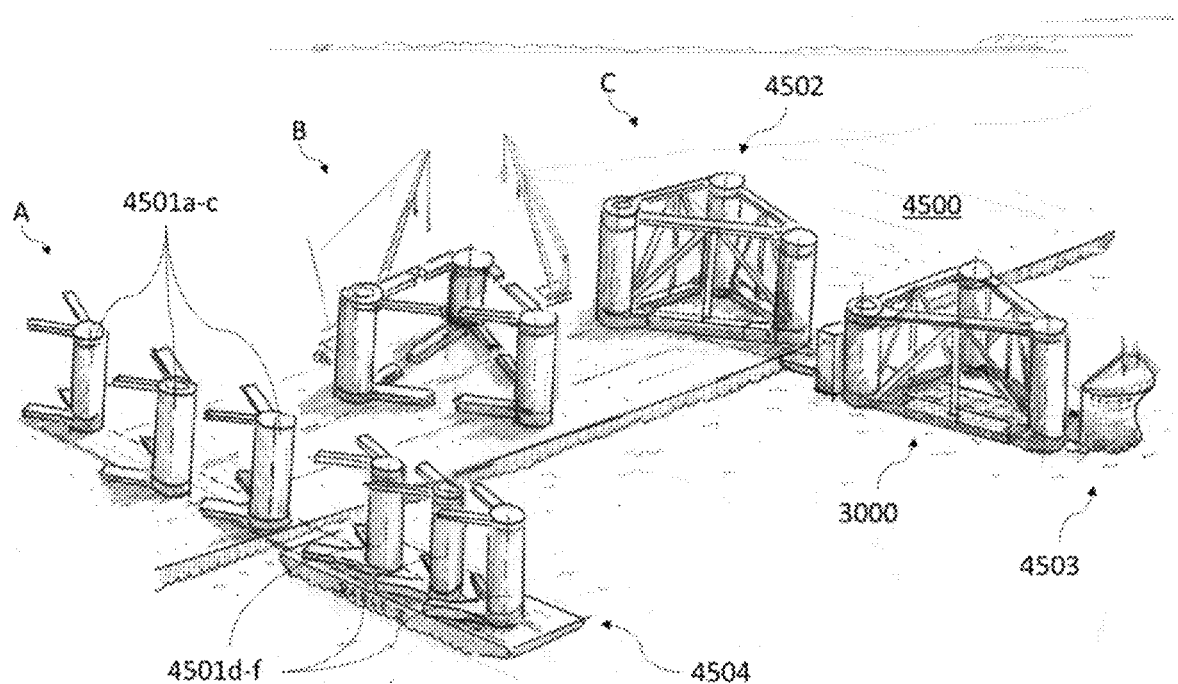
FIGS. 46-47 illustrate various steps in an assembly process of a floater.

According to some described aspects and embodiments, assembly of a floating wind power plant may be on a shore side 4500 is shown in FIG. 46. In FIG. 46, the assembly, e.g. interconnection of various pre-fabricated parts, is carried out on the shore side 4500, however in an alternative the assembly may take place on a docked vessel (described in further detail below).

Referring to FIG. 46, on the left hand side in a first process step A, a number of pre-fabricated parts 4501a-f are provided to the shore side 4500, in this embodiment by means of a vessel 4504 however any other transport arrangement may be used for this purpose in other embodiments. For example, the pre-fabricated parts may be provided via land-based transport to the shore side 4500. The parts 4501a-f can be moved from the vessel 4504 to the shore side 4500 and on the shore side 4500, for example, by means of multiwheelers (e.g. self-propelled modular transport units, SPMTs) or crane.

The pre-fabricated parts 4501a-f may advantageously include three pre-fabricated column elements for a floater 3000, which three pre-fabricated column elements are to be fixed together to form part of the floater 3000. In another embodiment any or all of the pre-fabricated parts 4501a-f may have a different shape, e.g. comprising four rectangular angled parts, or they may have a similar shape but are further assembled, e.g. the V-shaped from FIG. 41.

The pre-fabricated parts 4501a-f are assembled (indicated as step B) to form assembled part 4502, a floater 3000 (see FIG. 47) of the floating wind power plant 4000. In a next step C, the assembled part 4502 is completed, for example by finalizing connections, welding, internal structure, or the like. The assembled part 4502 is subsequently moved onto a submersible vessel 4503. Movement of the assembled part 4502 can be done, for example, by means of multiwheelers or crane.

Figure 47:
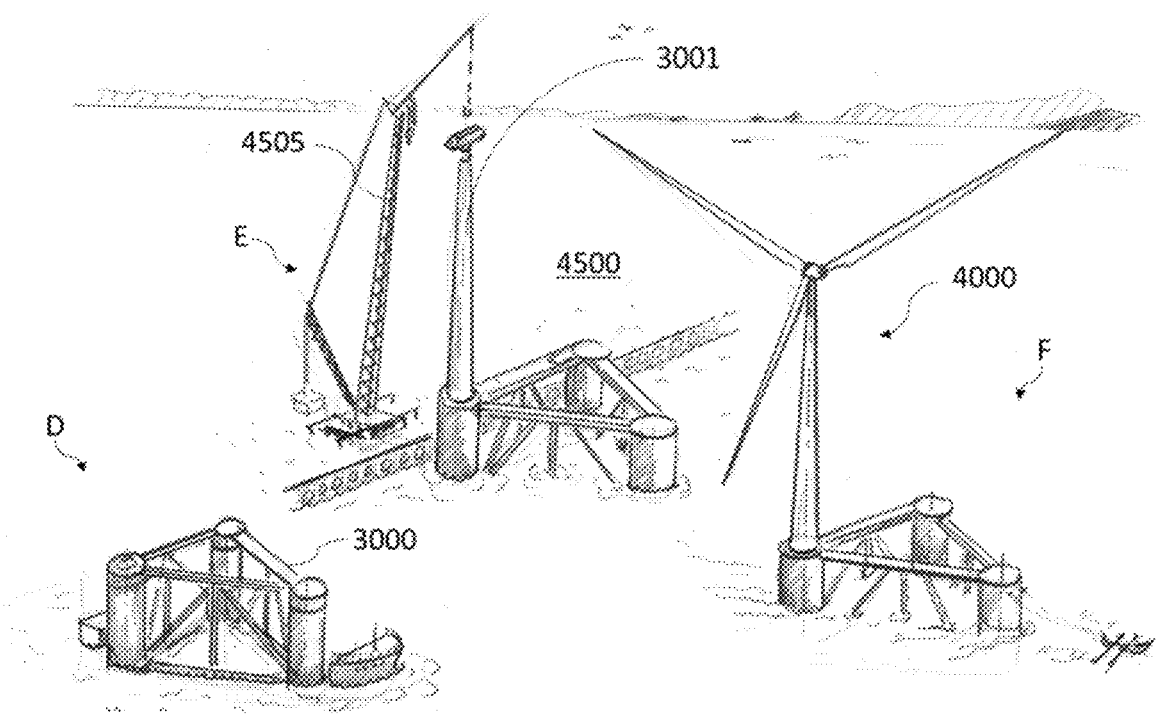

When submerging the submersible vessel 4503, the (now completed or substantially completed) floater 3000 is landed on water, as shown in step D in FIG. 47. Afterwards a wind turbine tower 3001 is mounted onto the floater 3000 (step E). This can be done by means of the crane 4505. Optionally, in other embodiments, this may also take place prior to landing the floater 3000 on water. The floating wind power plant 4000, comprising the floater 3000 and the turbine tower 3001 with its associated wind turbine components, is then moved to its destination for installation at an offshore wind farm. In this embodiment the floating wind power plant 4000 is towed, in another embodiment any other transportation method may be applied.

Figure 48:
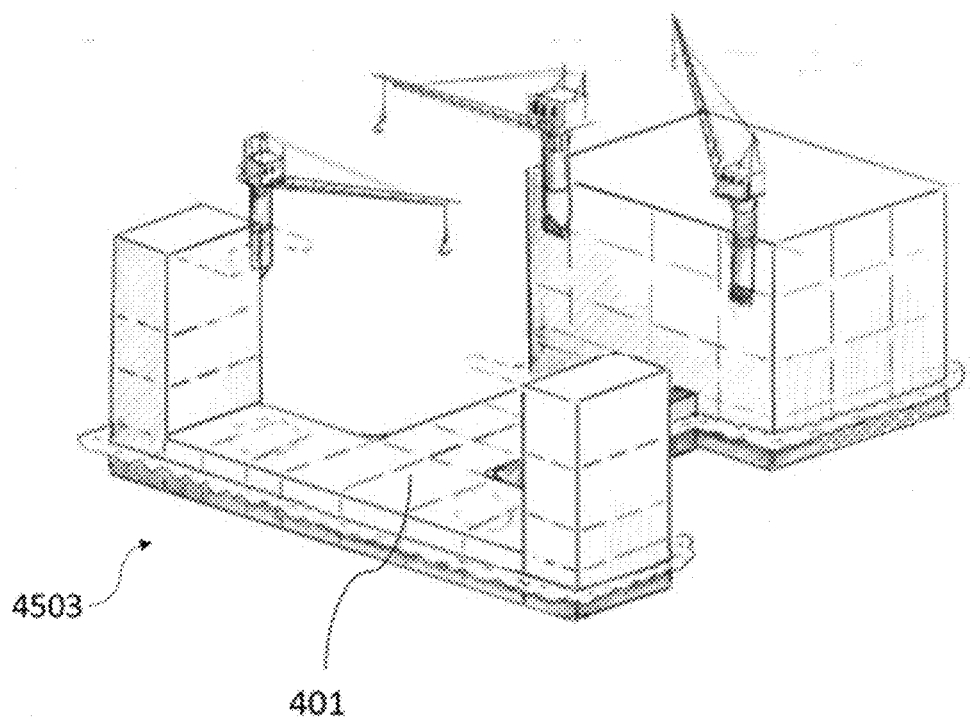
FIG. 48 illustrates an embodiment of a submersible construction vessel.

Alternatively, the floating wind power plant may be assembled on the submersible vessel 4503 which is arranged at the shore side 4500 and used to land the floater on water. The vessel 4503 may for this purpose be docked at the shore side 4500. FIG. 48 is a perspective view of a vessel 4503 having a deck 401 for construction of the wind energy power plant 4000. As depicted in FIG. 48, the vessel 4503 has a deck 401 on which the floater 3000 can be constructed. The vessel 4503 is semi-submersible, and includes vertical structures for buoyancy when submerged. The vertical structures may also function as support structures for holding various parts of the floater 3000. The vessel 4503 is thus selectively submersible by altering the ballast in the vessel hull, as is known from semi-submersible structures.

The floater 3000 can be constructed on the deck 401 of the vessel 4503 with the deck 401 in a non-submerged state. Parts, supplies, tools and personnel may be provided from the shore side 4500, and the vessel 4503 may be arranged so that for example personnel may walk between the shore side 4500 and the vessel 4503, and that parts, supplies or tools may be transported by vehicles between the shore side 4500 and the vessel 4503. This provides the advantage that the assembled part 4502 does not need be transported.

Figure 49:
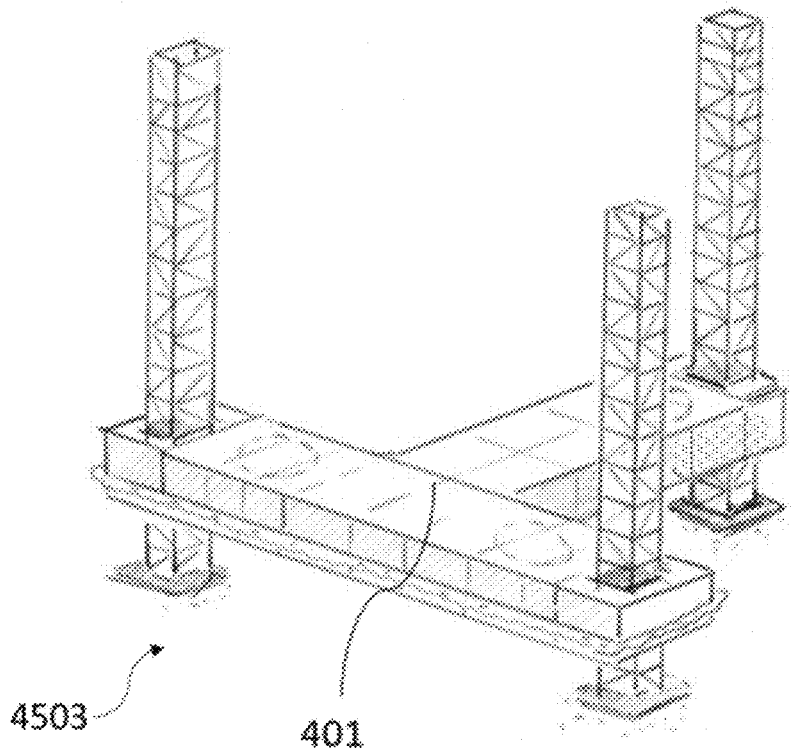
FIG. 49 illustrates another embodiment of a submersible construction vessel.

Alternatively, the vessel 4503 can be a jack-up rig or a self-elevating unit as illustrated in FIG. 49. The legs of the jack-up allow lifting/lowering the vessel 4503 in/out of the sea. Consequently, the floater 3000 can be constructed on the deck 401 when the jack-up rig is supported on the sea floor. The jack-up rig is illustrated in FIG. 49 in a simplified manner, however may comprise support structures on the deck 401 to hold parts of the floater 3000, cranes to assist in the construction, etc.

Advantageously, according to these methods, a more efficient construction of a wind turbine power plant can be obtained. For example, at various locations which may be suitable for wind power generation, yard facilities or other large-scale construction facilities at the shore side 4500 may be limited. According to methods as described herein, the need for specialist facilities is reduced, in that pre-fabrication of elements/parts can be done elsewhere, transported to the assembly site, and final assembly can be carried out near the installation site. This reduces the need for towing wind turbine power plant units 4000 or floaters 3000 over long distances. Local assembly may be done using mobile equipment, such as mobile cranes and work tools, to obtain efficient assembly also without specialist facilities locally. This can reduce the overall installation time for multiple wind turbine power plants.

Accordingly, there are provided the following numbered clauses, each of which making up inventive aspects provided by the present disclosure:

Clause J1. A method of constructing a floatable wind power plant (4000), the method comprising:
  providing a plurality of pre-fabricated parts (4501a-f) to a shore side (4500);
  assembling the pre-fabricated parts (4501a-f) at the shore side (4500) or on a deck (401) of a vessel (4503) docked at the shore side (4500) to produce a floater (3000) for the wind power plant (4000);
  landing the floater (3000) on water;
  with the floater (3000) in a floating state, mounting a wind turbine tower (3001) onto the floater (3000) to produce the wind power plant (4000); and
  towing the wind power plant (4000) to an installation site.

Clause J2. The method according to clause J1, wherein the step of landing the floater (3000) on water comprises submerging a submersible vessel (4503), upon which the floater (3000) is located.

Clause J3. The method according to clause J1 or J2, further comprising moving the floater (3000) from the shore side (4500) onto the submersible vessel (4503) prior to submerging the submergible vessel (4503).

Clause J4. The method according to any of clauses J1 to J3, wherein the step of towing the wind power plant (4000) to an installation site comprises moving the wind power plant (4000) to an offshore wind farm.

Clause J5. The method according to any of clauses J1 to J4, wherein the step of providing a plurality of pre-fabricated parts (4501*a-f*) to a shore side (4500) comprises transporting the pre-fabricated parts (4501*a-f*) to the shore side (4500) with a vessel (4504).

Clause J6. The method according to any of clauses J1 to J5, wherein the step of assembling the pre-fabricated parts (4501*a-f*) comprises:
connecting the pre-fabricated parts (4501*a-f*) by means of connectors, or
welding the pre-fabricated parts together.

Clause J7. The method according to any of clauses J1 to J6, wherein the step of mounting the wind turbine tower (3001) onto the floater (3000) comprises mounting the wind turbine tower (3001) onto the floater (3000) with a crane (4505) arranged on the shore side (4500).

Clause J8. The method according to any of clauses J1 to J7, comprising providing exactly three pre-fabricated parts.

In any of the above, the step of assembling the pre-fabricated parts (4501*a-f*) may comprise connecting the pre-fabricated parts 4501*a-f* with connectors according to any of the embodiments described above or below. (See e.g. FIGS. 9 to 11.) As described, optionally some or all of the connections between structural parts made as part of the assembly process may be welded connections.

A wind turbine may be installed on a floater to form a floatable wind power plant. As described, the wind turbine may be installed on the floater offshore. This may enable, for example, the floater and the wind turbine to be transported separately to an offshore location, which may be more convenient than transporting the turbine already installed on the floater. Further, once the wind turbine has been installed on the floater, further work (e.g. reparation work) may be required to the wind turbine either immediately after installation or after a period of operation of the floatable wind power plant. When installing a wind turbine on a floater to form a floatable wind power plant in an offshore location, or when performing work on a floatable wind power plant with a wind turbine already installed, the external environment (e.g. ocean waves) may hinder work during installation. One way to mitigate against this problem is to mount the floater (or the floatable wind power plant in cases where a wind turbine is already installed) on board of a larger vessel, which may provide a degree of stability during installation. In some cases, the larger vessel may be a service unit, e.g. a crane or a working platform, which can be coupled or mounted to the floatable wind power plant.

Attaching the service unit to the floater or floatable wind power plant may enable operations to be performed with less interference from the conditions of an external environment (e.g. interference from waves or high winds). This aspect relates to a service unit, which can be attached (e.g. coupled or mounted) to a floater or a floatable wind power plant, e.g. for mounting a wind turbine thereon or for performing maintenance such as switching rotor blades.

Figure 50:
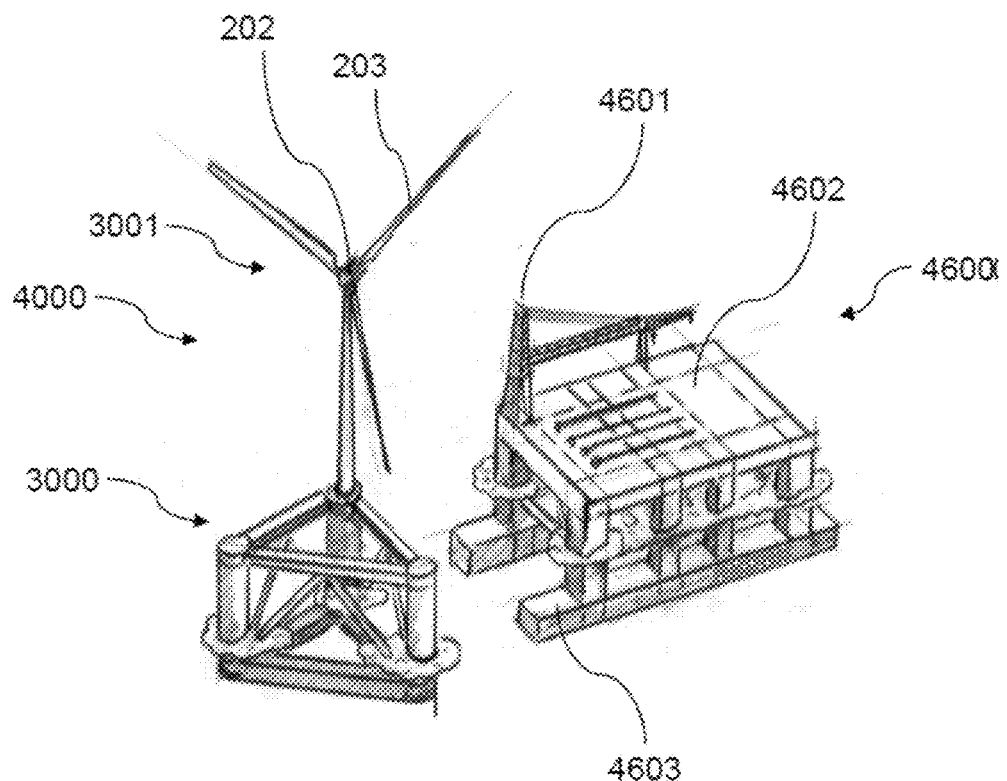
FIGS. 50-52 illustrate the docking of a service unit to a floatable wind power plant.

FIG. 50 shows a floatable wind power plant 4000, comprising a floater 3000 and a wind turbine. The wind turbine comprises the wind turbine tower 3001, a nacelle 202 and blades 203. On the right side of FIG. 50 a service unit 4600 is depicted, which may have means for selective ballasting and de-ballasting of the service unit, e.g. water tanks which may be emptied/filled. The service unit 4600 may comprise a crane 4601 and/or a service deck 4602 and/or provide other means for interacting with the floatable wind power plant 4000. The service unit 4600 may comprise a mooring mechanism 4603 for attaching to the floatable wind power plant 4000, e.g. ropes, magnets or a surface on which to raise the floatable wind power plant up, which may be similar to a fork lift, as shown in the embodiment of FIGS. 50-52.

Figure 51:
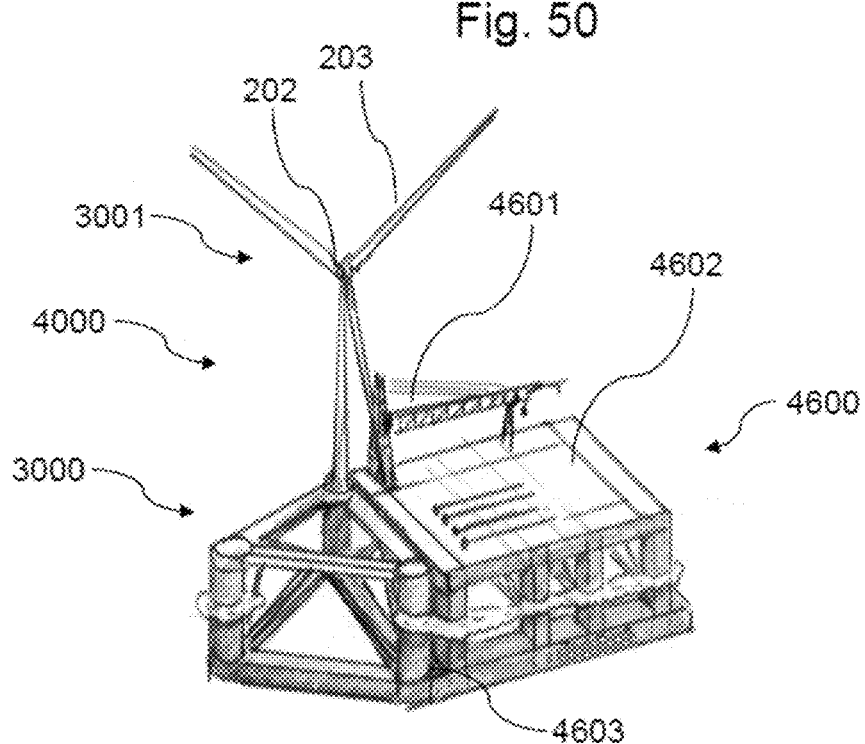

FIG. 51 shows the attachment of the service unit 4600 to the floatable wind power plant 4000 in an offshore location. The service unit 4600 is brought next to the floatable wind power plant 4000 and is coupled thereto via the mooring mechanism 4603. In this case the elongate structures of the service unit 4600 are moved beneath the floatable wind power plant 4000. This may be achieved, for example, by filling ballast tanks in the service unit 4600 so as to lower the elongate structures of the service unit 4600 such that they are positioned below the level of the floatable wind power plant 4000, and moving the service unit 4600 into contact with the floatable wind power plant 4000. The service unit 4600 may then be de-ballasted, such that the floatable wind power plant 4000 may be engaged and lifted by the elongate members of the service unit 4600. The weight of the floatable wind power plant 4000 resting on the service unit 4600 may assist with the coupling of the floatable wind power plant 4000 to the service unit 4600. Other mooring mechanisms may alternatively or additionally be provided to assist to attach (e.g. couple or mount) the floatable wind power platform 4000 to the service unit 4600. For example, some mechanisms may employ the use of ropes, magnets or the like to ensure a reliable connection of the floatable wind power plant 4000 and the service unit 4600.

Figure 52:
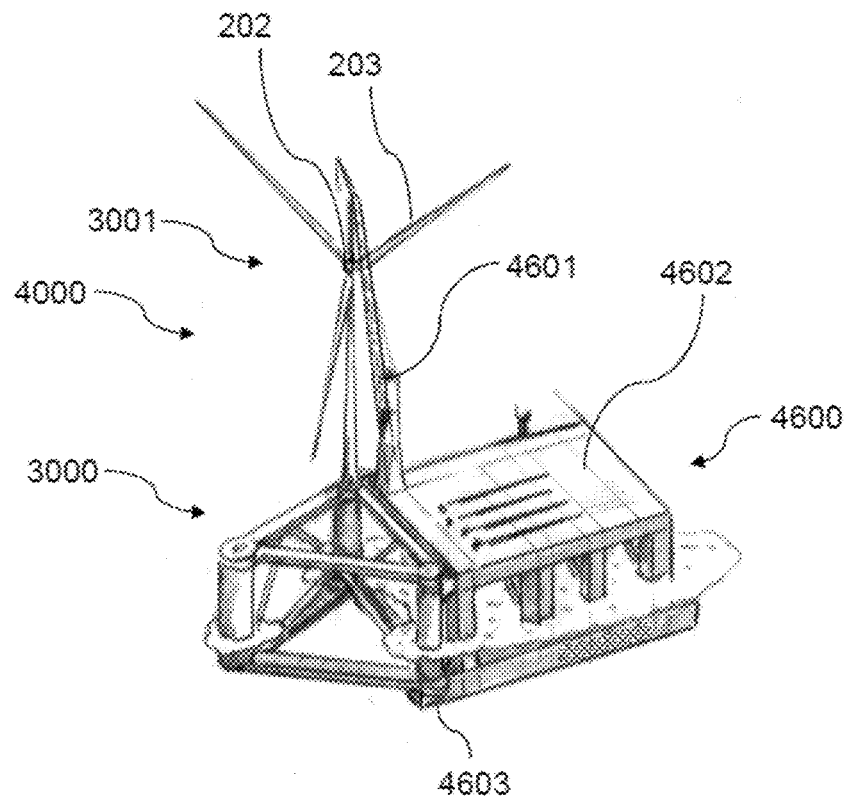

As shown in FIG. 52, the floatable wind power plant 4000 and the service unit 4600 are attached together such that an operation may now be performed, such as e.g. changing or performing repairs to a rotor blade. As such, it may be beneficial to have a service deck 4602 that may be used to store or repair parts (e.g. store spare parts or repair damaged parts) thereon. Additionally, a crane 4601 may be installed to assist at providing access to the wind turbine.

Figure 53:
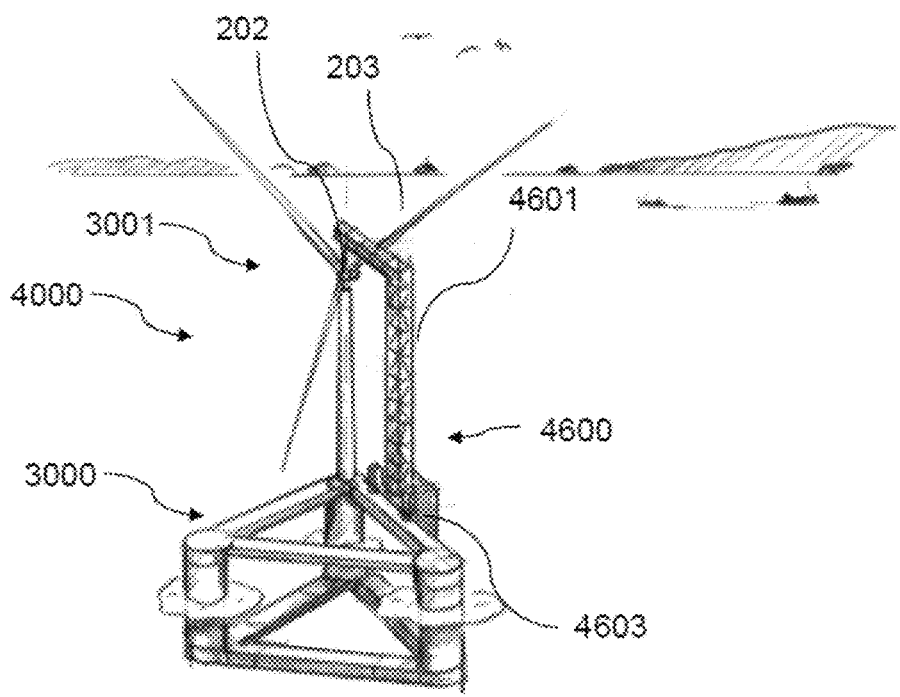
FIG. 53 illustrates another embodiment of the docking of a service unit to a floatable wind power plant.

Another embodiment is shown in FIG. 53, wherein the service unit 4600 comprises a crane 4601 and is mounted onto the floatable wind power plant 4000. In this embodiment, there may be no service deck as is shown in FIG. 53 or there may be a substantially smaller service deck provided. As such, the size of the service unit 4600 is reduced, and so handling of the service unit 4600 may be easier. In this embodiment, the service unit 4600 may be attached to the floatable wind power plant 4000 by a mooring mechanism 4603, which is in this case clamps. As a result of the service unit 4600 being smaller, an external storage of parts, e.g. on a vessel may be necessary. The service unit 4600 as shown in FIG. 53 may be more easily positioned relative to the floatable wind power plant 4000, for example by a vessel (not shown). Further, once the service unit 4600 is attached (e.g. coupled or clamped) to the floatable wind power plant 4000, this may reduce or remove the relative motion between the service unit 4600 and the floatable wind power plant 4000, which may be caused by external factors such as wind or ocean waves. In turn, this may facilitate the usage of crane 4601 with the floatable wind power plant 4600, and improve the stability of any operations on the floatable wind power plant 4000.

The service unit 4600 provided by this aspect may provide means to perform necessary operations on a floatable wind power plant without relying on the stability provided by a larger construction vessel. This may facilitate e.g. construction or maintenance of the floatable wind power plant.

According to these aspects, there are provided the following numbered clauses, each of which making up inventive aspects provided by the present disclosure:

Clause K1. A service unit (4600) for a floatable wind power plant (4000), the service unit (4600) having a mooring mechanism (4603) for coupling the service platform (4600) to the floatable wind power plant (4000) so as to prevent or substantially reduce relative movement between the service unit (4600) and the floatable wind power plant (4000).

Clause K2. A service unit (4600) according to clause K1, comprising a crane (4601) operable to access parts of the wind turbine (4000).

Clause K3. A service unit (4600) according to clause K1 or K2, comprising a service deck (4602).

Clause K4. A service unit (4600) according to any of clauses K1-K3, comprising a buoyancy arrangement, the buoyancy of which is selectively controllable by a user.

Clause K5. A service unit (4600) according to clause K4, wherein the buoyancy arrangement comprises at least one ballast tank, and the ballast tank is selectively ballastable and de-ballastable.

Clause K6. A service unit (4600) according to any of clauses K1-K5, wherein the mooring mechanism comprises an engagement surface (4603) configured to engage a corresponding service unit engagement surface of the service unit (4600).

Clause K7. A method for replacing a component on a floatable wind power plant (4000), the method comprising:
- positioning a service unit (4600) adjacent the floatable wind power plant (4000)
- coupling the service unit (4600) and the floatable wind power plant (4000) via a mooring mechanism (4603), so as to remove or substantially reduce relative movement between the service unit and the floatable wind power plant (4000);
- with the service platform (4600) and the floatable wind power plant (4000) in contact, replacing the component on the service platform (4600).

Clause K8. A method according to clause K7, comprising bringing an engagement surface (4603) of the service unit (4600) into engagement with a service unit engagement surface of the floatable wind power plant (4000) and de-ballasting the service unit and bringing the engagement surface of the service unit (4600) into contact with the service unit engagement surface of the floatable wind power plant (4000) to lift the floatable wind power plant (4000) to form a connection in which relative movement between the service unit (4600) and the floatable wind power plant (4000) is prevented.

Clause K9. A method according to clause K7 or K8, comprising replacing the component using a crane (4601).

Clause K10. A method according to any of clauses K7 to K9, wherein the service unit is or comprises a service platform (4602).

The installation and maintenance of a floatable wind power plant (such as that described in the previous examples) may require mounting rotor blades to a nacelle or removing said rotor blades. Access to a floatable wind power plant may be obtained by using a vessel large enough to take the floatable wind power plant on board said vessel, or by using a service unit, for example as presented in aspect K. To change a single rotor blade, the following apparatus and method will be presented, which may preferably dismount an old rotor blade and install a new rotor blade in one single process.

Figure 54:
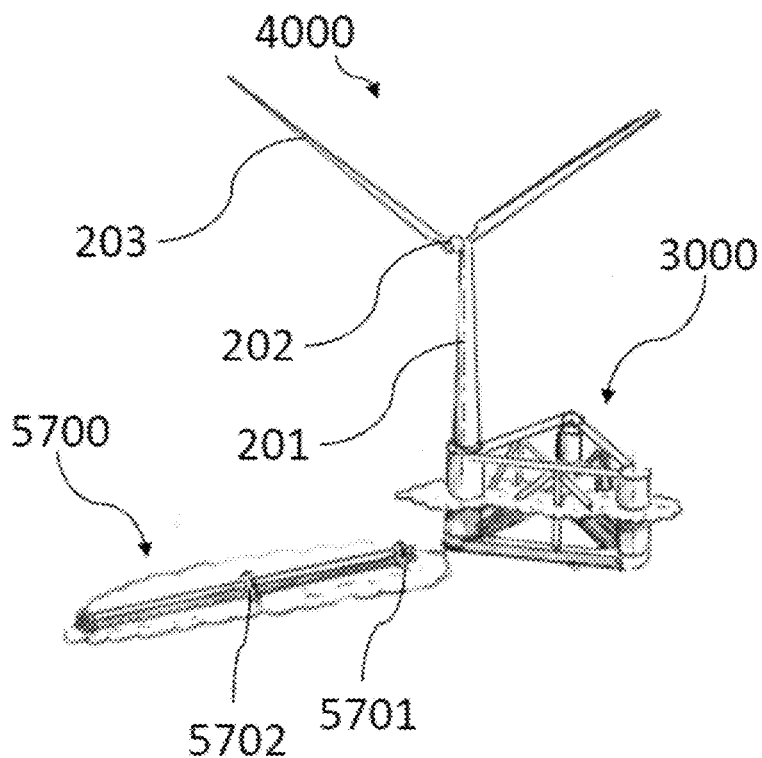
FIGS. 54-57 illustrate the steps involved in replacing a wind turbine blade using a switching tool.

FIG. 54 shows a floatable wind power plant 4000, comprising a floater 3000 and a turbine tower 201, a nacelle 202 and rotor blades 203. Also depicted is a blade switching tool 5700, which has selectively buoyant sections (e.g. sections having variable buoyancy by means of a buoyancy arrangement, for example, which is also described herein) and has a plurality of mooring gadgets 5701,5702 for providing temporary attachment to the floatable wind power plant 4000. In the example illustrated, the blade switching tool 5700 has two mooring gadgets 5701, 5702, although the skilled reader will understand that other numbers of mooring gadgets may be provided, for example one or three. The mooring gadgets 5701,5702 may be clamps, a guiding rail system installed on the turbine tower 201 or any other acceptable means. Preferably the mooring gadgets may be adjustable to the possibly height dependent diameter of the turbine tower, as presented in the following embodiment.

Figure 55:
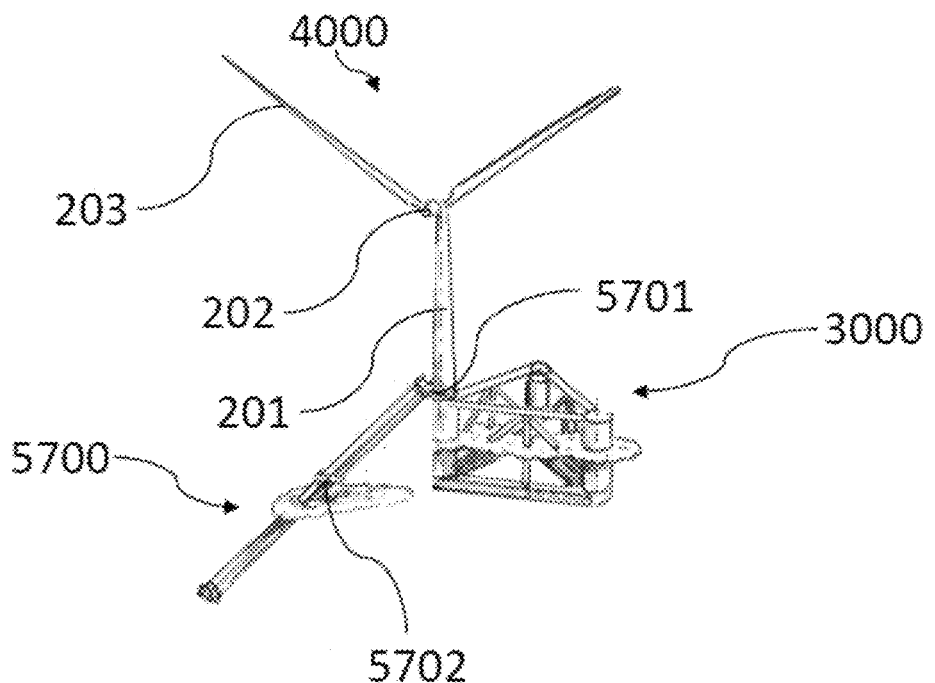

The switching tool 5700 may comprise a buoyancy arrangement (not shown), which may comprise at least one ballast tank (e.g. a plurality of tanks). After attaching (e.g. coupling, clamping, bolting, or the like) the switching tool 5700 to the floatable wind power plant 4000 with a first mooring gadget 5701 located at one end of the switching tool 5700, the buoyancy arrangement may be configured to reduce the buoyancy of an opposite end of the switching tool 5700, resulting in the switching tool 5700 rotating around an axis extending laterally from the switching tool 5700 and the first mooring gadget 5701 moving upwards with respect to the wind turbine tower 201 as shown in FIG. 55. The buoyancy arrangement may be or comprise a ballast tank or plurality of ballast tanks, which may assist in reducing or increasing the buoyancy of all of part of the switching tool 5700. In one example, at least one ballast tank may be located at a distal end of the switching tool 5700 relative to the floatable wind power plant 4000. In the example shown in FIG. 55, a ballast tank located at a distal end of the switching tool 5700 may be filled with a fluid (e.g. filled with seawater), causing the end of the switching tool to sink, providing the desired rotation as outlined above.

Figure 56:
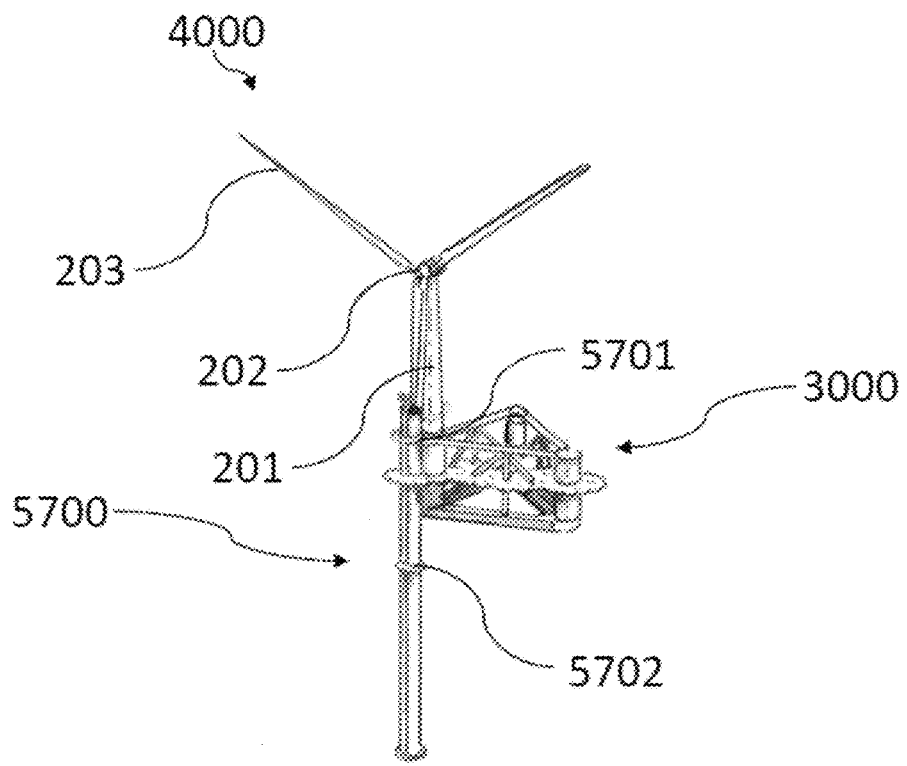

As the switching tool 5700 rotates, the buoyancy arrangement may continue to adjust the buoyancy of the switching tool 5700 until the switching tool 5700 has rotated to a vertical, or substantially vertical position. Once the switching tool 5700 has rotated to a substantially vertical position, a second mooring gadget 5702 may be fastened to the floatable wind power plant 4000, as shown in FIG. 56. As the switching tool 5700 is already attached to the floatable wind power plant 4000 via the first mooring gadget 5701, as the switching tool 5700 rotates towards a vertical orientation, the longitudinal axis of the switching tool 5700 may naturally align with the longitudinal axis of the tower 201 of the floatable wind power plant 4000, thereby facilitating attachment of the second mooring gadget 5702 to the floatable wind power plant 4000. In another embodiment there may be more than two mooring gadgets 5701,5702 and the mooring gadgets may be any suitable (e.g. mechanical) means. Once vertically oriented, any further mooring gadgets may additionally be attached to the floatable wind power plant 4000.

Figure 57:
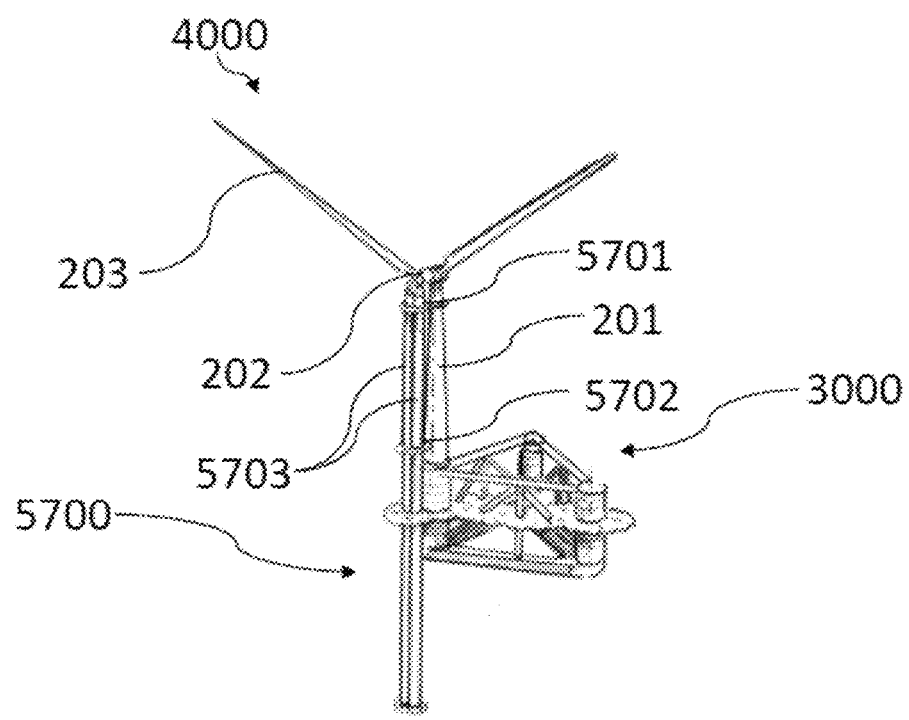

Once the blade switching tool 5700 is attached to the floatable wind power plant 4000 via the mooring gadgets 5701, 5702, the buoyancy arrangement may be configured to increase the buoyancy of the blade switching tool 5700, for example by de-ballasting a ballast tank, or a plurality of ballast tanks. As the buoyancy arrangement increases the buoyancy of the switching tool 5700, this causes an upwardly directed force to act on, such that the switching tool 5700 moves in an upwards direction relative to the turbine tower 201 and towards the nacelle 202, reaching the position shown in FIG. 57.

Alternatively or additionally, the switching tool 5700 may use mechanical means 5706 to move up the tower by using e.g. a winch or a rack railway or having mooring gadgets 5701,5702 able to propel themselves along the tower 201 e.g. by gripping a side surface of the tower and using a propulsion arrangement such as a motorised wheel to move the mooring gadgets 5701, 5702 along the surface of the tower 201.

The switching tool 5700 may comprise at least one compartment 5703 for a rotor blade 203 to be attached to the floatable wind power plant 4000, as well as means for detaching a rotor blade 203 from the nacelle 202 and storing it in the compartment 5703. In the position shown in FIG. 57, the rotor blade 203 may be inserted into a compartment 5703 of the switching tool 5700. To assist in positioning the rotor blade in question (e.g. the rotor blade to be replaced) in the compartment 5703, before the switching tool 5700 reaches the position shown in FIG. 57, the rotor blade in question may be positioned such that it extends in a downwards direction relative to the tower 201, and is generally aligned with the longitudinal axis of the tower 201. As the switching tool 5700 rises, the rotor blade in question may be aligned with an opening to compartment 5703, such that when then switching tool reaches the position shown in FIG. 57, the entire length (or a majority of the length) of the rotor blade in question is located inside the switching tool 5700. The rotor blade in question may then be detached from the nacelle 202 and stored in the compartment 5703, for removal from the floating wind power plant 4000 (for example by ballasting and detaching the switching tool 5700 from the floatable wind power plant 4000).

Advantageously, the switching tool 5700 comprises two compartments 5703, each for a rotor blade 203, wherein one compartment 5703 carries the new rotor blade that will replace the currently mounted one, while the other compartment is configured to receive a rotor blade to be replaced. And the switching tool 5700 may change to a second operational position, wherein the new rotor blade may be attached to the nacelle 202 from its compartment 5703 with attachment means. Therefore, the procedure of attaching the switching tool 5700 to the floatable wind power plant 4000, ballasting the switching tool 5700 to rotate the switching tool 5700 to a substantially vertical position and deballasting the switching tool 5700 to reach the position of FIG. 57 may take place just once to permit switching a single rotor blade 202 with a new one. In another embodiment, there may be multiple compartments 5703, for example four compartments 5703 to switch all the three blades of a three-bladed wind turbine. In such an embodiment, at least one compartment of the switching tool may be used both for storing a new blade to be attached to the nacelle 202, as well as for storing a used blade for removal from the nacelle.

Figure 58:
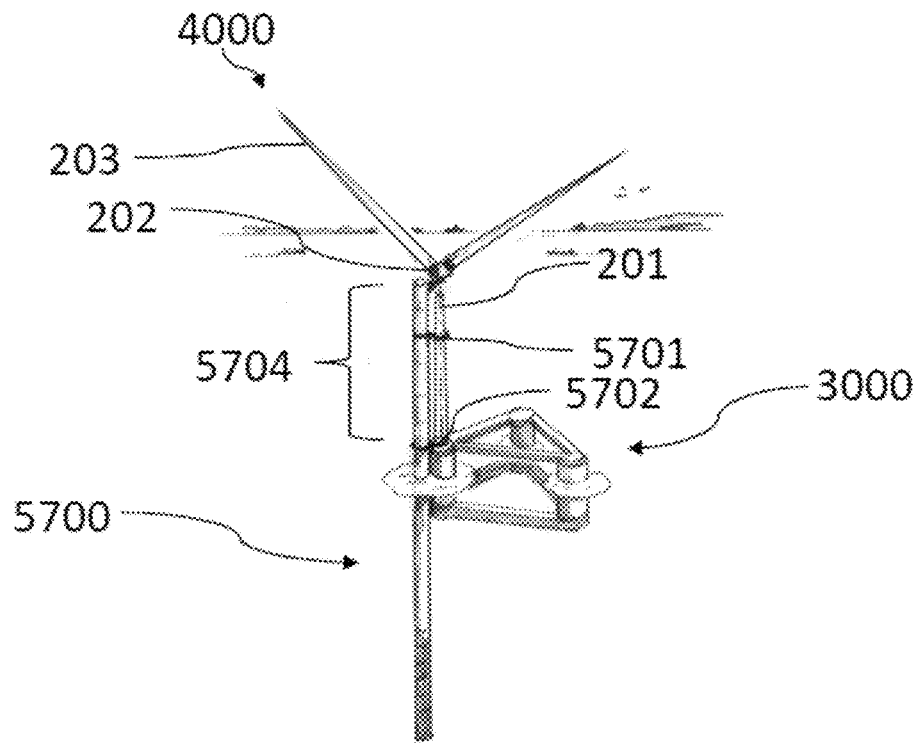
FIG. 58 illustrates another embodiment of a blade switching tool operating on a floatable wind power plant.

According to another embodiment shown in FIG. 58, the switching tool 5700 may not need to rise fully to the nacelle to reach a position whereby a rotor blade may be removed and/or attached to the nacelle 202. The switching tool 5700 may comprise a gliding device 5704, which extends from the switching tool 5700 and may engage a rotor blade 203 so as to either bring the rotor blade 203 into contact with the nacelle where the rotor blade 203 is to be attached to the nacelle 202, or support a rotor blade 203 after it has been detached from the nacelle 202 and is being lowered towards the switching tool 5700, in the downwards direction relative to the orientation of the floatable wind power plant 4000.

Therefore, in some instances, the gliding device 5704 may engage the rotor blade 203 and lift the rotor blade 203 from its compartment 5703 or in some embodiments the gliding device 5704 may itself comprise the compartment 5703.

Figure 59:
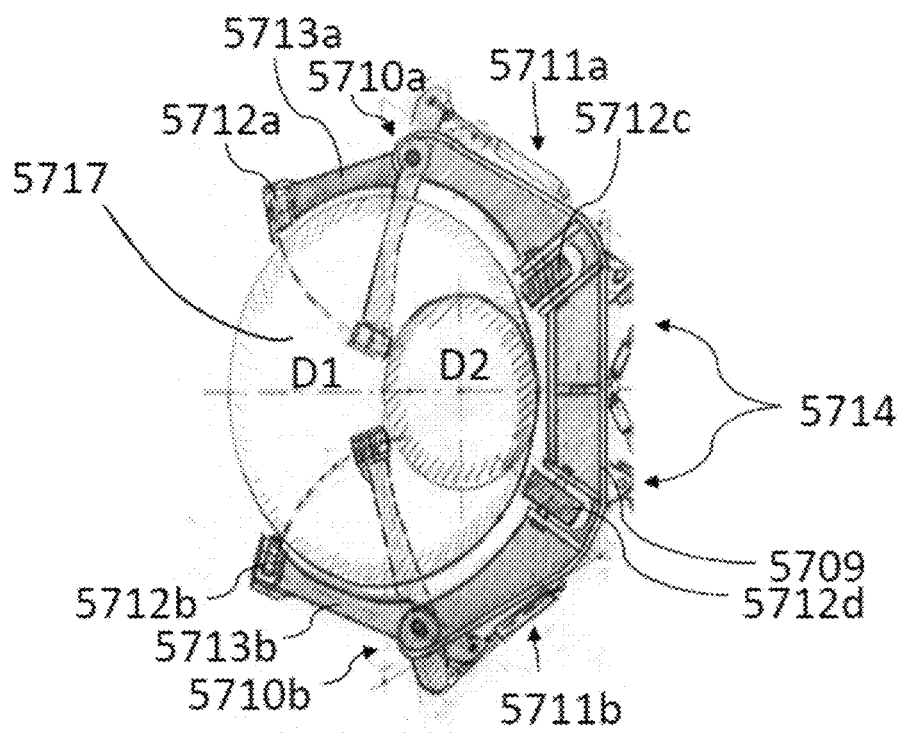
FIG. 59 illustrates a mooring gadget, which is part of the blade switching tool.

FIG. 59 shows one possible embodiment of a mooring gadget (5701 and 5702 as shown in FIGS. 54-58). In this case, the mooring gadget may be adjustable such that it is able to maintain grip of a tower of a wind turbine (for example as shown in FIGS. 54-58) as the diameter of the turbine tower changes with the height of the turbine tower. In the embodiment shown, the mooring gadget 5701, 5702 comprises an adjustable frame 5709, which facilitates adjustment of the various diameters ranging from a larger diameter D1 at the lower position, which may correspond to the diameter of the mooring gadget 5701,5702 when attached to the turbine tower 201, to a smaller diameter D2 which may correspond to the dimeter of a turbine tower at an upper position, for example proximate a nacelle.

In this embodiment, the frame 5709 comprises a fixed portion, which is generally C-shaped, with two arms 5713a-b which are moveable relative to the fixed portion. Each of the arms 5713a-b extends from either extremity of the fixed portion of the frame 5709, and are coupled to the fixed portion of the frame 5709 by a pivoting arrangement, which permits each of the arms 5713a-b to rotate about an axis running parallel to the plane of the C-shaped fixed portion. The fixed portion of the frame 5709 and the arms 5713a-b define a central recess 5717, for example in which a tower of a wind turbine may be located. In the fixed portion of the frame 5709, two recesses are provided, in which two translation members 5712c-d (which are in this case wheels) are positioned. Further, two further translation members 5712a-b (which in this case are also wheels) are positioned at the extremity of each of the arms 5713a-b. Although not shown in detail, the translation members 5712c-d may also be wheels. The frame 5709 also comprises a first and a second biasing arrangement 5711a-b for biasing the rotation of each of the arms 5713a-b to rotate in the direction towards the centre of the recess 5717 defined by the fixed portion of the frame 5009 and the arms 5713a-b. The biasing arrangement 5711a-b may be any appropriate biasing arrangement, such as a spring, a piston and cylinder, or the like. In this way, when an item (e.g. a shaft or a tower of a wind turbine) is positioned in the recess of the frame 5709, the arms have a gripping effect on said item, as they are biased to rotate towards the recess, now occupied by said item. As is shown in FIG. 59, when an item such as a shaft or tower of a wind turbine is positioned in the recess of the frame 5709, all four translation members 5712a-d are in contact with the item (e.g. the shaft, wind-turbine tower etc.) and are held in contact as a result of the arms 5713a-b being biased to rotate towards the centre of the recess. As shown in FIG. 59, each of the translation members 5712a-d are wheels, which enables rolling contact of the frame 5709 in the direction in line with the longitudinal axis of an item positioned in the recess thereof, in this case a shaft such as that of a wind turbine tower. The described configuration also has the benefit that, as the frame 5709 translates relative to the shaft, which may be a wind-turbine tower etc., any changes in diameter thereof may not affect the ability of the frame 5709 to grip the shaft, and maintain the translation members 5712a-d in contact with said shaft, which may be a wind-turbine tower etc.

In another embodiment, the frame 5709 may grip a shaft comprising guiding rails or another comparable system to assist in maintaining contact with the turbine tower 201. Further, such guiding rails may comprise teeth, or recesses, and the translation members 5712*a-d* may be in the form of wheels, also comprising teeth, such that the frame 5709 and the shaft form a rack-and-pinion style connection. Also shown in FIG. 59 are shown examples of a shaft of diameters D1 and D2. The diameters D1 and D2 may be on the same shaft, or may relate to two different shafts. However, FIG. 59 illustrates how the frame (in this case of a mooring gadget) is able to grip a shaft inserted therein. As shown mooring gadget 5701,5702 may adjust to the various diameters of the turbine tower 201 and provide a stable connection over a broad range of possible shaft diameters. The skilled reader will also understand that the dimensions of the mooring gadget 5701, 5702 are able to be changed to accommodate the anticipated use of the mooring gadget. On the right side of the drawing a connection 5714 towards the compartment 5703 is shown, which preferably has a rotational mount to enable addressing of multiple blade compartments to exchange an old blade with a new one.

Figure 60:
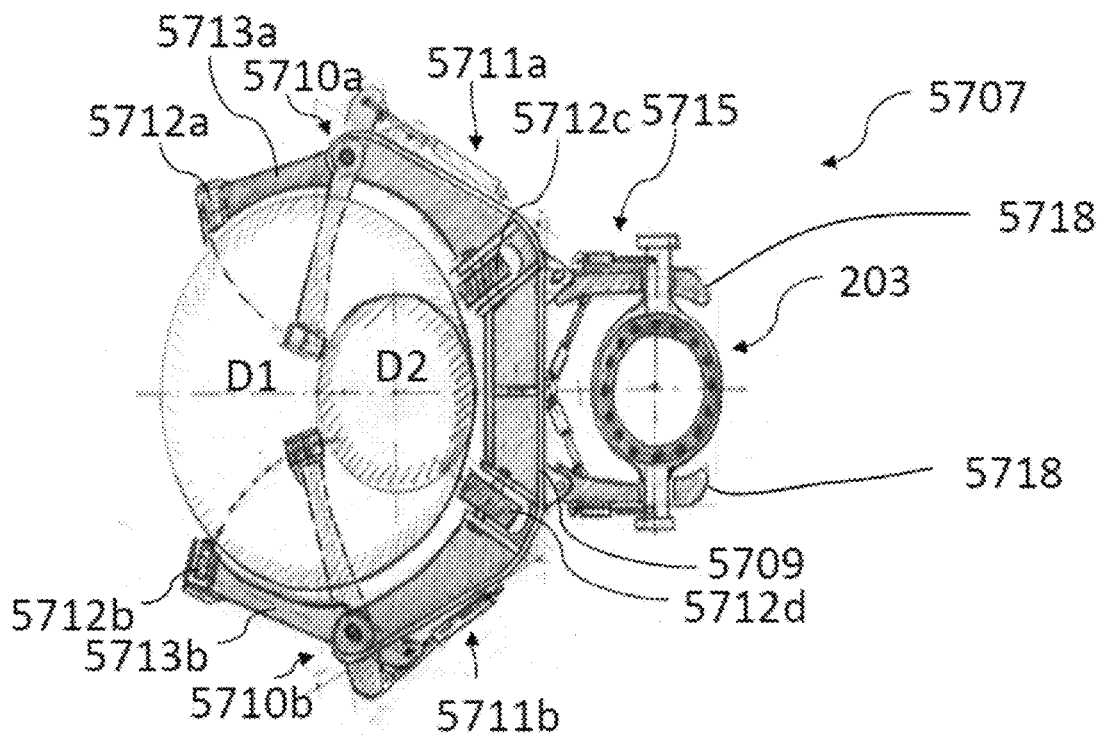
FIG. 60 illustrates another embodiment of a blade switching tool from a top view.

FIG. 60 shows another embodiment of a blade switching tool 5707, wherein a tool 5707, bearing similarities to the frame 5709 described in reference to FIG. 59 comprises an engagement interface 5715 for engaging and holding an object, in this case a rotor blade 203 for a wind turbine. As shown in FIG. 60, the tool has many components in common with that shown in FIG. 59 and for the sake of succinctness, the parts in common will not be described again. In this embodiment, the blade 203 is not stored in a compartment, but rather held by the engagement interface 5715, which is coupled to the frame 5709. The frame may then be attached to a turbine tower which, as previously described, may provide rolling contact between the frame 5709 and a turbine tower 201, thereby enabling an object (e.g. a wind turbine blade) to be raised and lowered relative to said wind turbine tower 201.

In the depicted embodiment, the engagement interface comprises two fork-like arms which extend outwardly from the frame 5709 in a direction generally opposite to that of arms 5713*a-b* of the frame 5709 (see FIG. 59), which are configurable to support blade 203. The person skilled in the art will understand that any other appropriate mechanism may be used, such as hooks. As shown in FIG. 60, the blade 203 comprises two laterally extending pins 5718 which are positionable on the engagement interface such that the blade is supported, under its own weight, thereon. As shown, when engaged with the engagement interface, the longitudinal axis of the blade may be substantially parallel to the wind turbine tower.

Figure 61:
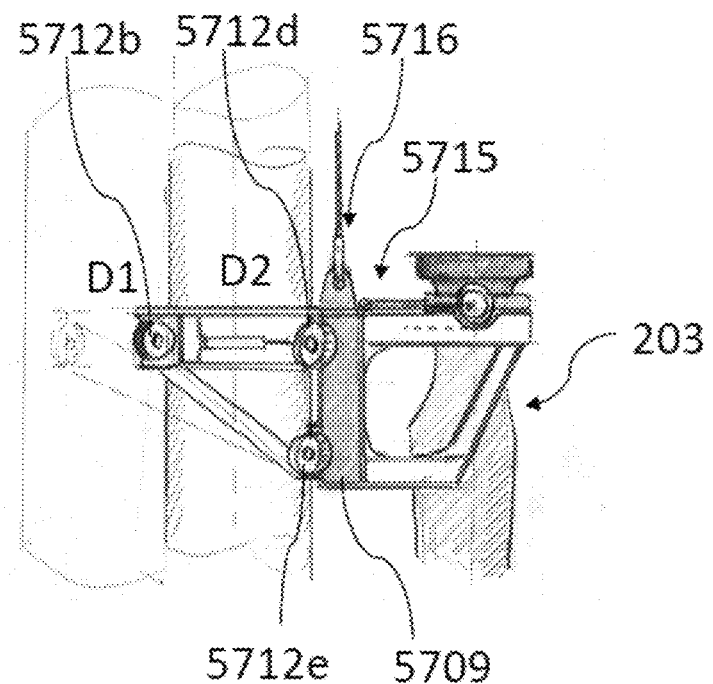
FIG. 61 illustrates the embodiment of a blade switching tool from FIG. 60 from a side view.

FIG. 61 shows a side view of the blade switching tool provided in FIG. 60. In this figure, there are illustrated means for moving the frame 5709 and associated blade switching tool 5700 with a blade 203 engaged in the engagement interface 5715 relative to a turbine tower 201 and towards a nacelle (not shown in FIG. 61, see FIG. 58, for example). In this embodiment means 5716 for moving the blade switching tool 5700 upwards are coupled to the blade switching tool 5707 at a location intermediate the frame 5709 and the engagement interface 5715. Although not fully shown these means 5716 for moving the switching tool 5700 upwards may comprise a cable, which may be attached to a winch mechanism, which may be mounted on the floatable wind power plant 4000, for example proximate a nacelle 202. In another embodiment there may be means 5716 such as a rack railway or any of guiding wheels 5712*a-f* may be attached to a motor to propel the blade switching tool upward.

The described methods may provide the ability to easily switch the rotor blades of a floatable wind power plant using a mechanism provided on a wind turbine itself, as the first depicted switching tool does not need further vessels or tools to operate. It also may enable to switch a rotor blade in one single step without the requirement for having a separate step of removing the old rotor blade prior to installing the new rotor blade. The second shown blade switching tool can be simply mounted on a turbine tower and may either be attached to and dismounted from the turbine tower 201 when required or remain mounted to one turbine tower 201 and used when required. This blade switching tool provides easy access to the wind turbine tower 201, but needs means for the transport of the old/new blade, e.g. a vessel.

According to this aspect, there are provided the following numbered clauses, each of which making up inventive aspects provided by the present disclosure:

Clause L1. A turbine blade switching tool (5700) for the replacement of a rotor blade (203) on a wind turbine (3001), the blade switching tool (5700) comprising at least one compartment (5703) in which to store a rotor blade (203), and a buoyancy arrangement for selectively controlling the buoyancy of the turbine blade switching tool (5700) so as to assist to manoeuvre a blade (203) on a wind turbine into one of the at least one compartment (5703).

Clause L2. A switching tool (5700) according to clause L1, wherein the switching tool (5700) is selectively ballastable and deballastable to reach an operational position.

Clause L3. A switching tool (5700) according to clause L1 or L2, wherein there are two compartments (5703), one for the old rotor blade (203) and one for the new rotor blade (203).

Clause L4. A switching tool (5700) according to any of clauses L1 to L3, wherein the switching tool (5700) comprises means for detaching a rotor blade (203) from a nacelle (202).

Clause L5. A switching tool (5700) according to clause L6, wherein the switching tool (5700) comprises means for attaching a rotor blade (203) to the nacelle (202).

Clause L6. A switching tool (5700) according to any of clauses L1 to L5, wherein at least one mooring gadget (5701,5702) is adjustable in diameter.

Clause L7. A switching tool (5700) according to any of clauses L1 to L6, wherein the switching tool (5700) moves up the tower by mechanical means (5706), comprising a winch.

Clause L8. A switching tool (5700) according to any of clauses L1 to L7, wherein the switching tool (5700) comprises a gliding device (5704).

Clause L9. A method of switching a rotor blade (203) of a floatable wind power plant (4000), the method comprising:
 a. attaching a switching tool (5700) to the floatable wind power plant (4000) using at least one mooring gadget (5701,5702)
 b. bringing the switching tool (5700) in an operational position
 c. removing an old rotor blade (203) from a nacelle (202) and storing it in an compartment (5703).

Clause L10. A method according to clause L9, wherein a new rotor blade (203), which was stored in a second compartment (5703), is mounted to the nacelle (202).

Clause L11. A method according to clause L9 or L10, wherein at least one mooring gadget (5701,5702) is adjustable in diameter.

Clause L12. A method according to any of clauses L9 to L11, wherein the switching tool (5700) moves up the tower by mechanical means (5706), comprising a winch.

Clause L13. A method according to any of clauses L9 to L12, wherein the switching tool (5700) comprises a gliding device (5704).

Clause L14. A switching tool (5707) comprising at least one mooring gadget (5701), a holding mechanism (5715) to hold a rotor blade (203) and means (5716) to be lifted upward at a turbine tower (201).

Clause L15. A switching tool (5707) according to clauses L14, wherein the switching tool (5707) comprises means for detaching the rotor blade (203) from a nacelle (202).

Clause L16. A switching tool (5707) according to clause L14 or L15, wherein the switching tool (5707) comprises means for attaching the rotor blade (203) to a nacelle (202).

Clause L17. A switching tool (5707) according to any of clauses L14 to L16, wherein at least one mooring gadget (5701) is adjustable in diameter.

Clause L18. A switching tool (5700) according to any of clauses L14 to L17, wherein the means (5716) for lifting the switching tool (5707) upwards comprise a winch.

Clause L19. A switching tool (5700) according to any of clauses L14 to L18, wherein the adjustable mooring gadget (5701) comprises arms (5713*a-b*) on rotary joints (5710*a-b*), wherein the arms are pushed towards the turbine tower (201) by hydraulic cylinders (5711*a-b*).

Clause L20. A switching tool (5700) according to any of clauses L14 to L19, wherein the adjustable mooring gadget (5701) comprises multiple wheels (5712*a-b*).

Figure 18:
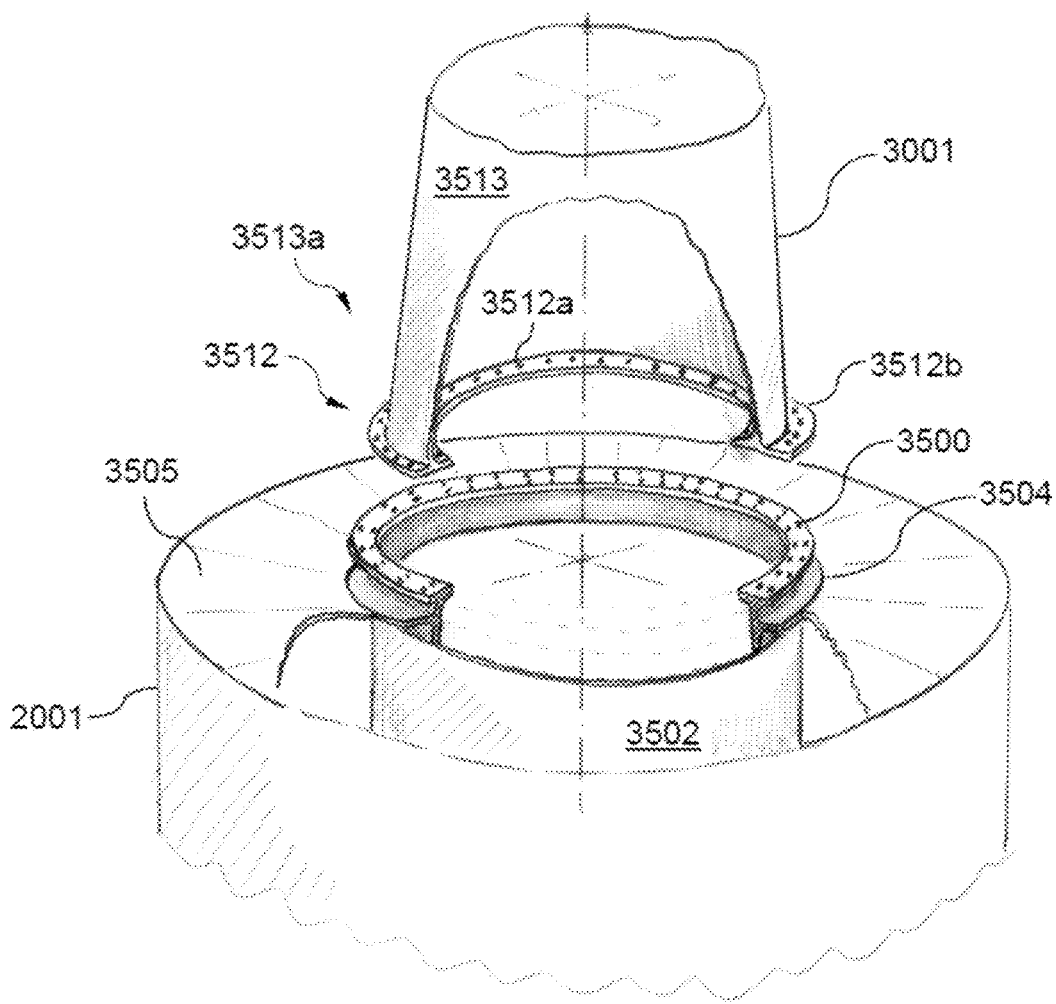
FIGS. 18-20 illustrate a support substructure for supporting a wind turbine tower on a floatable wind energy power plant
Figure 19:
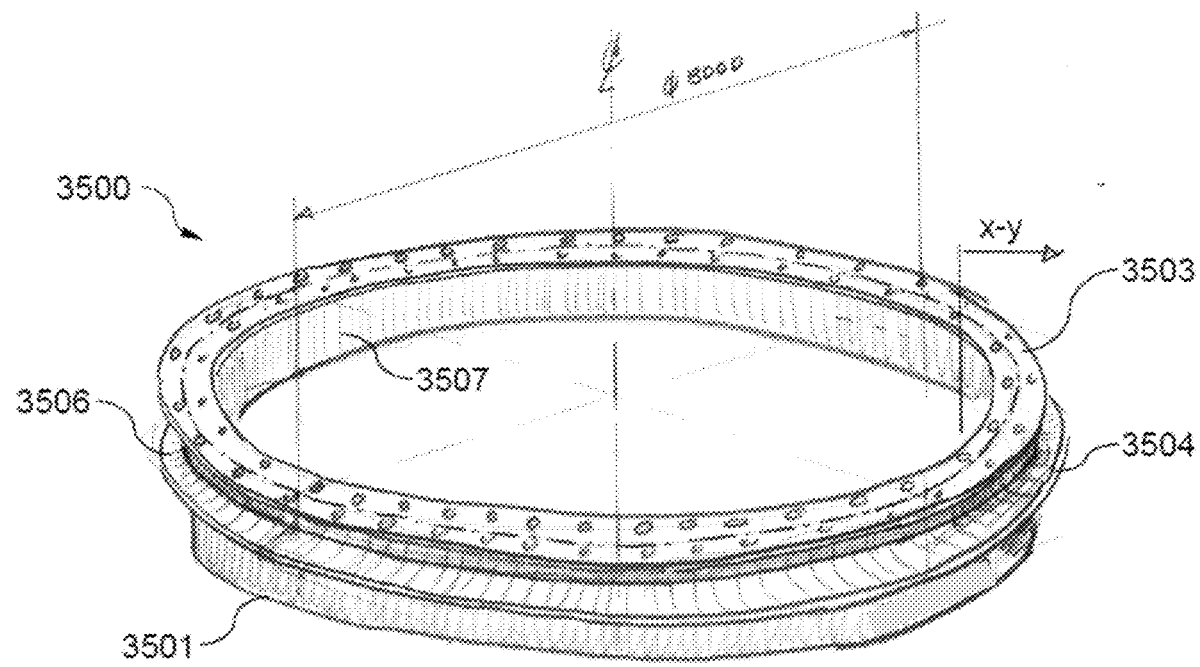
Figure 20:
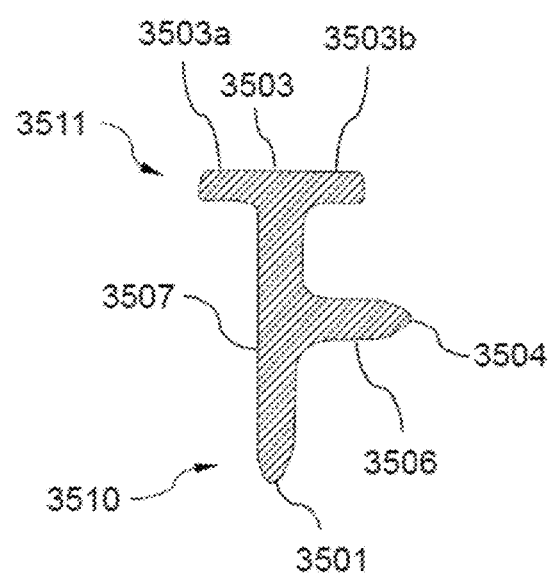

Referring now to FIGS. 18-20, a wind energy power plant 4000 may comprise a support substructure 3500 for supporting a wind turbine tower 3001 on the wind energy power plant 4000. The power plant 4000 may, for example, be a power plant as illustrated in FIG. 1*a,b*, 7 or 8, or any other type of power plant design described herein or elsewhere. The support substructure 3500 may be used with a floating wind energy power plant 4000 of any type, for example such power plants having cylindrical columns or flat plate geometry columns, for example as described above, or with fixed installations. The support substructure 3500 may be particularly advantageous for floating installations, however.

FIG. 18 illustrates the support substructure 3500 arranged between a wind turbine tower 3001 and a column 2001 of a power plant 4000. FIG. 19 illustrates the support substructure 3500, and FIG. 20 shows a cross-section view of a vertical cut in a plane indicated by axes x-y in FIG. 19.

The support substructure 3500 comprises a substantially cylindrical, rigid body 3507. The body 3507 may be, for example, a ring-shaped metal structure, such as a steel structure. The body 3507 has a first, lower interface 3501 arranged at a lower part 3510 of the body 3507 and configured for interfacing an inner support structure 3502 (FIG. 18) of a column 2001 of the floatable wind energy power plant 4000. The inner support structure 3502 may be, for example, an inner cylindrical structure fixed inside the column 2001, an internal truss structure, or the like.

A second, upper interface 3503 is arranged at an upper part 3511 of the body 3507 and configured for connecting to and holding the wind turbine tower 3001. In the illustrated embodiment, the second interface 3503 comprises a flange with a first flange part 3503*a* (FIG. 20) extending radially inwardly from the body 3507 and an opposing, second flange part 3503*b* extending radially outwardly from the body 3507. Each of the first and second flange parts 3503*a,b* are configured for being fixed to corresponding first and second tower flange parts 3512*a,b* (FIG. 18) on the wind turbine tower 3001.

The first and second flange parts 3503*a,b* and the first and second tower flange parts 3512*a,b* are configured to be connected by means of a plurality of bolts. Optionally, alternative fixation means can be used, such as clamps or a welded connection.

The support substructure 3500 further comprises a third, side interface 3504 configured for interfacing a horizontal superstructure 3505 (FIG. 18) of the column 2001. The horizontal superstructure 3505 may, for example, be a horizontal plate arranged on the top of the column 2001, such as a steel plate. The horizontal superstructure 3505 may be fixed to the inner support structure 3502, for example by means of an internal truss structure or support members internally in the column 2001. Alternatively, the horizontal superstructure 3505 and the top section of the inner support structure 3502 may not have any direct mechanical connection beyond that provided by the support substructure 3500.

The third interface 3504 is provided on an extension 3506 which is arranged radially outwardly on the body 3507 and located between the first and second interfaces 3501,3503.

Advantageously, a support substructure 3500 according to embodiments described here can provide enhanced performance, particularly in a floating wind power plants. Such power plants have particular and demanding requirements for structural components, due to the complex interaction of forces from waves, wind and internal structural interactions. The support substructure 3500 provided allows substantially vertical forces to be distributed downwardly in the column structure via the lower interface 3501, while substantially horizontal forces can be distribute via the side interface 3504 to the horizontal superstructure 3505. The shape and configuration of the support substructure 3500 provides enhanced load distribution, structural stability and resistance to, for example, fatigue when subjected to cyclic loads over long periods of time. The upper flange design (and corresponding tower flange design) provides enhanced and simplified connection of the turbine tower to the column, in particular in relation to pre-tensioning of the connection members (e.g. bolts), which also provides enhanced load distribution, structural stability fatigue resistance.

According to these aspects, there are provided the following numbered clauses, each of which making up inventive aspects provided by the present disclosure:

Clause M1. A support substructure (3500) for supporting a wind turbine tower (3001) on a floatable wind energy power plant (4000), the support substructure (3500) comprising:
- a substantially cylindrical, rigid body (3507),
- a first interface (3501) arranged at a lower part (3510) of the body (3507) and configured for interfacing an inner support structure (3502) of a column (2001) of the floatable wind energy power plant (4000),
- a second interface (3503) arranged at an upper part (3511) of the body (3507) and configured for connecting to and holding the wind turbine tower (3001),
- a third interface (3504) configured for interfacing a horizontal superstructure (3505) of the column (2001),
- wherein the third interface (3504) is provided on an extension (3506) arranged radially outwardly on the body (3507) between the first and second interfaces (3501,3503).

Clause M2. A support substructure (3500) according to the preceding clause M1, wherein the second interface (3503) comprises a flange, the flange having a first flange part (3503*a*) extending radially inwardly from the body (3507) and an opposing, second flange part (3503*b*) extending radially outwardly from the body (3507).

Clause M3. A support substructure (3500) according to the preceding clause M2, wherein each of the first and second flange parts (3503*a,b*) are configured for being fixed to corresponding first and second tower flange parts (3512*a,b*) on the wind turbine tower (3001).

Clause M4. A support substructure (3500) according to the preceding clause M3, wherein the first and second flange parts (3503*a,b*) and the first and second tower flange parts (3512*a,b*) are configured to be connected by means of a plurality of bolts.

Clause M5. A column (2001-2003) for a floatable wind energy power plant (4000) comprising a support substructure (3500) according to any preceding clause M1-M4.

Clause M6. A column (2001-2003) according to the preceding clause M5, comprising the wind turbine tower (3001) and wherein the wind turbine tower (3001) comprises an elongate, cylindrical tower structure (3513) having a tower flange (3512) arranged at its lower end (3513*a*).

Clause M7. A column (2001-2003) according to the preceding clause M6, wherein the first tower flange part (3512*a*) extends radially inwardly in relation to the cylindrical tower structure (3513) and the second tower flange part (3512*b*) extends radially outwardly in relation to the cylindrical tower structure (3513).

Clause M8. A floatable wind energy power plant (4000) having a column (2001-2003) according to any of clauses M5-M7.

Clause M9. A floatable wind energy power plant (4000) having a column (2001-2003) and a wind turbine tower (3001) fixed to the column via a support substructure (3500) according to any of clauses M1-M4.

Figure 62:
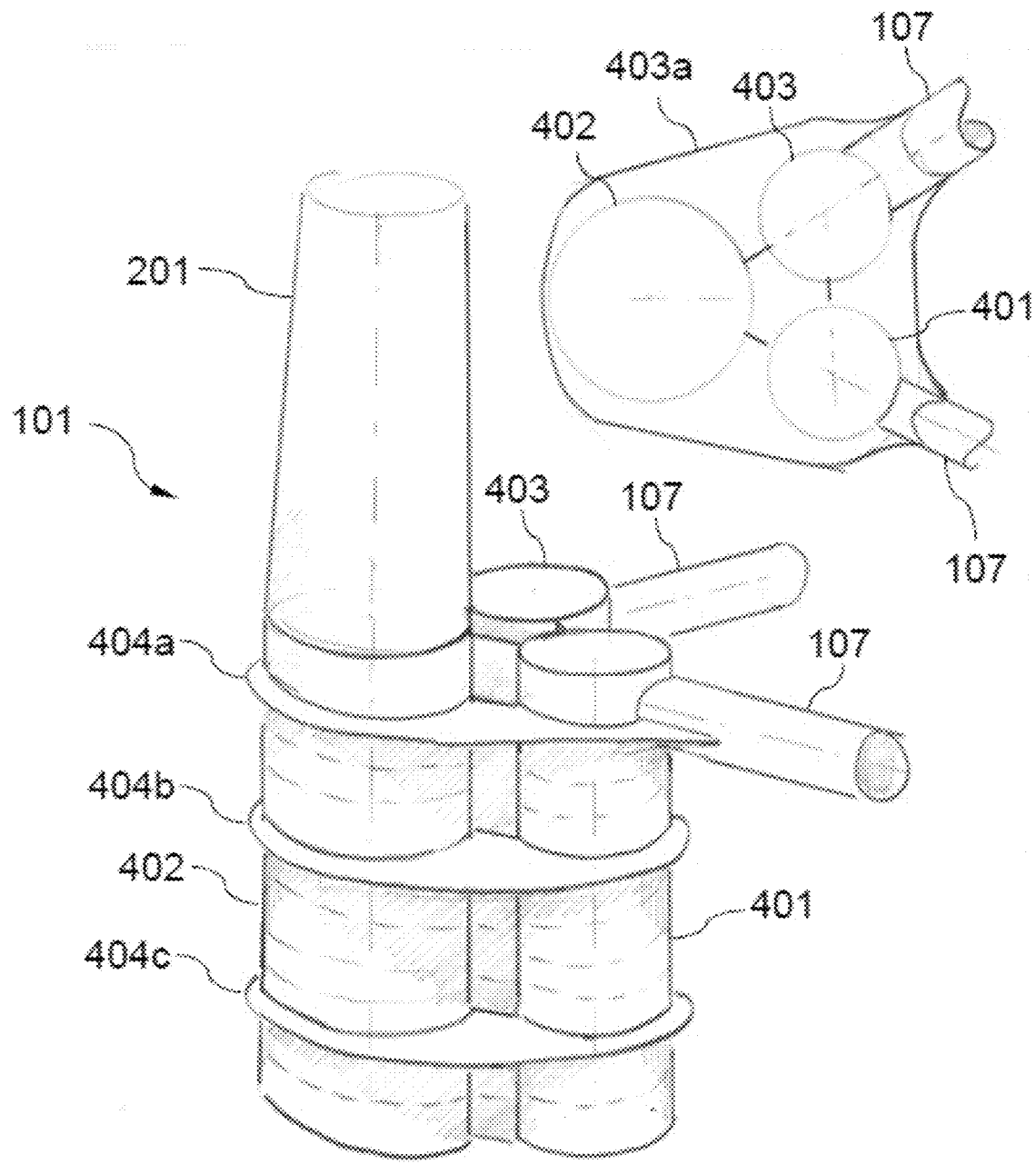
FIG. 62 illustrates parts of an embodiment of a wind energy power plant.

According to yet further aspects, FIG. 62 illustrates parts of an embodiment of the power plant. The embodiment may include one or more of the features described above in relation to FIGS. 1*a* and 1*b* or of the other aspects and embodiments described above. In this embodiment, the column 101 (and, optionally, one or both of the columns 102,103) comprise a plurality of elongate members 401,402, 403 connected by means of support members 404*a-c*. The support members 404*a-c* may provide horizontal and vertical support between the elongate members 401,402,403. For example, each of the support members 404*a-c* may provide both horizontal and vertical support between the elongate members 401,402,403, or one or more of the support members 404*a-c* may provide vertical support and one or more of the support members 404*a-c* provide horizontal support.

The elongate members 401,402,403 may be spaced, whereby they will not be in contact and will not interfere with each other.

In these embodiments, the manufacturing of the floater 100 may be simplified, in that the elongate members 401, 402,403 may be manufactured separately and assembled at a later time, when the floater 100 is being assembled and constructed. This may allow manufacturing processes to be optimized.

One of the elongate members 402 may have a larger cross-section area than the other elongate members 401,403. For example, if the elongate members 402 are cylindrical or have a circular cross-section, the diameter of the larger elongate member 402 may be larger than that of the other elongate members 401,403. In such an embodiment, the tower 201 may be fixed to the larger elongate member 402. The interconnection between the columns 101,102,103 may be via the other elongate members 401,403, as shown in FIG. 5. In this embodiment, the different elongate members 401,402,403 may be better optimized for their individual purpose, for example the larger elongate member 402 may be designed specifically to hold the tower 201, while the elongate members 401,403 may be designed specifically for the interconnection between the columns 101,102,103. This may allow a more purpose-specific design of the different element, for example in relation to their structural strength, fatigue resistance, interconnections, etc.

The column 101 may comprise ballast tanks or chambers. The ballast tanks or chambers may, in an embodiment as shown in FIG. 62, be arranged in one or more of the elongate members 401,402,403. For example, the ballast tanks may be arranged in the larger elongate member 402 only, or in the other elongate members 401,403 only. This may allow an optimized design and utilization of space, in that, for example, equipment related to the wind generator may be placed in the larger elongate member 402 without interference from a ballast system, if the ballast tanks/chambers are arranged in the other elongate members 401,403.

In yet further aspects, we provide methods and assemblies for a floatable power plant.

Figure 63:
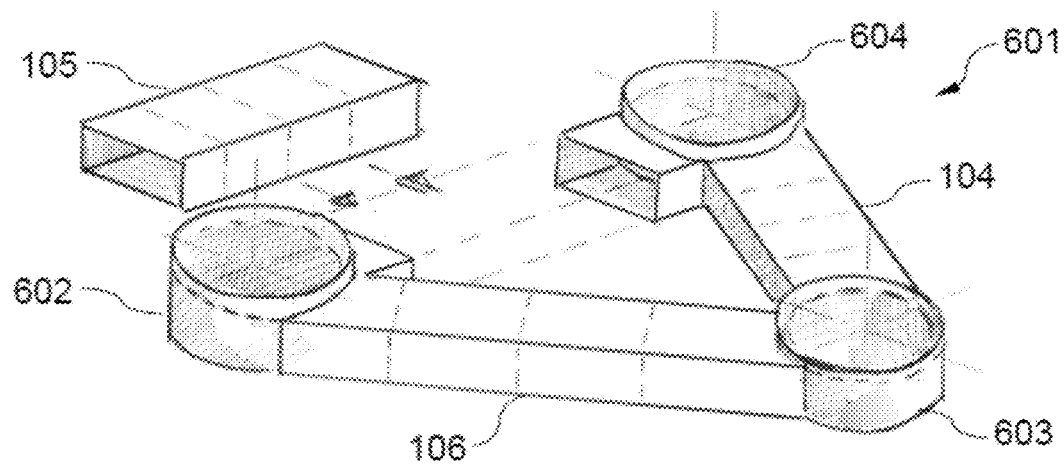
FIG. 63 illustrates a base for a floater according to an embodiment.

FIG. 63 illustrates parts of a floater 100 for a floatable power plant, such as that illustrated in FIGS. 1*a* and 1*b* or the other figures, more specifically a base 601. The base 601 comprises three elongate connection members, which is this embodiment are pontoon units 104-106, similarly as described above. The connection members may, alternatively, be beams or equivalent, for example similarly as described in the abovementioned WO 2009/131826 A2 and WO 2013/110276 A1.

The base 601 further comprises three corner members 602-604. Each corner member 602-604 is fixed to and interconnects two of the connection members, in this case pontoon units 104-106. The connection between the corner members 602-604 and the respective connection members may be a welded, bolted, or other type of connection. The connection may be similar as described above, and the corner members 602-604 may be provided with planar surfaces (similar to planar surface 108 described above) to facilitate connection.

The base 601 according to this embodiment may thus be manufactured in parts (e.g., manufacturing the corner members 602-604 separately and the pontoon units 104-106 separately) and assembled together into the base 601 as indicated in FIG. 6. Optionally, the base 601 may be pre-fabricated as a single unit, i.e. not as an assembly of parts. Such a single unit may be advantageous in some instances, for example where fabrication capability allows the base to be manufactured near an installation site.

The base 601 may submergible, and the base 601 may have a positive buoyancy, or selectively positive buoyancy (the latter being the case if the base 601, for example, comprises ballast chambers).

Figure 64:
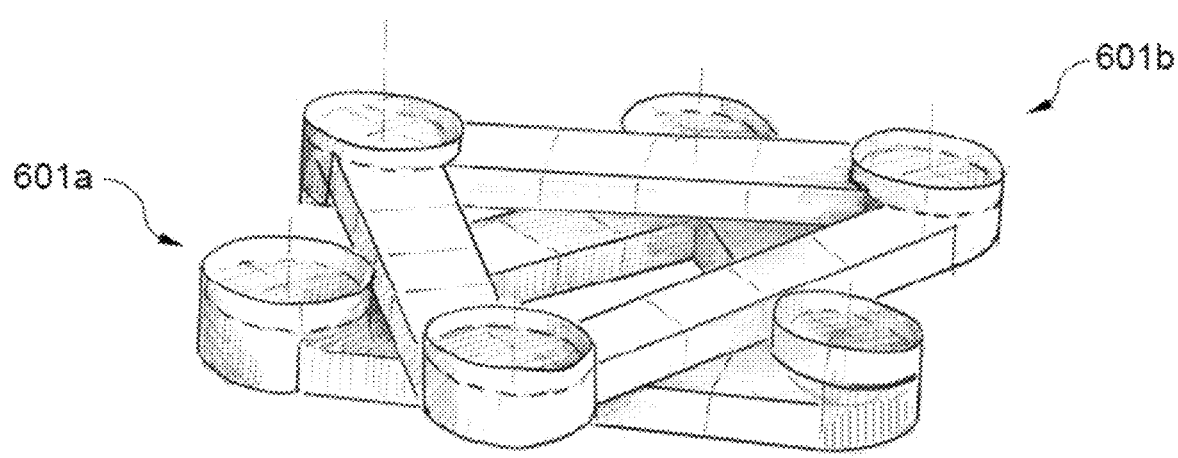
FIG. 64 illustrates stacked bases according to an embodiment.

FIG. 64 illustrates an example of, by means of a base 601 according to that illustrated in FIG. 63, transport or storage of a plurality of such bases, here indicated as base 601*a* and base 601*b*, can be done. FIG. 64 illustrates two bases 601*a*,601*b*, however further bases may be stacked vertically, as shown. Advantageously, the bases 601*a*,601*b* are stacked such that the connection members of one base 601*b* rests on the connection members of another base 601*a*. This obviates the need for the corner members 602-604 to carry loads when stacking such bases for storage or transport, which may be beneficial in order that structure on the corner members 602-604 remain intact and undamaged, for example interconnection points towards columns (see below).

Figure 65:
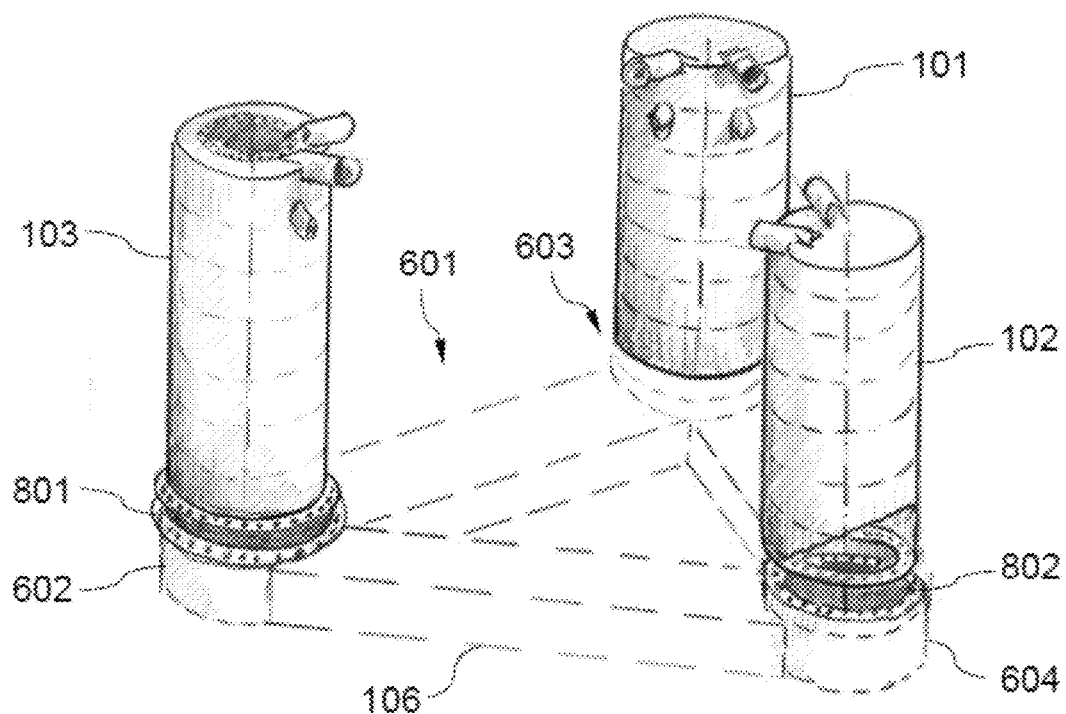
FIGS. 65 and 66 illustrate parts of a floater according to an embodiment.

FIG. 65 illustrates the base 601 (indicated by dashed lines) with three columns 101-103 arranged thereon. Each column 101-103 is arranged on a respective corner member 602-604, whereby a lower end of each column 101-103 is fixed to the corner member 602-604, and thereby to the base 601. The connection between the columns 101-103 and the respective corner member 602-604 may be, for example, a bolted connection, as indicated in FIG. 65, a welded connection, or any other type of mechanical connection. The corner members 602-604 may be provided with receiver parts, illustrated as 801,802 in relation to corner members 602 and 604, to receive the respective column 101-103 and fix the column 101-103 on the corner member 602-604. The columns 101-103 may be provided with corresponding connection parts at their lower ends to engage the receiver parts 801,802.

Figure 66:
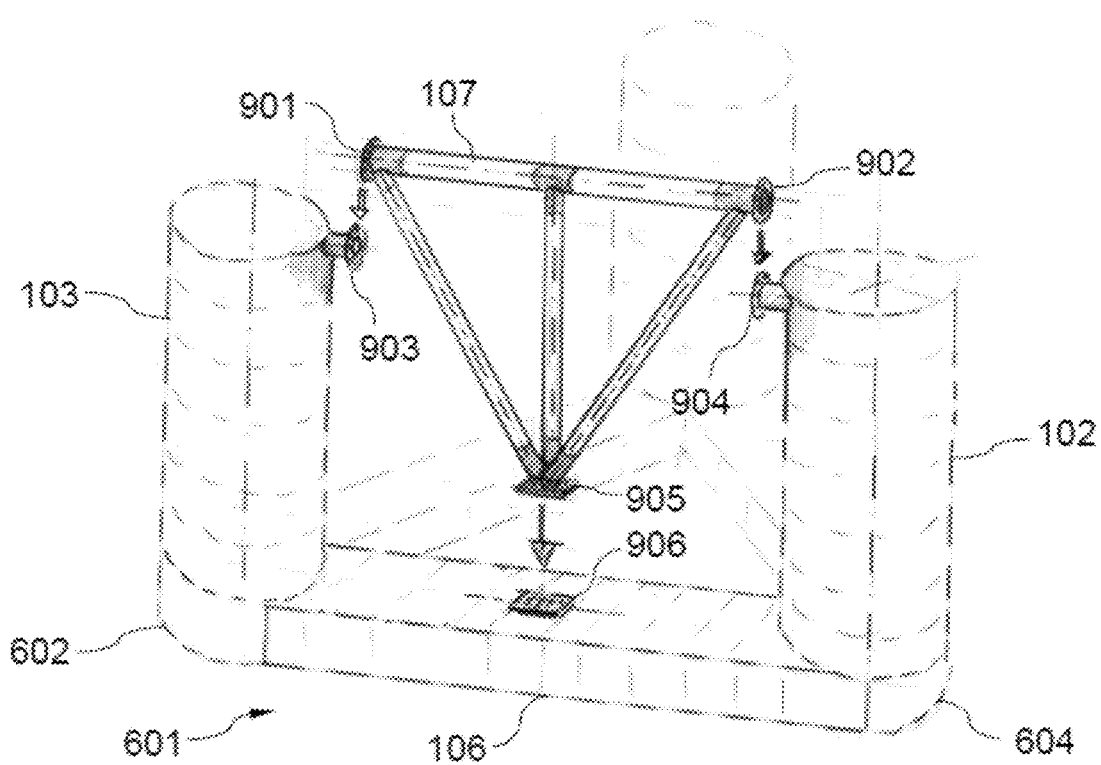

FIG. 66 illustrates the base 601 having three columns 101-103 arranged thereon, as in FIG. 65, and with a truss structure 107 arranged between columns 102 and 103. It will be understood that similar truss structures are arranged between columns 101 and 103, and between columns 101 and 102. The truss structure 107 extends between upper parts of two columns 102,103 and comprises connectors 901 and 902, configured to engage and be fixed to corresponding connectors 903,904 arranged on the upper part of each column 102,103.

The truss structure 107 further comprises a connector 905 configured to engage a corresponding connector 906 on the connection member, which in this embodiment is a pontoon unit 106.

While the columns 101-103 in FIGS. 65 and 66 are illustrated as circular columns, they may equally well have a different cross-sectional shape, for example polygonal as illustrated above in relation to FIGS. 2-6.

According to these aspects, the manufacturing and assembly of a floatable power plant may be made more efficient and flexible, for example in relation to the facilities required at the manufacturing site. This may allow, for example, assembly of a floatable power plant at a quayside or shoreside without deepwater facilities.

According to these aspects, and with reference particularly to FIGS. 1-6 and 63-66, there are provided the following numbered clauses, each of which making up inventive aspects provided by the present disclosure:

N1. A floater (100) for a floatable power plant, the floater comprising
a plurality of columns (101,102,103),
wherein each column (101,102,103) is connected to at least two of the other columns (101,102,103) by means of connection members (104-107),
and wherein one of the columns (101) is configured to support a wind turbine (200).

N2. A floater (100) according to clause N1, wherein the column (101) configured to support the wind turbine (200) is configured to support the wind turbine (200) in a position vertically above the column (101).

N3. A floater (100) according to any of clauses N1 or N2, wherein:
a center axis of a wind turbine tower (201) coincides with a center axis of the column (101), or
the center axis of the wind turbine tower (201) is parallel but spaced from the center axis of the column (101).

N4. A floater (100) according to any of clauses N1-N3, wherein each column (101,102,103) has a lower part (103b) configured to be submerged in an operational state of the floater (200), and an upper part (103a) configured to be non-submerged in the operational state of the floater (200).

N5. A floater (100) according to any of clauses N1-N4, wherein each column (101,102,103) is provided with a ballasting system configured to selectively increase or decrease an amount of ballast water present in the respective column (101,102,103).

N6. A floater (100) according to any of clauses N1-N5, wherein the floater (100):
is provided without an active ballasting system operable to move ballast water between the columns (101,102, 103), or
is provided with an active ballasting system operable to move ballast water between the columns (101,102, 103).

N7. A floater (100) according to any of clauses N1-N6, wherein the connection members (104-107) comprise pontoon units (104,105,106).

N8. A floater (100) according to clause N7, wherein the pontoon units (104,105,106) extend substantially horizontally between lower parts (103b) of the columns (101,102, 103).

N9. A floater (100) according to any of clauses N1-N8, wherein the pontoon units (104,105,106) comprise ballast chambers which can be selectively ballasted or de-ballasted.

N10. A floater (100) according to any of clauses N1-N9, wherein the pontoon units (104,105,106) comprise void buoyancy chambers such that the pontoon units (104,105, 106) has permanent positive buoyancy in water.

N11. A floater (100) according to any of clauses N1-N10, comprising a substantially horizontal plate (104a,106a) arranged between the lower parts (103b) of two or more of the columns (101,102,103).

N12. A floater (100) according to clause N11, wherein the horizontal plate (104a,106a) is a heave plate.

N13. A floater (100) according to any of clauses N1-N12, wherein the horizontal plate (104a,106a) is part of a pontoon unit (104,105,106).

N14. A floater (100) according to any of clauses N1-N13, wherein the horizontal plate (104a,106a) is part a truss structure (107) forming part of the connection members (104-107).

N15. A floater (100) according to any of clauses N1-N14, wherein the connection members (104-107) comprises a truss structure (107).

N16. A floater (100) according to clause N15, wherein:
the truss structure (107) extends between upper parts (103a) of respective columns (101,102,103),
the truss structure (107) extends between lower parts (103b) of respective columns (101,102,103), and/or
the truss structure (107) extends between an upper part (103a) of one column (101,102,103) and a lower part (103b) of another column (101,102,103).

N17. A floater (100) according to any of clauses N1-N16, wherein the columns (101,102,103):
has a substantially circular cross-section, or
has a polygonal cross-section.

N18. A floater (100) according to any of clauses N1-N17, wherein one or more of the columns (101,102,103) has a planar surface (108) which forms an interface between the column (101,102,103) and the connection members (104-107).

N19. A floater (100) according to any of clauses N1-N18, wherein the columns (101,102,103) have a polygonal cross-section and connection members (104-107) are fixed to adjacent planes of the polygonal columns (101,102,103).

N20. A floater (100) according to clause N19, wherein the connection members (104-107) which are fixed to adjacent planes of the polygonal columns (101,102,103) are in direct contact and connected.

N21. A floater (100) according to any of clauses N1-N20, wherein the connection members (104-107) are fixed to planar surfaces (108) of a column (101,102,103), whereby the planar surfaces (108) are each adjacent to an intermediate plane (110) of the column (101,102,103).

N22. A floater (100) according to any of clauses N1-N21, wherein the connection members (104-107) are fixed to planar surfaces (108) of a column (101,102,103), whereby the planar surfaces (108) are adjacent each other.

N23. A floater (100) according to any of clauses N1-N22, wherein at least one of the columns (101,102,103) comprise a plurality of parallel, elongate members (401,402,403) interconnected by support members (404*a-c*).

N24. A floater (100) according to clause N23, wherein each of the parallel, elongate members (401,402,403) are spaced and not in direct contact.

N25. A floater (100) according to any of clauses N1-N24, wherein one of the parallel, elongate members (401,402, 403) has a larger cross-section area than the other parallel, elongate members (401,402,403).

N26. A floater (100) according to clause N25, wherein the larger parallel, elongate member (402) is configured to support the tower (201) of the wind turbine (200).

N27. A floater (100) according to clause N26, wherein the connection members (104-107) are connected to parallel, elongate members (401,403) which do not support the tower (201).

N28. A floater (100) according to any of clauses N1-N27, comprising a substantially triangular base (601) having receiver parts (801,802) adapted to receive and fix three columns (101,102,103) thereon, wherein the base (601) forms at least a part of the connection members (104-107).

N29. A floater (100) according to clause N28, wherein the base (601) is submergible, and/or wherein the base (601) has a positive buoyancy or selectively positive buoyancy.

N30. An assembly of parts interconnectable to form a floater (100) according to any of clauses N1-N29, the parts comprising:
  a substantially triangular base (601) having receiver parts (801,802) adapted to receive and fix three columns (101,102,103) thereon,
  three columns (101,102,103), and
  three truss structures (107), each truss structure (107) configured to be connected between two of the three columns (101,102,103).

N31. An assembly according to clause N30, wherein each truss structure (107) is configured to be connected to the base (601).

N32. An assembly according to clause N30 or N31, wherein each truss structure (107) extends between upper parts (103*a*) of the respective two columns.

N33. An assembly according to any of clauses N30-N32, wherein the assembly comprises
  three elongate connection members (104-106) and three corner members (602-604), and
  wherein each corner member (602-604) is arranged to be fixed to and to interconnect two of the connection members (104-106), such that, when assembled, the three elongate connection members (104-106) and the three corner members (602-604) form at least a part of the base (601).

N34. An assembly according to clause N33, wherein the receiver parts (801,802) are arranged on the corner members (602-604).

N35. An assembly according to any of clauses N30-N34, wherein the base (601) is submergible, and/or wherein the base (601) has a positive buoyancy or selectively positive buoyancy.

N36. An assembly of parts interconnectable to form a base (601) for a floater (100), the assembly of parts comprising:
  three elongate connection members (104-106) and
  three corner members (602-604), whereby
    each corner member (602-604) is arranged to be fixed to and to interconnect two of the connection members (104-106), such that, when assembled, the three elongate connection members (104-106) and the three corner members (602-604) form the substantially triangular base (601).

N37. An assembly according to clause N37, wherein the corner members (602-604) comprise receiver parts (801, 802) adapted to receive and fix three columns (101,102,103) thereon.

N38. An assembly according to any of clauses N36-N37, wherein the base (601) is submergible, and/or wherein the base (601) has a positive buoyancy or selectively positive buoyancy.

N39. A floatable power plant comprising:
  a floater (100) according to any of clauses N1-N29 and/or an assembly according to any of clauses N30-N38, and
  a wind turbine (200).

N40. A method of assembling a floater (100) for a floatable power plant, the method comprising the steps:
  providing a base (601) having three receiver parts (801, 802), each receiver part (801,802) adapted for receiving a column (101,102,103);
  bringing a column (101,102,103) into fixed engagement with the base (601) at each of the receiver parts (801,802); and
  fixing a wind turbine tower (201) to one of the columns (101,102,103).

N41. A method according to clause N40, further comprising the step:
  bringing three truss structures (107) into fixed engagement with the columns (101,102,103).

N42. A method according to clause N41, further comprising the step:
  bringing each of the three truss structures (107) into fixed engagement with the base (601).

N43. A method according to any of clauses N40-N42, further comprising:
  assembling the base (601) from three elongate connection members (104-106) and three corner members (602-604), by arranging each corner member (602-604) to be fixed to and to interconnect two of the connection members (104-106), such that the three elongate connection members (104-106) and the three corner members (602-604) form a substantially triangular base (601).

N44. A method according to any of clauses N40-N43, wherein the base (601) is submergible, and/or wherein the base (601) has a positive buoyancy or selectively positive buoyancy.

According to yet further aspects of this disclosure, methods for construction of a floater of the wind energy power plant is provided. The floater may be substantially similar to that described above in relation to FIGS. 1*a,b*, or it may be of a different design, for example one not having pontoons 104-106 but where the columns 101-103 are interconnected only by means of truss structures.

FIG. 48 is a perspective view of a vessel 4503 having a deck 401 for construction of a floater of a wind energy power plant. As depicted in FIG. 48, the vessel 4503 has a deck 401 on which the floater 100 can be constructed. The vessel 4503 is semi-submersible, and includes vertical structures for buoyancy when submerged (see below.) The vertical structures may also function as support structures for holding various parts of the floater 100, as will also be shown below. The vessel 4503 is thus selectively submersible by altering the ballast in the vessel hull, as is known from semi-submersible structures.

The floater 100 can be constructed on the deck 401 of the vessel 4503 with the deck 401 in a non-submerged state. Certain parts of the floater 100 may be arranged on the deck 401 when in a submerged state, and then the deck 401 is raised.

Alternatively, the vessel 4503 can be a jack-up rig or a self-elevating unit as illustrated in FIG. 49. The legs of the jack-up allow lifting/lowering the vessel 4503 in/out of the sea. Consequently, the floater 100 can be constructed on the deck 401 when the jack-up rig is supported on the sea floor. The jack-up rig is illustrated in FIG. 49 in a simplified manner, however may comprise support structures on the deck 401 to hold parts of the floater 100, cranes to assist in the construction, etc.

Figure 67:
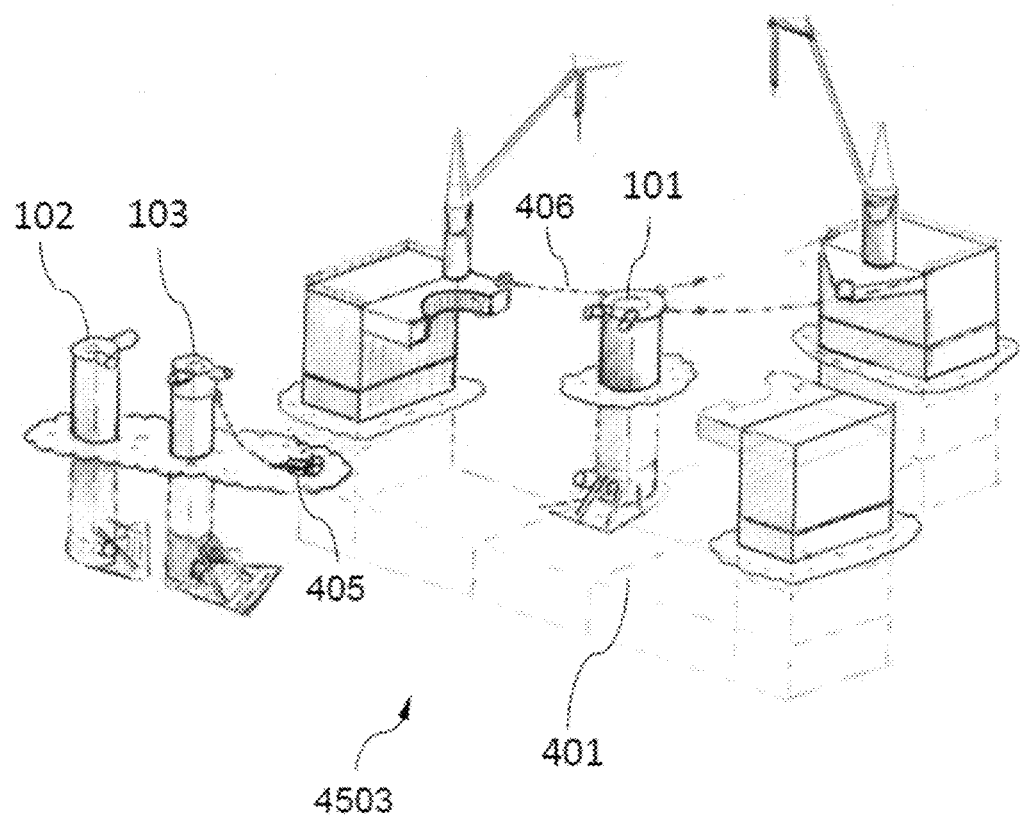
FIG. 67 illustrates parts of a floater on a deck of a vessel.

FIG. 67 illustrates parts of the floater 100 being positioned on the deck 401 of the vessel 4503 according to the embodiment shown in FIG. 48. As depicted in FIG. 67, floating parts of the floater 100 such as the columns 101, 102 and 103 can be floated onto the deck 401 of the vessel 4503 while the deck 401 is in the submerged state.

The columns 101, 102 and 103 of the floater 100 are moved towards the respective support structures of the vessel 4503 such that the support structures hold the columns 101, 102 and 103 of the floater 100 and they are positioned in the correct place.

The columns 101-103 may be towed onto the deck 401 by means of a tug 405, by means of wires and winches 406, by a combination of the two, or by other means.

Figure 68:
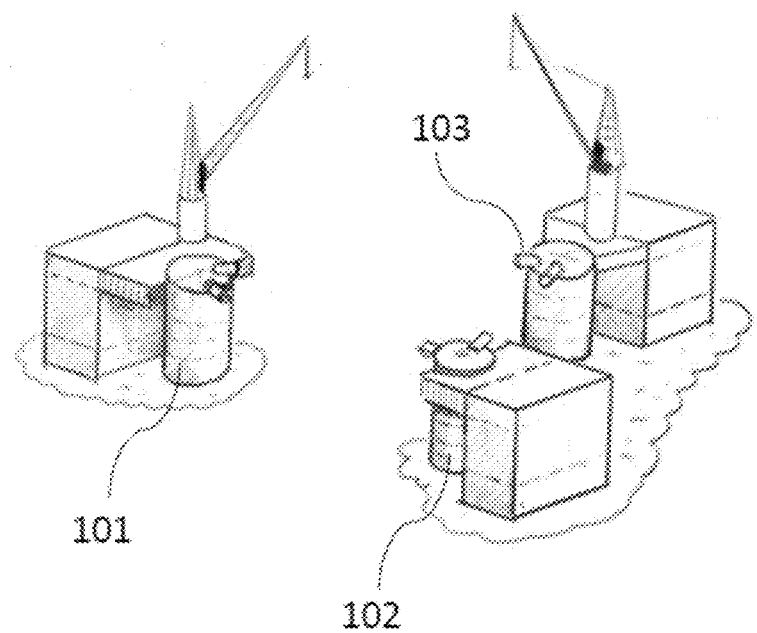
FIG. 68 illustrates parts of a floater connected to a vessel.

FIG. 68 illustrates the columns 101-103 having been positioned in the correct location on the vessel 4503. The support structures of the vessel 4503 hold the columns 101-103. The vessel 4503 can now be de-ballasted such that the deck 401 is raised into the non-submerged position.

Figure 69:
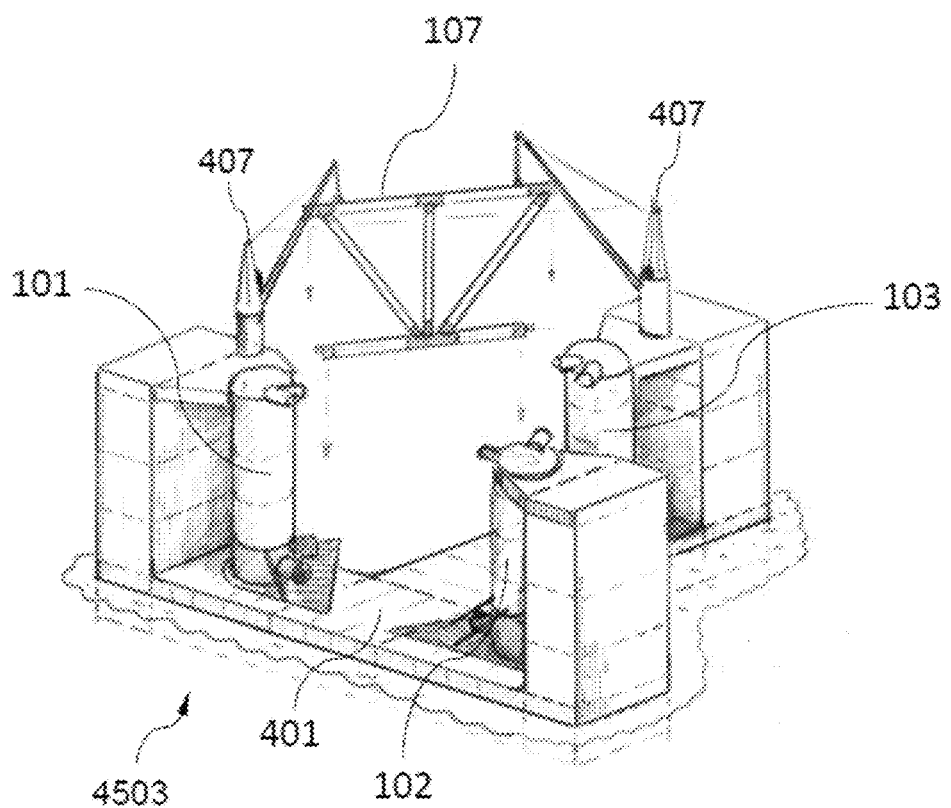
FIG. 69 illustrates a truss structure being inserted between parts of a floater.

FIG. 69 illustrates the vessel 4503 now in the de-ballasted position, where the deck 401 is in the non-submerged position. The columns 101-103 now rest on the deck 401 in their desired positions for construction.

Truss structures 107 can now be arranged between the columns 101, 102 and 103 of the floater 100. Cranes 407 may be provided on the vessel 4503 for hoisting parts into place, and other tools and equipment may similarly be provided. Alternatively, the different components can be hoisted in place from a separate vessel, for example a transport vessel which transports the components to the location of the vessel 4503.

If necessary, the columns 101, 102 and 103 of the floater 100 positioned on the deck 401 can be adjusted for connecting the trusses 107 between the columns 101, 102 and 103. For example, the position of the columns 101, 102 and 103 on the deck 401 may not be positioned sufficiently accurately to allow the trusses 107 to be connected between them, if the tolerances for the connections (e.g. flanges or bolted connections) are smaller than the positioning accuracy for the columns 101-103 when they are positioned on the deck 401. For this purpose, the position of the columns 101, 102 and 103 can be changed on the deck 401 along x, y and/or z planes, and may optionally also be rotated for connecting trusses 107 between the columns 101, 102 and 103.

Figure 70:
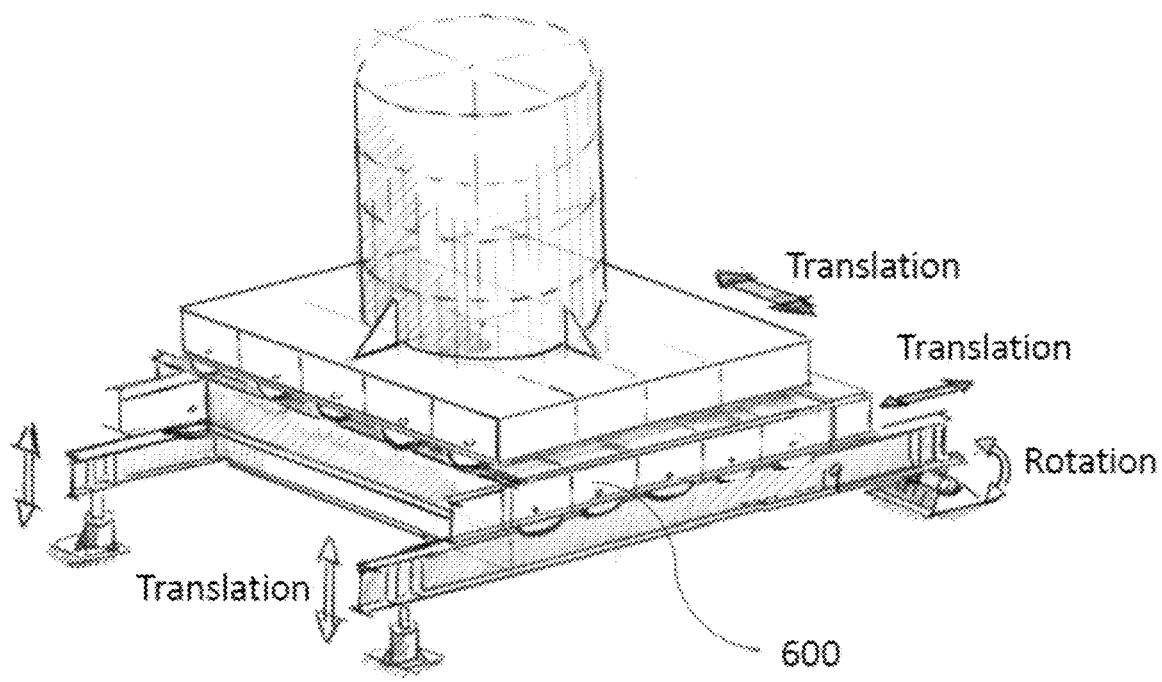
FIG. 70 illustrates a base for adjusting a position of columns on a deck.

FIG. 70 illustrates one option to realise this. A base 600 for adjusting the position of the columns on the deck 401 is positioned on the deck 401, or integrated into the deck 401. As depicted in FIG. 70, one or more of the columns 101, 102 and 103 are positioned on the base 600. For example, the base 600 can be a movable trolley, work floor, an actuator or the like which can push or drag any of the columns 101, 102 and 103 on the deck 401. The base 600 may have actuators, for example hydraulic cylinders, to effect this movement. Such a movable base 600 may be arranged with one, two, or all three of the column positions on the deck 401. (Or more, if there are more than three columns.)

Figure 71:
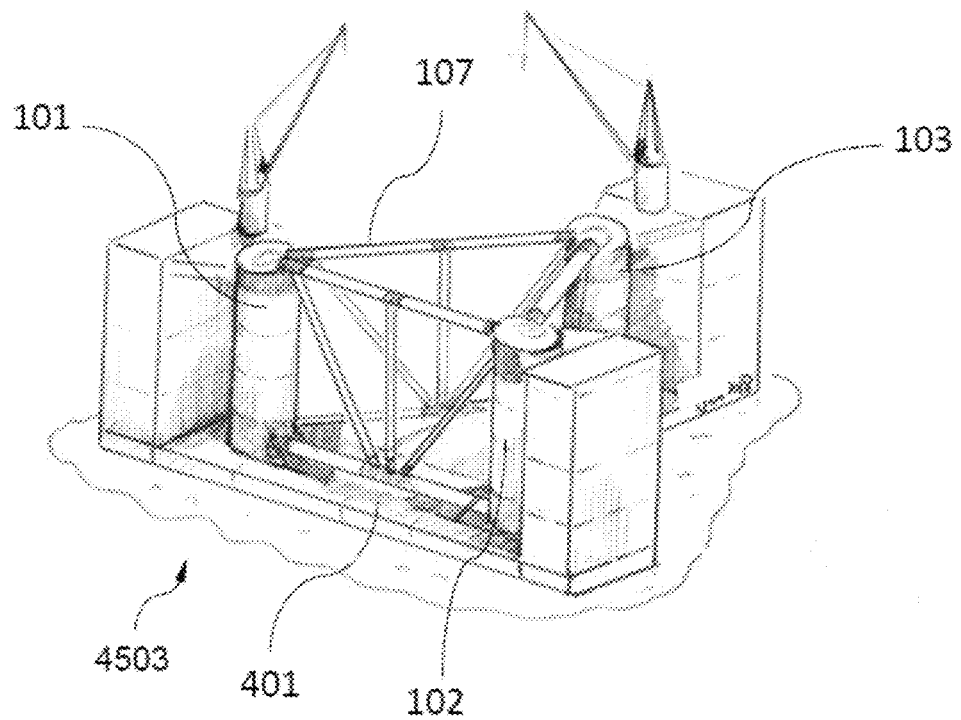
FIG. 71 illustrates a floater on a deck.

FIG. 71 illustrates the floater 100 on the deck 401, where the trusses have been arranged between all three columns 101-103. In one embodiment, the wind turbine 200 (see FIG. 1*a*) is installed on one of the columns 101, 102 and 103 when the floater is on the deck 401, i.e. in the position shown in FIG. 71. Alternatively, the wind turbine 200 is installed after the floater leaves the deck 401.

As the deck 401 is arranged in a non-submerged state, all necessary work on the floater 100 can be completed. For example, welding work, testing of materials, connections, etc., surface treatment, or similar operations can be completed by personnel on the vessel 4503 in this state. When the floater 100 is completed, the vessel 4503 is ballasted so that the deck 401 is lowered into its submerged position.

The floater 100, due to its own buoyancy, will now float above the deck 401, and can be towed away.

Figure 72:
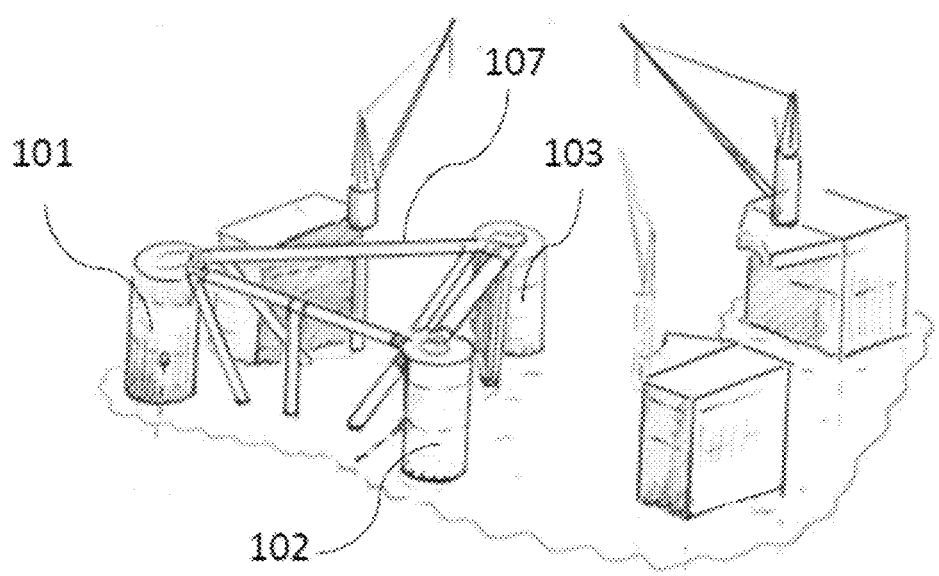
FIG. 72 illustrates a floater when leaving a deck.

FIG. 72 illustrates the submerged position and the floater 100 leaving the vessel 4503. Thus, after construction of the floater 100 with the deck 401 in the non-submerged state, the floater 100 is separated off the deck 401 by bringing the deck 401 to the submerged state, thereby allowing the floater 100 to float by means of the floater's own buoyancy. The floater 100 may, for example, be towed off the vessel 4503 by a tug or installation vessel.

Figure 73:
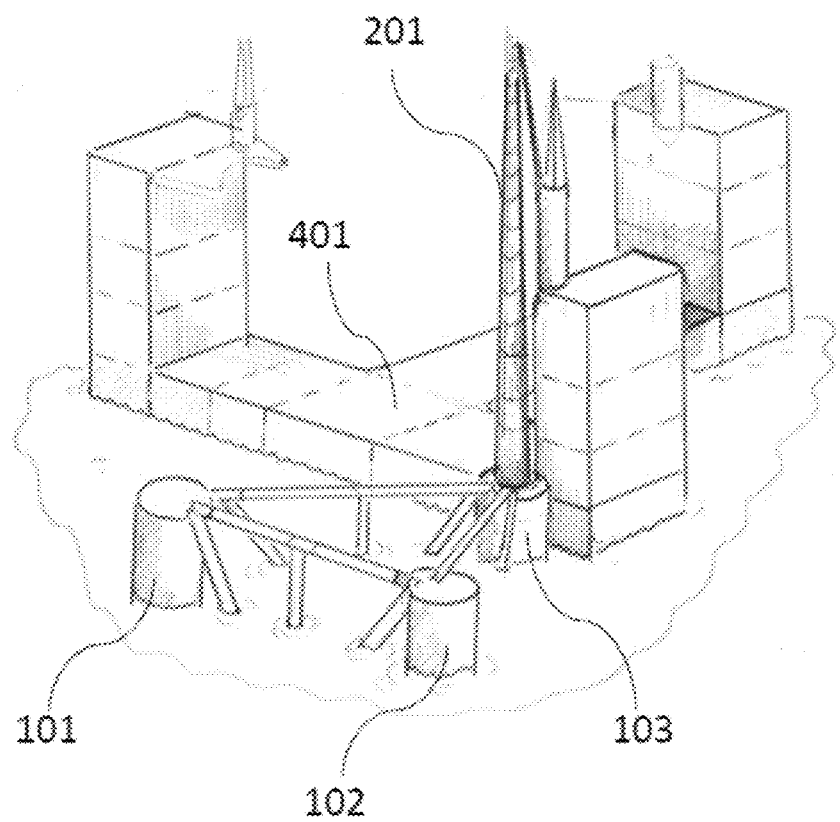
FIG. 73 illustrates the installation of a wind turbine on a floater.

In this embodiment, the wind turbine 200 is installed on the floater 100 after it has been floated off the vessel 4503. FIG. 73 illustrates the installation of the wind turbine 200 on the floater 100 after the floater has left the deck 401.

The wind turbine 200 may be installed using the vessel 4503, by means of cranes and other equipment on the vessel 4503. For this purpose, the floater 100 is positioned adjacent the vessel 4503 after it has been floated off the deck 401 in order for the wind turbine 200 to be installed. Alternatively, the wind turbine 200 may be installed by a separate vessel, for example an installation vessel particularly suitable for that purpose. In that case, the floater 100 may be positioned adjacent the installation vessel after construction for installation of the wind turbine 200.

After completion of the wind energy power plant, it may be towed into an installation position and moored in place, connected to electrical distribution lines, and otherwise prepared for operation.

Optionally, the steps described in relation to FIGS. 67 and 68 above may be omitted, and the floater 100 constructed on the deck 401 with the deck 401 entirely in the non-submerged position. Instead of floating components onto the deck 401, these may in such a case be hoisted onto the deck 401, or moved onto the deck 401 in a different manner such as by rolling on a trolley or trailer, etc. This may also include the columns 101-103, which may be hoisted or moved into their positions as illustrated in FIG. 69 with the deck 401 in the non-submerged position.

Advantageously, the construction of the floater 100 may be carried out at an offshore location. This may make the construction of wind parks more efficient, since the individual parts can be shipped with suitable vessels and the floaters 100 can be constructed at the site. This may eliminate the need to tow the floater long distances.

Although the above-mentioned embodiments describe the construction of the floater 100 having trusses interconnected between the columns, these embodiments are equally applicable for construction of the floater having pontoon units 104,105,106.

The method of construction may include assembling a base 601 (see FIG. 63 and the associated description above) from a plurality of base components 104-106, 602-604 on the deck 401. Optionally, the method of construction may include placing a pre-fabricated base 601 onto the deck 401 for constructing the floater 100.

The method may then comprise carrying out the further steps described above in relation to FIGS. 63-66 and/or in relation to aspects N40-N44 on the deck 401.

According to this aspect, there are provided the following numbered clauses, each of which making up inventive aspects provided by the present disclosure:

O1. A method of constructing a floater (100) for a wind power plant, comprising:
 providing a vessel (4503) having a deck (401) which is selectively submersible,
 with the deck (401) in a non-submerged position, constructing the floater (100) on the deck (401),
 bringing the deck (401) to a submerged position and floating the floater (100) off the deck by means of a floater's own buoyancy.

O2. The method of clause O1, wherein the floater (100) includes a plurality of columns (101-103) interconnected by connection members (104-107), and the step of constructing the floater (100) comprises interconnecting the columns (101-103) and the connection members (104-107).

O3. The method of clause O1 or O2, wherein the method comprises:
 with the deck (401) in a submerged position, floating parts of the floater (100) onto the deck (401), and
 raising the deck (401) to the non-submerged position.

O4. The method according to any of clauses O1-O3, comprising
 hoisting parts of the floater (100) onto the deck (401) prior to constructing the floater (100) on the deck (401).

O5. The method according to any of clauses O1-O4, comprising:
 positioning the plurality of columns (101-103) on the deck (401) by bringing the columns (101-103) into engagement with a vertical support structure on the vessel (4503).

O6. The method according to any of clauses O1-O5, comprising:
 with the deck (401) in the non-submerged position, adjusting a position of one or more of the plurality of columns (101-103) by means of a positioning mechanism (600) prior to fixing connection members (104-107) between the columns (101-103).

O7. The method according to clause O6, wherein the step of adjusting the position of one or more of the plurality of columns (101-103) comprises moving the column (101-103) in a horizontal direction, moving the column (101-103) in a vertical direction, and/or rotating the column (101-103) about a vertical axis.

O8. The method according to any of clauses O1-O7, comprising installing a wind turbine (200) on the floater (100).

O9. The method according to clause O8, wherein:
 the wind turbine (200) is installed on the floater (100) while the floater (100) is supported on the deck (401), or
 the wind turbine (200) is installed on the floater (100) while the floater (100) is floating by its own buoyancy.

O10. The method according to any of clauses O1-O9, wherein the vessel (4503) is one of a semi-submersible vessel and a jack-up.

O11. The method according to any of clauses O1-O10, wherein the method comprises anchoring the floater (100) at the offshore location after construction of the floater (100).

O12. The method according to any of clauses O1-O11, wherein the method is carried out at an offshore location.

O13. The method according to any of clauses O1-O12, wherein the method comprises:
 constructing a base (601) from a plurality of base components (104-106, 602-604) on the deck (401) or providing a base (601) onto the deck (401), and
 mounting the columns (101-103) onto the base (601) while the base (601) is supported by the deck (401).

O14. The method according to clause O13, comprising mounting connection members (104-107) between the columns (101-103).

O15. The method according to any one of clauses O1-O14, wherein the step of constructing the floater (100) on the deck (401) comprises:
 constructing the floater with a method according to any one of clauses 6-11 carried out on the deck (401);
 constructing the floater with a method according to any one of clauses D1-D16 carried out on the deck (401);
 constructing the floater with a method according to any one of clauses G1-G3 carried out on the deck (401); or
 assembling the floater with a method according to any one of clauses 26-36 carried out on the deck (401).

According to the numerous inventive aspects provided in the present disclosure, it should be understood that any of these aspects and/or any of the numbered clauses may, individually or combined, form claimed subject matter to protect inventions embodied therein.

As will be clear to the reader, various individual features and aspects according to the embodiments described above in relation to the figures may be combined in a number of different ways. The invention is not limited by the embodiments described above; reference should be had to the appended claims and the above numbered clauses.

The invention claimed is:

1. A method for constructing a floater for a floatable wind energy power plant, the method comprising:
 floating a first pre-assembled part comprising at least one first connection arrangement;
 floating a second pre-assembled part comprising at least one second connection arrangement;
 while the first pre-assembled part and the second pre-assembled part are floating:
  arranging the at least one first connection arrangement of the first pre-assembled part proximate to the at least one second connection arrangement of the second pre-assembled part so as to form a first connection site which comprises at least a part of the at least one first connection arrangement and at least a part of the at least one second connection arrangement;

sealingly arranging an enclosure about the first connection site so as to seal the enclosure against an ingress of water; and connecting the first pre-assembled part and the second pre-assembled part at the first connection site.

2. The method as recited in claim 1, wherein the connecting of the first pre-assembled part and the second pre-assembled part at the first connection site is performed by welding the first pre-assembled part and the second pre-assembled part together.

3. The method as recited in claim 1, wherein the enclosure comprises a liquid, and the method further comprises:

removing the liquid from the enclosure prior to the connecting of the first preassembled part and the second pre-assembled part.

4. The method as recited in claim 1, wherein a contact between the enclosure and the first connection site is avoided.

5. The method as recited in claim 1, wherein, the at least one first connection arrangement of the first pre-assembled part comprises a first connection arrangement and a second first connection arrangement, the first connection arrangement forming the at least a part of the first connection site, and the at least one second connection arrangement of the second pre-assembled part comprises a first second connection arrangement and a second connection arrangement, the first second connection arrangement forming the at least a part of the first connection site, and the method further comprises:

floating a third pre-assembled part comprising at least one third connection arrangement which comprises a first third connection arrangement and a second third connection arrangement;

while the first pre-assembled part and the second pre-assembled part are floating:

arranging the at least one first second connection arrangement of the first preassembled part proximate to the first third connection arrangement of the third pre-assembled part so as to form a second connection site which comprises at least a part of the first second connection arrangement and at least a part of the first third connection arrangement;

arranging the at least one second connection arrangement of the second preassembled part proximate to the second third connection arrangement of the third preassembled part so as to form a third connection site which comprises at least a part of the second connection arrangement and at least a part of the second third connection arrangement;

sealingly arranging an enclosure about each of the second connection site and the third connection site so as to seal each enclosure against an ingress of water;

connecting the first pre-assembled part to the third pre-assembled part at the second connection site; and connecting the second pre-assembled part to the third pre-assembled part at the third connection site.

6. The method as recited in claim 5, wherein, the first pre-assembled part further comprises at least one first pontoon unit part, and the at least one first connection arrangement is arranged on the at least one first pontoon unit part, the second pre-assembled part further comprises at least one second pontoon unit part, and the at least one second connection arrangement is arranged on the at least one second pontoon unit part, and the third pre-assembled part further comprises at least one third pontoon unit part, and the at least one third connection arrangement is arranged on the at least one third pontoon unit part.

7. A method of constructing a floatable wind power plant, the method comprising:

providing a plurality of pre-fabricated parts to a shore side;

assembling the plurality of pre-fabricated parts on a deck of a submersible vessel which is docked at the shore side to create a floater on the deck of the submersible vessel;

landing the floater on water so that the floater is in a floating state by submerging the submersible vessel;

mounting a wind turbine tower onto the floater so as to provide the floatable wind power plant; and towing the floatable wind power plant to an installation site.

8. The method as recited in claim 7, wherein the assembling of the plurality of pre-fabricated parts on the deck of the submersible vessel which is docked at the shore side so as to create the floater is performed by connecting the plurality of prefabricated parts by welding the plurality of pre-fabricated parts together.

9. The method as recited in claim 7, wherein the mounting of the wind turbine tower onto the floater so as to provide the floatable wind power plant is performed by mounting the wind turbine tower onto the floater with a crane which is arranged on the shore side.

10. A method of constructing a floater for a wind power plant, the method comprising:

providing an assembly deck which is configured to be selectively floating or submersed;

submerging the assembly deck;

floating pre-assembled parts over the assembly deck via a buoyancy of the respective pre-assembled parts;

moving the assembly deck into a non-submerged position;

constructing the floater on the assembly deck by interconnecting the pre-assembled parts;

resubmerging the assembly deck;

floating the floater off of the assembly deck via a buoyancy of the floater; and installing a wind turbine on the floater.

11. The method as recited in claim 10, wherein, when the assembly deck is in the non-submerged position, the method further comprises:

adjusting a position of at least one of a plurality of columns via a positioning mechanism, and then fixing connection members between the plurality of columns.

12. The method as recited in claim 10, wherein the installing of the wind turbine on the floater is performed while the floater is floating via the buoyancy of the floater.

13. The method as recited in claim 10, wherein the method is performed at an offshore location.

14. The method as recited in claim 10, wherein, the pre-assembled parts comprise pontoon unit parts, and the constructing of the floater on the assembly deck by interconnecting the preassembled parts is performed by interconnecting the respective pontoon unit parts of the preassembled parts.

15. The method as recited in claim 10, wherein the floating of the preassembled parts onto the assembly deck via the buoyancy of the respective pre-assembled parts is performed by floating exactly three of the pre-assembled parts onto the assembly deck via a buoyancy of the three respective pre-assembled parts.

* * * * *